US007539625B2

(12) United States Patent
Klumpen et al.

(10) Patent No.: US 7,539,625 B2
(45) Date of Patent: May 26, 2009

(54) METHOD AND APPARATUS AND PROGRAM STORAGE DEVICE INCLUDING AN INTEGRATED WELL PLANNING WORKFLOW CONTROL SYSTEM WITH PROCESS DEPENDENCIES

(75) Inventors: Hans Eric Klumpen, Austin, TX (US); Daan Veeningen, Houston, TX (US); Kris Givens, Stafford, TX (US)

(73) Assignee: Schlumberger Technology Corporation, Houston, TX (US)

( * ) Notice: Subject to any disclaimer, the term of this patent is extended or adjusted under 35 U.S.C. 154(b) by 1070 days.

(21) Appl. No.: 10/802,622

(22) Filed: Mar. 17, 2004

(65) Prior Publication Data

US 2005/0209836 A1    Sep. 22, 2005

(51) Int. Cl.
*G05B 19/418*    (2006.01)
(52) U.S. Cl. .......................................... 705/8
(58) Field of Classification Search ........................ 705/8
See application file for complete search history.

(56) References Cited

U.S. PATENT DOCUMENTS

| | | | | | |
|---|---|---|---|---|---|
| 5,416,697 | A | * | 5/1995 | Goodman | 702/9 |
| 6,424,919 | B1 | * | 7/2002 | Moran et al. | 702/6 |
| 6,438,495 | B1 | * | 8/2002 | Chau et al. | 702/9 |
| 6,728,947 | B1 | * | 4/2004 | Bengston | 717/103 |
| 2003/0177046 | A1 | * | 9/2003 | Socha-Leialoha | 705/7 |
| 2005/0021877 | A1 | * | 1/2005 | Varpela et al. | 710/1 |

(Continued)

FOREIGN PATENT DOCUMENTS

EP    1146200 A1 * 10/2001

(Continued)

OTHER PUBLICATIONS

Sriramdas, Srinivas, Systems Analysis of Drilling Engineering and Management To Design a Relational Database University of SouthWestern Louisianna, Spring 1998.*

(Continued)

*Primary Examiner*—Scott L Jarrett
(74) *Attorney, Agent, or Firm*—Robert P. Lord; Bryan P. Galloway

(57) ABSTRACT

A method of well planning in an automatic well planning system comprises the steps of: selecting one or more tasks in a task manager; verifying by a task dependency a proper order of the one or more tasks; retrieving by the task manager from a task base one or more sets of instructions associated with the one or more tasks selected in the task manager and verified by the task dependency; retrieving by the task manager from an access manager one or more sets of input data associated with the one or more sets of instructions retrieved by the task manager from the task base; verifying that each set of input data of the one or more sets of input data retrieved by the task manager from the access manager is received by a corresponding one of the one or more sets of instructions retrieved by the task manager from the task base; executing, by the task manager, the one or more sets of instructions and using, by the task manager, the one or more sets of input data during the executing step thereby generating a set of results; and recording or displaying, by a task view base, the set of results on a recorder or display device.

55 Claims, 63 Drawing Sheets

U.S. PATENT DOCUMENTS

2005/0119911 A1* 6/2005 Ayan et al. .................. 705/1

FOREIGN PATENT DOCUMENTS

GB 2290330 A * 12/1995
GB 2367843 A * 4/2002

OTHER PUBLICATIONS

Primavera Project Planner Planning and Control Guide Version 3.0 Primavera Systems, 1999.*
Oliver, Rod, Complete planning for maintenance turnarouds will ensure success Oil & Gas Journal, vol. 100, No. 17, Apr. 29, 2002.*
Choi, Injun et al., Task net: Transactional workflow model based on colored Petri net European Journal of Operational Research, vol. 136, 2002.*
Attie, PC et al., Scheduling workflows by enforcing intertask dependencies Distributed System Engineering, vol. 3, 1996.*
ActionWorkflow Enterprise Series 3.0 Process Builder User's Guide Action Technologies, Inc., 1996.*
Vijayalakshmi, Atluri et al., Modeling and Evaluation of Redesigning Methodologies for Distributed Workflows IEEE 2000.*
Harel D. et al., STATEMATE: A Working Environment for the Development of Complex Reactive Systems IEEE, 1988.*
Teamware Flow 3.1 User's Guide TeamWARE Group Limited, Apr. 2000.*
TrackWise User's Guide Sparta Systems, Inc. 2000.*
Nastansky, Ludwig, Conceptual Design and Implementation of a Graphical Workflow Modeling Editor in the Context of Distributed Groupware Databases, University of Paderborn, May 1994.*
Bourgoyne, Adam T. Jr. et al., Applied Drilling Engineering Society of Petroleum Engineers, 1996.*
Booth, J. et al., Meeting Future Drilling Planning and Decision Support Requirements SPE/IADC Drilling Conference, 2001.*
SPE/IADC 67816 "Meeting Future Drilling Planning and Decision Support Requirements" Copyright 2001, Feb. 27-Mar. 1, 2001.

* cited by examiner

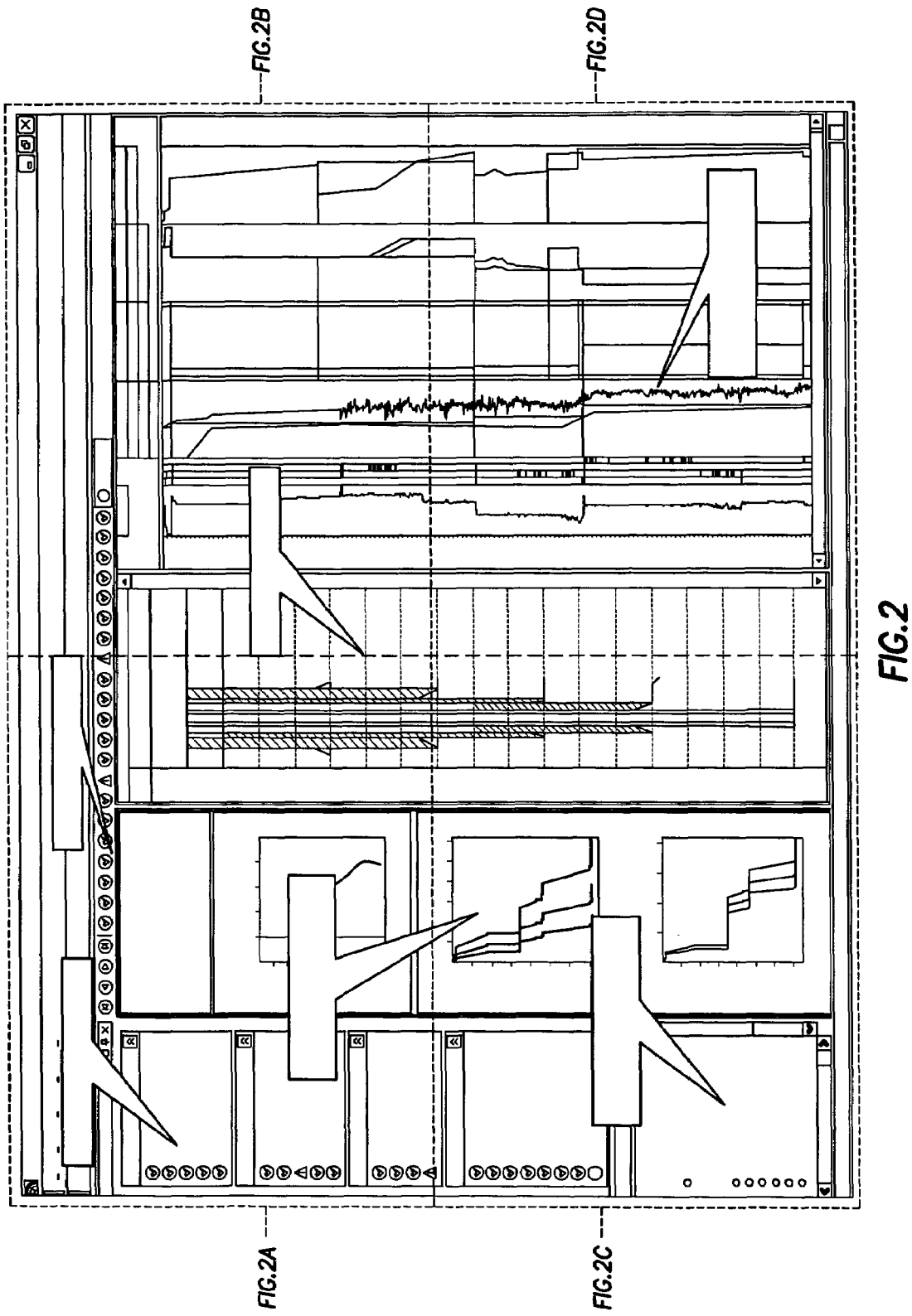

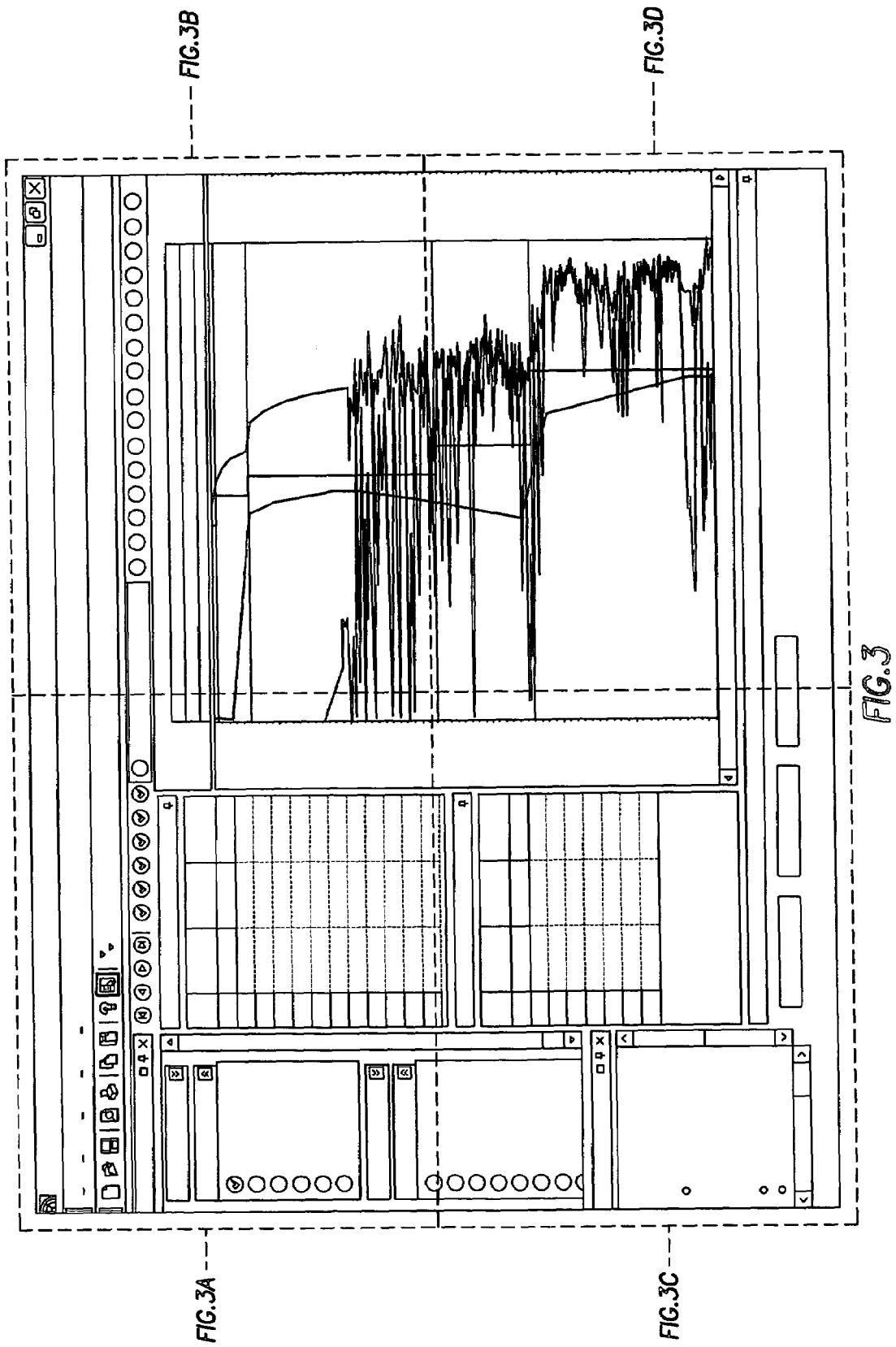

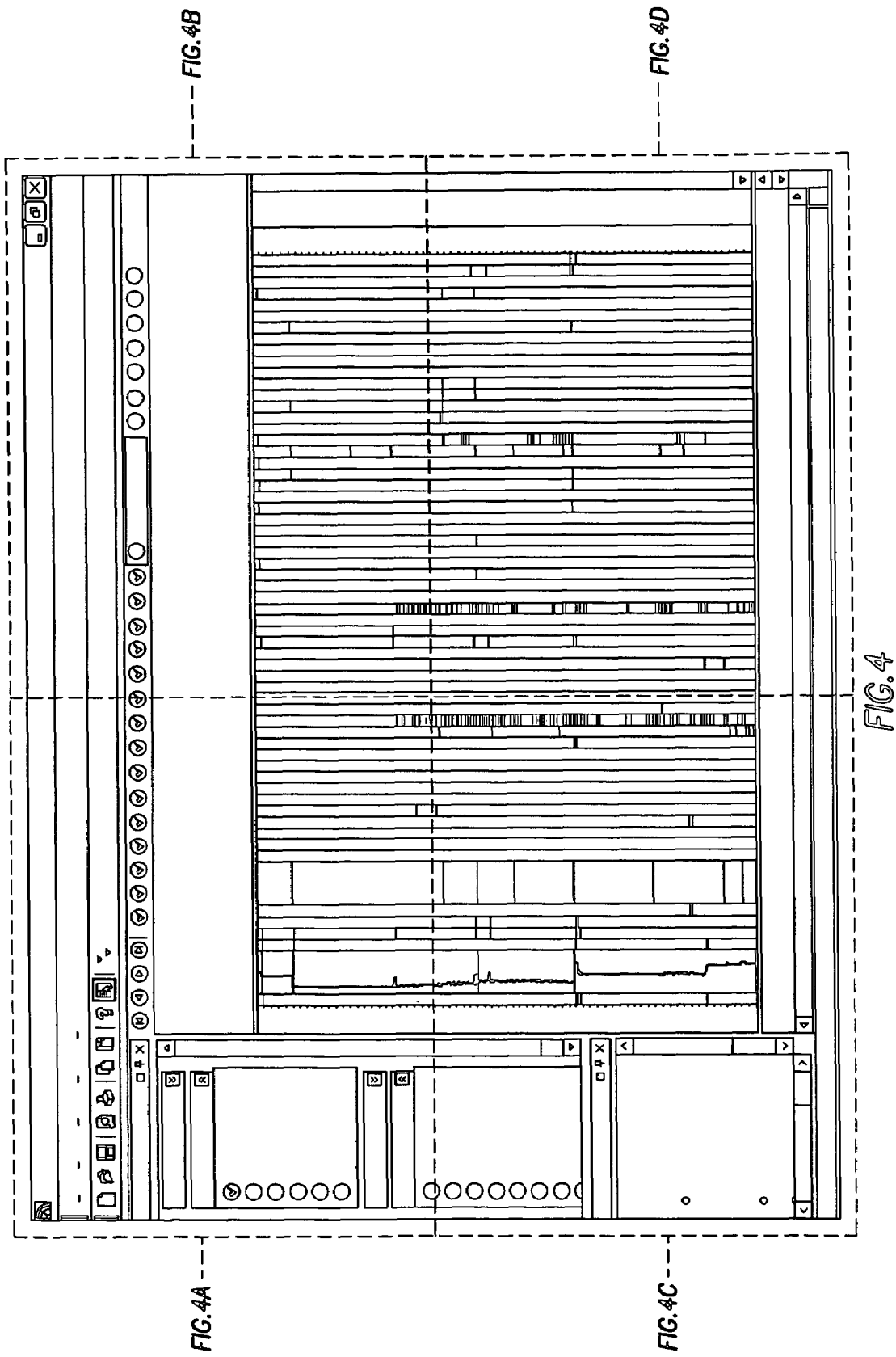

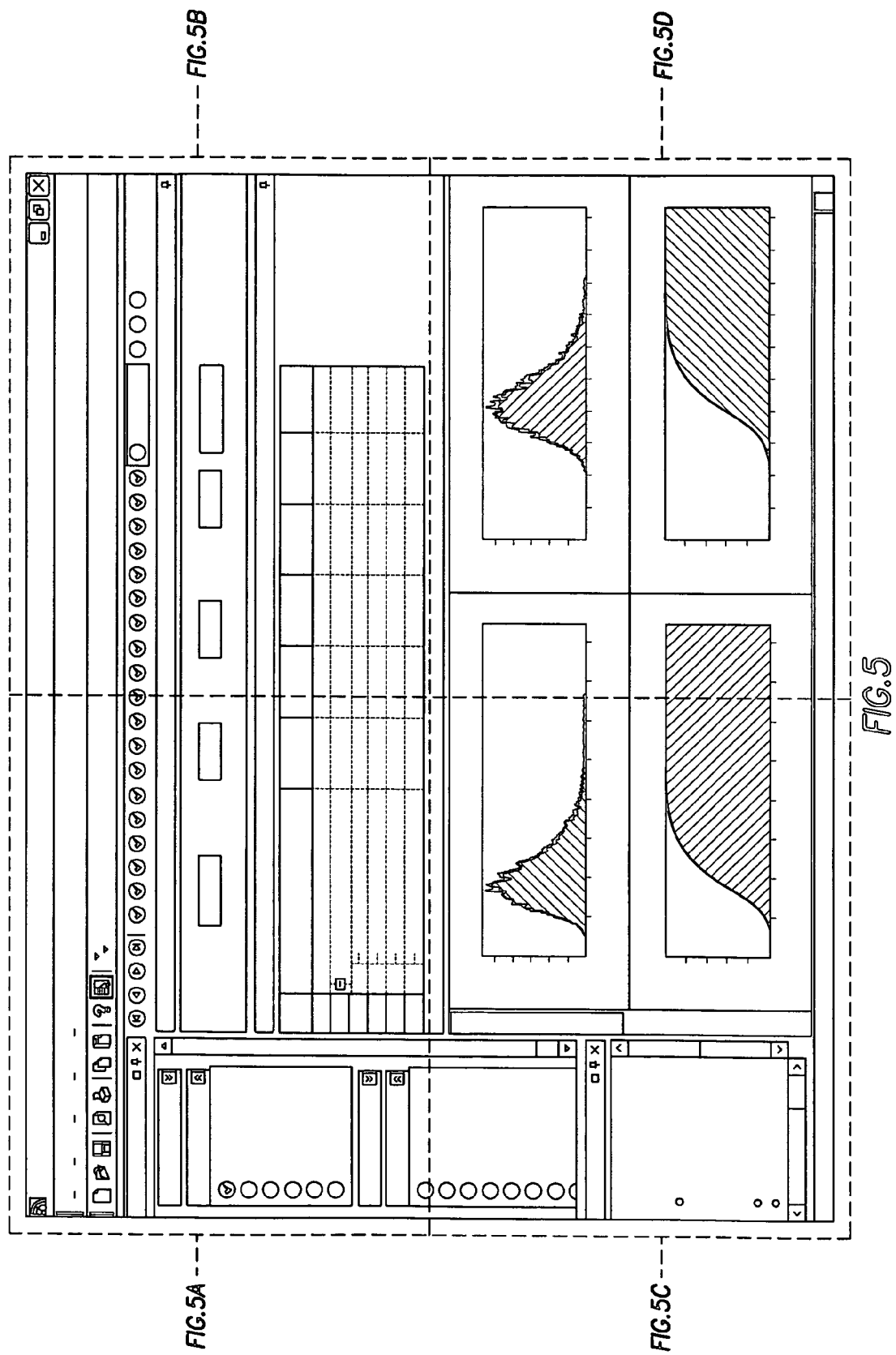

FIG. 5A

| Mid P% Time | End P% Time | First P% Cost | Mid P% Cost | End P% Cost |
|---|---|---|---|---|
| day | day | K$ | K$ | K$ |
| 39.6 | 63.99 | 1,638 | 2,132 | 2,804 |
| 1.33 | 2.77 | 15 | 30 | 57 |
| 35.9 | 56.76 | 1,585 | 2,035 | 2,634 |
| 1.17 | 1.95 | 24 | 40 | 61 |
| 1.2 | 2.51 | 14 | 27 | 52 |

FIG. 5B

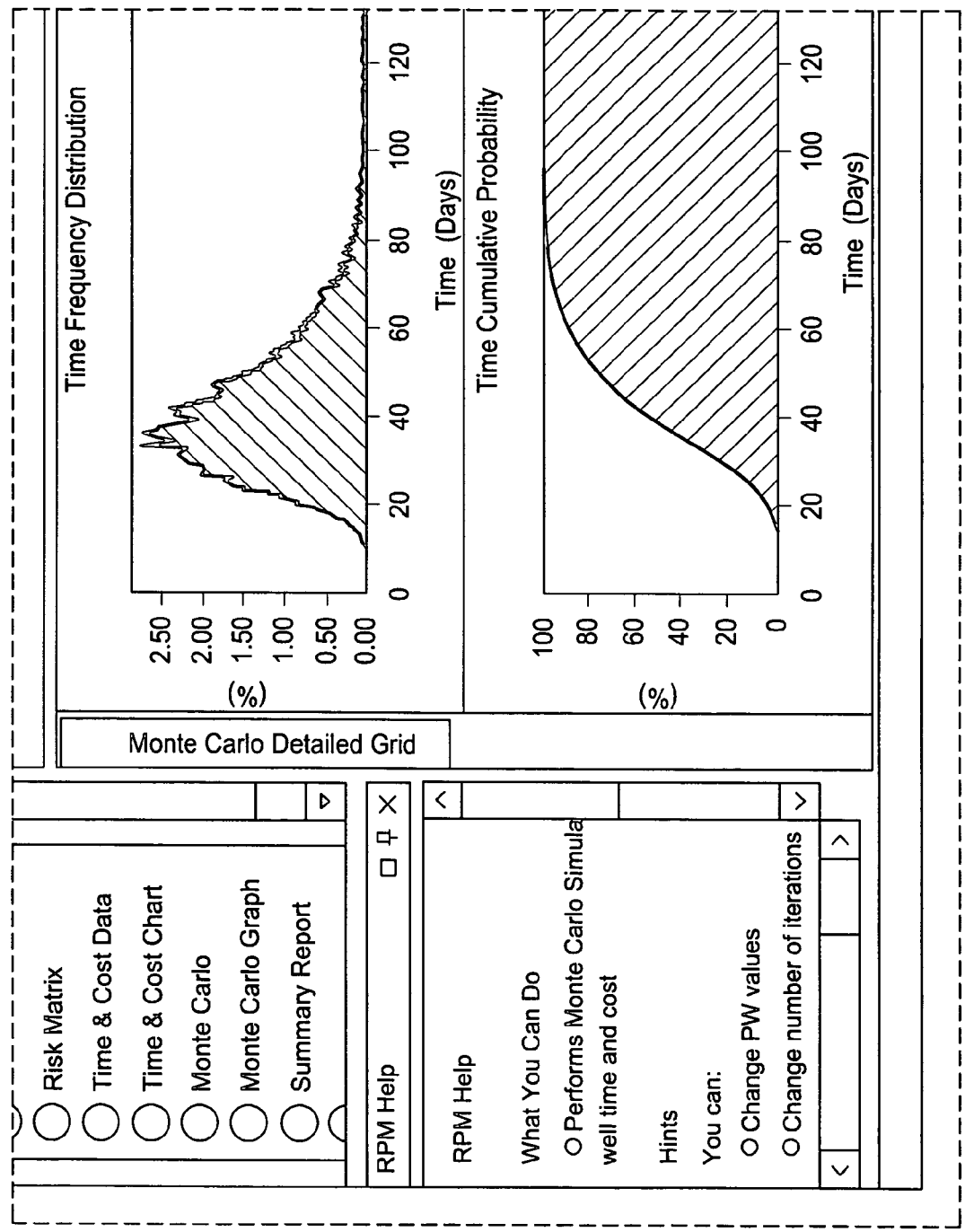

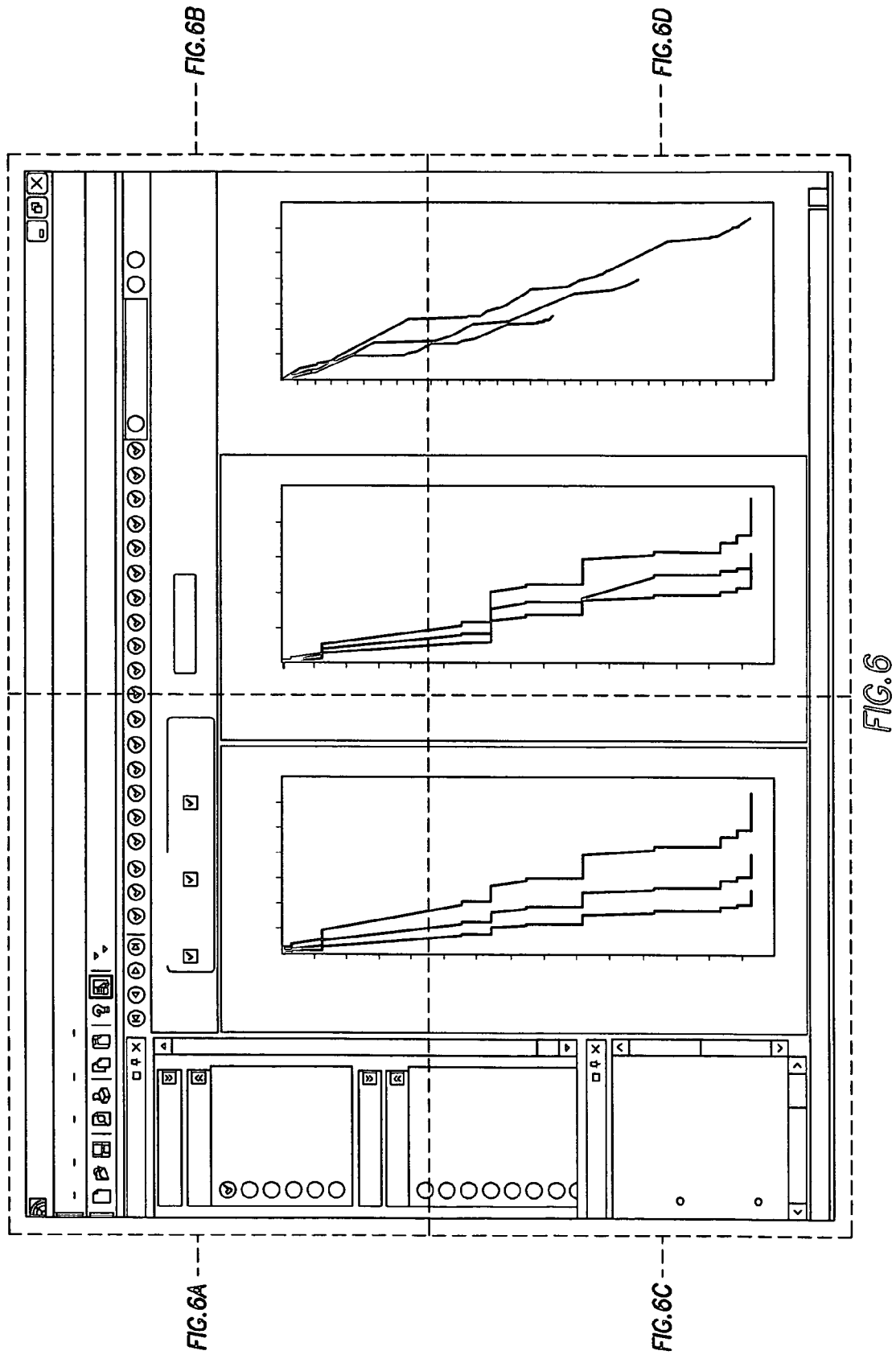

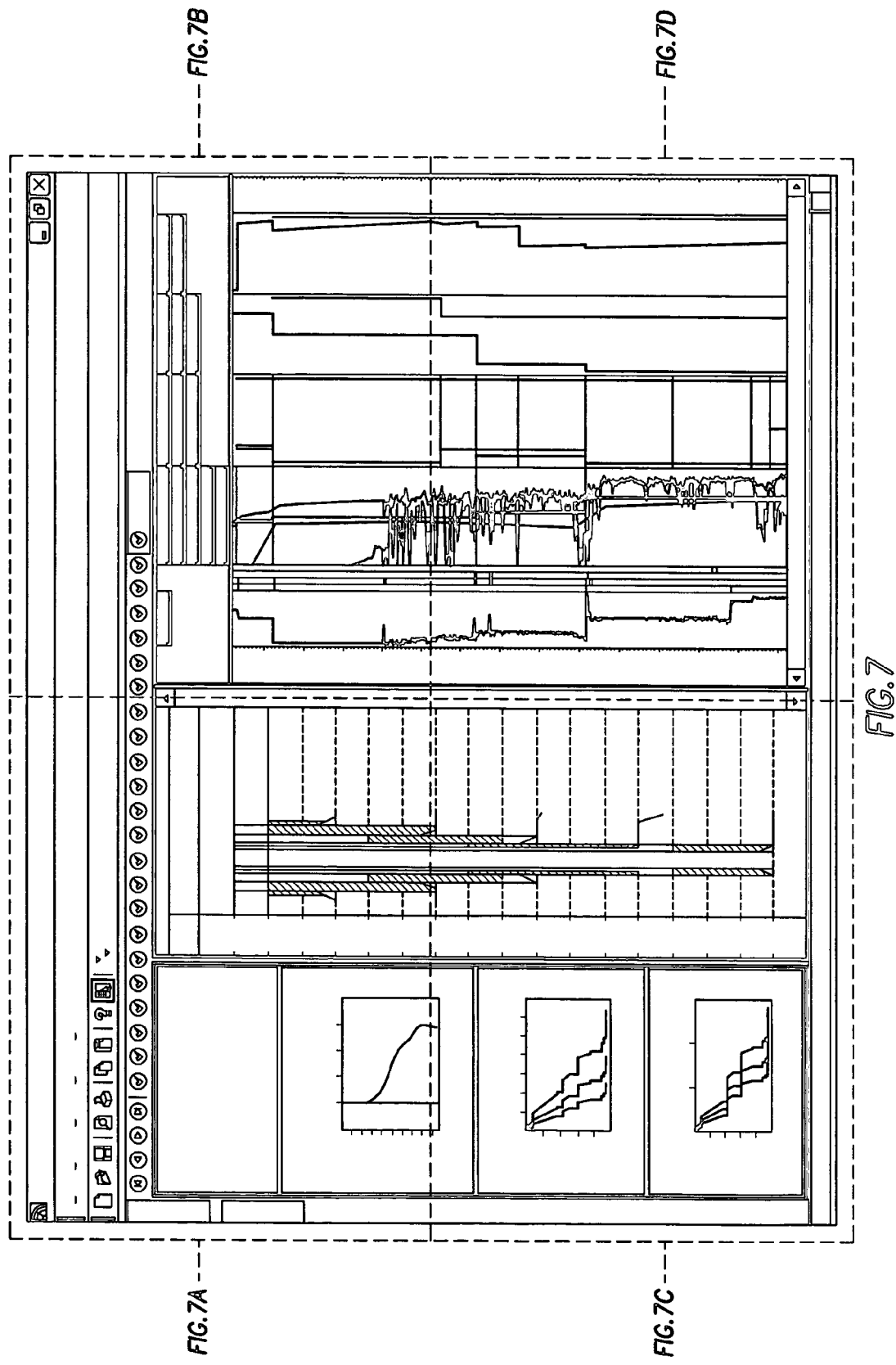

FIG. 15A
FIG. 15B
FIG. 15C
FIG. 15D
FIG. 15

| End MD | Distance | ROP | WOB | RPM | KREV | Excess | Co |
|---|---|---|---|---|---|---|---|
| ft | ft | ft/h | lbm | | | | K$ |
| 3493.24 | 697.24 | 38.50 | 5.00 | 85.00 | 0.00 | 0.00 | |
| 5648.76 | 2155.51 | 30.20 | 10.00 | 120.00 | 130.39 | 0.00 | |
| 7558.20 | 1909.45 | 35.40 | 5.00 | 140.00 | 599.55 | 0.00 | |
| 10481.43 | 2923.23 | 25.00 | 10.00 | 100.00 | 323.64 | 0.00 | |
| 13946.00 | 3464.57 | 30.00 | 10.00 | 100.00 | 701.57 | 0.00 | |
| 14339.70 | 393.70 | 29.90 | 10.00 | 100.00 | 692.91 | 0.00 | |
| 16249.15 | 1909.45 | 35.00 | 5.00 | 120.00 | 94.80 | 0.00 | |
| 16642.85 | 393.70 | 15.00 | 15.00 | 70.00 | 229.13 | 0.00 | |
| 16997.18 | 354.33 | 15.00 | 15.00 | 70.00 | 110.24 | 0.00 | |
| 17361.35 | 364.17 | 15.00 | 15.00 | 70.00 | 99.21 | 0.00 | |
| 17735.37 | 374.02 | 15.00 | 15.00 | 70.00 | 101.97 | 0.00 | |

| Weight DC1 | OD DC1 | ID DC1 | LW DC1 | Length DC2 | Weight DC2 | OD DC2 | ID DC2 |
|---|---|---|---|---|---|---|---|
| kg | in | in | kg/m | m | kg | in | in |
| 7826.62 | 9.50 | 2.81 | 329.60 | 27.43 | 3579.01 | 6.75 | 2. |
| 5201.34 | 8.00 | 2.81 | 224.52 | 27.43 | 3491.69 | 6.75 | 2. |
| 2745.49 | 4.75 | 2.25 | 123.84 | 27.43 | 2745.49 | 4.75 | 2. |
| 2649.54 | 4.75 | 2.25 | 123.84 | 27.43 | 1669.89 | 3.50 | 1. |

Drillstring Design

Wellbore Schematic: 2/23/2004 (KB-Grd: 15.2m)
Schematic-Proposed

Wellbore Schematic, 18 5/8, 15.2-331.6,

FIG. 19B

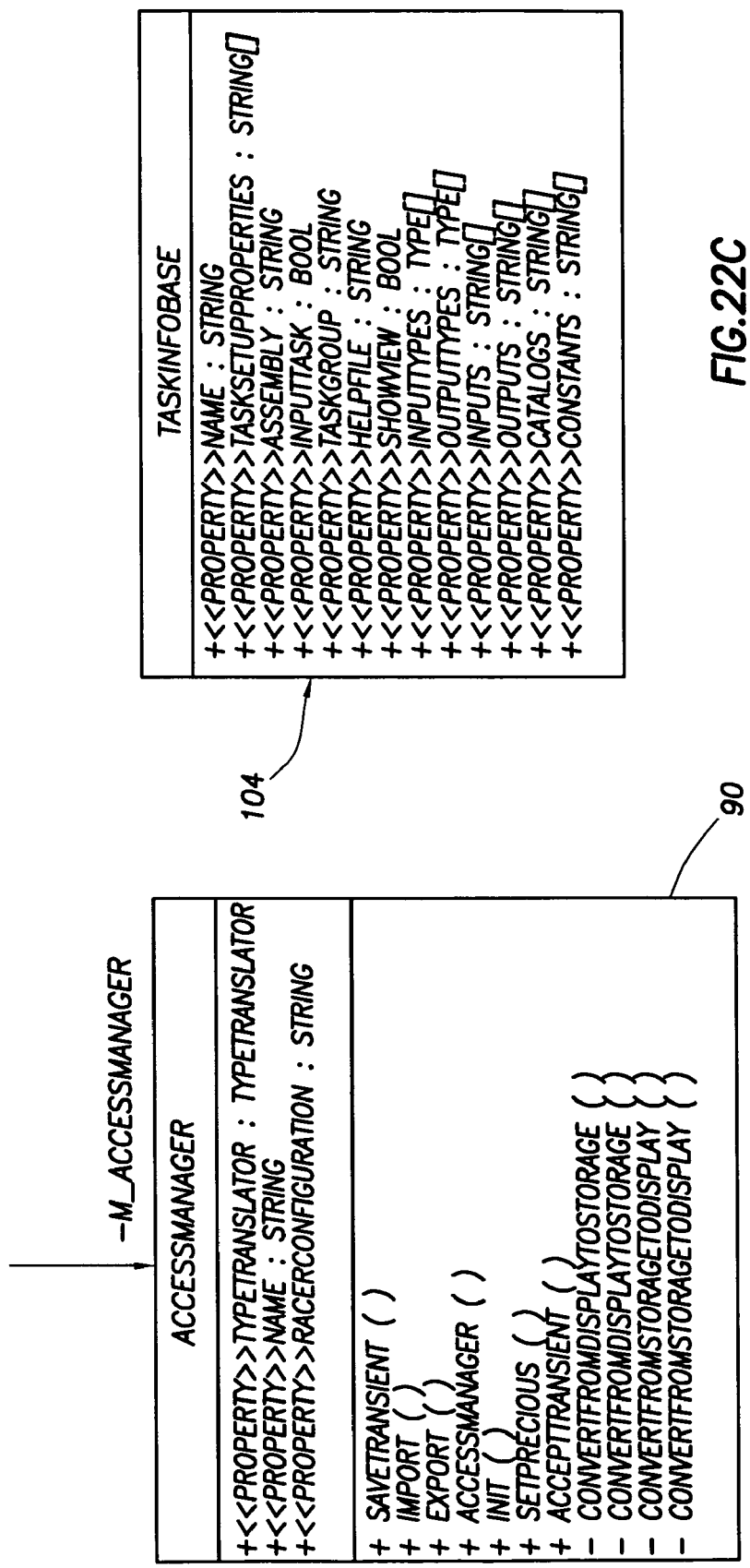

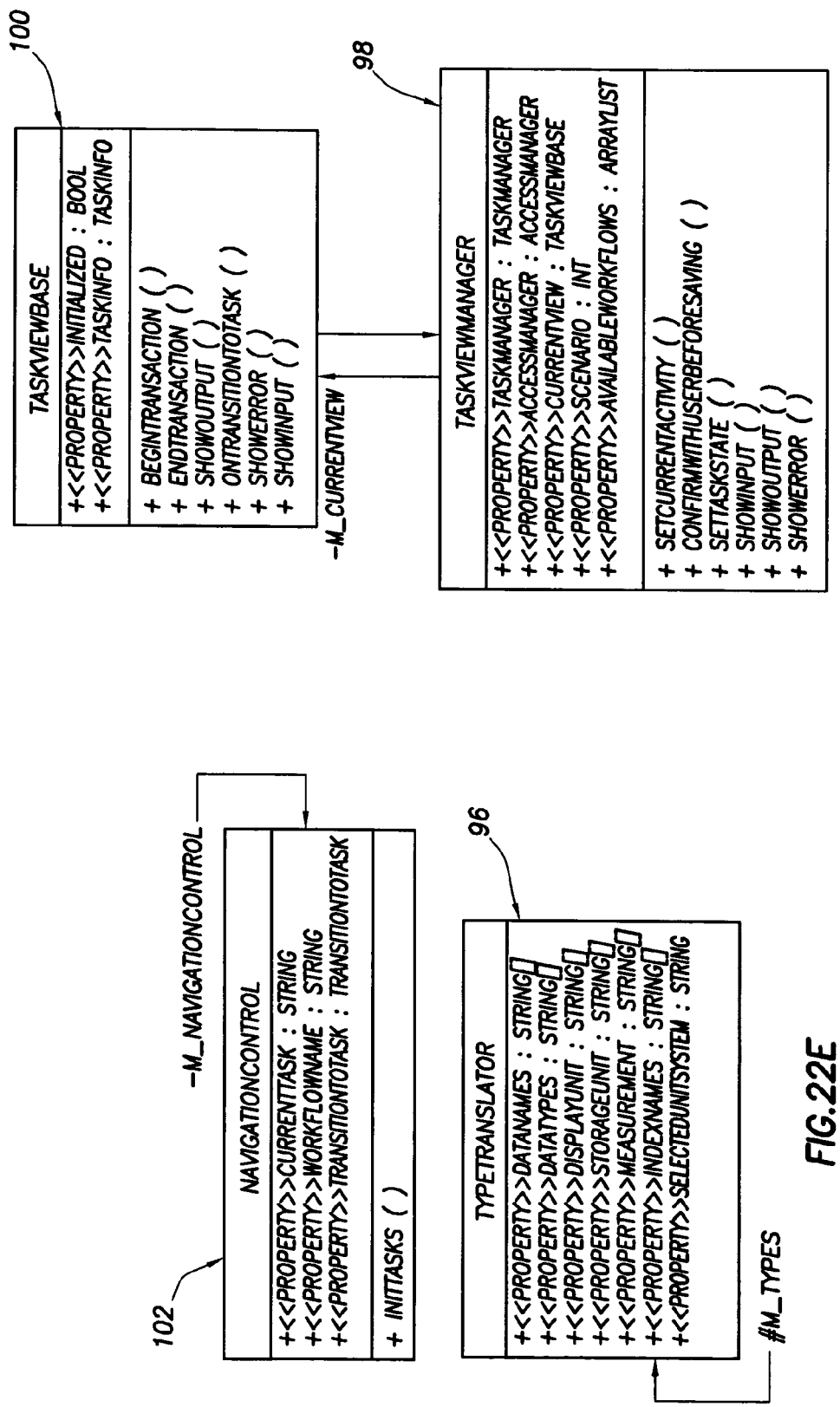

METHOD AND APPARATUS AND PROGRAM STORAGE DEVICE INCLUDING AN INTEGRATED WELL PLANNING WORKFLOW CONTROL SYSTEM WITH PROCESS DEPENDENCIES

CROSS REFERENCE TO RELATED APPLICATIONS

This application is related to pending application Ser. No. 10/802,507 filed Mar. 17, 2004, and is related to pending application Ser. No. 10/802,545 filed Mar 17, 2004, and it is related to pending application Ser. No. 10/802,524 filed Mar. 17, 2004, and it is related to pending application Ser. No. 10/802,613 filed Mar 17, 2004.

BACKGROUND OF THE INVENTION

The subject matter of the present invention relates to a software system adapted to be stored in a computer system, such as a personal computer, for providing an integrated well planning workflow control system with process dependencies.

Minimizing wellbore costs and associated risks requires wellbore construction planning techniques that account for the interdependencies involved in the wellbore design. The inherent difficulty is that most design processes and systems exist as independent tools used for individual tasks by the various disciplines involved in the planning process. In an environment where increasingly difficult wells of higher value are being drilled with fewer resources, there is now, more than ever, a need for a rapid well-planning, cost, and risk assessment tool.

This specification discloses a software system representing an automated process adapted for integrating both a wellbore construction planning workflow and accounting for process interdependencies. The automated process is based on a drilling simulator, the process representing a highly interactive process which is encompassed in a software system that: (1) allows well construction practices to be tightly linked to geological and geomechanical models, (2) enables asset teams to plan realistic well trajectories by automatically generating cost estimates with a risk assessment, thereby allowing quick screening and economic evaluation of prospects, (3) enables asset teams to quantify the value of additional information by providing insight into the business impact of project uncertainties, (4) reduces the time required for drilling engineers to assess risks and create probabilistic time and cost estimates faithful to an engineered well design, (5) permits drilling engineers to immediately assess the business impact and associated risks of applying new technologies, new procedures, or different approaches to a well design. Discussion of these points illustrate the application of the workflow and verify the value, speed, and accuracy of this integrated well planning and decision-support tool.

Minimizing well costs and associated risks requires well construction planning techniques that account for all of the interdependencies involved with the well design. The inherent difficulty is that most design processes and systems in use today exist as independent tools used for individual tasks by the various disciplines involved in the process. Although a series of steps involved in well construction planning are well defined and understood, the inter-dependencies among those steps and the resulting workflow were never previously analyzed and therefore no technical solution has been provided in the past for the purpose of reducing the time it takes to create accurate results.

SUMMARY OF THE INVENTION

One aspect of the present invention involves a method of well planning in an automatic well planning system, comprising the steps of: selecting one or more tasks in a task manager; verifying by a task dependency a proper order of the one or more tasks; retrieving by the task manager from a task base one or more sets of instructions associated with the one or more tasks selected in the task manager and verified by the task dependency; retrieving by the task manager from an access manager one or more sets of input data associated with the one or more sets of instructions retrieved by the task manager from the task base; verifying that each set of input data of the one or more sets of input data retrieved by the task manager from the access manager is received by a corresponding one of the one or more sets of instructions retrieved by the task manager from the task base; executing, by the task manager, the one or more sets of instructions and using, by the task manager, the one or more sets of input data during the executing step thereby generating a set of results; and recording or displaying, by a task view base, the set of results on a recorder or display device.

Another aspect of the present invention involves a program storage device readable by a machine tangibly embodying a program of instructions executable by the machine to perform method steps adapted for well planning in an automatic well planning system, the method steps comprising: selecting one or more tasks in a task manager; verifying by a task dependency a proper order of the one or more tasks; retrieving by the task manager from a task base one or more sets of instructions associated with the one or more tasks selected in the task manager and verified by the task dependency; retrieving by the task manager from an access manager one or more sets of input data associated with the one or more sets of instructions retrieved by the task manager from the task base; verifying that each set of input data of the one or more sets of input data retrieved by the task manager from the access manager is received by a corresponding one of the one or more sets of instructions retrieved by the task manager from the task base; executing, by the task manager, the one or more sets of instructions and using, by the task manager, the one or more sets of input data during the executing step thereby generating a set of results; and recording or displaying, by a task view base, the set of results on a recorder or display device.

Another aspect of the present invention involves an automatic well planning system, comprising: task manager apparatus adapted for receiving one or more tasks selected by a user; task dependency apparatus adapted for verifying a proper order of the one or more tasks, the task manager apparatus retrieving from a task base one or more sets of instructions associated with the one or more tasks received in the task manager apparatus and verified by the task dependency apparatus, the task manager apparatus retrieving from an access manager one or more sets of input data associated with the one or more sets of instructions retrieved by the task manager from the task base; translator apparatus adapted for verifying that each set of input data of the one or more sets of input data retrieved by the task manager apparatus from the access manager is received by a corresponding one of the one or more sets of instructions retrieved by the task manager apparatus from the task base, the task manager executing the one or more sets of instructions and using the one or more sets of input data during the execution of the one or more sets of instructions thereby generating a set of results; and task view base apparatus adapted for recording or display the set of results on a recorder or display device.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 2 including

FIG. 3 including

FIG. 4 including

FIG. 5 including FIGS. 5A, 5B, 5C, and 5D illustrates a Monte Carlo time and cost distribution;

FIG. 6 including

FIG. 7 including

DETAILED DESCRIPTION

Figure 1:
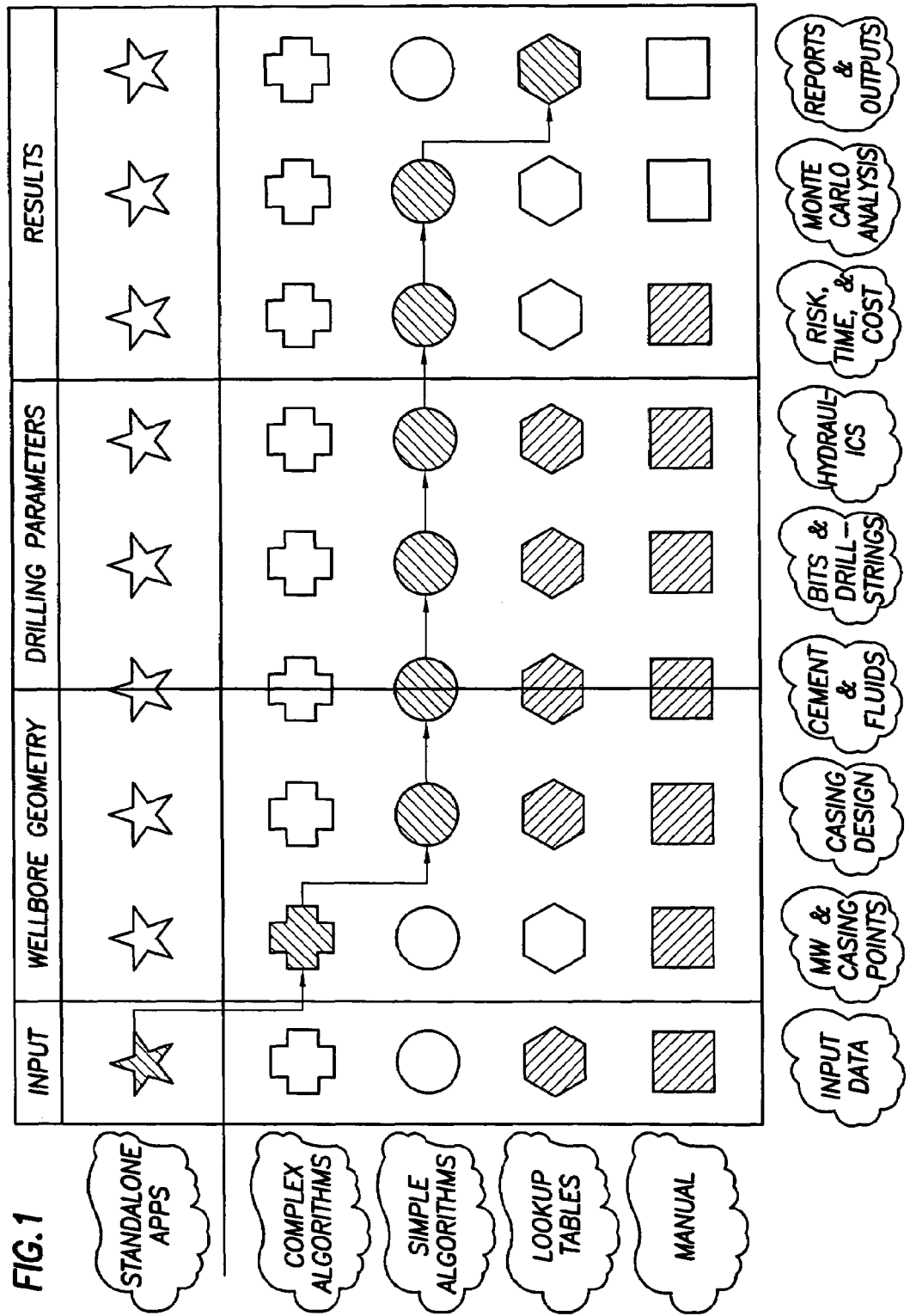
FIG. 1 illustrates a software architecture schematic indicating a modular nature to support custom workflows.
Figure 2A:
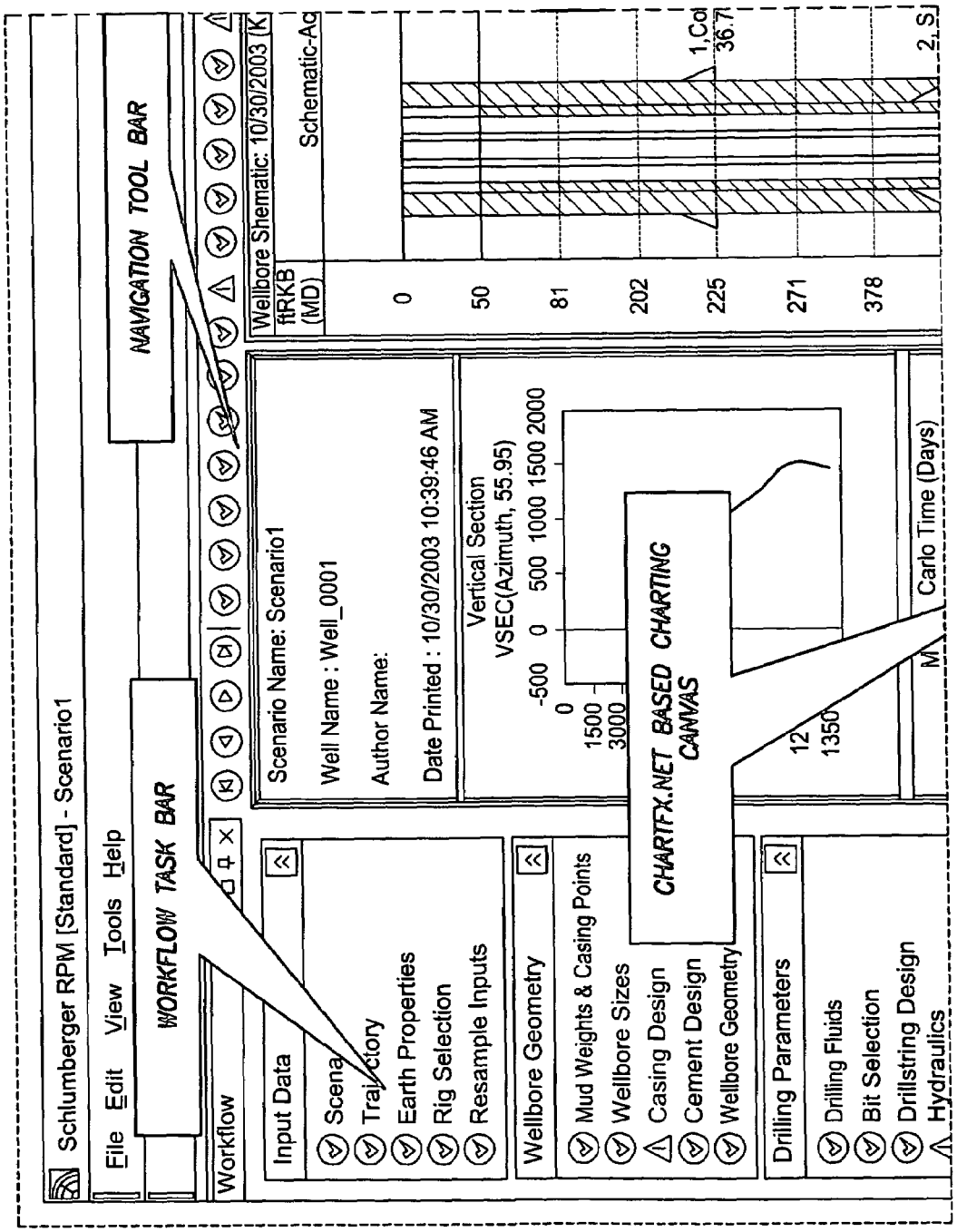
FIGS. 2A, 2B, 2C, and 2D illustrates a typical task view consisting of workflow, help and data canvases.
Figure 2B:
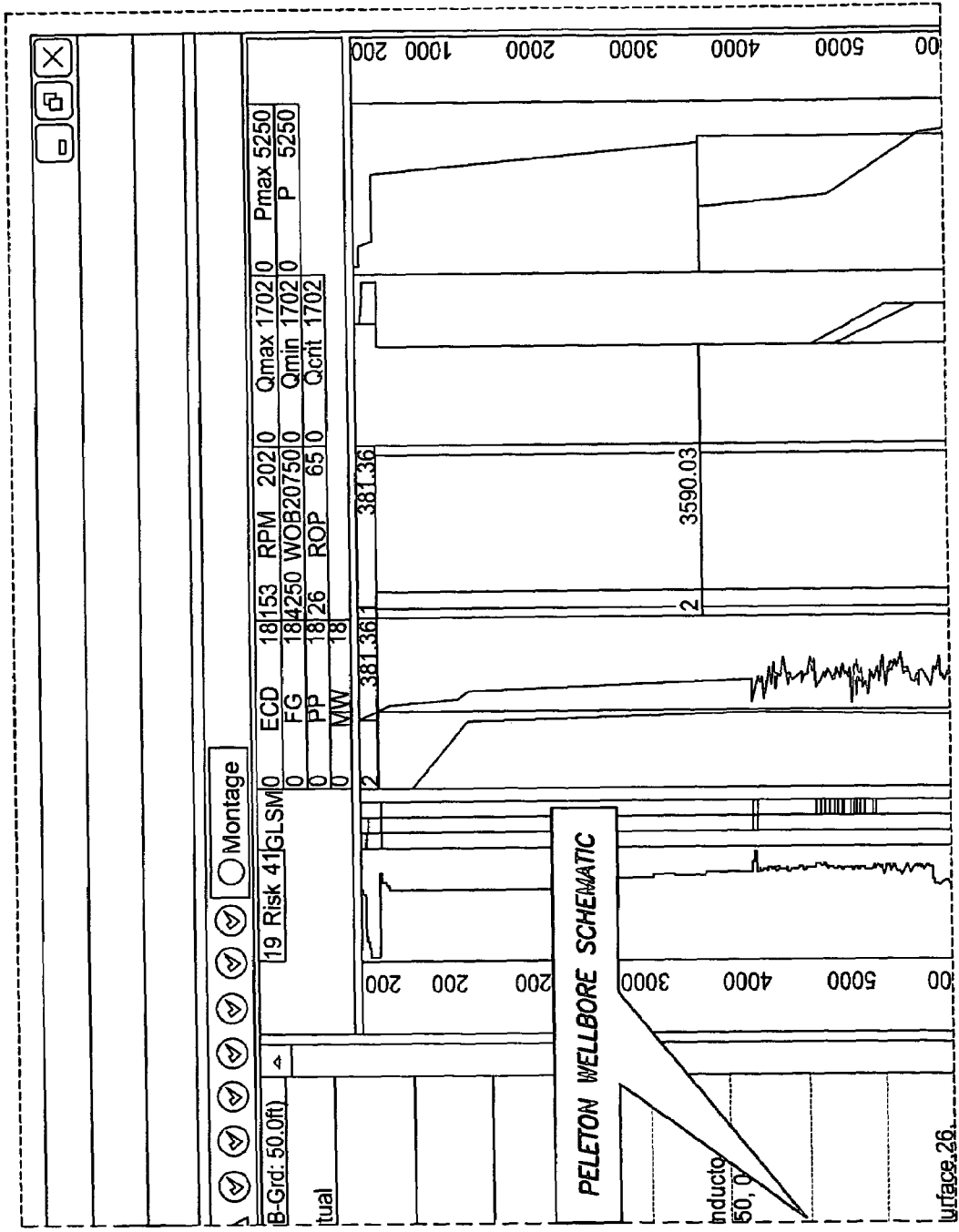
Figure 2C:
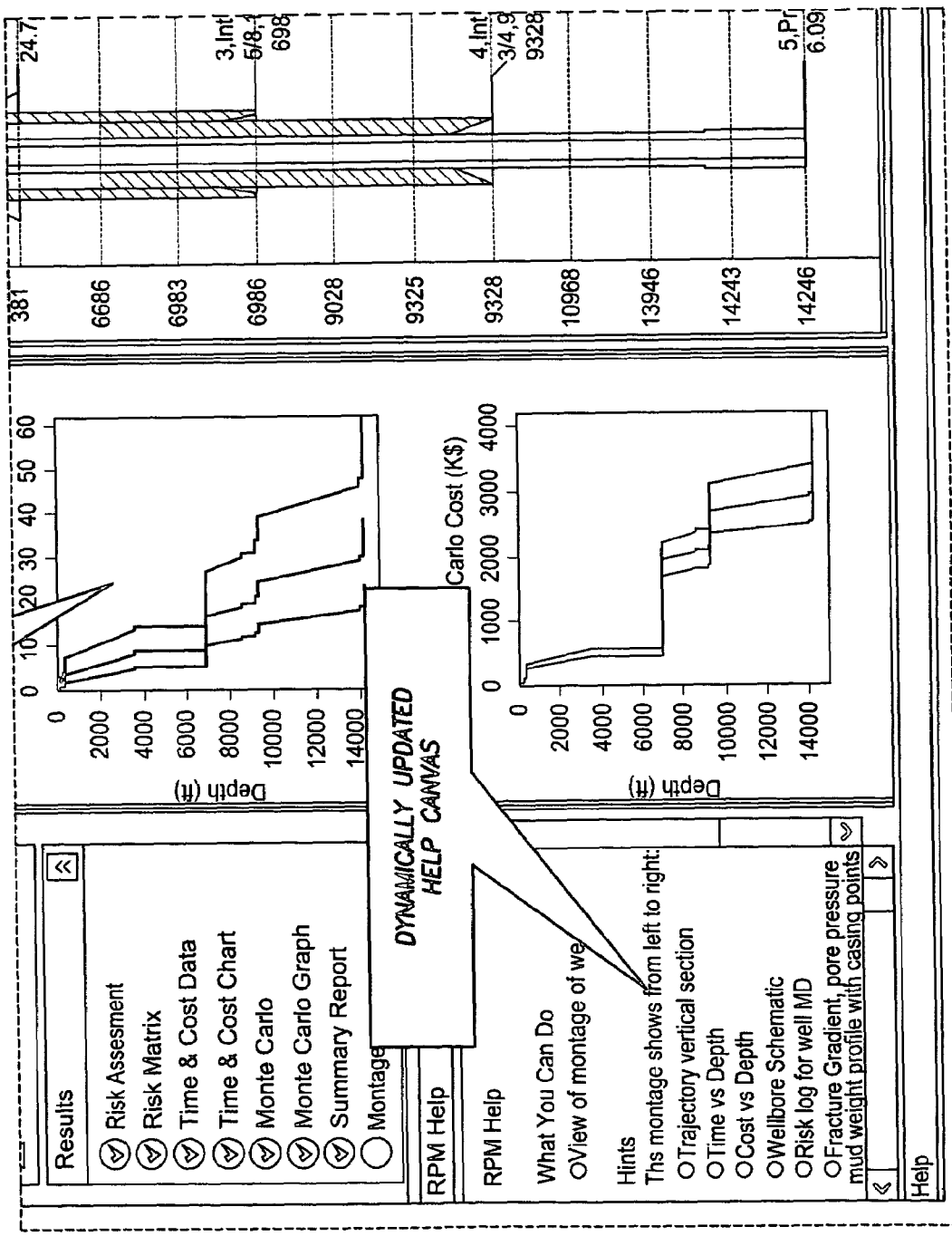
Figure 2D:
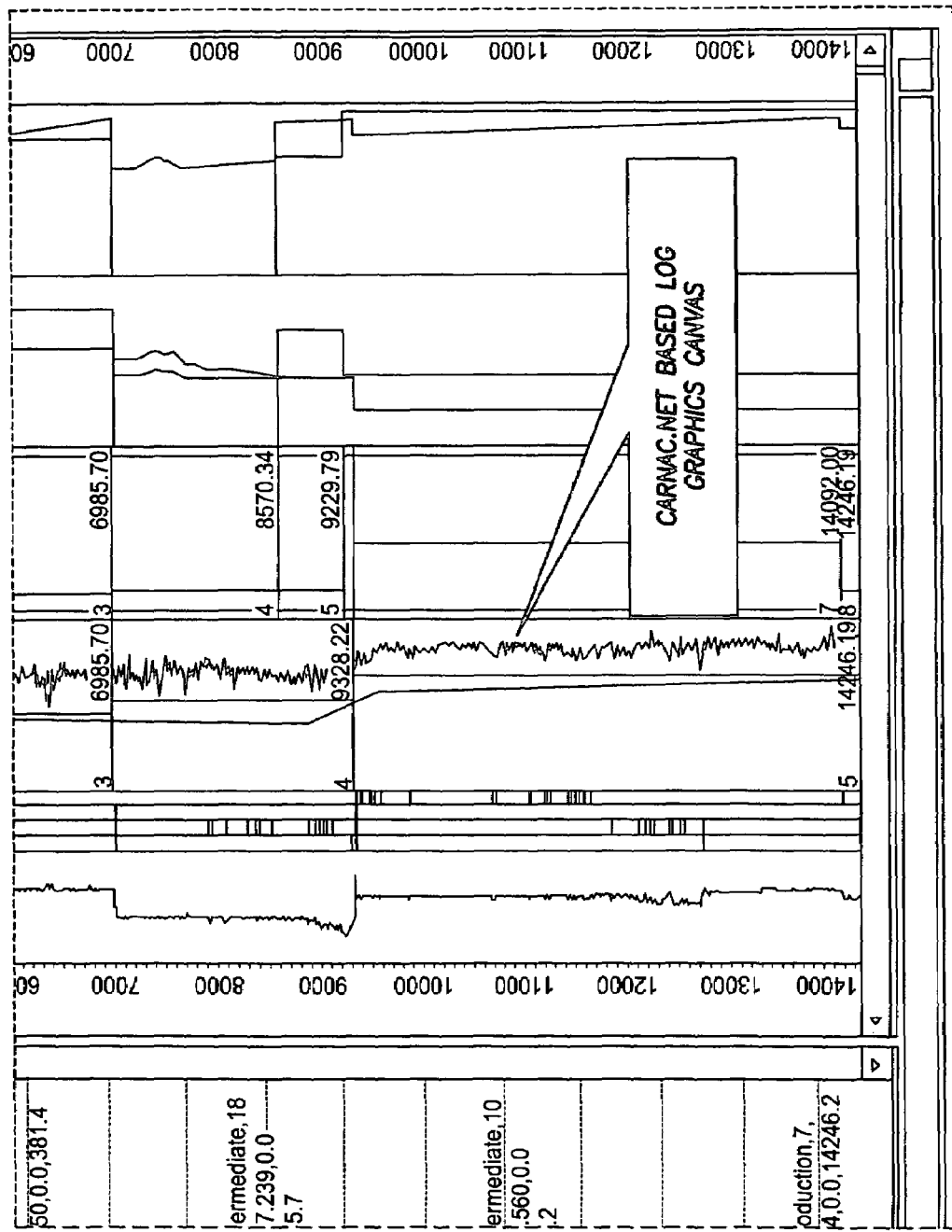
Figure 3A:
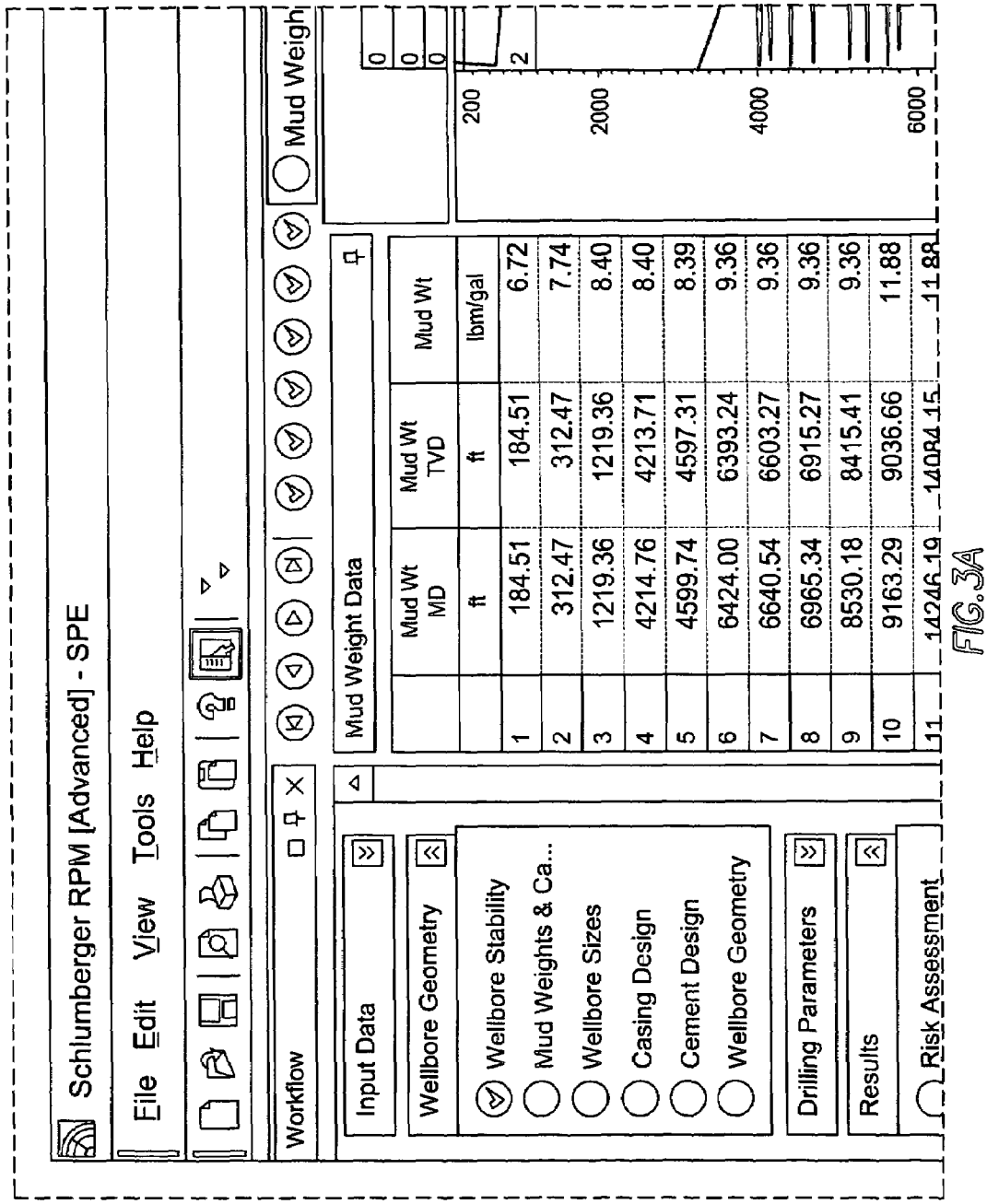
FIGS. 3A, 3B, 3C, and 3D illustrates wellbore stability, mud weights, and casing points.
Figure 3B:
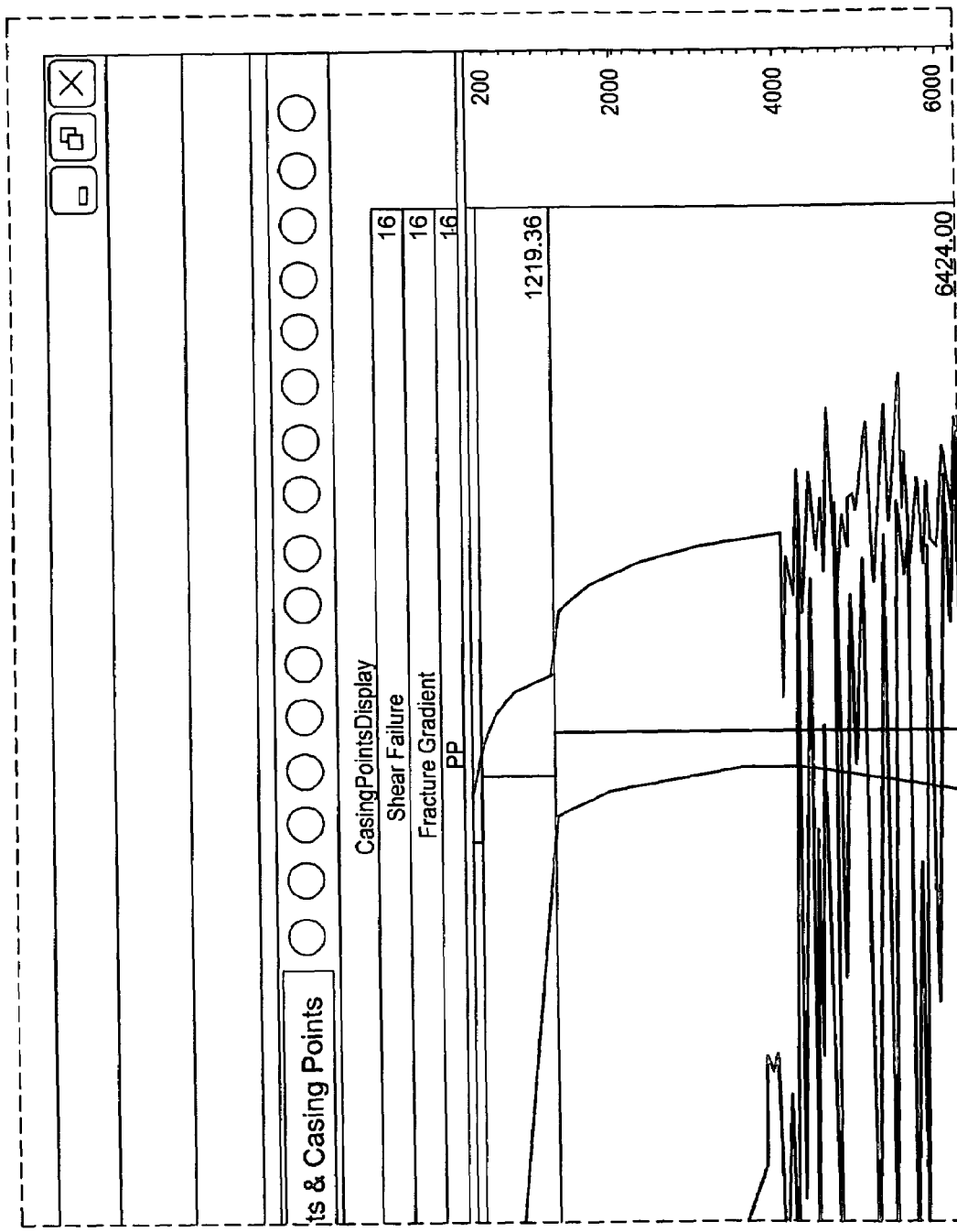
Figure 3C:
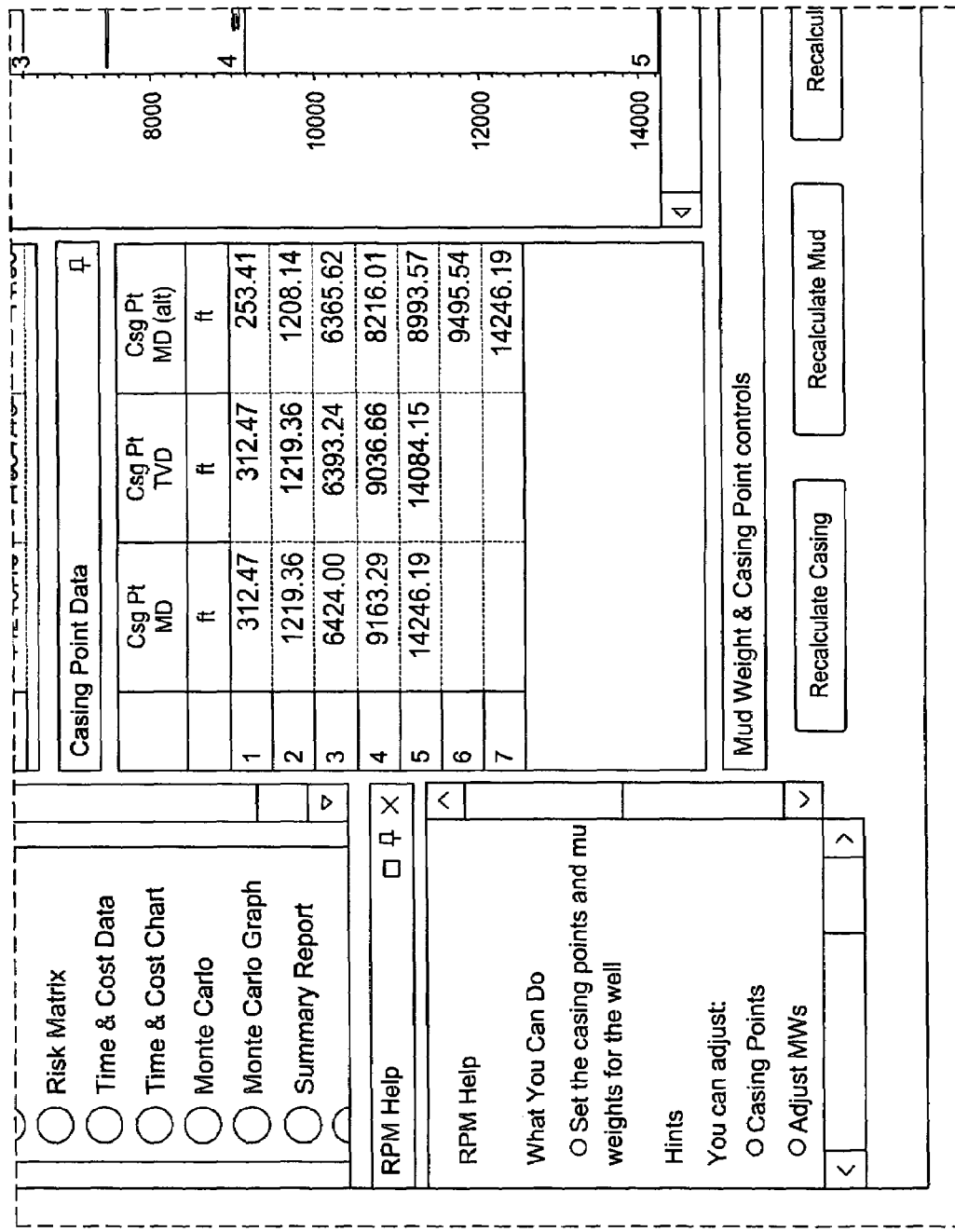
Figure 3D:
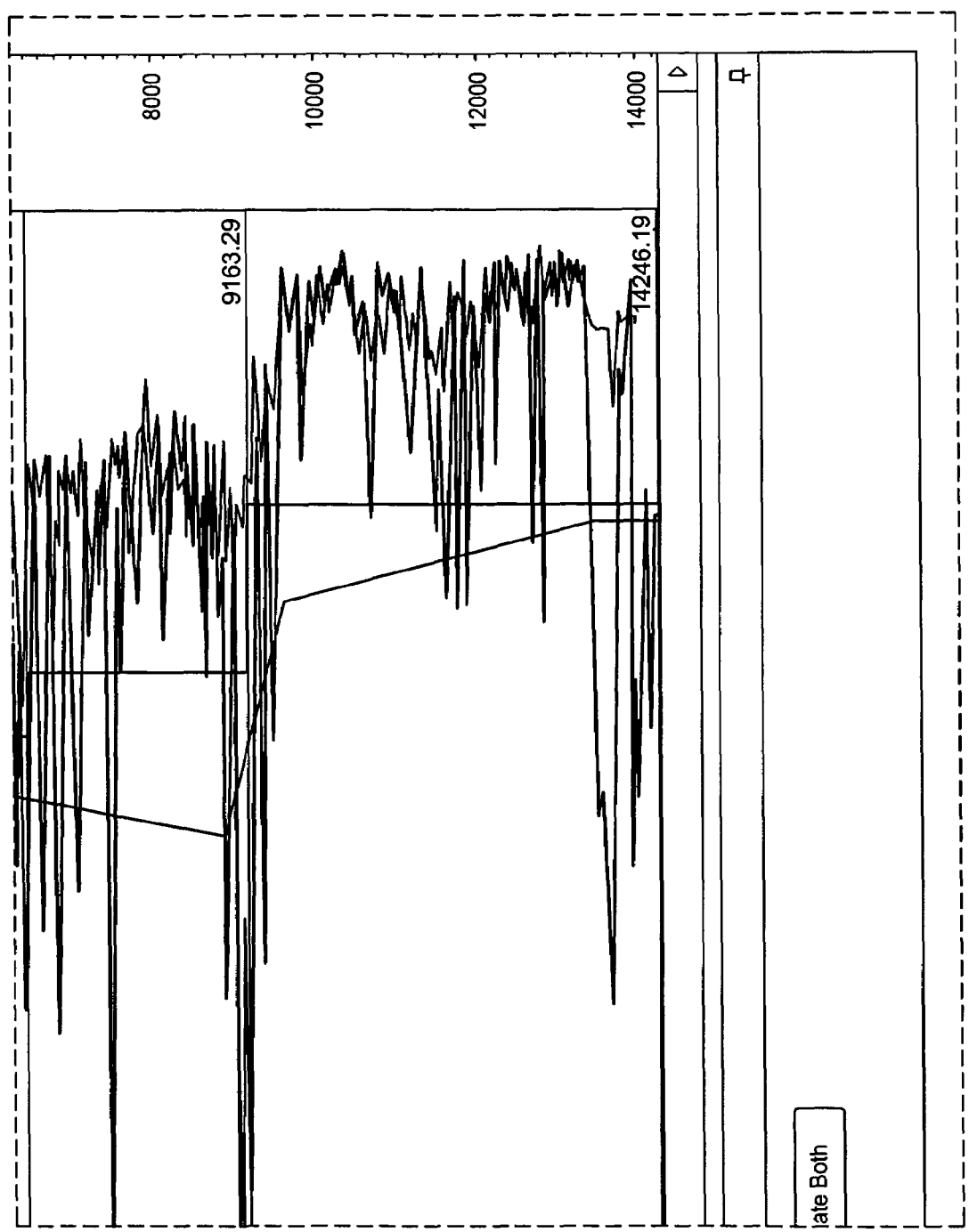
Figure 4A:
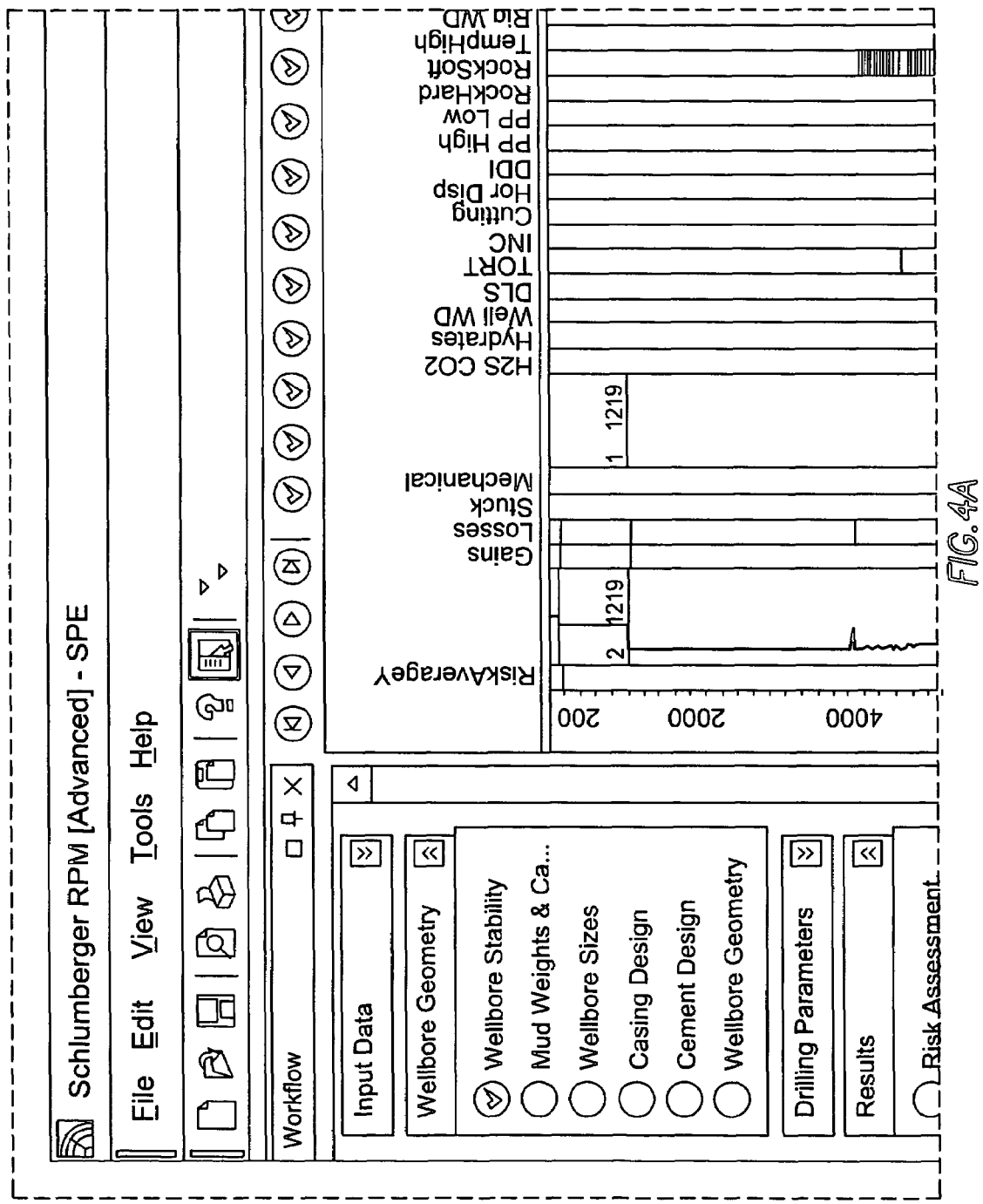
FIGS. 4A, 4B, 4C, and 4D illustrates risk assessment.
Figure 4B:
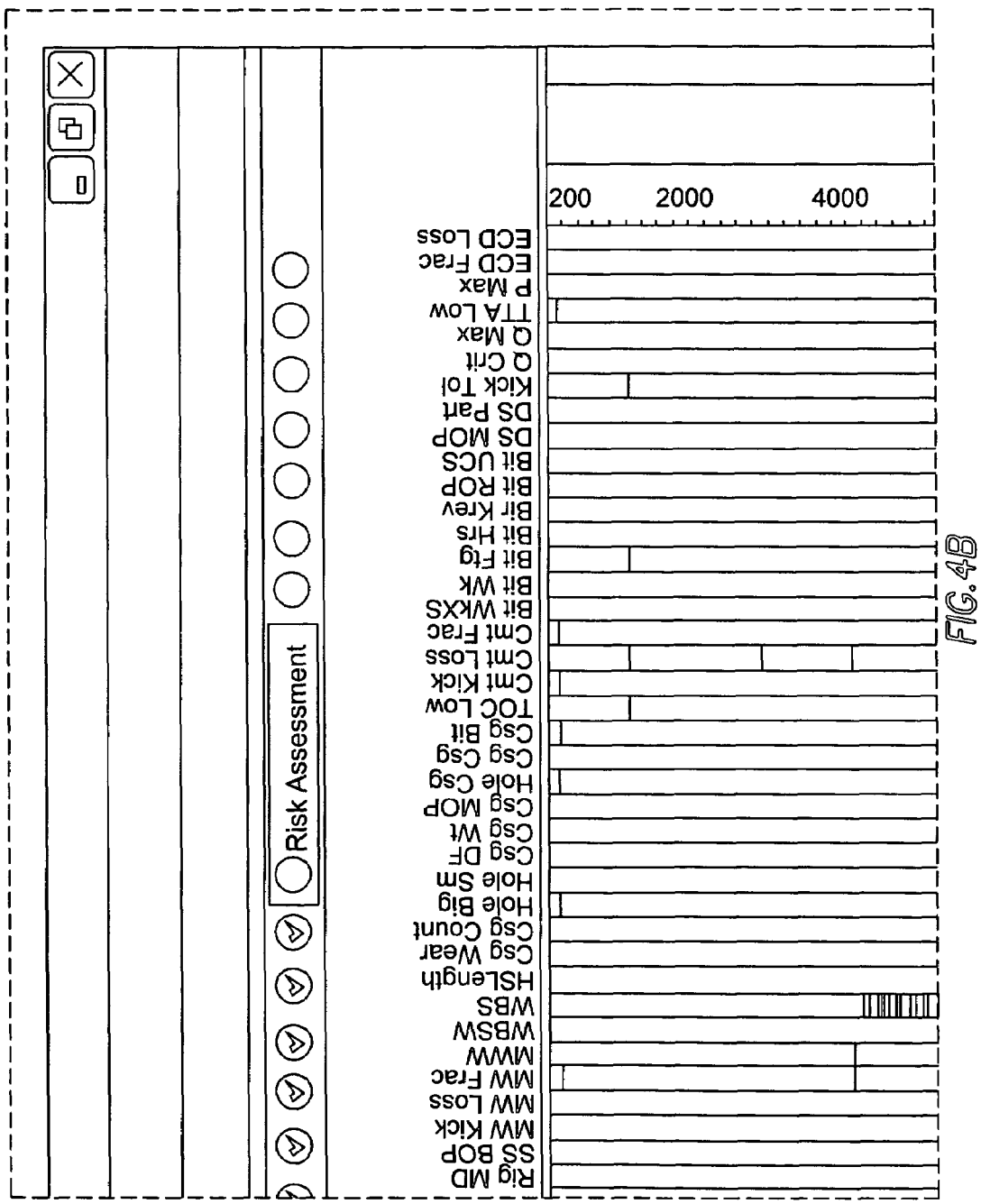
Figure 4C:
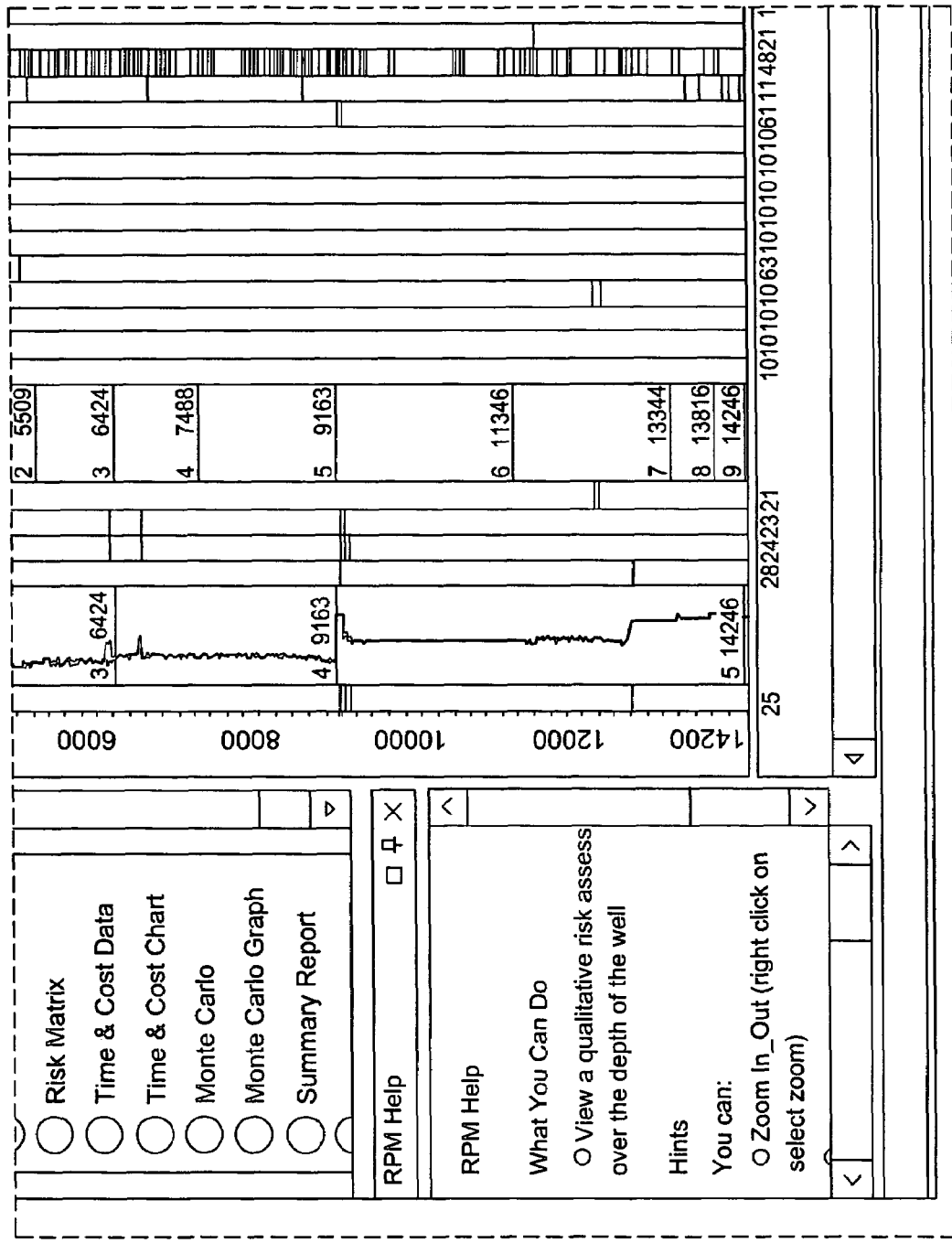
Figure 4D:
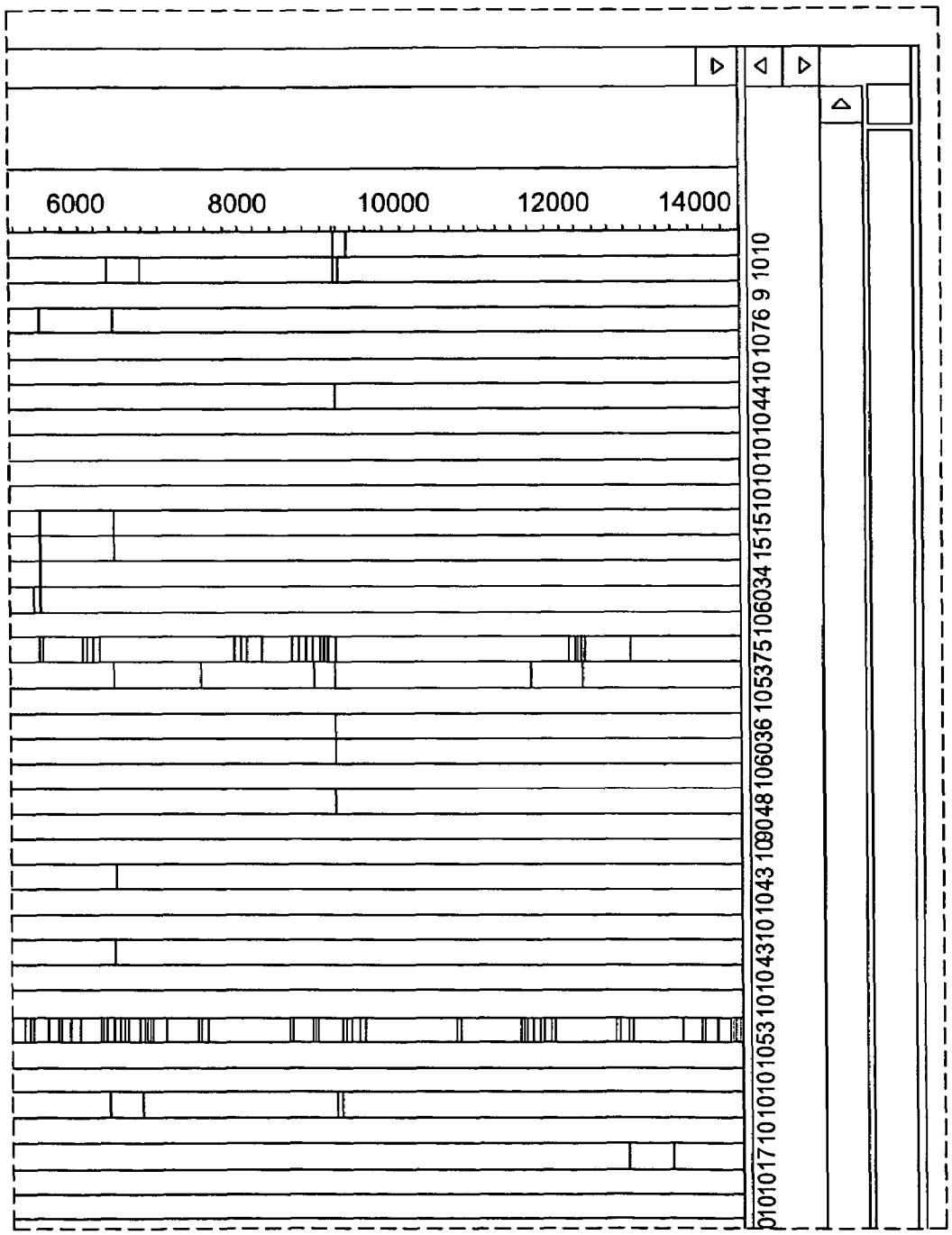

An 'Automatic Well Planning Software System' is disclosed in this specification. The 'Automatic Well Planning Software System' of the present invention is a "smart" tool for rapid creation of a detailed drilling operational plan that provides economics and risk analysis. The user inputs trajectory and earth properties parameters; the system uses this data and various catalogs to calculate and deliver an optimum well design thereby generating a plurality of outputs, such as drill string design, casing seats, mud weights, bit selection and use, hydraulics, and the other essential factors for the drilling task. System tasks are arranged in a single workflow in which the output of one task is included as input to the next. The user can modify most outputs, which permits fine-tuning of the input values for the next task. The 'Automatic Well Planning Software System' has two primary user groups: (1) Geoscientist: Works with trajectory and earth properties data; the 'Automatic Well Planning Software System' provides the necessary drilling engineering calculations; this allows the user to scope drilling candidates rapidly in terms of time, costs, and risks; and (2) Drilling engineer: Works with wellbore geometry and drilling parameter outputs to achieve optimum activity plan and risk assessment; Geoscientists typically provide the trajectory and earth properties data. The scenario, which consists of the entire process and its output, can be exported for sharing with other users for peer review or as a communication tool to facilitate project management between office and field. Variations on a scenario can be created for use in business decisions. The 'Automatic Well Planning Software System' can also be used as a training tool for geoscientists and drilling engineers.

The 'Automatic Well Planning Software System' will enable the entire well construction workflow to be run through quickly. In addition, the 'Automatic Well Planning Software System' can ultimately be updated and re-run in a time-frame that supports operational decision making. The entire replanning process must be fast enough to allow users to rapidly iterate to refine well plans through a series of what-if scenarios.

The decision support algorithms provided by the 'Automatic Well Planning Software System' disclosed in this specification would link geological and geomechanical data with the drilling process (casing points, casing design, cement, mud, bits, hydraulics, etc) to produce estimates and a breakdown of the well time, costs, and risks. This will allow interpretation variations, changes, and updates of the Earth Model to be quickly propagated through the well planning process.

The software associated with the aforementioned 'Automatic Well Planning Software System' accelerates the prospect selection, screening, ranking, and well construction workflows. The target audiences are two fold: those who generate drilling prospects, and those who plan and drill those prospects. More specifically, the target audiences include: Asset Managers, Asset Teams (Geologists, Geophysicists, Reservoir Engineers, and Production Engineers), Drilling Managers, and Drilling Engineers.

Asset Teams will use the software associated with the 'Automatic Well Planning Software System' as a scoping tool for cost estimates, and assessing mechanical feasibility, so that target selection and well placement decisions can be made more knowledgeably, and more efficiently. This process will encourage improved subsurface evaluation and provide a better appreciation of risk and target accessibility. Since the system can be configured to adhere to company or local design standards, guidelines, and operational practices, users will be confident that well plans are technically sound.

Drilling Engineers will use the software associated with the 'Automatic Well Planning Software System' disclosed in this specification for rapid scenario planning, risk identification, and well plan optimization. It will also be used for training, in planning centers, universities, and for looking at the drilling of specific wells, electronically drilling the well, scenario modeling and 'what-if' exercises, prediction and diagnosis of events, post-drilling review and knowledge transfer.

The software associated with the 'Automatic Well Planning Software System' will enable specialists and vendors to demonstrate differentiation amongst new or competing technologies. It will allow operators to quantify the risk and business impact of the application of these new technologies or procedures.

Therefore, the 'Automatic Well Planning Software System' disclosed in this specification will: (1) dramatically improve the efficiency of the well planning and drilling processes by incorporating all available data and well engineering processes in a single predictive well construction model, (2) integrate predictive models and analytical solutions for wellbore stability, mud weights & casing seat selection, tubular & hole size selection, tubular design, cementing, drilling fluids, bit selection, rate of penetration, BHA design, drillstring design, hydraulics, risk identification, operations planning, and probabilistic time and cost estimation, all within the framework of a mechanical earth model, (3) easily and interactively manipulate variables and intermediate results within individual scenarios to produce sensitivity analyses. As a result, when the 'Automatic Well Planning Software System' is utilized, the following results will be achieved: (1) more accurate results, (2) more effective use of engineering resources, (3) increased awareness, (4) reduced risks while drilling, (5) decreased well costs, and (6) a standard methodology or process for optimization through iteration in planning and execution. As a result, during the implementation of the 'Automatic Well Planning Software System', the emphasis was placed on architecture and usability.

In connection with the implementation of the 'Automatic Well Planning Software System', the software development effort was driven by the requirements of a flexible architecture which must permit the integration of existing algorithms and technologies with commercial-off-the-shelf (COTS) tools for data visualization. Additionally, the workflow demanded that the product be portable, lightweight and fast, and require a very small learning curve for users. Another key requirement was the ability to customize the workflow and configuration based on proposed usage, user profile and equipment availability.

The software associated with the 'Automatic Well Planning Software System' was developed using the 'Ocean' framework owned by Schlumberger Technology Corporation of Houston, Tex. This framework uses Microsoft's .NET technologies to provide a software development platform which allows for easy integration of COTS software tools with a flexible architecture that was specifically designed to support custom workflows based on existing drilling algorithms and technologies.

Referring to FIG. 1, a software architecture schematic is illustrated indicating the 'modular nature' for supporting custom workflows. FIG. 1 schematically shows the modular architecture that was developed to support custom workflows. This provides the ability to configure the application based on the desired usage. For a quick estimation of the time, cost and risk associated with the well, a workflow consisting of lookup tables and simple algorithms can be selected. For a more detailed analysis, complex algorithms can be included in the workflow.

In addition to customizing the workflow, the software associated with the 'Automatic Well Planning Software System' was designed to use user-specified equipment catalogs for its analysis. This ensures that any results produced by the software are always based on local best practices and available equipment at the project site. From a usability perspective, application user interfaces were designed to allow the user to navigate through the workflow with ease.

Referring to FIG. 2, a typical task view consisting of workflow, help and data canvases is illustrated. FIG. 2 shows a typical task view with its associated user canvases. A typical task view consists of a workflow task bar, a dynamically updating help canvas, and a combination of data canvases based on COTS tools like log graphics, Data Grids, Wellbore Schematic and charting tools. In any task, the user has the option to modify data through any of the canvases; the application then automatically synchronizes the data in the other canvases based on these user modifications.

The modular nature of the software architecture associated with the 'Automatic Well Planning Software System' also allows the setting-up of a non-graphical workflow, which is key to implementing advanced functionality, such as batch processing of an entire field, and sensitivity analysis based on key parameters, etc.

Basic information for a scenario, typical of well header information for the well and wellsite, is captured in the first task. The trajectory (measured depth, inclination, and azimuth) is loaded and the other directional parameters like true vertical depth and dogleg severity are calculated automatically and graphically presented to the user.

The 'Automatic Well Planning Software System' disclosed in this specification requires the loading of either geomechanical earth properties extracted from an earth model, or, at a minimum, pore pressure, fracture gradient, and unconfined compressive strength. From this input data, the 'Automatic Well Planning Software System' automatically selects the most appropriate rig and associated properties, costs, and mechanical capabilities. The rig properties include parameters like derrick rating to evaluate risks when running heavy casing strings, pump characteristics for the hydraulics, size of the BOP, which influences the sizes of the casings, and very importantly the daily rig rate and spread rate. The user can select a different rig than what the 'Automatic Well Planning Software System' proposed and can modify any of the technical specifications suggested by the software.

Other wellbore stability algorithms (which are offered by Schlumberger Technology Corporation, or Houston, Tex.) calculate the predicted shear failure and the fracture pressure as a function of depth and display these values with the pore pressure. The 'Automatic Well Planning Software System' then proposes automatically the casing seats and maximum mud weight per hole section using customizable logic and rules. The rules include safety margins to the pore pressure and fracture gradient, minimum and maximum lengths for hole sections and limits for maximum overbalance of the drilling fluid to the pore pressure before a setting an additional casing point. The 'Automatic Well Planning Software System' evaluates the casing seat selection from top-to-bottom and from bottom-to-top and determines the most economic variant. The user can change, insert, or delete casing points at any time, which will reflect in the risk, time, and cost for the well.

Referring to FIG. 3, a display showing wellbore stability, mud weights, and casing points is illustrated.

The wellbore sizes are driven primarily by the production tubing size. The preceding casing and hole sizes are determined using clearance factors. The wellbore sizes can be restricted by additional constraints, such as logging requirements or platform slot size. Casing weights, grades, and connection types are automatically calculated using traditional biaxial design algorithms and simple load cases for burst, collapse and tension. The most cost effective solution is chosen when multiple suitable pipes are found in the extensive tubular catalog. Non-compliance with the minimum required design factors are highlighted to the user, pointing out that a manual change of the proposed design may be in order. The 'Automatic Well Planning Software System' allows full strings to be replaced with liners, in which case, the liner overlap and hanger cost are automatically suggested while all strings are redesigned as necessary to account for changes in load cases. The cement slurries and placement are automatically proposed by the 'Automatic Well Planning Software System'. The lead and tail cement tops, volumes, and densities are suggested. The cementing hydrostatic pressures are validated against fracture pressures, while allowing the user to modify the slurry interval tops, lengths, and densities. The cost is derived from the volume of the cement job and length of time required to place the cement.

The 'Automatic Well Planning Software System' proposes the proper drilling fluid type including rheology properties that are required for hydraulic calculations. A sophisticated scoring system ranks the appropriate fluid systems, based on operating environment, discharge legislation, temperature, fluid density, wellbore stability, wellbore friction and cost. The system is proposing not more than 3 different fluid systems for a well, although the user can easily override the proposed fluid systems.

A new and novel algorithm used by the 'Automatic Well Planning Software System' selects appropriate bit types that are best suited to the anticipated rock strengths, hole sizes, and drilled intervals. For each bit candidate, the footage and bit life is determined by comparing the work required to drill the rock interval with the statistical work potential for that bit. The most economic bit is selected from all candidates by evaluating the cost per foot which takes into account the rig rate, bit cost, tripping time and drilling performance (ROP). Drilling parameters like string surface revolutions and weight on bit are proposed based on statistical or historical data.

In the 'Automatic Well Planning Software System', the bottom hole assembly (BHA) and drillstring is designed based on the required maximum weight on bit, inclination, directional trajectory and formation evaluation requirements in the hole section. The well trajectory influences the relative weight distribution between drill collars and heavy weight drill pipe. The BHA components are automatically selected based on the hole size, the internal diameter of the preceding casings, and bending stress ratios are calculated for each component size transition. Final kick tolerances for each hole section are also calculated as part of the risk analysis.

The minimum flow rate for hole cleaning is calculated using Luo's[2] and Moore's[3] criteria considering the wellbore geometry, BHA configuration, fluid density and rheology, rock density, and ROP. The bit nozzles total flow area (TFA) are sized to maximize the standpipe pressure within the liner operating pressure envelopes. Pump liner sizes are selected based on the flow requirements for hole cleaning and corresponding circulating pressures. The Power Law rheology model is used to calculate the pressure drops through the circulating system, including the equivalent circulating density (ECD).

Referring to FIG. 4, a display showing 'Risk Assessment' is illustrated.

In FIG. 4, in the 'Automatic Well Planning Software System', drilling event 'risks' are quantified in a total of 54 risk categories of which the user can customize the risk thresholds. The risk categories are plotted as a function of depth and color coded to aid a quick visual interpretation of potential trouble spots. Further risk assessment is achieved by grouping these categories in the following categories: 'gains', 'losses', 'stuck pipe', and 'mechanical problems'. The total risk log curve can be displayed along the trajectory to correlate drilling risks with geological markers. Additional risk analysis views display the "actual risk" as a portion of the "potential risk" for each design task.

In the 'Automatic Well Planning Software System', a detailed operational activity plan is automatically assembled from customizable templates. The duration for each activity is calculated based on the engineered results of the previous tasks and Non-Productive Time (NPT) can be included. The activity plan specifies a range (minimum, average, and maximum) of time and cost for each activity and lists the operations sequentially as a function of depth and hole section. This information is graphically presented in the time vs. depth and cost vs. depth graphs.

Figure 5A:
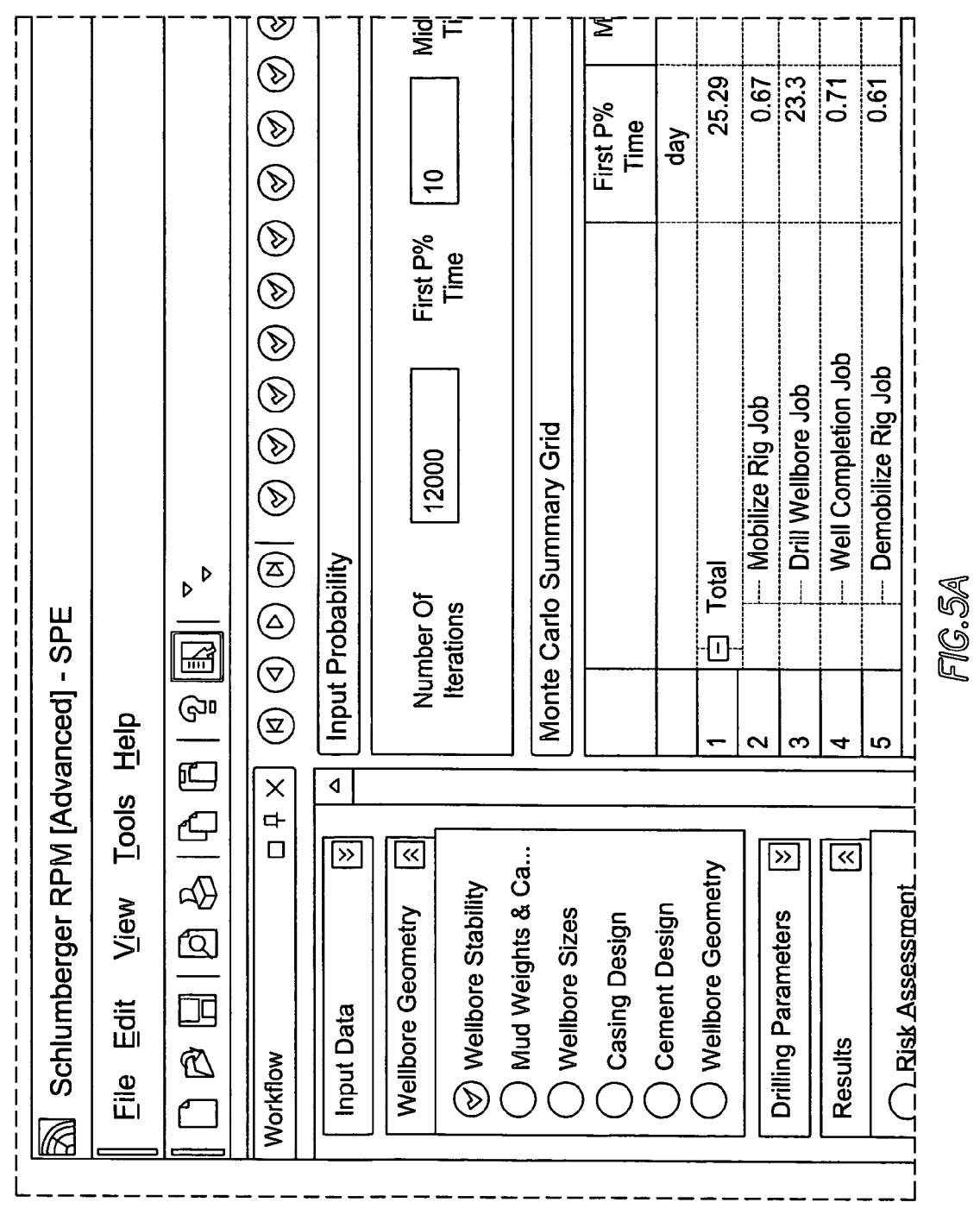
Figure 5D:
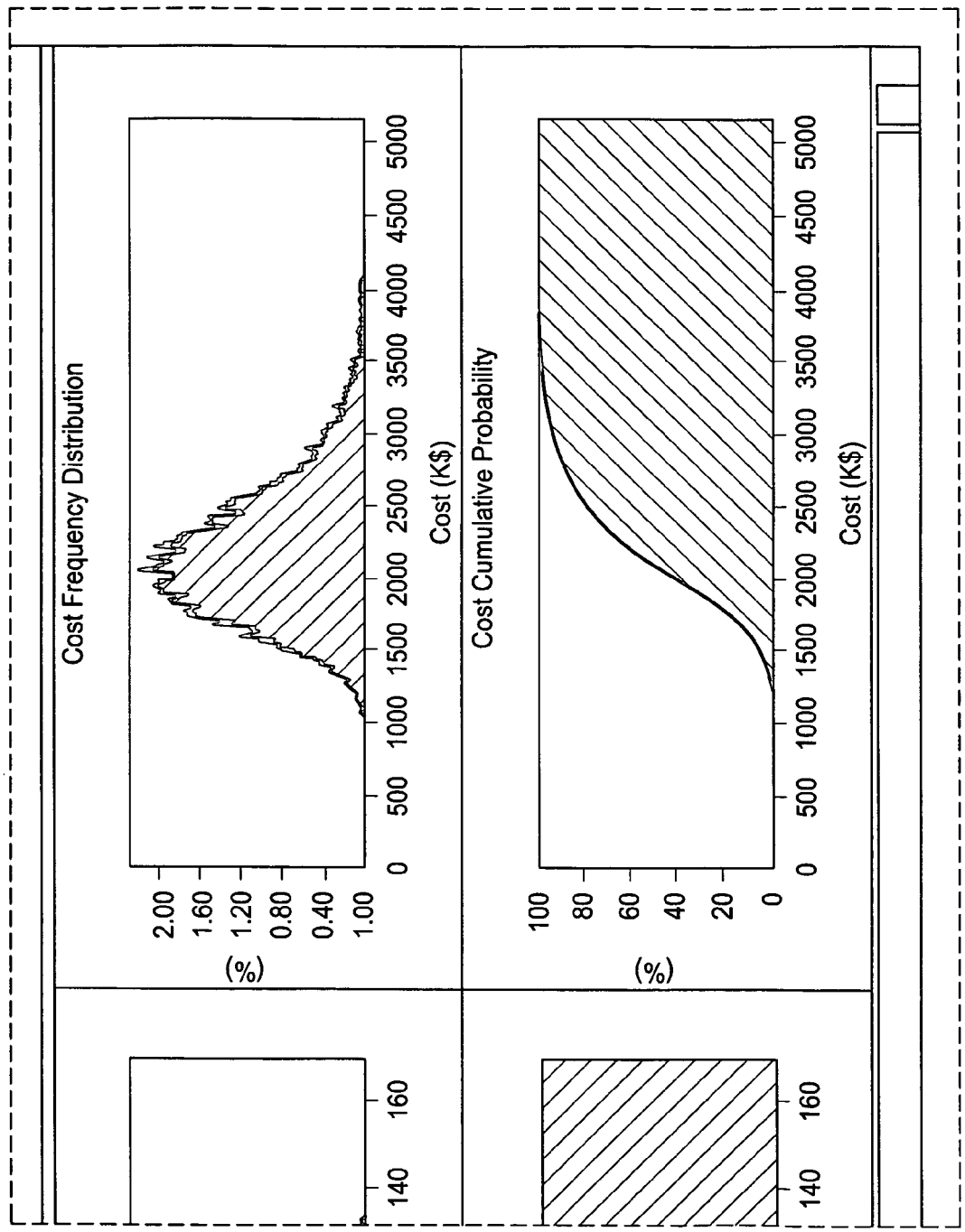
Figure 6A:
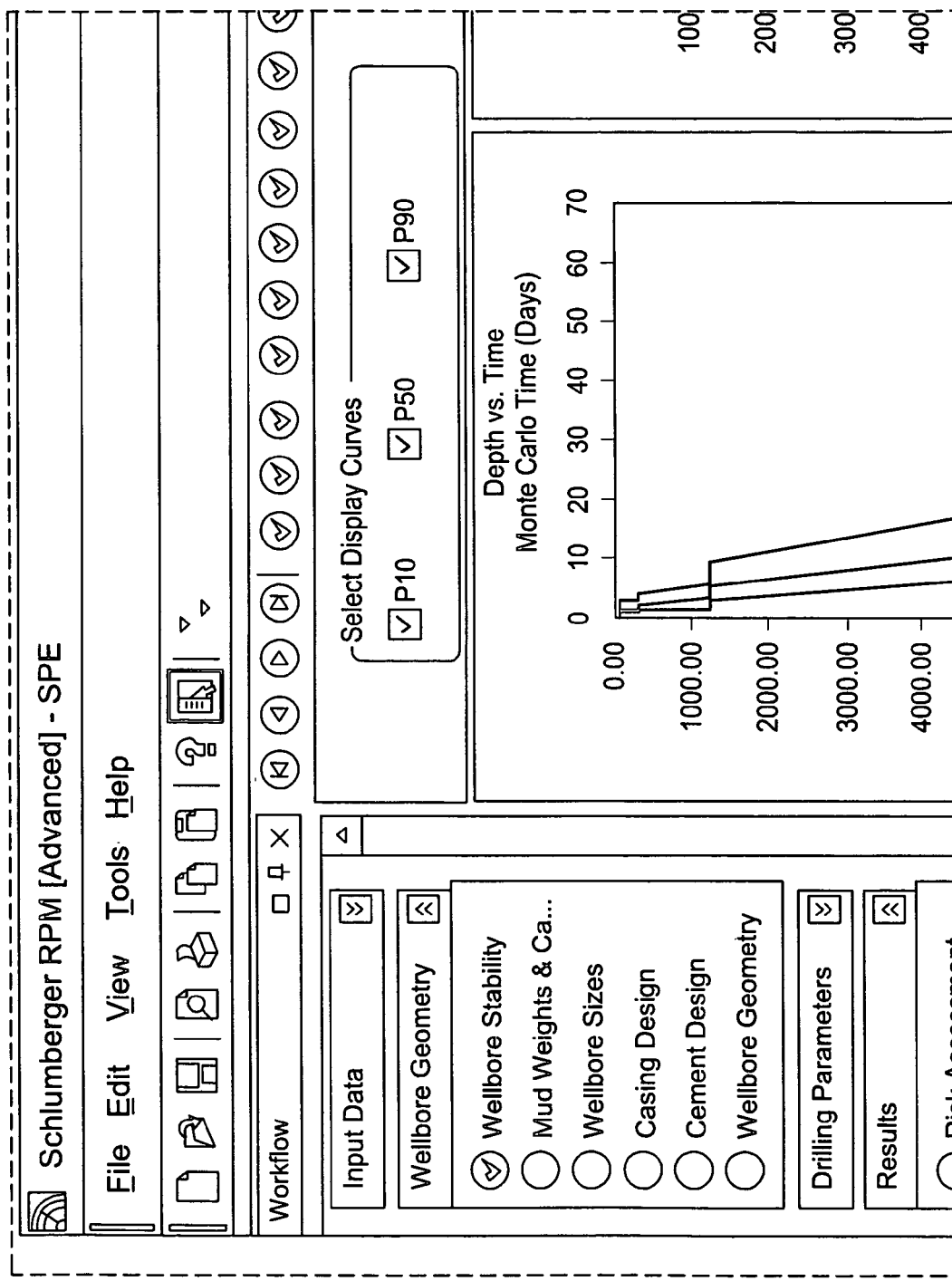
FIGS. 6A, 6B, 6C, and 6D illustrates a probabilistic time and cost vs. depth.
Figure 6B:
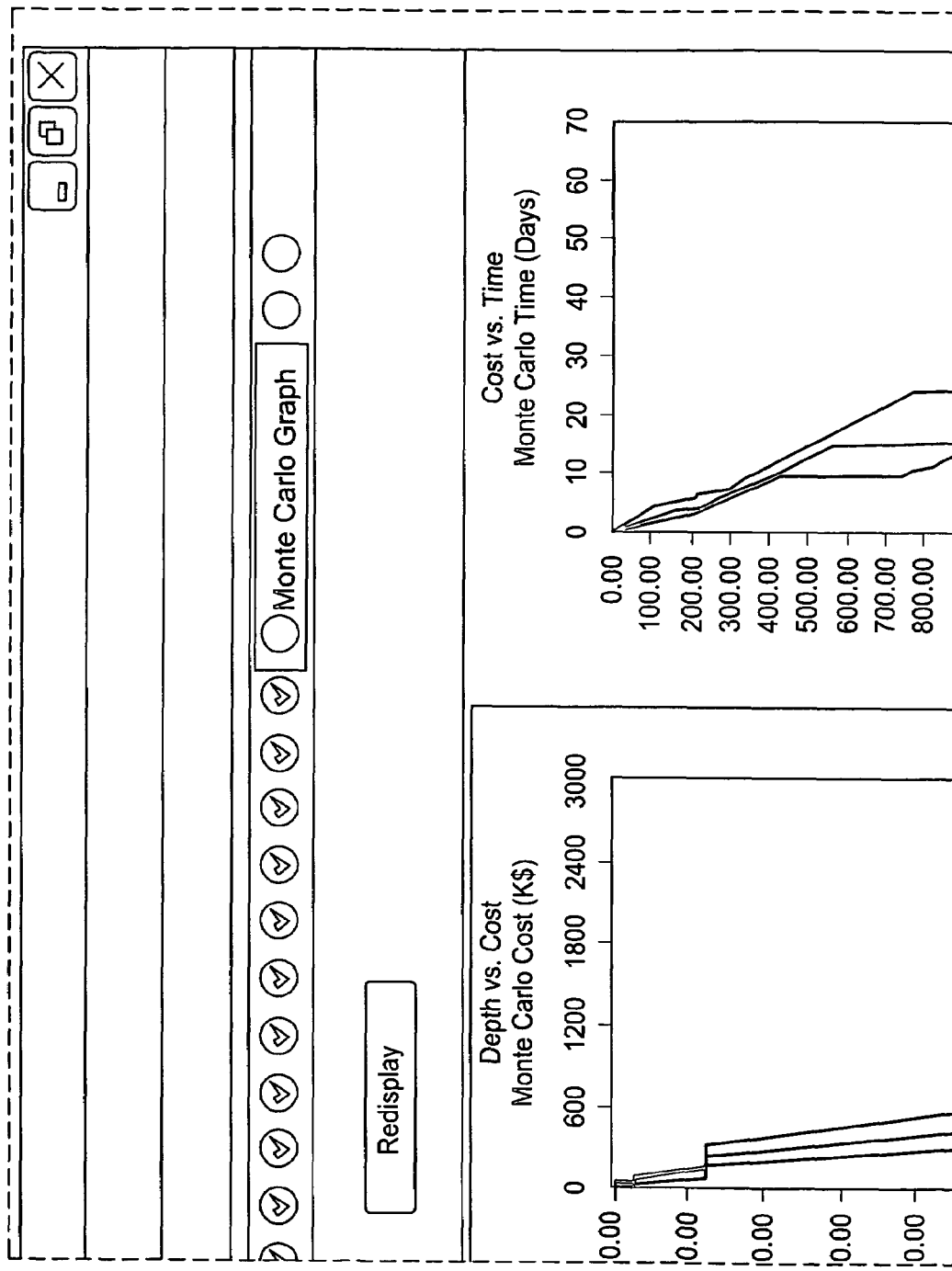
Figure 6C:
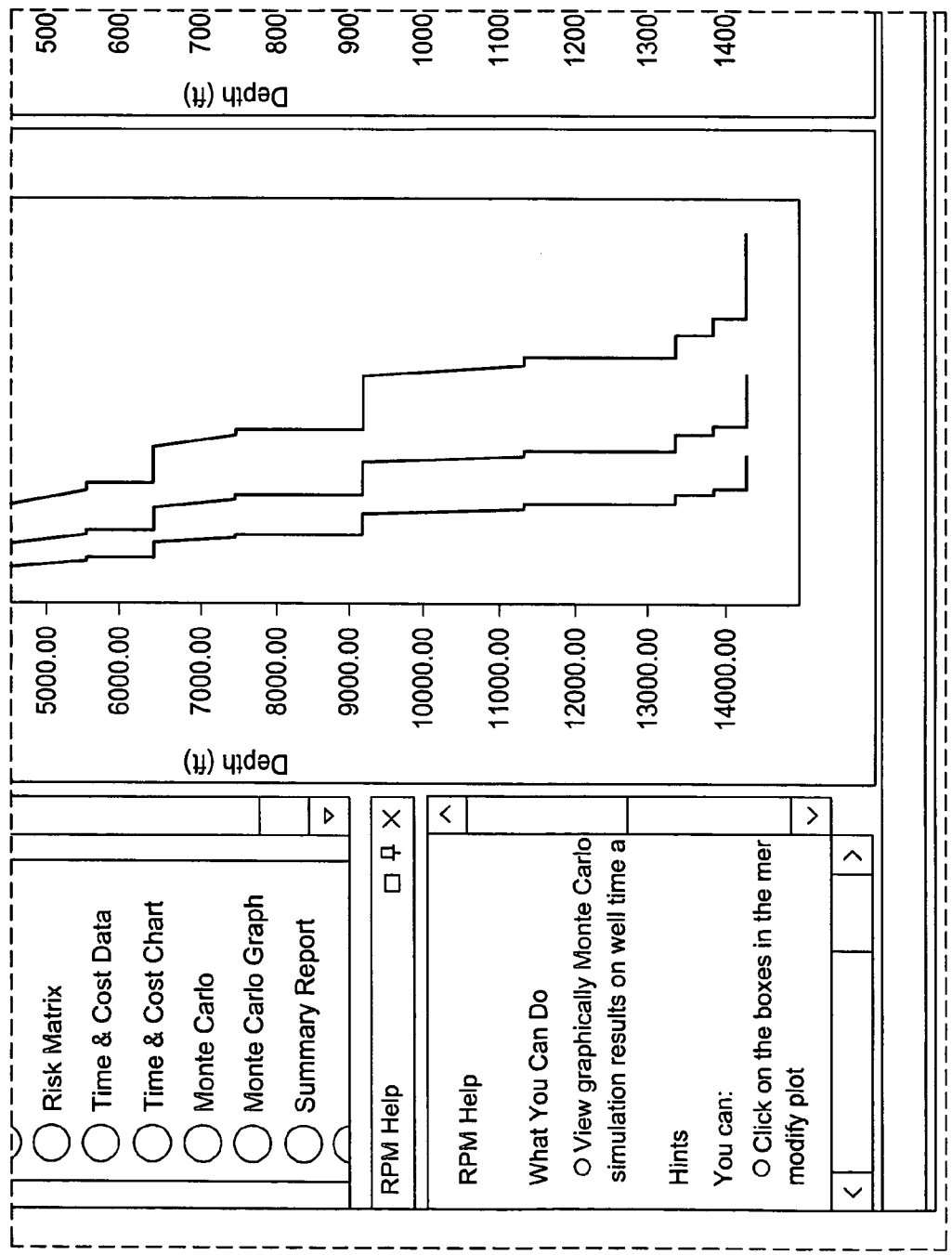
Figure 6D:
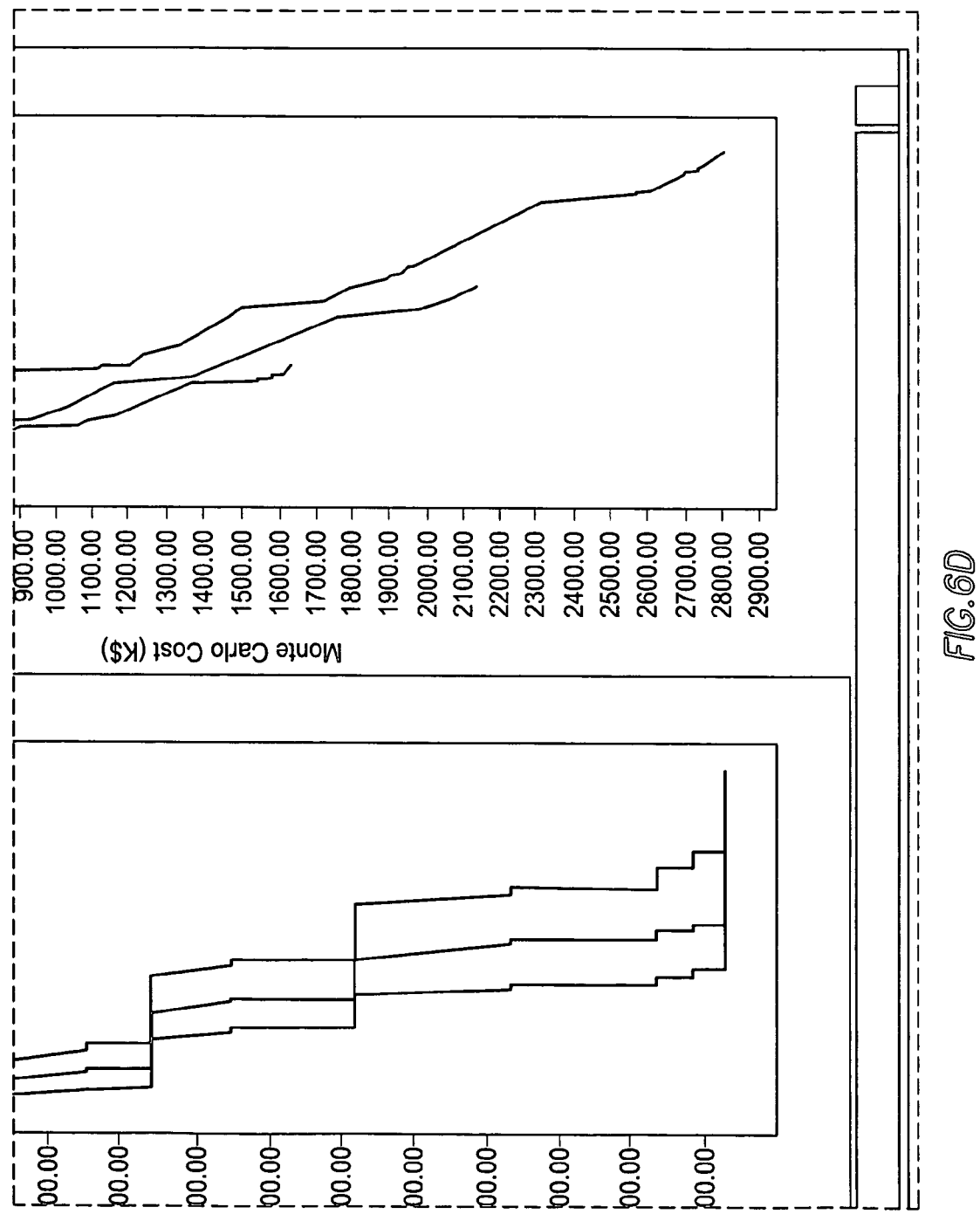
Figure 7A:
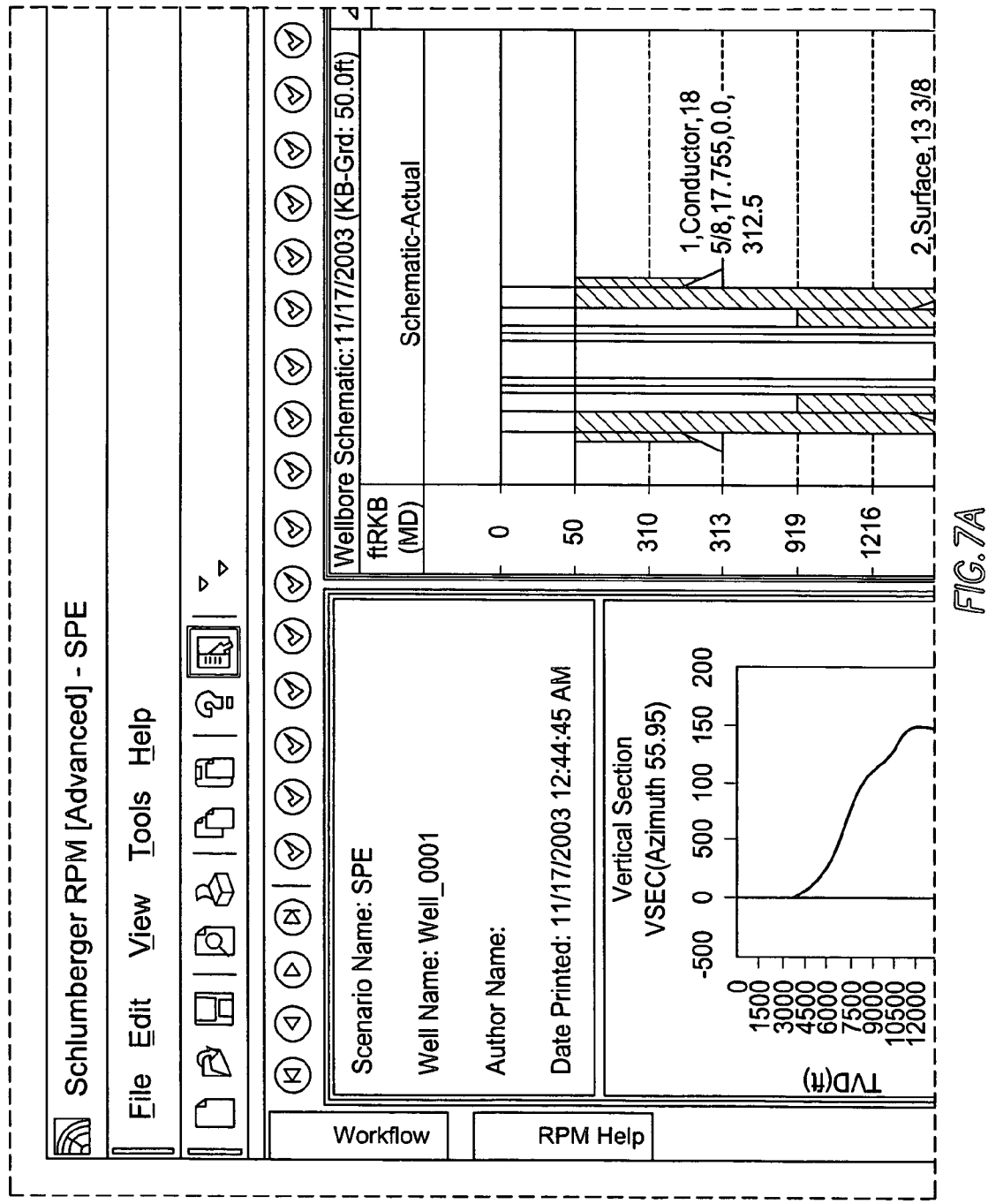
FIGS. 7A, 7B, 7C, and 7D illustrates a summary montage.
Figure 7B:
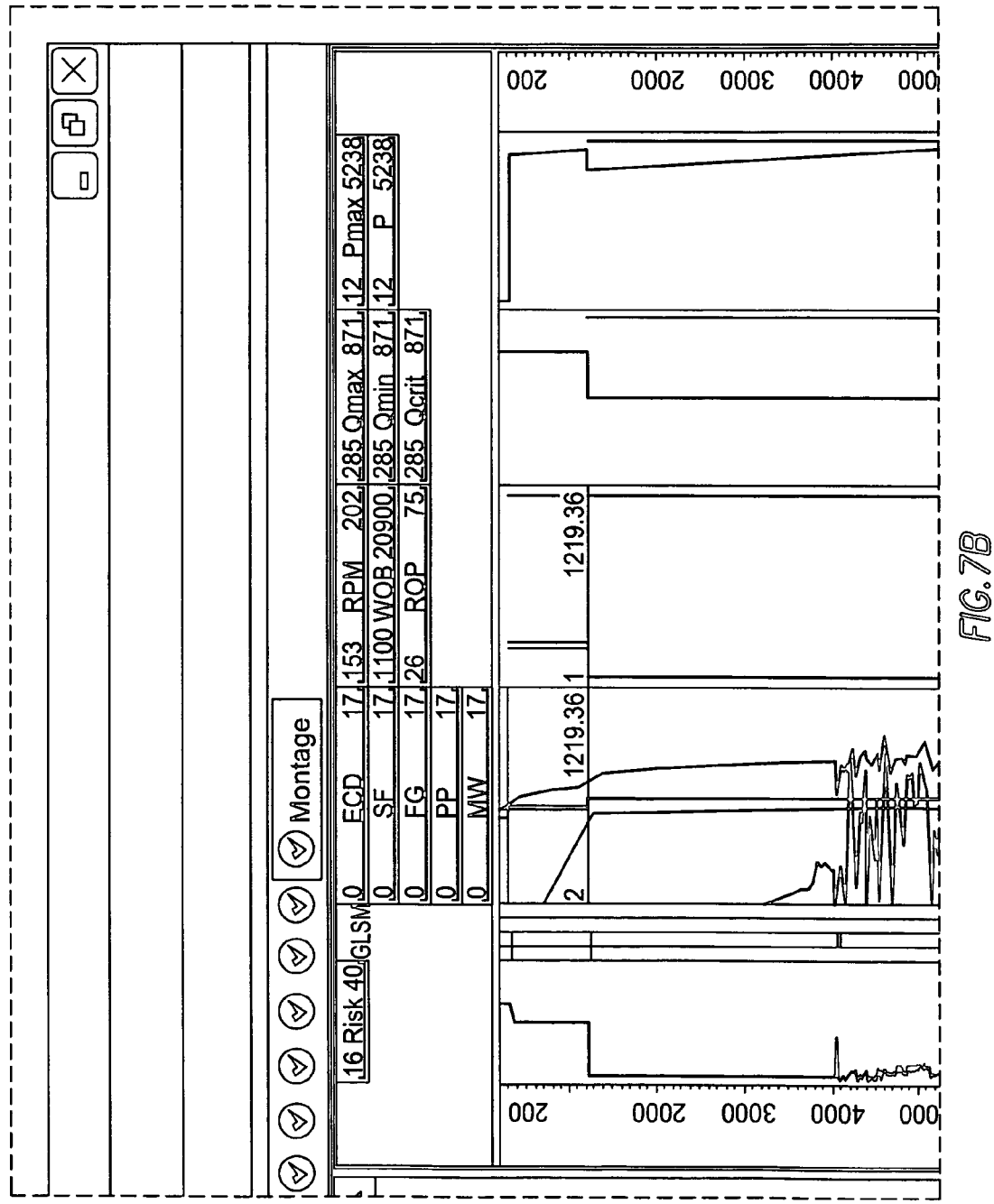
Figure 7C:
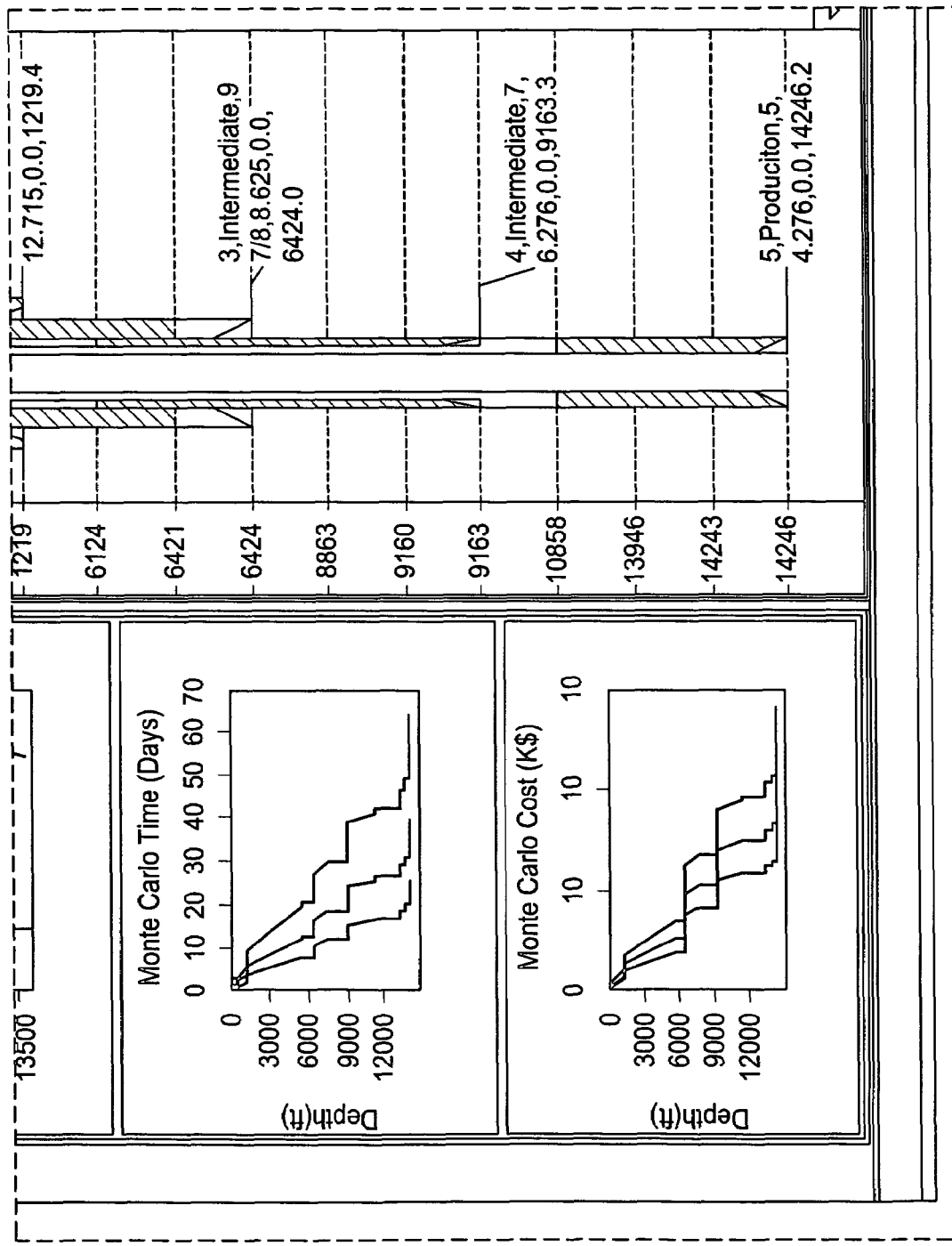
Figure 7D:
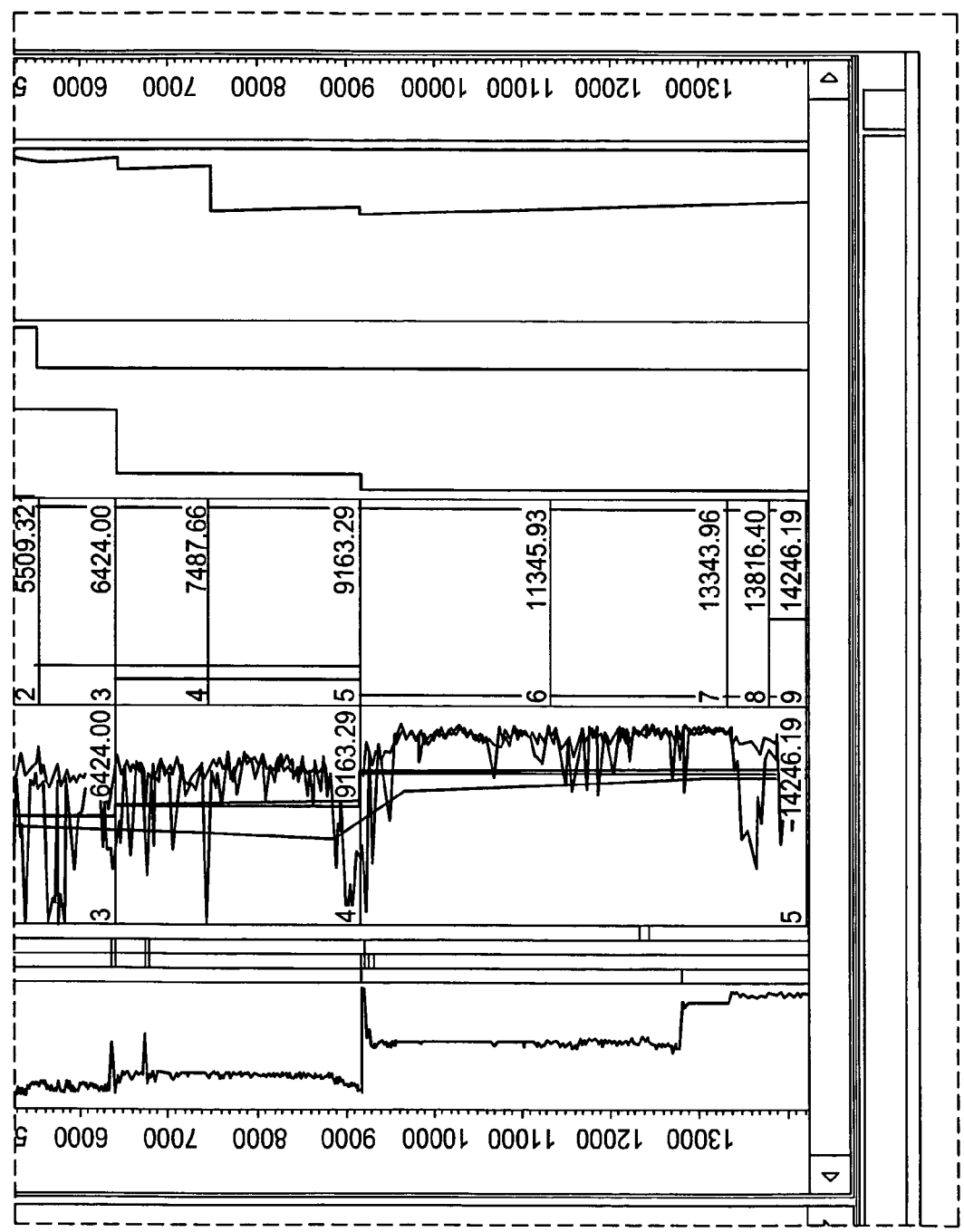

Referring to FIG. 5, a display showing Monte Carlo time and cost distributions is illustrated. In FIG. 5, the 'Automatic Well Planning Software System' uses Monte Carlo simulation to reconcile all of the range of time and cost data to produce probabilistic time and cost distributions.

Referring to FIG. 6, a display showing Probabilistic time and cost vs. depth is illustrated. In FIG. 6, this probabilistic analysis, used by the 'Automatic Well Planning Software System', allows quantifying the P10, P50 and P90 probabilities for time and cost.

Referring to FIG. 7, a display showing a summary montage is illustrated. In FIG. 7, a comprehensive summary report and a montage display, utilized by the 'Automatic Well Planning Software System', can be printed or plotted in large scale and are also available as a standard result output.

Using its expert system and logic, the 'Automatic Well Planning Software System' disclosed in this specification automatically proposes sound technical solutions and provides a smooth path through the well planning workflow. Graphical interaction with the results of each task allows the user to efficiently fine-tune the results. In just minutes, asset teams, geoscientists, and drilling engineers can evaluate drilling projects and economics using probabilistic cost estimates based on solid engineering fundamentals instead of traditional, less rigorous estimation methods. The testing program combined with feedback received from other users of the program during the development of the software package made it possible to draw the following conclusions: (1) The 'Automatic Well Planning Software System' can be installed and used by inexperienced users with a minimum amount of training and by referencing the documentation provided, (2) The need for good earth property data enhances the link to geological and geomechanical models and encourages improved subsurface interpretation; it can also be used to quantify the value of acquiring additional information to reduce uncertainty, (3) With a minimum amount of input data, the 'Automatic Well Planning Software System' can create reasonable probabilistic time and cost estimates faithful to an engineered well design; based on the field test results, if the number of casing points and rig rates are accurate, the results will be within 20% of a fully engineered well design and AFE, (4) With additional customization and localization, predicted results compare to within 10% of a fully engineered well design AFE, (5) Once the 'Automatic Well Planning Software System' has been localized, the ability to quickly run new scenarios and assess the business impact and associated risks of applying new technologies, procedures or approaches to well designs is readily possible, (6) The speed of the 'Automatic Well Planning Software System' allows quick iteration and refinement of well plans and creation of different 'what if' scenarios for sensitivity analysis, (7) The 'Automatic Well Planning Software System' provides consistent and transparent well cost estimates to a process that has historically been arbitrary, inconsistent, and opaque; streamlining the workflow and eliminating human bias provides drilling staff the confidence to delegate and empower non-drilling staff to do their own scoping estimates, (8) The 'Automatic Well Planning Software System' provides unique understanding of drilling risk and uncertainty enabling more realistic economic modeling and improved decision making, (9) The risk assessment accurately identifies the type and location of risk in the wellbore enabling drilling engineers to focus their detailed engineering efforts most effectively, (10) It was possible to integrate and automate the well construction planning workflow based on an earth model and produce technically sound usable results, (11) The project was able to extensively use COTS technology to accelerate development of the software, and (12) The well engineering workflow interdependencies were able to be mapped and managed by the software.

The following nomenclature was used in this specification:

| | |
|---|---|
| RT = | Real-Time, usually used in the context of real-time data (while drilling). |
| G&G = | Geological and Geophysical |
| SEM = | Shared Earth Model |
| MEM = | Mechanical Earth Model |
| NPT = | Non Productive Time, when operations are not planned, or due to operational difficulties, the progress of the well has be delayed, also often referred to as Trouble Time. |
| NOT = | Non Optimum Time, when operations take longer than they should for various reasons. |

-continued

| | |
|---|---|
| WOB = | Weight on bit |
| ROP = | Rate of penetration |
| RPM = | Revolutions per minute |
| BHA = | Bottom hole assembly |
| SMR = | Software Modification Request |
| BOD = | Basis of Design, document specifying the requirements for a well to be drilled. |
| AFE = | Authorization for Expenditure |

REFERENCES (1) Booth, J., Bradford, I. D. R., Cook, J. M., Dowell, J. D., Ritchie, G., Tuddenham, I.: 'Meeting Future Drilling Planning and Decision Support Requirements: A New Drilling Simulator', IADC/SPE 67816 presented at the 2001 IADC/SPE Drilling Conference, Amsterdam, The Netherlands, 27 February-1 March.

(2) Luo, Y., Bern, P. A. and Chambers, B. D.: 'Flow-Rate Predictions for Cleaning Deviated Wells', paper IADC/SPE 23884 presented at the 1992 IADC/SPE Drilling Conference, New Orleans, La., February 18-21.

(3) Moore and Chien theory is published in 'Applied Drilling Engineering', Bourgoyne, A. T., Jr, et al., SPE Textbook Series Vol 2.

A functional specification associated with the overall 'Automatic Well Planning Software System' (termed a 'use case') will be set forth in the following paragraphs. This functional specification relates to the overall 'Automatic Well Planning Software System'.

The following defines information that pertains to this particular 'use case'. Each piece of information is important in understanding the purpose behind the 'use Case'.

| | |
|---|---|
| Goal In Context: | Describe the full workflow for the low level user |
| Scope: | N/A |
| Level: | Low Level |
| Pre-Condition: | Geological targets pre-defined |
| Success End Condition: | Probability based time estimate with cost and risk |
| Failed End Condition: | Failure in calculations due to assumptions or if distribution of results is too large |
| Primary Actor: | Well Engineer |
| Trigger Event: | N/A |

Main Success Scenario—This Scenario describes the steps that are taken from trigger event to goal completion when everything works without failure. It also describes any required cleanup that is done after the goal has been reached. The steps are listed below:

1. User opens program, and system prompts user whether to open an old file or create a new one. User creates new model and system prompts user for well information (well name, field, country, coordinates). System prompts user to insert earth model. Window with different options appears and user selects data level. Secondary window appears where file is loaded or data inserted manually. System displays 3D view of earth model with key horizons, targets, anti-targets, markers, seismic, etc.

2. System prompts user for a well trajectory. The user either loads from a file or creates one in Caviar for Swordfish. System generates 3D view of trajectory in the earth model and 2D views, both plan and vertical section. User prompted to verify trajectory and modify if needed via direct interaction with 3D window.

3. The system will extract mechanical earth properties (PP, FG, WBS, lithology, density, strength, min/max horizontal stress, etc.) for every point along the trajectory and store it. These properties will either come from a populated mechanical earth model, from interpreted logs applied to this trajectory, or manually entered.
4. The system will prompt the user for the rig constraints. Rig specification options will be offered and the user will choose either the type of rig and basic configurations or insert data manually for a specific drilling unit.
5. The system will prompt the user to enter pore pressure data, if applicable, otherwise taken from the mechanical earth model previously inserted and a MW window will be generated using PP, FG, and WBS curves. The MW window will be displayed and allow interactive modification.
6. The system will automatically divide the well into hole/casing sections based on kick tolerance and trajectory sections and then propose a mud weight schedule. These will be displayed on the MW window and allow the user to interactively modify their values. The casing points can also be interactively modified on the 2D and 3D trajectory displays.
7. The system will prompt the user for casing size constraints (tubing size, surface slot size, evaluation requirements), and based on the number of sections generate the appropriate hole size—casing size combinations. The hole/casing circle chart will be used, again allowing for interaction from the user to modify the hole/casing size progression.
8. The system will successively calculate casing grades, weights/wall thickness and connections based on the sizes selected and the depths. User will be able to interact and define availability of types of casing.
9. The system will generate a basic cementing program, with simple slurry designs and corresponding volumes.
10. The system will display the wellbore schematic based on the calculations previously performed and this interface will be fully interactive, allowing the user to click and drag hole & casing sizes, top & bottom setting depths, and recalculating based on these selections. System will flag user if the selection is not feasible.
11. The system will generate the appropriate mud types, corresponding rheology, and composition based on the lithology, previous calculations, and the users selection.
12. The system will successively split the well sections into bit runs, and based on the rock properties will select drilling bits for each section with ROP and drilling parameters.
13. The system will generate a basic BHA configuration, based on the bit section runs, trajectory and rock properties.

Items 14, 15, and 16 Represent One Task: Hydraulics.

14. The system will run a hole cleaning calculation, based on trajectory, wellbore geometry, BHA composition and MW characteristics.
15. The system will do an initial hydraulics/ECD calculation using statistical ROP data. This data will be either selected or user defined by the system based on smart table lookup.
16. Using the data generated on the first hydraulics calculation, the system will perform an ROP simulation based on drilling bit characteristics and rock properties.
17. The system will run a successive hydraulics/ECD calculation using the ROP simulation data. System will flag user if parameters are not feasible.
18. The system will calculate the drilling parameters and display them on a multi display panel. This display will be exportable, portable, and printable.
19. The system will generate an activity planning sequence using default activity sequences for similar hole sections and end conditions. This sequence will be fully modifiable by the user, permitting modification in sequence order and duration of the event. This sequence will be in the same standard as the Well Operations or Drilling Reporting software and will be interchangeable with the Well Operations or Drilling Reporting software. The durations of activities will be populated from tables containing default "best practice" data or from historical data (DIMS, Snapper . . . ).
20. The system will generate time vs. depth curve based on the activity planning details. The system will create a best, mean, and worst set of time curves using combinations of default and historical data. These curves will be exportable to other documents and printable.
21. The system will prompt the user to select probability points such as P10, P50, P90 and then run a Monte Carlo simulation to generate a probability distribution curve for the scenario highlighting the user selected reference points and corresponding values of time. The system will provide this as frequency data or cumulative probability curves. These curves will be again exportable and printable.
22. The system will generate a cost plan using default cost templates that are pre-configured by users and can be modified at this point. Many of the costs will reference durations of the entire well, hole sections, or specific activities to calculate the applied cost. The system will generate P10, P50, and P90 cost vs. depth curves.
23. The system will generate a summary of the well plan, in word format, along with the main display graphs. The user will select all that should be exported via a check box interface. The system will generate a large one-page summary of the whole process. This document will be as per a standard Well Operations Program template.

Figure 8:
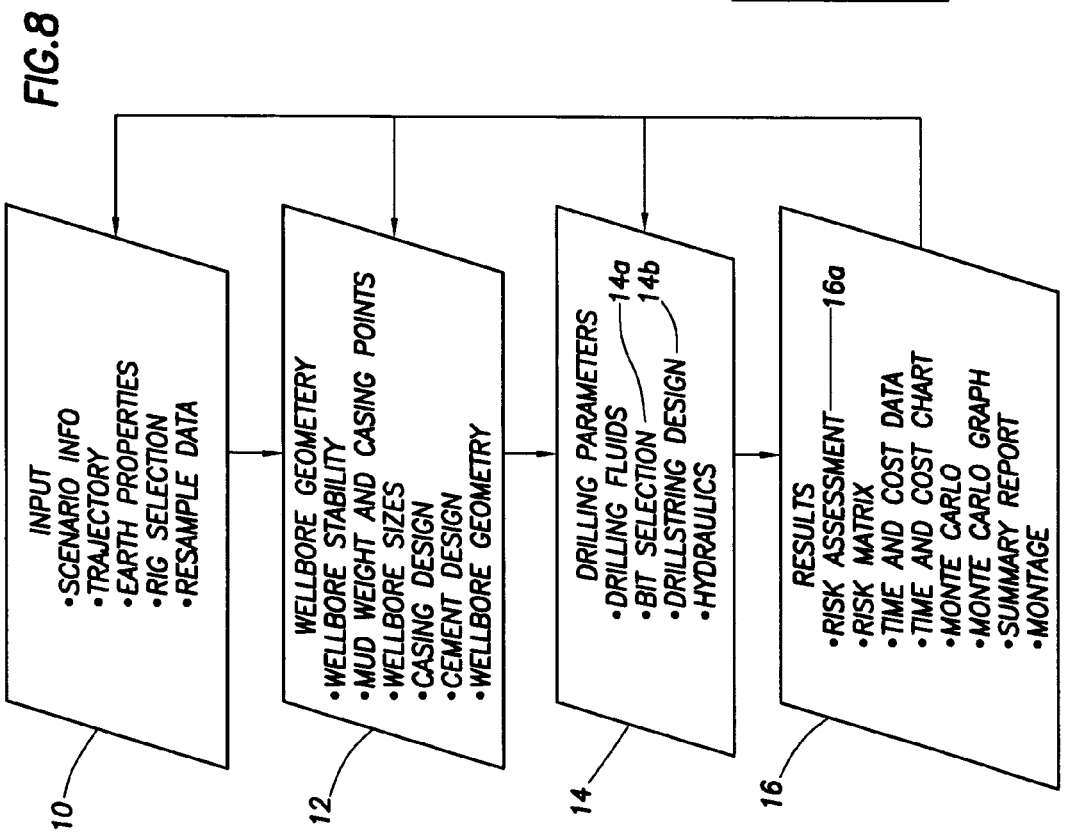
FIG. 8 illustrates a workflow in an 'Automatic Well Planning Software System'.

Referring to FIG. 8, as can be seen on the left side of the displays illustrated in FIGS. 2 through 6, the 'Automatic Well Planning Software System' includes a plurality of 'tasks'. Each of those tasks are illustrated in FIG. 8. These 'tasks' will be discussed again below with reference to FIGS. 20-28 when the 'Automatic Well Planning Workflow Control System software is discussed. In FIG. 8, those plurality of 'tasks' are divided into four groups: (1) Input task 10, where input data is provided, (2) Wellbore Geometry task 12 and Drilling Parameters task 14, where calculations are performed, and (3) a Results task 16, where a set of results are calculated and presented to a user. The Input task 10 includes the following sub-tasks: (1) scenario information, (2) trajectory, (3) Earth properties, (4) Rig selection, (5) Resample Data. The Wellbore Geometry task 12 includes the following sub-tasks: (1) Wellbore stability, (2) Mud weights and casing points, (3) Wellbore sizes, (4) Casing design, (5) Cement design, (6) Wellbore geometry. The Drilling Parameters task 14 includes the following sub-tasks: (1) Drilling fluids, (2) Bit selection 14a, (3) Drillstring design 14b, (4) Hydraulics. The Results task 16 includes the following sub-tasks: (1) Risk Assessment 16a, (2) Risk Matrix, (3) Time and cost data, (4) Time and cost chart, (5) Monte Carlo, (6) Monte Carlo graph, (7) Summary report, and (8) montage.

Recalling that the Results task 16 of FIG. 8 includes a 'Risk Assessment' sub-task 16a, the 'Risk Assessment' sub-task 16a will be discussed in detail in the following paragraphs with reference to FIGS. 9A, 9B, and 10.

Automatic Well Planning Software System—Risk Assessment Sub-task 16a—Software Identifying the risks associated with drilling a well is probably the most subjective process in well planning today. This is based on a person recognizing part of a technical well design that is out of place relative to the earth properties or mechanical equipment to be used to drill the well. The identification of any risks is brought about by integrating all of the well, earth, and equipment information in the mind of a person and mentally sifting through all of the information, mapping the interdependencies, and based solely on personal experience extracting which parts of the project pose what potential risks to the overall success of that project. This is tremendously sensitive to human bias, the individual's ability to remember and integrate all of the data in their mind, and the individuals experience to enable them to recognize the conditions that trigger each drilling risk. Most people are not equipped to do this and those that do are very inconsistent unless strict process and checklists are followed. There are some drilling risk software systems in existence today, but they all require the same human process to identify and assess the likelihood of each individual risks and the consequences. They are simply a computer system for manually recording the results of the risk identification process.

The Risk Assessment sub-task 16a associated with the 'Automatic Well Planning Software System' is a system that will automatically assess risks associated with the technical well design decisions in relation to the earth's geology and geomechanical properties and in relation to the mechanical limitations of the equipment specified or recommended for use.

Risks are calculated in four ways: (1) by 'Individual Risk Parameters', (2) by 'Risk Categories', (3) by 'Total Risk', and (4) the calculation of 'Qualitative Risk Indices' for each.

Individual Risk Parameters are calculated along the measured depth of the well and color coded into high, medium, or low risk for display to the user. Each risk will identify to the user: an explanation of exactly what is the risk violation, and the value and the task in the workflow controlling the risk. These risks are calculated consistently and transparently allowing users to see and understand all of the known risks and how they are identified. These risks also tell the users which aspects of the well justify further engineering effort to investigate in more detail.

Group/category risks are calculated by incorporating all of the individual risks in specific combinations. Each individual risk is a member of one or more Risk Categories. Four principal Risk Categories are defined as follows: (1) Gains, (2) Losses, (3) Stuck, and (4) Mechanical; since these four Rick Categories are the most common and costly groups of troublesome events in drilling worldwide.

The Total Risk for a scenario is calculated based on the cumulative results of all of the group/category risks along both the risk and depth axes.

Risk indexing—Each individual risk parameter is used to produce an individual risk index which is a relative indicator of the likelihood that a particular risk will occur. This is purely qualitative, but allows for comparison of the relative likelihood of one risk to another—this is especially indicative when looked at from a percentage change. Each Risk Category is used to produce a category risk index also indicating the likelihood of occurrence and useful for identifying the most likely types of trouble events to expect. Finally, a single risk index is produced for the scenario that is specifically useful for comparing the relative risk of one scenario to another.

The 'Automatic Well Planning Software System' is capable of delivering a comprehensive technical risk assessment, and it can do this automatically. Lacking an integrated model of the technical well design to relate design decisions to associated risks, the 'Automatic Well Planning Software System' can attribute the risks to specific design decisions and it can direct users to the appropriate place to modify a design choice in efforts to modify the risk profile of the well.

Figure 9A:
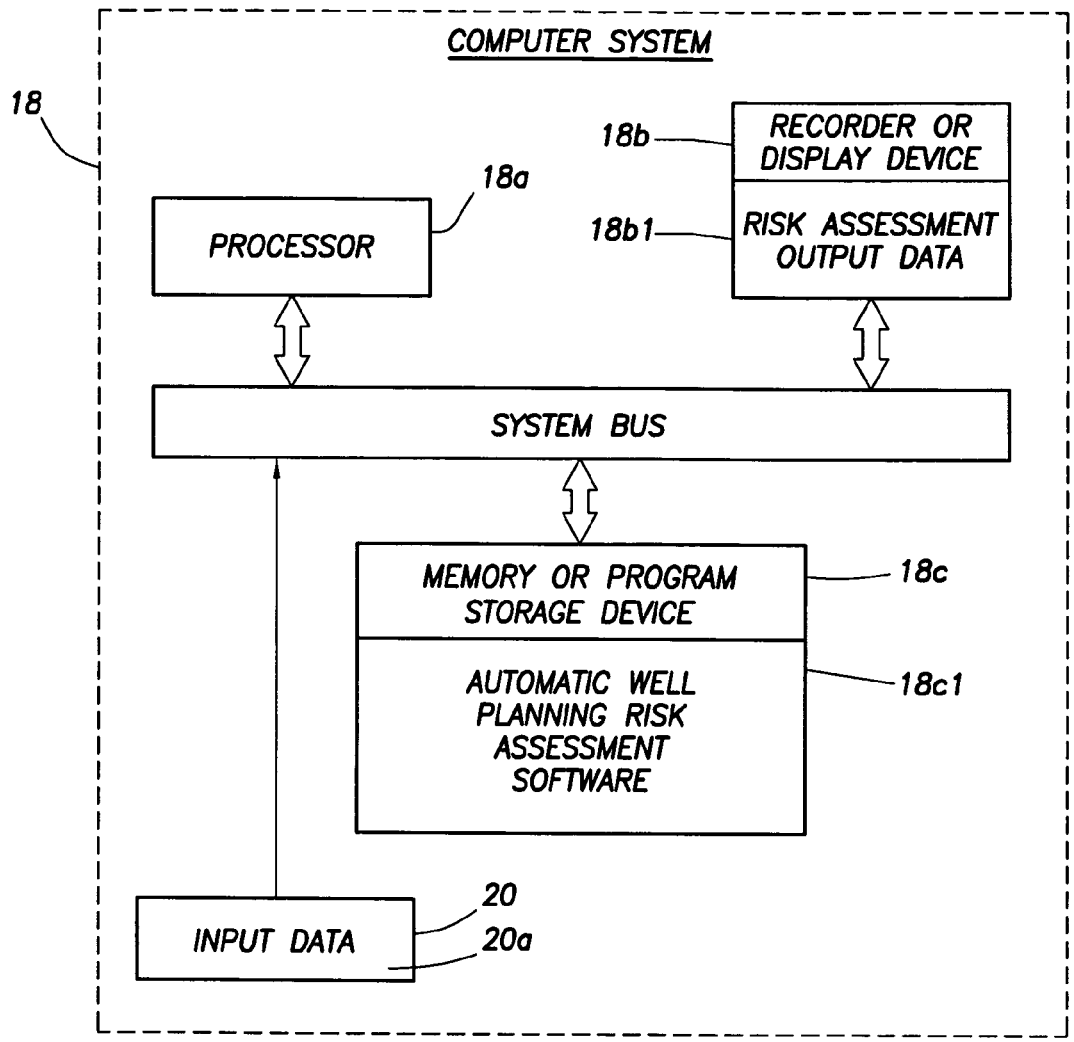
FIG. 9A illustrates a computer system which stores an Automatic Well Planning Risk Assessment Software.

Referring to FIG. 9A, a Computer System 18 is illustrated. The Computer System 18 includes a Processor 18a connected to a system bus, a Recorder or Display Device 18b connected to the system bus, and a Memory or Program Storage Device 18c connected to the system bus. The Recorder or Display Device 18b is adapted to display 'Risk Assessment Output Data' 18b1. The Memory or Program Storage Device 18c is adapted to store an 'Automatic Well Planning Risk Assessment Software' 18c1. The 'Automatic Well Planning Risk Assessment Software' 18c1 is originally stored on another 'program storage device', such as a hard disk; however, the hard disk was inserted into the Computer System 18 and the 'Automatic Well Planning Risk Assessment Software' 18c1 was loaded from the hard disk into the Memory or Program Storage Device 18c of the Computer System 18 of FIG. 9A. In addition, a Storage Medium 20 containing a plurality of 'Input Data' 20a is adapted to be connected to the system bus of the Computer System 18, the 'Input Data' 20a being accessible to the Processor 18a of the Computer System 18 when the Storage Medium 20 is connected to the system bus of the Computer System 18. In operation, the Processor 18a of the Computer System 18 will execute the Automatic Well Planning Risk Assessment Software 18c1 stored in the Memory or Program Storage Device 18c of the Computer System 18 while, simultaneously, using the 'Input Data' 20a stored in the Storage Medium 20 during that execution. When the Processor 18a completes the execution of the Automatic Well Planning Risk Assessment Software 18c1 stored in the Memory or Program Storage Device 18c (while using the 'Input Data' 20a), the Recorder or Display Device 18b will record or display the 'Risk Assessment Output Data' 18b1, as shown in FIG. 9A. For example the 'Risk Assessment Output Data' 18b1 can be displayed on a display screen of the Computer System 18, or the 'Risk Assessment Output Data' 18b1 can be recorded on a printout which is generated by the Computer System 18. The Computer System 18 of FIG. 9A may be a personal computer (PC). The Memory or Program Storage Device 18c is a computer readable medium or a program storage device which is readable by a machine, such as the processor 18a. The processor 18a may be, for example, a microprocessor, microcontroller, or a mainframe or workstation processor. The Memory or Program Storage Device 18c, which stores the 'Automatic Well Planning Risk Assessment Software' 18c1, may be, for example, a hard disk, ROM, CD-ROM, DRAM, or other RAM, flash memory, magnetic storage, optical storage, registers, or other volatile and/or non-volatile memory.

Figure 9B:
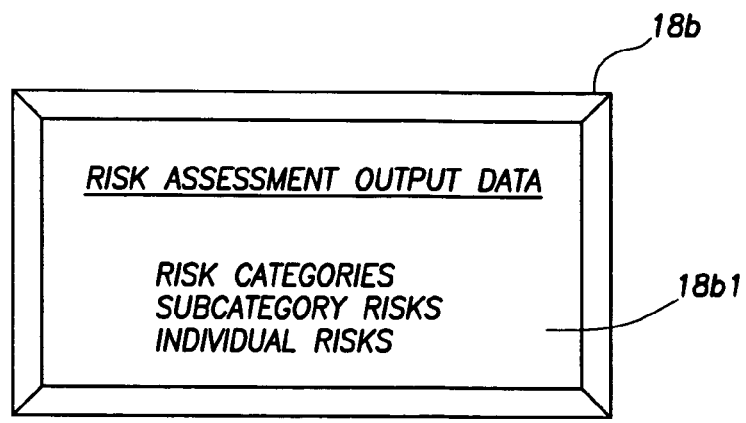
FIG. 9B illustrates a display as shown on a Recorder or Display device of the Computer System of FIG. 9A.

Referring to FIG. 9B, a larger view of the Recorder or Display Device 18b of FIG. 9A is illustrated. In FIG. 9B, the 'Risk Assessment Output Data' 18b1 includes: a plurality or Risk Categories, (2) a plurality of Subcategory Risks (each of which have been ranked as either a High Risk or a Medium Risk or a Low Risk), and (3) a plurality of Individual Risks (each of which have been ranked as either a High Risk or a Medium Risk or a Low Risk). The Recorder or Display Device 18b of FIG. 9B will display or record the 'Risk Assessment Output Data' 18b1 including the Risk Categories, the Subcategory Risks, and the Individual Risks.

Figure 10:
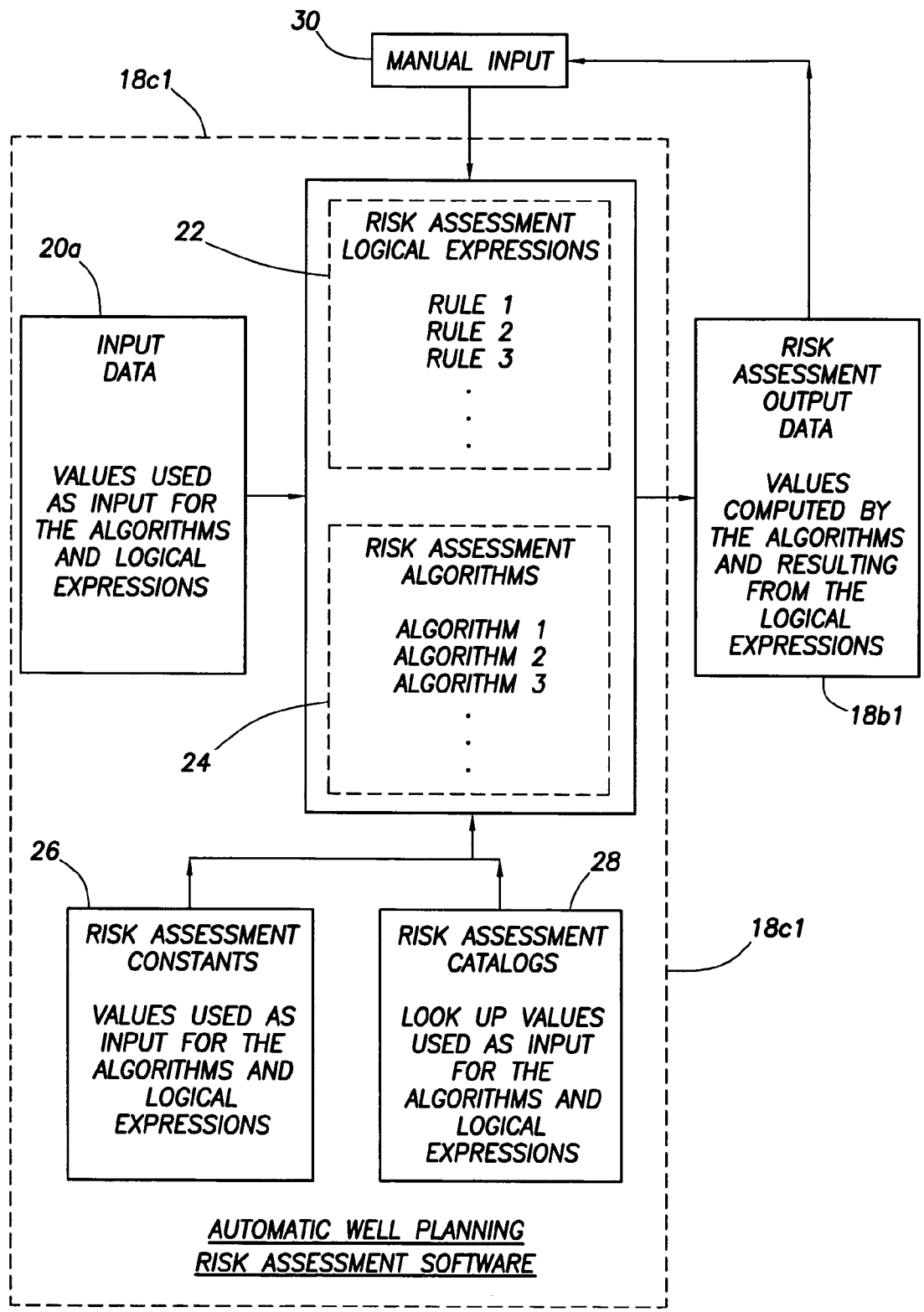
FIG. 10 illustrates a detailed construction of the Automatic Well Planning Risk Assessment Software stored in the Computer System of FIG. 9A.

Referring to FIG. 10, a detailed construction of the 'Automatic Well Planning Risk Assessment Software' 18c1 of FIG. 9A is illustrated. In FIG. 10, the 'Automatic Well Planning Risk Assessment Software' 18c1 includes a first block which stores the Input Data 20a, a second block 22 which stores a plurality of Risk Assessment Logical Expressions 22; a third block 24 which stores a plurality of Risk Assessment Algorithms 24, a fourth block 26 which stores a plurality of Risk Assessment Constants 26, and a fifth block 28 which stores a plurality of Risk Assessment Catalogs 28. The Risk Assessment Constants 26 include values which are used as input for the Risk Assessment Algorithms 24 and the Risk Assessment Logical Expressions 22. The Risk Assessment Catalogs 28 include look-up values which are used as input by the Risk Assessment Algorithms 24 and the Risk Assessment Logical Expressions 22. The 'Input Data' 20a includes values which are used as input for the Risk Assessment Algorithms 24 and the Risk Assessment Logical Expressions 22. The 'Risk Assessment Output Data' 18b1 includes values which are computed by the Risk Assessment Algorithms 24 and which result from the Risk Assessment Logical Expressions 22. In operation, referring to FIGS. 9 and 10, the Processor 18a of the Computer System 18 of FIG. 9A executes the Automatic Well Planning Risk Assessment Software 18c1 by executing the Risk Assessment Logical Expressions 22 and the Risk Assessment Algorithms 24 of the Risk Assessment Software 18c1 while, simultaneously, using the 'Input Data' 20a, the Risk Assessment Constants 26, and the values stored in the Risk Assessment Catalogs 28 as 'input data' for the Risk Assessment Logical Expressions 22 and the Risk Assessment Algorithms 24 during that execution. When that execution by the Processor 18a of the Risk Assessment Logical Expressions 22 and the Risk Assessment Algorithms 24 (while using the 'Input Data' 20a, Constants 26, and Catalogs 28) is completed, the 'Risk Assessment Output Data' 18b1 will be generated as a 'result'. That 'Risk Assessment Output Data' 18b1 is recorded or displayed on the Recorder or Display Device 18b of the Computer System 18 of FIG. 9A. In addition, that 'Risk Assessment Output Data' 18b1 can be manually input, by an operator, to the Risk Assessment Logical Expressions block 22 and the Risk Assessment Algorithms block 24 via a 'Manual Input' block 30 shown in FIG. 10.

Input Data 20a

The following paragraphs will set forth the 'Input Data' 20a which is used by the 'Risk Assessment Logical Expressions' 22 and the 'Risk Assessment Algorithms' 24. Values of the Input Data 20a that are used as input for the Risk Assessment Algorithms 24 and the Risk Assessment Logical Expressions 22 are as follows:

(1) Casing Point Depth
(2) Measured Depth
(3) True Vertical Depth
(4) Mud Weight
(5) Measured Depth
(6) ROP
(7) Pore Pressure
(8) Static Temperature
(9) Pump Rate
(10) DogLegSeverity
(11) ECD
(12) Inclination
(13) Hole Size
(14) Casing Size
(15) Easting-westing
(16) Northing-Southing
(17) Water Depth
(18) Maximum Water Depth
(19) Maximum well Depth
(20) Kick Tolerance
(21) Drill Collar 1 Weight
(22) Drill Collar 2 Weight
(23) Drill Pipe Weight
(24) Heavy Weight Weight
(25) Drill Pipe Tensile Rating
(26) Upper Wellbore Stability Limit
(27) Lower Wellbore Stability Limit
(28) Unconfined Compressive Strength
(29) Bit Size
(30) Mechanical drilling energy (UCS integrated over distance drilled by the bit)
(31) Ratio of footage drilled compared to statistical footage
(32) Cumulative UCS
(33) Cumulative Excess UCS
(34) Cumulative UCS Ratio
(35) Average UCS of rock in section
(36) Bit Average UCS of rock in section
(37) Statistical Bit Hours
(38) Statistical Drilled Footage for the bit
(39) RPM
(40) On Bottom Hours
(41) Calculated Total Bit Revolutions
(42) Time to Trip
(43) Critical Flow Rate
(44) Maximum Flow Rate in hole section
(45) Minimum Flow Rate in hole section
(46) Flow Rate
(47) Total Nozzle Flow Area of bit
(48) Top Of Cement
(49) Top of Tail slurry
(50) Length of Lead slurry
(51) Length of Tail slurry
(52) Cement Density Of Lead
(53) Cement Density Of Tail slurry
(54) Casing Weight per foot
(55) Casing Burst Pressure
(56) Casing Collapse Pressure
(57) Casing Type Name
(58) Hydrostatic Pressure of Cement column
(59) Start Depth
(60) End Depth
(61) Conductor
(62) Hole Section Begin Depth
(63) Openhole Or Cased hole completion
(64) Casing Internal Diameter
(65) Casing Outer Diameter
(66) Mud Type
(67) Pore Pressure without Safety Margin
(68) Tubular Burst Design Factor
(69) Casing Collapse Pressure Design Factor
(70) Tubular Tension Design Factor
(71) Derrick Load Rating
(72) Drawworks Rating
(73) Motion Compensator Rating
(74) Tubular Tension rating
(75) Statistical Bit ROP
(76) Statistical Bit RPM
(77) Well Type
(78) Maximum Pressure
(79) Maximum Liner Pressure Rating
(80) Circulating Pressure
(81) Maximum UCS of bit
(82) Air Gap
(83) Casing Point Depth

(84) Presence of H2S
(85) Presence of CO2
(86) Offshore Well
(87) Flow Rate Maximum Limit Risk Assessment Constants 26

The following paragraphs will set forth the 'Risk Assessment Constants' 26 which are used by the 'Risk Assessment Logical Expressions' 22 and the 'Risk Assessment Algorithms' 24. Values of the Constants 26 that are used as input data for Risk Assessment Algorithms 24 and the Risk Assessment Logical Expressions 22 are as follows:
 (1) Maximum Mud Weight Overbalance to Pore Pressure
 (2) Minimum Required Collapse Design Factor
 (3) Minimum Required Tension Design Factor
 (4) Minimum Required Burst Design Factor
 (5) Rock density
 (6) Seawater density Risk Assessment Catalogs 28

The following paragraphs will set forth the 'Risk Assessment Catalogs' 28 which are used by the 'Risk Assessment Logical Expressions' 22 and the 'Risk Assessment Algorithms' 24. Values of the Catalogs 28 that are used as input data for Risk Assessment Algorithms 24 and the Risk Assessment Logical Expressions 22 include the following:
 (1) Risk Matrix Catalog
 (2) Risk Calculation Catalog
 (3) Drillstring component catalog
 (4) Drill Bit Catalog
 (5) Clearance Factor Catalog
 (6) Drill Collar Catalog
 (7) Drill Pipes Catalog
 (8) Minimum and maximum flow rate catalog
 (9) Pump catalog
 (10) Rig Catalog
 (11) Constants and variables Settings catalog
 (12) Tubular Catalog Risk Assessment Output Data 18b1

The following paragraphs will set forth the 'Risk Assessment Output Data' 18b1 which are generated by the 'Risk Assessment Algorithms' 24. The 'Risk Assessment Output Data' 18b1, which is generated by the 'Risk Assessment Algorithms' 24, includes the following types of output data: (1) Risk Categories, (2) Subcategory Risks, and (3) Individual Risks. The 'Risk Categories', 'Subcategory Risks', and 'Individual Risks' included within the 'Risk Assessment Output Data' 18b1 comprise the following:

The following 'Risk Categories' are calculated:
 (1) Individual Risk
 (2) Average Individual Risk
 (3) Subcategory Risk
 (4) Average Subcategory Risk
 (5) Total risk
 (6) Average total risk
 (7) Potential risk for each design task
 (8) Actual risk for each design task The following 'Subcategory Risks' are calculated
 (1) Gains risks
 (2) Losses risks
 (3) Stuck Pipe risks
 (4) Mechanical risks The following 'Individual Risks' are calculated
 (1) H2S and CO2,
 (2) Hydrates,
 (3) Well water depth,
 (4) Tortuosity,
 (5) Dogleg severity,
 (6) Directional Drilling Index,
 (7) Inclination,
 (8) Horizontal displacement,
 (9) Casing Wear,
 (10) High pore pressure,
 (11) Low pore pressure,
 (12) Hard rock,
 (13) SoftRock,
 (14) High temperature,
 (15) Water-depth to rig rating,
 (16) Well depth to rig rating,
 (17) mud weight to kick,
 (18) mud weight to losses,
 (19) mud weight to fracture,
 (20) mud weight window,
 (21) Wellbore stability window,
 (22) wellbore stability,
 (23) Hole section length,
 (24) Casing design factor,
 (25) Hole to casing clearance,
 (26) casing to casing clearance,
 (27) casing to bit clearance,
 (28) casing linear weight,
 (29) Casing maximum overpull,
 (30) Low top of cement,
 (31) Cement to kick,
 (32) cement to losses,
 (33) cement to fracture,
 (34) Bit excess work,
 (35) Bit work,
 (36) Bit footage,
 (37) bit hours,
 (38) Bit revolutions,
 (39) Bit ROP,
 (40) Drillstring maximum overputt,
 (41) Bit compressive strength,
 (42) Kick tolerance,
 (43) Critical flow rate,
 (44) Maximum flow rate,
 (45) Small nozzle area,
 (46) Standpipe pressure,
 (47) ECD to fracture,
 (48) ECD to losses,
 (49) Subsea BOP,
 (50) Large Hole,
 (51) Small Hole,
 (52) Number of casing strings,
 (53) Drillstring parting,
 (54) Cuttings.

Risk Assessment Logical Expressions 22

The following paragraphs will set forth the 'Risk Assessment Logical Expressions' 22. The 'Risk Assessment Logical Expressions' 22 will: (1) receive the 'Input Data 20a' including a 'plurality of Input Data calculation results' that has been generated by the 'Input Data 20a'; (2) determine whether each of the 'plurality of Input Data calculation results' represent a high risk, a medium risk, or a low risk; and (3) generate a 'plurality of Risk Values' (also known as a 'plurality of Individual Risks'), in response thereto, each of the plurality of Risk Values/plurality of Individual Risks representing a 'an Input Data calculation result' that has been 'ranked' as either a 'high risk', a 'medium risk', or a 'low risk'.

The Risk Assessment Logical Expressions 22 include the following:
Task: Scenario
Description: H2S and CO2 present for scenario indicated by user (per well)
Short Name: H2S_CO2
Data Name: H2S
Calculation: H2S and CO2 check boxes checked yes
Calculation Name: CalculateH2S_CO2
High: Both selected
Medium: Either one selected
Low: Neither selected
Unit: unitless
Task: Scenario
Description: Hydrate development (per well)
Short Name: Hydrates
Data Name: Water Depth
Calculation: =Water Depth
Calculation Name: CalculateHydrates
High: >=3000
Medium: >=2000
Low: <2000
Unit: ft
Task: Scenario
Description: Hydrate development (per well)
Short Name: Well_WD
Data Name: Water Depth
Calculation: =WaterDepth
Calculation Name: CalculateHydrates
High: >=5000
Medium: >=1000
Low: <1000
Unit: ft
Task: Trajectory
Description: Dogleg severity (per depth)
Short Name: DLS
Data Name: Dog Leg Severity
Calculation: NA
Calculation Name: CalculateRisk
High: >=6
Medium: >=4
Low: <4
Unit: deg/100 ft
Task: Trajectory
Description: Tortuosity (per depth)
Short Name: TORT
Data Name: Dog Leg Severity
Calculation: Summation of DLS
Calculation Name: CalculateTort
High: >=90
Medium: >=60
Low: <60
Unit: deg
Task: Trajectory
Description: Inclination (per depth)
Short Name: INC
Data Name: Inclination
Calculation: NA
Calculation Name: CalculateRisk
High: >=65
Medium: >=40
Low: <40
Unit: deg
Task: Trajectory
Description: Well inclinations with difficult cuttings transport conditions (per depth)
Short Name: Cutting
Data Name: Inclination
Calculation: NA
Calculation Name: CalculateCutting
High: >=45
Medium: >65
Low: <45
Unit: deg
Task: Trajectory
Description: Horizontal to vertical ratio (per depth)
Short Name: Hor_Disp
Data Name: Inclination
Calculation: =Horizontal Displacement/True Vertical Depth
Calculation Name: CalculateHor Disp
High: >=1.0
Medium: >=0.5
Low: <0.5
Unit: Ratio
Task: Trajectory
Description: Directional Drillability Index (per depth) Fake Threshold
Short Name: DDI
Data Name: Inclination
Calculation: =Calculate DDI using Resample data
Calculation Name: CalculateDDI
High: >6.8
Medium: >=6.0
Low: <6.0
Unit: unitless
Task: EarthModel
Description: High or supernormal Pore Pressure (per depth)
Short Name: PP_High
Data Name: Pore Pressure without Safety Margin
Calculation: =PP
Calculation Name: CalculateRisk
High: >=16
Medium: >=12
Low: <12
Unit: ppg
Task: EarthModel
Description: Depleted or subnormal Pore Pressure (per depth)
Short Name: PP_Low
Data Name: Pore Pressure without Safety Margin
Calculation: =Pore Pressure without Safety Margin
Calculation Name: CalculateRisk
High: <=8.33
Medium: <=8.65
Low: >8.65
Unit: ppg
Task: EarthModel
Description: Superhard rock (per depth)
Short Name: RockHard
Data Name: Unconfined Compressive Strength
Calculation: =Unconfined Compressive Strength
Calculation Name: CalculateRisk
High: >=25
Medium: >=16
Low: <16
Unit: kpsi
Task: EarthModel
Description: Gumbo (per depth)
Short Name: RockSoft
Data Name: Unconfined Compressive Strength
Calculation: =Unconfined Compressive Strength Calculation Name: CalculateRisk
High: <=2
Medium: <=4
Low: >4
Unit: kpsi
Task: EarthModel
Description: High Geothermal Temperature (per depth)
Short Name: TempHigh
Data Name: StaticTemperature
Calculation: =Temp
Calculation Name: CalculateRisk
High: >=280
Medium: >=220
Low: <220
Unit: degF
Task: RigConstraint
Description: Water depth as a ratio to the maximum water depth rating of the rig (per depth)
Short Name: Rig_WD
Data Name:
Calculation: =WD, Rig WD rating
Calculation Name: CalculateRig_WD
High: >=0.75
Medium: >=0.5
Low: <0.5
Unit: Ratio
Task: RigConstraint
Description: Total measured depth as a ratio to the maximum depth rating of the rig (per depth)
Short Name: Rig_MD
Data Name:
Calculation: =MD/Rig MD rating
Calculation Name: CalculateRig_MD
High: >=0.75
Medium: >=0.5
Low: <0.5
Unit: Ratio
Task: RigConstraint "Description: Subsea BOP or wellhead (per well), not quite sure how to compute it"
Short Name: SS_BOP
Data Name: Water Depth
Calculation: =
Calculation Name: CalculateHydrates
High: >=3000
Medium: >=1000
Low: <1000
Unit: ft
Task: MudWindow
Description: Kick potential where Mud Weight is too low relative to Pore Pressure (per depth)
Short Name: MW_Kick
Data Name:
Calculation: =Mud Weight—Pore Pressure
Calculation Name: CalculateMW_Kick
High: <=0.3
Medium: <=0.5
Low: >0.5
Unit: ppg
Task: MudWindow
Description: Loss potential where Hydrostatic Pressure is too high relative to Pore Pressure (per depth)
Short Name: MW_Loss
Data Name:
Calculation: =Hydrostatic Pressure−Pore Pressure
Calculation Name: CalculateMW_Loss
"PreCondition: =Mud Type (HP-WBM, ND-WBM, D-WBM)"
High: >=2500
Medium: >=2000
Low: <2000
Unit: psi
Task: MudWindow
Description: Loss potential where Hydrostatic Pressure is too high relative to Pore Pressure (per depth)
Short Name: MW_Loss
Data Name:
Calculation: =Hydrostatic Pressure−Pore Pressure
Calculation Method: CalculateMW_Loss
"PreCondition: =Mud Type (OBM, MOBM, SOBM)"
High: >=2000
Medium: >=1500
Low: <1500
Unit: psi
Task: MudWindow
Description: Loss potential where Mud Weight is too high relative to Fracture Gradient (per depth)
Short Name: MW_Frac
Data Name:
Calculation: =Upper Bound−Mud Weight
Calculation Method: CalculateMW_Frac
High: <=0.2
Medium: <=0.5
Low: >0.5
Unit: ppg
Task: MudWindow
Description: Narrow mud weight window (per depth)
Short Name: MWW
Data Name:
Calculation: =Upper Wellbore Stability Limit−Pore Pressure without Safety Margin
Calculation Method: CalculateMWW
High: <=0.5
Medium: <=1.0
Low: >1.0
Unit: ppg
Task: MudWindow
Description: Narrow wellbore stability window (per depth)
Short Name: WBSW
Data Name:
Calculation: =Upper Bound−Lower Bound
Calculation Method: CalculateWBSW
"PreCondition: =Mud Type (OBM, MOBM, SOBM)"
High: <=0.3
Medium: <=0.6
Low: >0.6
Unit: ppg
Task: MudWindow
Description: Narrow wellbore stability window (per depth)
Short Name: WBSW
Data Name:
Calculation: =Upper Bound−Lower Bound
Calculation Method: CalculateWBSW
"PreCondition: =Mud Type (HP-WBM, ND-WBM, D-WBM)"
High: <=0.4
Medium: <=0.8
Low: >0.8
Unit: ppg
Task: MudWindow
Description: Wellbore Stability (per depth)
Short Name: WBS
Data Name: Pore Pressure without Safety Margin
Calculation: =Pore Pressure without Safety Margin
Calculation Method: CalculateWBS High: LB>=MW>=PP
Medium: MW>=LB>=PP
Low: MW>=PP>=LB
Unit: unitless
Task: MudWindow
Description: Hole section length (per hole section)
Short Name: HSLength
Data Name:
Calculation: =HoleEnd−HoleStart
Calculation Method: CalculateHSLength
High: >=8000
Medium: >=7001
Low: <7001
Unit: ft
Task: MudWindow
Description: Dogleg severity at Casing points for casing wear (per hole section)
Short Name: Csg_Wear
Data Name: Dog Leg Severity
Calculation: =Hole diameter
Calculation Method: CalculateCsg_Wear
High: >=4
Medium: >=3
Low: <3
Unit: deg/100 ft
Task: MudWindow
Description: Number of Casing strings (per hole section)
Short Name: Csg_Count
Data Name: Casing Point Depth
Calculation: =Number of Casing strings
Calculation Method: CalculateCsg_Count
High: >=6
Medium: >=4
Low: <4
Unit: unitless
Task: WellboreSizes
Description: Large Hole size (per hole section)
Short Name: Hole_Big
Data Name: Hole Size
Calculation: =Hole diameter
Calculation Method: CalculateHoleSectionRisk
High: >=24
Medium: >=18.625
Low: <18.625
Unit: in
Task: WellboreSizes
Description: Small Hole size (per hole section)
Short Name: Hole_Sm
Data Name: Hole Size
Calculation: =Hole diameter
Calculation Method: CalculateHole_Sm
PreCondition: Onshore
High: <=4.75
Medium: <=6.5
Low: >6.5
Unit: in
Task: WellboreSizes
Description: Small Hole size (per hole section)
Short Name: Hole_Sm
Data Name: Hole Size
Calculation: =Hole diameter
Calculation Method: CalculateHole_Sm
PreCondition: Offshore
High: <=6.5
Medium: <=7.875
Low: >7.875
Unit: in
Task: TubularDesign
"Description: Casing Design Factors for Burst, Collapse, & Tension (per hole section), DFb,c,t<=1.0 for High, DFb,c,t<=1.1 for Medium, DFb,c,t>1.1 for Low"
Short Name: Csg_DF
Data Name:
Calculation: =DF/Design Factor
Calculation Method: CalculateCsg_DF
High: <=1.0
Medium: <=1.1
Low: >1.1
Unit: unitless
Task: TubularDesign
Description: Casing string weight relative to rig lifting capabilities (per casing string)
Short Name: Csg_Wt
Data Name:
Calculation: =CasingWeight/RigMinRating
Calculation Method: CalculateCsg_Wt
High: >=0.95
Medium: <0.95
Low: <0.8
Unit: Ratio
Task: TubularDesign
Description: Casing string allowable Margin of Overpull (per casing string)
Short Name: Csg_MOP
DataName:
Calculation: =Tubular Tension rating-CasingWeight
Calculation Method: CalculateCsg_MOP
High: <=50
Medium: <=100
Low: >100
Unit: klbs
Task: WellboreSizes
Description: Clearance between hole size and casing max OD (per hole section)
Short Name: Hole_Csg
Data Name:
Calculation: =Area of hole size Area of casing size (max OD)
Calculation Method: CalculateHole_Csg
High: <=1.1
Medium: <=1.25
Low: >1.25
Unit: Ratio
Task: WellboreSizes
Description:
Short Name: Csg_Csg
Data Name:
Calculation: =CainsgID/NextMaxCasingSize
Calculation Method: CalculateCsg_Csg
High: <=1.05
Medium: <=1.1
Low: >1.1
Unit: Ratio
Task: WellboreSizes
Description: Clearance between casing inside diameter and subsequent bit size (per bit run)
Short Name: Csg_Bit
Data Name:
Calculation: =CainsgID/NextBit Size
Calculation Method: CalculateCsg_Bit
High: <=1.05
Medium: <=1.1
Low: >1.1

Unit: Ratio
Task: CementDesign
Description: Cement height relative to design guidelines for each string type (per hole section)
Short Name: TOC_Low
Data Name:
Calculation: =CasingBottomDepth−TopDepthOfCement
Calculation Method: CalculateTOC_Low
High: <=0.75
Medium: <=1.0
Low: >1.0
Unit: Ratio
Task: CementDesign
Description: Kick potential where Hydrostatic Pressure is too low relative to Pore Pressure (per depth)
Short Name: Cmt_Kick
Data Name:
Calculation: =(Cementing Hydrostatic Pressure−Pore Pressure)/TVD
Calculation Method: CalculateCmt_Kick
High: <=0.3
Medium: <=0.5
Low: >0.5
Unit: ppg
Task: CementDesign
Description: Loss potential where Hydrostatic Pressure is too high relative to Pore Pressure (per depth)
Short Name: Cmt_Loss
DataName:
Calculation: =Cementing Hydrostatic Pressure−Pore Pressure
Calculation Method: CalculateCmt_Loss
High: >=2500
Medium: >=2000
Low: <2000
Unit: psi
Task: CementDesign
Description: Loss potential where Hydrostatic Pressure is too high relative to Fracture Gradient (per depth)
Short Name: Cmt_Frac
Data Name:
Calculation: =(UpperBound−Cementing Hydrostatic Pressure)/TVD
Calculation Method: CalculateCmt_Frac
High: <=0.2
Medium: <=0.5
Low: >0.5
Unit: ppg
Task: BitsSelection
Description: Excess bit work as a ratio to the Cumulative Mechanical drilling energy (UCS integrated over distance drilled by the bit)
Short Name: Bit_WkXS
Data Name: CumExcessCumulative UCSRatio
Calculation: =CumExcess/Cumulative UCS
Calculation Method: CalculateBitSectionRisk
High: >=0.2
Medium: >=0.1
Low: <0.1
Unit: Ratio
Task: BitsSelection
Description: Cumulative bit work as a ratio to the bit catalog average Mechanical drilling energy (UCS integrated over distance drilled by the bit)
Short Name: Bit_Wk
Data Name:
Calculation: =Cumulative UCS/Mechanical drilling energy (UCS integrated over distance drilled by the bit)
Calculation Method: CalculateBit_Wk
High: >=1.5
Medium: >=1.25
Low: <1.25
Unit: Ratio
Task: BitsSelection
Description: Cumulative bit footage as a ratio to the bit catalog average footage (drilled length) (per depth)
Short Name: Bit_Ftg
Data Name: Ratio of footage drilled compared to statistical footage
Calculation: =Ratio of footage drilled compared to statistical footage
Calculation Method: CalculateBitSectionRisk
High: >=2
Medium: >=1.5
Low: <1.5
Unit: Ratio
Task: BitsSelection
Description: Cumulative bit hours as a ratio to the bit catalog average hours (on bottom rotating time) (per depth)
Short Name: Bit_Hrs
Data Name: Bit_Ftg
Calculation: =On Bottom Hours/Statistical Bit Hours
Calculation Method: CalculateBit_Hrs
High: >=2
Medium: >=1.5
Low: <1.5
Unit: Ratio
Task: BitsSelection
Description: Cumulative bit Krevs as a ratio to the bit catalog average Krevs (RPM*hours) (per depth)
Short Name: Bit_Krev
Data Name:
Calculation: =Cumulative Krevs Bit average Krevs
Calculation Method: CalculateBit_Krev
High: >=2
Medium: >=1.5
Low: <1.5
Unit: Ratio
Task: BitsSelection
Description: Bit ROP as a ratio to the bit catalog average ROP (per bit run)
Short Name: Bit_ROP
Data Name:
Calculation: =ROP/Statistical Bit ROP
Calculation Method: CalculateBit_ROP
High: >=1.5
Medium: >=1.25
Low: <1.25
Unit: Ratio
Task: BitsSelection
Description: UCS relative to Bit UCS and Max Bit UCS (per depth)
Short Name: Bit_UCS
Data Name:
Calculation: =UCS
Calculation Method: CalculateBit_UCS
High: UCS >=Max Bit UCS >=Bit UCS
Medium: Max Bit UCS >=UCS >=Bit UCS
Low: Max Bit UCS >=Bit UCS >=UCS
Unit: Ratio
Task: DrillstringDesign Description: Drillstring allowable Margin of Overpull (per bit run)
Short Name: DS_MOP
Data Name:
Calculation: =MOP
Calculation Method: CalculateDS_MOP
High: <=50
Medium: <=100
Low: >100
Unit: klbs
Task: DrillstringDesign
"Description: Potential parting of the drillstrings where required tension approaches mechanical tension limits of drill pipe, heavy weight, drill pipe, drill collars, or connections (per bit run)"
Short Name: DS_Part
Data Name:
Calculation: =Required Tension (including MOP)/Tension limit of drilling component (DP)
Calculation Method: CalculateDS_Part
High: >=0.9
Medium: >=0.8
Low: >0.8
Unit: ratio
Task: DrillstringDesign
Description: Kick Tolerance (per hole section)
Short Name: Kick_Tol
Data Name: Bit_UCS
"Calculation: NA (already calculated), Exploration/Development"
Calculation Method: CalculateKick_Tol
PreCondition: Exporation
High: <=50
Medium: <=100
Low: >100
Unit: bbl
Task: DrillstringDesign
Description: Kick Tolerance (per hole section)
Short Name: Kick_Tol
Data Name: Bit_UCS
"Calculation: NA (already calculated), Exploration/Development"
Calculation Method: CalculateKick_Tol
PreCondition: Development
High: <=25
Medium: <=50
Low: >50
Unit: bbl
Task: Hydraulics
Description: Flow rate for hole cleaning (per depth)
Short Name: Q_Crit
"Data Name: Flow Rate, Critical Flow Rate"
Calculation: =Flow Rate/Critical Flow Rate
Calculation Method: CalculateQ_Crit
High: <=1.0
Medium: <=1.1
Low: >1.1
Unit: Ratio
Task: Hydraulics
Description: Flow rate relative to pump capabilities (per depth)
Short Name: Q_Max
Data Name: Bit_UCS
Calculation: =Q/Qmax
Calculation Method: CalculateQ_Max
High: >=1.0
Medium: >=0.9
Low: <0.9
Unit: Ratio
Task: Hydraulics
"Description: TFA size relative to minimum TFA (per bit run), 0.2301=3 of $^{10}/_{32}$ inch, 0.3313=3 of $^{12}/_{32}$ inch"
Short Name: TFA_Low
Data Name: Bit_UCS
Calculation: TFA
Calculation Method: CalculateTFA_Low
High: <=0.2301
Medium: <=0.3313
Low: >0.3313
Unit: inch
Task: Hydraulics
Description: Circulating pressure relative to rig and pump maximum pressure (per depth)
Short Name: P_Max
Data Name: Bit_UCS
Calculation: P_Max
Calculation Method: CalculateP_Max
High: >=1.0
Medium: >=0.9
Low: <0.9
Unit: Ratio
Task: Hydraulics
Description: Loss potential where ECD is too high relative to Fracture Gradient (per depth)
Short Name: ECD_Frac
Data Name: Bit_UCS
Calculation: UpperBound-ECD
Calculation Method: CalculateECD_Frac
High: <=0.0
Medium: <=0.2
Low: >0.2
Unit: ppg
Task: Hydraulics
Description: Loss potential where ECD is too high relative to Pore Pressure (per depth)
Short Name: ECD_Loss
Data Name: Bit_UCS
Calculation: =ECD−Pore Pressure
Calculation Method: CalculateECD_Loss
"PreCondition: Mud Type (HP-WBM, ND-WBM, D-WBM)"
High: >=2500
Medium: >=2000
Low: <2000
Unit: psi
Task: Hydraulics
Description: Loss potential where ECD is too high relative to Pore Pressure (per depth)
Short Name: ECD_Loss
Data Name: Bit_UCS
Calculation: =ECD−Pore Pressure
Calculation Method: CalculateECD_Loss
"PreCondition: Mud Type (OBM, MOBM, SOBM)"
High: >=2000
Medium: >=1500
Low: <1500
Unit: psi Risk Assessment Algorithms 24

Recall that the 'Risk Assessment Logical Expressions' 22 will: (1) receive the 'Input Data 20a' including a 'plurality of Input Data calculation results' that has been generated by the 'Input Data 20a'; (2) determine whether each of the 'plurality of Input Data calculation results' represent a high risk, a medium risk, or a low risk; and (3) generate a plurality of Risk Values/plurality of Individual Risks in response thereto, where each of the plurality of Risk Values/plurality of Individual Risks represents a 'an Input Data calculation result' that has been 'ranked' as either a 'high risk', a 'medium risk', or a 'low risk'. For example, recall the following task:

Task: Hydraulics

Description: Loss potential where ECD is too high relative to Pore Pressure (per depth)

Short Name: ECD_Loss

Data Name: Bit_UCS

Calculation: =ECD−Pore Pressure

Calculation Method: CalculateECD_Loss

"PreCondition: Mud Type (OBM, MOBM, SOBM)"

High: >=2000

Medium: >=1500

Low: <1500

Unit: psi

When the Calculation 'ECD—Pore Pressure' associated with the above referenced Hydraulics task is >=2000, a 'high' rank is assigned to that calculation; but if the Calculation 'ECD—Pore Pressure' is >=1500, a 'medium' rank is assigned to that calculation, but if the Calculation 'ECD—Pore Pressure' is <1500, a 'low' rank is assigned to that calculation.

Therefore, the 'Risk Assessment Logical Expressions' 22 will rank each of the 'Input Data calculation results' as either a 'high risk' or a 'medium risk' or a 'low risk' thereby generating a 'plurality of ranked Risk Values', also known as a 'plurality of ranked Individual Risks'. In response to the 'plurality of ranked Individual Risks' received from the Logical Expressions 22, the 'Risk Assessment Logical Algorithms' 24 will then assign a 'value' and a 'color' to each of the plurality of ranked Individual Risks received from the Logical Expressions 22, where the 'value' and the 'color' depends upon the particular ranking (i.e., the 'high risk' rank, or the 'medium risk' rank, or the 'low risk' rank) that is associated with each of the plurality of ranked Individual Risks. The 'value' and the 'color' is assigned, by the 'Risk Assessment Algorithms' 24, to each of the plurality of Individual Risks received from the Logical Expressions 22 in the following manner:

Risk Calculation #1—Individual Risk Calculation:

Referring to the 'Risk Assessment Output Data' 18*b*1 set forth above, there are fifty-four (54) 'Individual Risks' currently specified. For an 'Individual Risk':

a High risk=90, a Medium risk=70, and a Low risk=10

High risk color code=Red

Medium risk color code=Yellow

Low risk color code=Green

If the 'Risk Assessment Logical Expressions' 22 assigns a 'high risk' rank to a particular 'Input Data calculation result', the 'Risk Assessment Algorithms' 24 will then assign a value '90' to that 'Input Data calculation result' and a color 'red' to that 'Input Data calculation result'.

If the 'Risk Assessment Logical Expressions' 22 assigns a 'medium risk' rank to a particular 'Input Data calculation result', the 'Risk Assessment Algorithms' 24 will then assign a value '70' to that 'Input Data calculation result' and a color 'yellow' to that 'Input Data calculation result'.

If the 'Risk Assessment Logical Expressions' 22 assigns a 'low risk' rank to a particular 'Input Data calculation result', the 'Risk Assessment Algorithms' 24 will then assign a value '10' to that 'Input Data calculation result' and a color 'green' to that 'Input Data calculation result'.

Therefore, in response to the 'Ranked Individual Risks' from the Logical Expressions 22, the Risk Assessment Algorithms 24 will assign to each of the 'Ranked Individual Risks' a value of 90 and a color 'red' for a high risk, a value of 70 and a color 'yellow' for the medium risk, and a value of 10 and a color 'green' for the low risk. However, in addition, in response to the 'Ranked Individual Risks' from the Logical Expressions 22, the Risk Assessment Algorithms 24 will also generate a plurality of ranked 'Risk Categories' and a plurality of ranked 'Subcategory Risks'.

Referring to the 'Risk Assessment Output Data' 18*b*1 set forth above, the 'Risk Assessment Output Data' 18*b*1 includes: (1) eight 'Risk Categories', (2) four 'Subcategory Risks', and (3) fifty-four (54) 'Individual Risks' [that is, 54 individual risks plus 2 'gains' plus 2 'losses' plus 2 'stuck' plus 2 'mechanical' plus 1 'total'=63 risks].

The eight 'Risk Categories' include the following: (1) an Individual Risk, (2) an Average Individual Risk, (3) a Risk Subcategory (or Subcategory Risk), (4) an Average Subcategory Risk, (5) a Risk Total (or Total Risk), (6) an Average Total Risk, (7) a potential Risk for each design task, and (8) an Actual Risk for each design task.

Recalling that the 'Risk Assessment Algorithms' 24 have already established and generated the above referenced 'Risk Category (1)' [i.e., the plurality of ranked Individual Risks'] by assigning a value of 90 and a color 'red' to a high risk 'Input Data calculation result', a value of 70 and a color 'yellow' to a medium risk 'Input Data calculation result', and a value of 10 and a color 'green' to a low risk 'Input Data calculation result', the 'Risk Assessment Algorithms' 24 will now calculate and establish and generate the above referenced 'Risk Categories (2) through (8)' in response to the plurality of Risk Values/plurality of Individual Risks received from the 'Risk Assessment Logical Expressions' 22 in the following manner:

Risk Calculation #2—Average Individual Risk:

The average of all of the 'Risk Values' is calculated as follows:

$$\text{Average individual risk} = \frac{\sum_{i}^{n} Riskvalue_i}{n}$$

In order to determine the 'Average Individual Risk', sum the above referenced 'Risk Values' and then divide by the number of such 'Risk Values', where i=number of sample points. The value for the 'Average Individual Risk' is displayed at the bottom of the colored individual risk track.

Risk Calculation #3—Risk Subcategory

Referring to the 'Risk Assessment Output Data' 18b1 set forth above, the following 'Subcategory Risks' are defined: (a) gains, (b) losses, (c) stuck and (d) mechanical, where a 'Subcategory Risk' (or 'Risk Subcategory') is defined as follows:

$$Risk\ Subcategory = \frac{\sum_{j}^{n}(Riskvalue_j \times severity_j \times N_j)}{\sum_{j}(severity_j \times N_j)}$$

j=number of individual risks,
$0 \leq Severity \leq 5$, and
$N_j$=either 1 or 0 depending on whether the Risk Value$_j$ contributes to the sub category
Severity$_j$=from the risk matrix catalog.
Red risk display for Risk Subcategory$\geq$40
Yellow risk display for $20 \leq$Risk Subcategory$<40$
Green risk display for Risk Subcategory$<20$ Risk Calculation #4—Average Subcategory Risk:

$$Average\ subcategory\ risk = \frac{\sum_{i}^{n}(Risk\ Subcategory_i \times risk\ multiplier_i)}{\sum_{1}^{n} risk\ multiplier_i}$$

n=number of sample points.

The value for the average subcategory risk is displayed at the bottom of the colored subcategory risk track.
Risk Multiplier=3 for Risk Subcategory$\geq$40,
Risk Multiplier=2 for $20 \leq$Risk Subcategory$<40$
Risk Multiplier=1 for Risk Subcategory$<20$ Risk Calculation #5—Total Risk The total risk calculation is based on the following categories: (a) gains, (b) losses, (c) stuck, and (d) mechanical.

$$Risk\ Total = \frac{\sum_{1}^{4} Risk\ subcategory_k}{4}$$

where k=number of subcategories
Red risk display for Risk total$\geq$40
Yellow risk display for $20 \leq$Risk Total$<40$
Green risk display for Risk Total$<20$ Risk Calculation #6—Average Total Risk $$Average\ total\ risk = \frac{\sum_{i}^{n}(Risk\ Subcategory_i \times risk\ multiplier_i)}{\sum_{1}^{n} risk\ multiplier_i}$$

n=number of sample points.
Risk Multiplier=3 for Risk Subcategory$\geq$40,
Risk Multiplier=2 for $20 \leq$Risk Subcategory$<40$
Risk Multiplier=1 for Risk Subcategory$<20$ The value for the average total risk is displayed at the bottom of the colored total risk track.

Risk Calculation #7—Risks Per Design Task:

The following 14 design tasks have been defined: Scenario, Trajectory, Mechanical Earth Model, Rig, Wellbore stability, Mud weight and casing points, Wellbore Sizes, Casing, Cement, Mud, Bit, Drillstring, Hydraulics, and Time design. There are currently 54 individual risks specified.

Risk Calculation #7A—Potential Maximum Risk Per Design Task $$Potential\ Risk_k = \frac{\sum_{j=1}^{55}(90 \times Severity_{k,j} \times N_{k,j})}{\sum_{j=1}^{55}(Severity_{k,j} \times N_{k,j})}$$

k=index of design tasks, there are 14 design tasks,
$N_j$=either 0 or 1 depending on whether the Risk Value$_j$ contributes to the design task.
$0 \leq Severity \leq 5$ Risk Calculation #7B—Actual Risk Per Design Task $$Actual\ Risk_k = \frac{\sum_{j=1}^{55}(Average\ Individual\ Risk_j \times Severity_{,j} \times N_{k,j})}{\sum_{j=1}^{55}(Severity_j \times N_{k,j})}$$

k=index of design tasks, there are 14 design tasks
$N_{k,j} \in [0, \ldots, M]$
$0 \leq Severity_j \leq 5$ The 'Severity' in the above equations are defined as follows:

| Risk | Severity |
|---|---|
| H2S_CO2 | 2.67 |
| Hydrates | 3.33 |
| Well_WD | 3.67 |
| DLS | 3 |
| TORT | 3 |
| Well_MD | 4.33 |
| INC | 3 |
| Hor_Disp | 4.67 |
| DDI | 4.33 |
| PP_High | 4.33 |
| PP_Low | 2.67 |
| RockHard | 2 |
| RockSoft | 1.33 |
| TempHigh | 3 |
| Rig_WD | 5 |
| Rig_MD | 5 |
| SS_BOP | 3.67 |
| MW_Kick | 4 |
| MW_Loss | 3 |
| MW_Frac | 3.33 |
| MWW | 3.33 |
| WBS | 3 |
| WBSW | 3.33 |
| HSLength | 3 |
| Hole_Big | 2 |
| Hole_Sm | 2.67 |
| Hole_Csg | 2.67 |

-continued

| Risk | Severity |
| --- | --- |
| Csg_Csg | 2.33 |
| Csg_Bit | 1.67 |
| Csg_DF | 4 |
| Csg_Wt | 3 |
| Csg_MOP | 2.67 |
| Csg_Wear | 1.33 |
| Csg_Count | 4.33 |
| TOC_Low | 1.67 |
| Cmt_Kick | 3.33 |
| Cmt_Loss | 2.33 |
| Cmt_Frac | 3.33 |
| Bit_Wk | 2.33 |
| Bit_WkXS | 2.33 |
| Bit_Ftg | 2.33 |
| Bit_Hrs | 2 |
| Bit_Krev | 2 |
| Bit_ROP | 2 |
| Bit_UCS | 3 |
| DS_MOP | 3.67 |
| DS_Part | 3 |
| Kick_Tol | 4.33 |
| Q_Crit | 2.67 |
| Q_Max | 3.33 |
| Cutting | 3.33 |
| P_Max | 4 |
| TFA_Low | 1.33 |
| ECD_Frac | 4 |
| ECD_Loss | 3.33 |

Figure 11:
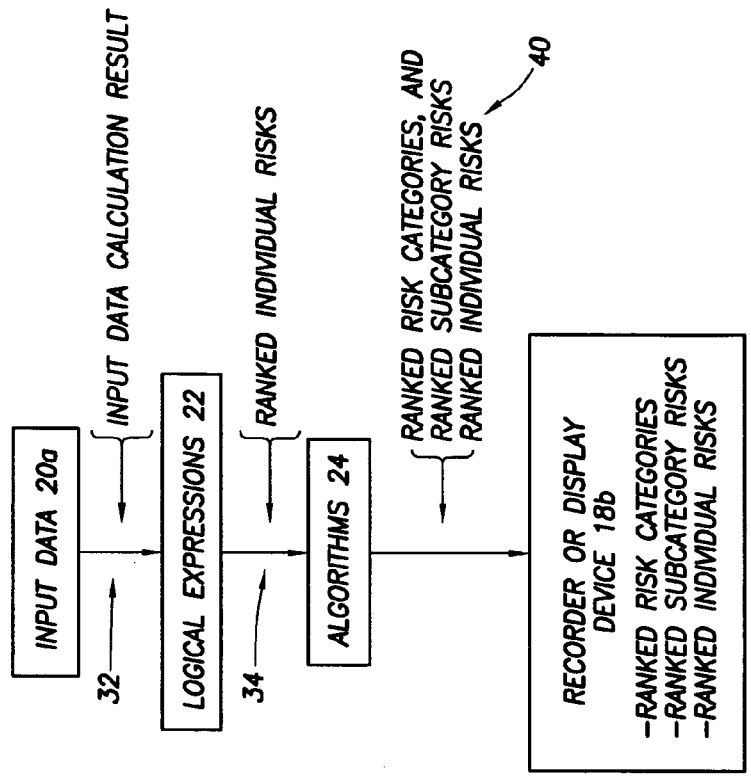
FIG. 11 illustrates a block diagram representing a construction of the Automatic Well Planning Risk Assessment software of FIG. 10 which is stored in the Computer System of FIG. 9A.

Refer now to FIG. 11 which will be used during the following functional description of the operation of the present invention.

A functional description of the operation of the 'Automatic Well Planning Risk Assessment Software' 18c1 will be set forth in the following paragraphs with reference to FIGS. 1 through 11 of the drawings.

The Input Data 20a shown in FIG. 9A will be introduced as 'input data' to the Computer System 18 of FIG. 9A. The Processor 18a will execute the Automatic Well Planning Risk Assessment Software 18c1, while using the Input Data 20a, and, responsive thereto, the Processor 18a will generate the Risk Assessment Output Data 18b1, the Risk Assessment Output Data 18b1 being recorded or displayed on the Recorder or Display Device 18b in the manner illustrated in FIG. 9B. The Risk Assessment Output Data 18b1 includes the 'Risk Categories', the 'Subcategory Risks', and the 'Individual Risks'. When the Automatic Well Planning Risk Assessment Software 18c1 is executed by the Processor 18a of FIG. 9A, referring to FIGS. 10 and 11, the Input Data 20a (and the Risk Assessment Constants 26 and the Risk Assessment Catalogs 28) are collectively provided as 'input data' to the Risk Assessment Logical Expressions 22. Recall that the Input Data 20a includes a 'plurality of Input Data Calculation results'. As a result, as denoted by element numeral 32 in FIG. 11, the 'plurality of Input Data Calculation results' associated with the Input Data 20a will be provided directly to the Logical Expressions block 22 in FIG. 11. During that execution of the Logical Expressions 22 by the Processor 18a, each of the 'plurality of Input Data Calculation results' from the Input Data 20a will be compared with each of the 'logical expressions' in the Risk Assessment Logical Expressions block 22 in FIG. 11. When a match is found between an 'Input Data Calculation result' from the Input Data 20a and an 'expression' in the Logical Expressions block 22, a 'Risk Value' or 'Individual Risk' 34 will be generated (by the Processor 18a) from the Logical Expressions block 22 in FIG. 11.

As a result, since a 'plurality of Input Data Calculation results' 32 from the Input Data 20a have been compared with a 'plurality of expressions' in the Logical Expressions' block 22 in FIG. 11, the Logical Expressions block 22 will generate a plurality of Risk Values/plurality of Individual Risks 34 in FIG. 11, where each of the plurality of Risk Values/plurality of Individual Risks on line 34 in FIG. 11 that are generated by the Logical Expressions block 22 will represent an 'Input Data Calculation result' from the Input Data 20a that has been ranked as either a 'High Risk', or a 'Medium Risk', or a 'Low Risk' by the Logical Expressions block 22. Therefore, a 'Risk Value' or 'Individual Risk' is defined as an 'Input Data Calculation result' from the Input Data 20a that has been matched with one of the 'expressions' in the Logical Expressions 22 and ranked, by the Logical Expressions block 22, as either a 'High Risk', or a 'Medium Risk', or a 'Low Risk'. For example, consider the following 'expression' in the Logical Expressions' 22:

Task: MudWindow
Description: Hole section length (per hole section)
Short Name: HSLength
Data Name:
Calculation: =HoleEnd−HoleStart
Calculation Method: CalculateHSLength
High: >=8000
Medium: >=7001
Low: <7001

The 'Hole End−HoleStart' calculation is an 'Input Data Calculation result' from the Input Data 20a. The Processor 18a will find a match between the 'Hole End —HoleStart Input Data Calculation result' originating from the Input Data 20a and the above identified 'expression' in the Logical Expressions 22. As a result, the Logical Expressions block 22 will 'rank' the 'Hole End—HoleStart Input Data Calculation result' as either a 'High Risk', or a 'Medium Risk', or a 'Low Risk' depending upon the value of the 'Hole End−HoleStart Input Data Calculation result'.

When the 'Risk Assessment Logical Expressions' 22 ranks the 'Input Data calculation result' as either a 'high risk' or a 'medium risk' or a 'low risk' thereby generating a plurality of ranked Risk Values/plurality of ranked Individual Risks, the 'Risk Assessment Logical Algorithms' 24 will then assign a 'value' and a 'color' to that ranked 'Risk Value' or ranked 'Individual Risk', where the 'value' and the 'color' depends upon the particular ranking (i.e., the 'high risk' rank, or the 'medium risk' rank, or the 'low risk' rank) that is associated with that 'Risk Value' or 'Individual Risk'. The 'value' and the 'color' is assigned, by the 'Risk Assessment Logical Algorithms' 24, to the ranked 'Risk Values' or ranked 'Individual Risks' in the following manner:

a High risk=90,
a Medium risk=70, and
a Low risk=10
High risk color code=Red
Medium risk color code=Yellow
Low risk color code=Green If the 'Risk Assessment Logical Expressions' 22 assigns a 'high risk' rank to the 'Input Data calculation result' thereby generating a ranked 'Individual Risk', the 'Risk Assessment Logical Algorithms' 24 assigns a value '90' to that ranked 'Risk Value' or ranked 'Individual Risk' and a color 'red' to that ranked 'Risk Value' or that ranked 'Individual Risk'. If the 'Risk Assessment Logical Expressions' 22 assigns a 'medium risk' rank to the 'Input Data calculation result' thereby generating a ranked 'Individual Risk', the 'Risk Assessment Logical Algorithms' 24 assigns a value '70' to that ranked 'Risk Value' or ranked 'Individual Risk' and a color 'yellow' to that ranked 'Risk Value' or that ranked 'Individual Risk'. If the 'Risk Assessment Logical Expressions' 22 assigns a 'low risk' rank to the 'Input Data calculation result' thereby generating a ranked 'Individual Risk', the 'Risk Assessment Logical Algorithms' 24 assigns a value '10' to that ranked 'Risk Value' or ranked 'Individual Risk' and a color 'green' to that ranked 'Risk Value' or that ranked 'Individual Risk'.

Therefore, in FIG. 11, a plurality of ranked Individual Risks (or ranked Risk Values) is generated, along line 34, by the Logical Expressions block 22, the plurality of ranked Individual Risks (which forms a part of the 'Risk Assessment Output Data' 18b1) being provided directly to the 'Risk Assessment Algorithms' block 24. The 'Risk Assessment Algorithms' block 24 will receive the plurality of ranked Individual Risks' from line 34 and, responsive thereto, the 'Risk Assessment Algorithms' 24 will: (1) generate the 'Ranked Individual Risks' including the 'values' and 'colors' associated therewith in the manner described above, and, in addition, (2) calculate and generate the 'Ranked Risk Categories' 40 and the 'Ranked Subcategory Risks' 40 associated with the 'Risk Assessment Output Data' 18b1. The 'Ranked Risk Categories' 40 and the 'Ranked Subcategory Risks' 40 and the 'Ranked Individual Risks' 40 can now be recorded or displayed on the Recorder or Display device 18b. Recall that the 'Ranked Risk Categories' 40 include: an Average Individual Risk, an Average Subcategory Risk, a Risk Total (or Total Risk), an Average Total Risk, a potential Risk for each design task, and an Actual Risk for each design task. Recall that the 'Ranked Subcategory Risks' 40 include: a Risk Subcategory (or Subcategory Risk).

As a result, recalling that the 'Risk Assessment Output Data' 18b1 includes 'one or more Risk Categories' and 'one or more Subcategory Risks' and 'one or more Individual Risks', the 'Risk Assessment Output Data' 18b1, which includes the Risk Categories 40 and the Subcategory Risks 40 and the Individual Risks 40, can now be recorded or displayed on the Recorder or Display Device 18b of the Computer System 18 shown in FIG. 9A.

As noted earlier, the 'Risk Assessment Algorithms' 24 will receive the 'Ranked Individual Risks' from the Logical Expressions 22 along line 34 in FIG. 11; and, responsive thereto, the 'Risk Assessment Algorithms' 24 will (1) assign the 'values' and the 'colors' to the 'Ranked Individual Risks' in the manner described above, and, in addition, (2) calculate and generate the 'one or more Risk Categories' 40 and the 'one or more Subcategory Risks' 40 by using the following equations (set forth above).

The average Individual Risk is calculated from the 'Risk Values' as follows:

$$Average\ individual\ risk = \frac{\sum_{i}^{n} Riskvalue_i}{n}$$

The Subcategory Risk, or Risk Subcategory, is calculated from the 'Risk Values' and the 'Severity', as defined above, as follows:

$$Risk\ Subcategory = \frac{\sum_{j}^{n}(Riskvalue_j \times severity_j \times N_j)}{\sum_{j}(severity_j \times N_j)}$$

The Average Subcategory Risk is calculated from the Risk Subcategory in the following manner, as follows:

$$Average\ subcategory\ risk = \frac{\sum_{i}^{n}(Risk\ Subcategory_i \times risk\ multiplier_i)}{\sum_{1}^{n} risk\ multiplier_i}$$

The Risk Total is calculated from the Risk Subcategory in the following manner, as follows:

$$Risk\ Total = \frac{\sum_{1}^{4} Risk\ subcategory_k}{4}$$

The Average Total Risk is calculated from the Risk Subcategory in the following manner, as follows:

$$Average\ total\ risk = \frac{\sum_{i}^{n}(Risk\ Subcategory_i \times risk\ multiplier_i)}{\sum_{1}^{n} risk\ multiplier_i}$$

The Potential Risk is calculated from the Severity, as defined above, as follow:

$$Potential\ Risk_k = \frac{\sum_{j=1}^{55}(90 \times Severity_{k,j} \times N_{k,j})}{\sum_{j=1}^{55}(Severity_{k,j} \times N_{k,j})}$$

The Actual Risk is calculated from the Average Individual Risk and the Severity (defined above) as follows:

$$Actual\ Risk_k = \frac{\sum_{j=1}^{55}(Average\ Individual\ Risk_j \times Severity_j \times N_{k,j})}{\sum_{j=1}^{55}(Severity_j \times N_{k,j})}$$

Recall that the Logical Expressions block 22 will generate a 'plurality of Risk Values/Ranked Individual Risks' along line 34 in FIG. 11, where each of the 'plurality of Risk Values/Ranked Individual Risks' generated along line 34 represents a received 'Input Data Calculation result' from the Input Data 20a that has been 'ranked' as either a 'High Risk', or a 'Medium Risk', or a 'Low Risk' by the Logical Expressions 22. A 'High Risk' will be assigned a 'Red' color, and a 'Medium Risk' will be assigned a 'Yellow' color, and a 'Low Risk' will be assigned a 'Green' color. Therefore, noting the word 'rank' in the following, the Logical Expressions block 22 will generate (along line 34 in FIG. 11) a 'plurality of ranked Risk Values/ranked Individual Risks'.

In addition, in FIG. 11, recall that the 'Risk Assessment Algorithms' block 24 will receive (from line 34) the 'plurality of ranked Risk Values/ranked Individual Risks' from the Logical Expressions block 22. In response thereto, noting the word 'rank' in the following, the 'Risk Assessment Algorithms' block 24 will generate: (1) the 'one or more Individual Risks having 'values' and 'colors' assigned thereto, (2) the 'one or more ranked Risk Categories' 40, and (3) the 'one or more ranked Subcategory Risks' 40. Since the 'Risk Categories' and the 'Subcategory Risks' are each 'ranked', a 'High Risk' (associated with a Risk Category 40 or a Subcategory Risk 40) will be assigned a 'Red' color, and a 'Medium Risk' will be assigned a 'Yellow' color, and a 'Low Risk' will be assigned a 'Green' color. In view of the above 'rankings' and the colors associated therewith, the 'Risk Assessment Output Data' 18b1, including the 'ranked' Risk Categories 40 and the 'ranked' Subcategory Risks 40 and the 'ranked' Individual Risks 38, will be recorded or displayed on the Recorder or Display Device 18b of the Computer System 18 shown in FIG. 9A in the manner illustrated in FIG. 9B.

Automatic Well Planning Software System—Bit Selection Sub-task 14a

In FIG. 8, the Bit Selection sub-task 14a is illustrated.

The selection of Drill bits is a manual subjective process based heavily on personal, previous experiences. The experience of the individual recommending or selecting the drill bits can have a large impact on the drilling performance for the better or for the worse. The fact that bit selection is done primarily based on personal experiences and uses little information of the actual rock to be drilled makes it very easy to choose the incorrect bit for the application.

The Bit Selection sub-task 14a utilizes an 'Automatic Well Planning Bit Selection software' to automatically generate the required drill bits to drill the specified hole sizes through the specified hole section at unspecified intervals of earth. The 'Automatic Well Planning Bit Selection software' includes a piece of software (called an 'algorithm') that is adapted for automatically selecting the required sequence of drill bits to drill each hole section (defined by a top/bottom depth interval and diameter) in the well. It uses statistical processing of historical bit performance data and several specific Key Performance Indicators (KPI) to match the earth properties and rock strength data to the appropriate bit while optimizing the aggregate time and cost to drill each hole section. It determines the bit life and corresponding depths to pull and replace a bit based on proprietary algorithms, statistics, logic, and risk factors.

Figure 12:
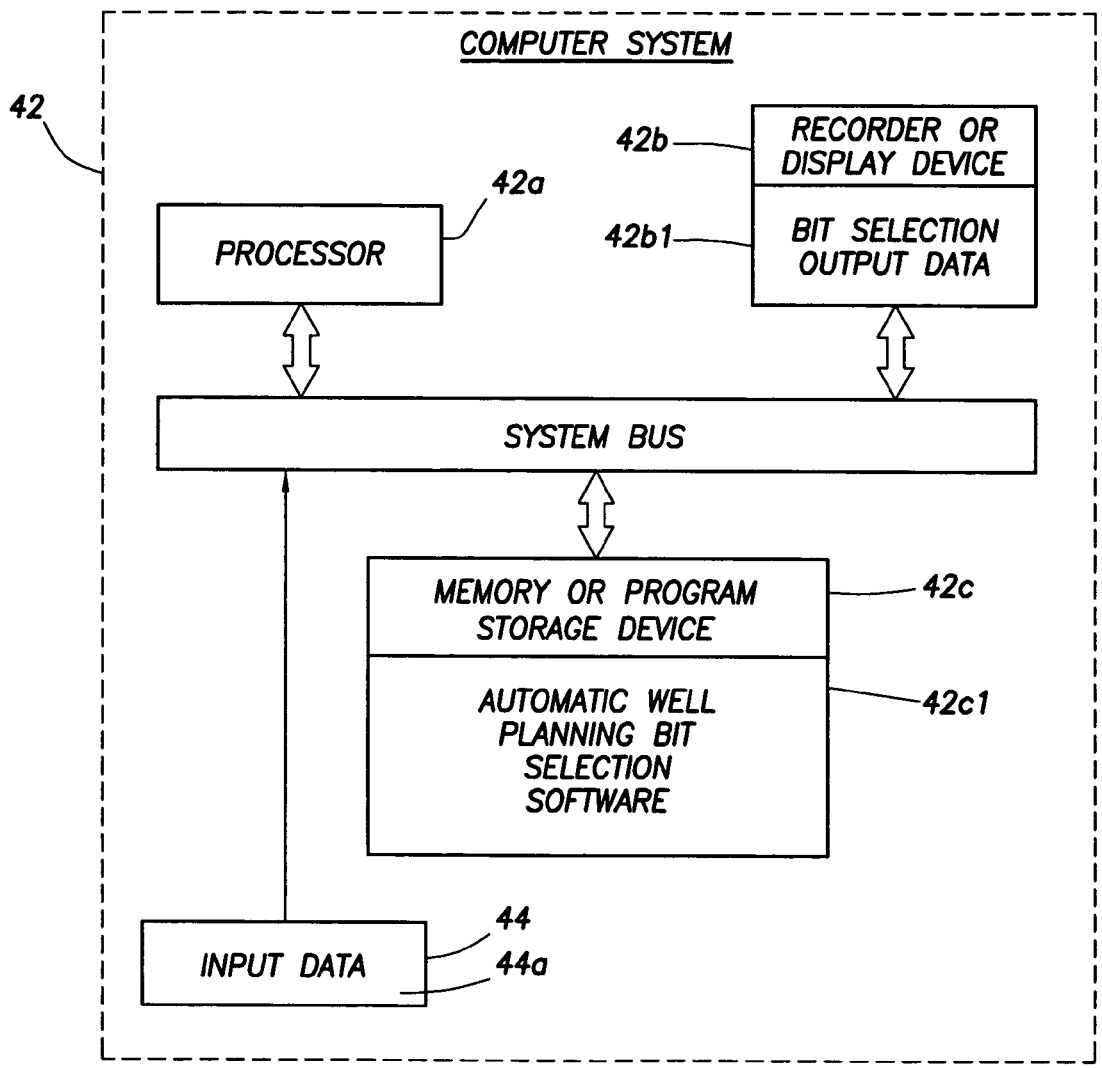
FIG. 12 illustrates a Computer System which stores an Automatic Well Planning Bit Selection software.

Referring to FIG. 12, a Computer System 42 is illustrated. The Computer System 42 includes a Processor 42a connected to a system bus, a Recorder or Display Device 42b connected to the system bus, and a Memory or Program Storage Device 42c connected to the system bus. The Recorder or Display Device 42b is adapted to display 'Bit Selection Output Data' 42b1. The Memory or Program Storage Device 42c is adapted to store an 'Automatic Well Planning Bit selection Software' 42c1. The 'Automatic Well Planning Bit selection Software' 42c1 is originally stored on another 'program storage device', such as a hard disk; however, the hard disk was inserted into the Computer System 42 and the 'Automatic Well Planning Bit selection Software' 42c1 was loaded from the hard disk into the Memory or Program Storage Device 42c of the Computer System 42 of FIG. 12. In addition, a Storage Medium 44 containing a plurality of 'Input Data' 44a is adapted to be connected to the system bus of the Computer System 42, the 'Input Data' 44a being accessible to the Processor 42a of the Computer System 42 when the Storage Medium 44 is connected to the system bus of the Computer System 42. In operation, the Processor 42a of the Computer System 42 will execute the Automatic Well Planning Bit selection Software 42c1 stored in the Memory or Program Storage Device 42c of the Computer System 42 while, simultaneously, using the 'Input Data' 44a stored in the Storage Medium 44 during that execution. When the Processor 42a completes the execution of the Automatic Well Planning Bit selection Software 42c1 stored in the Memory or Program Storage Device 42c (while using the 'Input Data' 44a), the Recorder or Display Device 42b will record or display the 'Bit selection Output Data' 42b1, as shown in FIG. 12. For example the 'Bit selection Output Data' 42b1 can be displayed on a display screen of the Computer System 42, or the 'Bit selection Output Data' 42b1 can be recorded on a printout which is generated by the Computer System 42. The 'Input Data' 44a and the 'Bit Selection Output Data' 42b1 will be discussed and specifically identified in the following paragraphs of this specification. The 'Automatic Well Planning Bit Selection software' 42c1 will also be discussed in the following paragraphs of this specification. The Computer System 42 of FIG. 12 may be a personal computer (PC). The Memory or Program Storage Device 42c is a computer readable medium or a program storage device which is readable by a machine, such as the processor 42a. The processor 42a may be, for example, a microprocessor, a microcontroller, or a mainframe or workstation processor. The Memory or Program Storage Device 42c, which stores the 'Automatic Well Planning Bit selection Software' 42c1, may be, for example, a hard disk, ROM, CD-ROM, DRAM, or other RAM, flash memory, magnetic storage, optical storage, registers, or other volatile and/or non-volatile memory.

Figure 13:
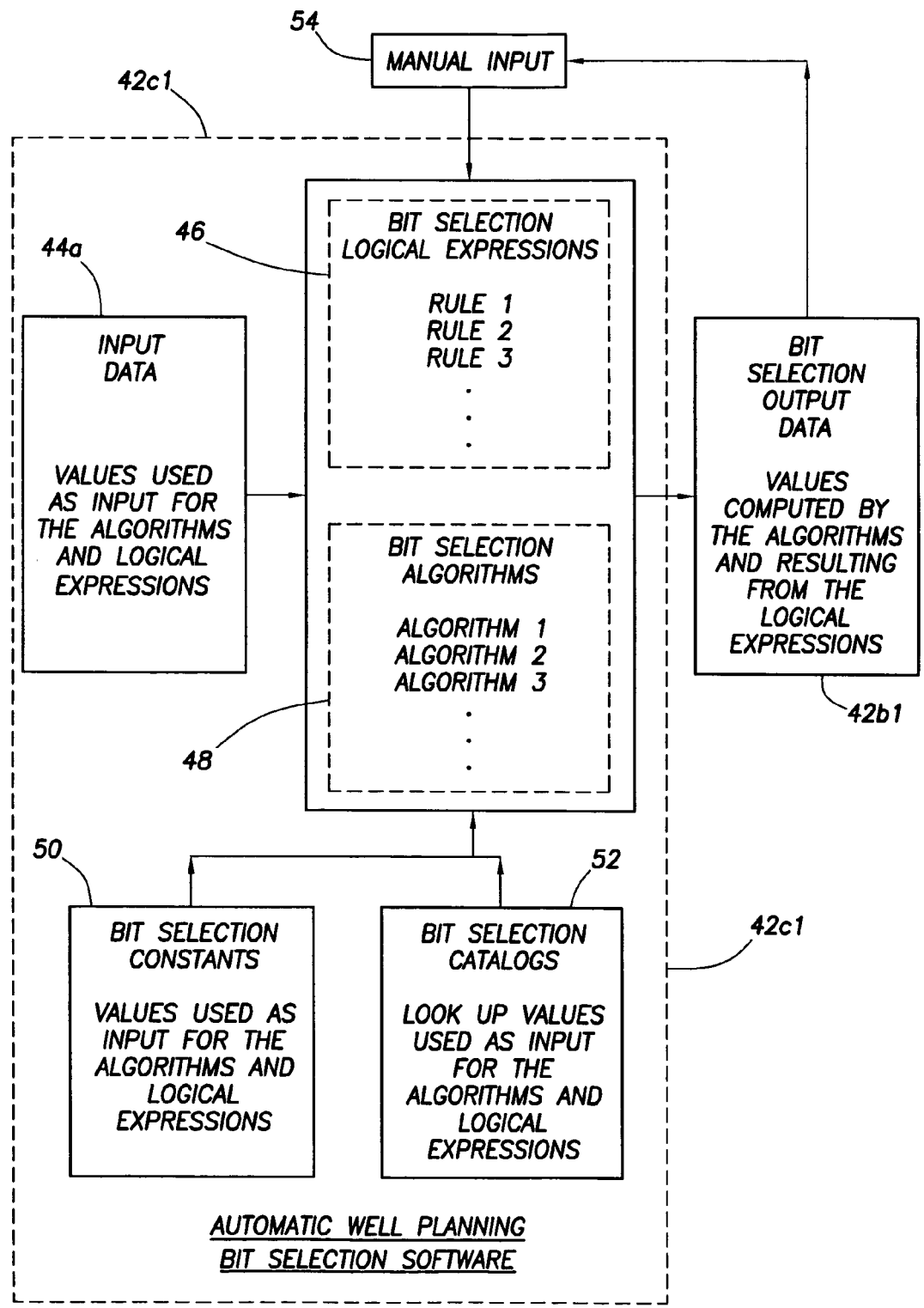
FIG. 13 illustrates a detailed construction of the Automatic Well Planning Bit Selection Software stored in the Computer System of FIG. 12.

Referring to FIG. 13, a detailed construction of the 'Automatic Well Planning Bit selection Software' 42c1 of FIG. 12 is illustrated. In FIG. 13, the 'Automatic Well Planning Bit selection Software' 42c1 includes a first block which stores the Input Data 44a, a second block 46 which stores a plurality of Bit selection Logical Expressions 46; a third block 48 which stores a plurality of Bit selection Algorithms 48, a fourth block 50 which stores a plurality of Bit selection Constants 50, and a fifth block 52 which stores a plurality of Bit selection Catalogs 52. The Bit selection Constants 50 include values which are used as input for the Bit selection Algorithms 48 and the Bit selection Logical Expressions 46. The Bit selection Catalogs 52 include look-up values which are used as input by the Bit selection Algorithms 48 and the Bit selection Logical Expressions 46. The 'Input Data' 44a includes values which are used as input for the Bit selection Algorithms 48 and the Bit selection Logical Expressions 46. The 'Bit selection Output Data' 42b1 includes values which are computed by the Bit selection Algorithms 48 and which result from the Bit selection Logical Expressions 46. In operation, referring to FIGS. 12 and 13, the Processor 42a of the Computer System 42 of FIG. 12 executes the Automatic Well Planning Bit selection Software 42c1 by executing the Bit selection Logical Expressions 46 and the Bit selection Algorithms 48 of the Bit selection Software 42c1 while, simultaneously, using the 'Input Data' 44a, the Bit selection Constants 50, and the values stored in the Bit selection Catalogs 52 as 'input data' for the Bit selection Logical Expressions 46 and the Bit selection Algorithms 48 during that execution. When that execution by the Processor 42a of the Bit selection Logical Expressions 46 and the Bit selection Algorithms 48 (while using the 'Input Data' 44a, Constants 50, and Catalogs 52) is completed, the 'Bit selection Output Data' 42b1 will be generated as a 'result'. The 'Bit selection Output Data' 42b1 is recorded or displayed on the Recorder or Display Device 42b of the Computer System 42 of FIG. 12. In addition, that 'Bit selection Output Data' 42b1 can be manually input, by an operator, to the Bit selection Logical Expressions block 46 and the Bit selection Algorithms block 48 via a 'Manual Input' block 54 shown in FIG. 13.

Input Data 44a

The following paragraphs will set forth the 'Input Data' 44a which is used by the 'Bit Selection Logical Expressions' 46 and the 'Bit Selection Algorithms' 48. Values of the Input Data 44a that are used as input for the Bit Selection Algorithms 48 and the Bit Selection Logical Expressions 46 include the following:
(1) Measured Depth
(2) Unconfined Compressive Strength
(3) Casing Point Depth
(4) Hole Size
(5) Conductor
(6) Casing Type Name
(7) Casing Point
(8) Day Rate Rig
(9) Spread Rate Rig
(10) Hole Section Name Bit Selection Constants 50

The 'Bit Selection Constants' 50 are used by the 'Bit selection Logical Expressions' 46 and the 'Bit selection Algorithms' 48. The values of the 'Bit Selection Constants 50 that are used as input data for Bit selection Algorithms 48 and the Bit selection Logical Expressions 46 include the following: Trip Speed.

Bit Selection Catalogs 52

The 'Bit selection Catalogs' 52 are used by the 'Bit selection Logical Expressions' 46 and the 'Bit selection Algorithms' 48. The values of the Catalogs 52 that are used as input data for Bit selection Algorithms 48 and the Bit selection Logical Expressions 46 include the following: Bit Catalog Bit Selection Output Data 42b1

The 'Bit selection Output Data' 42b1 is generated by the 'Bit selection Algorithms' 48. The 'Bit selection Output Data' 42b1, that is generated by the 'Bit selection Algorithms' 48, includes the following types of output data:
(1) Measured Depth
(2) Cumulative Unconfined Compressive Strength (UCS)
(3) Cumulative Excess UCS
(4) Bit Size
(5) Bit Type
(6) Start Depth
(7) End Depth
(8) Hole Section Begin Depth
(9) Average UCS of rock in section
(10) Maximum UCS of bit
(11) BitAverage UCS of rock in section
(12) Footage
(13) Statistical Drilled Footage for the bit
(14) Ratio of footage drilled compared to statistical footage
(15) Statistical Bit Hours
(16) On Bottom Hours
(17) Rate of Penetration (ROP)
(18) Statistical Bit Rate of Penetration (ROP)
(19) Mechanical drilling energy (UCS integrated over distance drilled by the bit)
(20) Weight On Bit
(21) Revolutions per Minute (RPM)
(22) Statistical Bit RPM
(23) Calculated Total Bit Revolutions
(24) Time to Trip
(25) Cumulative Excess as a ration to the Cumulative UCS
(26) Bit Cost
(27) Hole Section Name Bit Selection Logical Expressions 46

The following paragraphs will set forth the 'Bit selection Logical Expressions' 46. The 'Bit selection Logical Expressions' 46 will: (1) receive the 'Input Data 44a', including a 'plurality of Input Data calculation results' that has been generated by the 'Input Data 44a'; and (2) evaluate the 'Input Data calculation results' during the processing of the 'Input Data'.

The Bit Selection Logical Expressions 46, which evaluate the processing of the Input Data 44a, include the following:
(1) Verify the hole size and filter out the bit sizes that do not match the hole size.
(2) Check if the bit is not drilling beyond the casing point.
(3) Check the cumulative mechanical drilling energy for the bit run and compare it with the statistical mechanical drilling energy for that bit, and assign the proper risk to the bit run.
(4) Check the cumulative bit revolutions and compare it with the statistical bit revolutions for that bit type and assign the proper risk to the bit run.
(5) Verify that the encountered rock strength is not outside the range of rock strengths that is optimum for the selected bit type.
(6) Extend footage by 25% in case the casing point could be reached by the last selected bit.

Bit Selection Algorithms 48

The following paragraphs will set forth the 'Bit Selection Algorithms' 48. The 'Bit Selection Algorithms' 48 will receive the output from the 'Bit Selection Logical Expressions' 46 and process that 'output from the Bit Selection Logical Expressions 46' in the following manner:
(1) Read variables and constants
(2) Read catalogs
(3) Build cumulative rock strength curve from casing point to casing point.

$$CumUCS = \int_{start}^{end} (UCS) d\,ft$$

(4) Determine the required hole size
(5) Find the bit candidates that match the closest unconfined compressive strength of the rock to drill.
(6) Determine the end depth of the bit by comparing the historical drilling energy with the cumulative rock strength curve for all bit candidates.
(7) Calculate the cost per foot for each bit candidate taking into accounts the rig rate, trip speed and drilling rate of penetration.

TOT Cost = (RIG RATE + SPREAD RATE)

$$\left(T\_TripIn + \frac{footage}{ROP} + T\_Trip\right) + Bit\ Cost$$

(8) Evaluate which bit candidate is most economic.
(9) Calculate the remaining cumulative rock strength to casing point.
(10) Repeat step 5 to 9 until the end of the hole section
(11) Build cumulative UCS
(12) Select bits—display bit performance and operating parameters
(13) Remove sub-optimum bits
(14) Find most economic bit based on cost per foot Refer now to FIGS. 14A and 14B which will be used during the following functional description.

A functional description of the operation of the 'Automatic Well Planning Bit Selection Software' 42c1 will be set forth in the following paragraphs with reference to FIGS. 1 through 14B of the drawings.

Recall that the selection of Drill bits is a manual subjective process based heavily on personal, previous experiences. The experience of the individual recommending or selecting the drill bits can have a large impact on the drilling performance for the better or for the worse. The fact that bit selection is done primarily based on personal experiences and uses little information of the actual rock to be drilled makes it very easy to choose the incorrect bit for the application. Recall that the Bit Selection sub-task 14a utilizes an 'Automatic Well Planning Bit Selection software' 42c1 to automatically generate the required roller cone drill bits to drill the specified hole sizes through the specified hole section at unspecified intervals of earth. The 'Automatic Well Planning Bit Selection software' 42c1 includes the 'Bit Selection Logical Expressions' 46 and the 'Bit Selection Algorithms' 48 that are adapted for automatically selecting the required sequence of drill bits to drill each hole section (defined by a top/bottom depth interval and diameter) in the well. The 'Automatic Well Planning Bit Selection software' 42c1 uses statistical processing of historical bit performance data and several specific Key Performance Indicators (KPI) to match the earth properties and rock strength data to the appropriate bit while optimizing the aggregate time and cost to drill each hole section. It determines the bit life and corresponding depths to pull and replace a bit based on proprietary algorithms, statistics, logic, and risk factors.

Figure 14A:
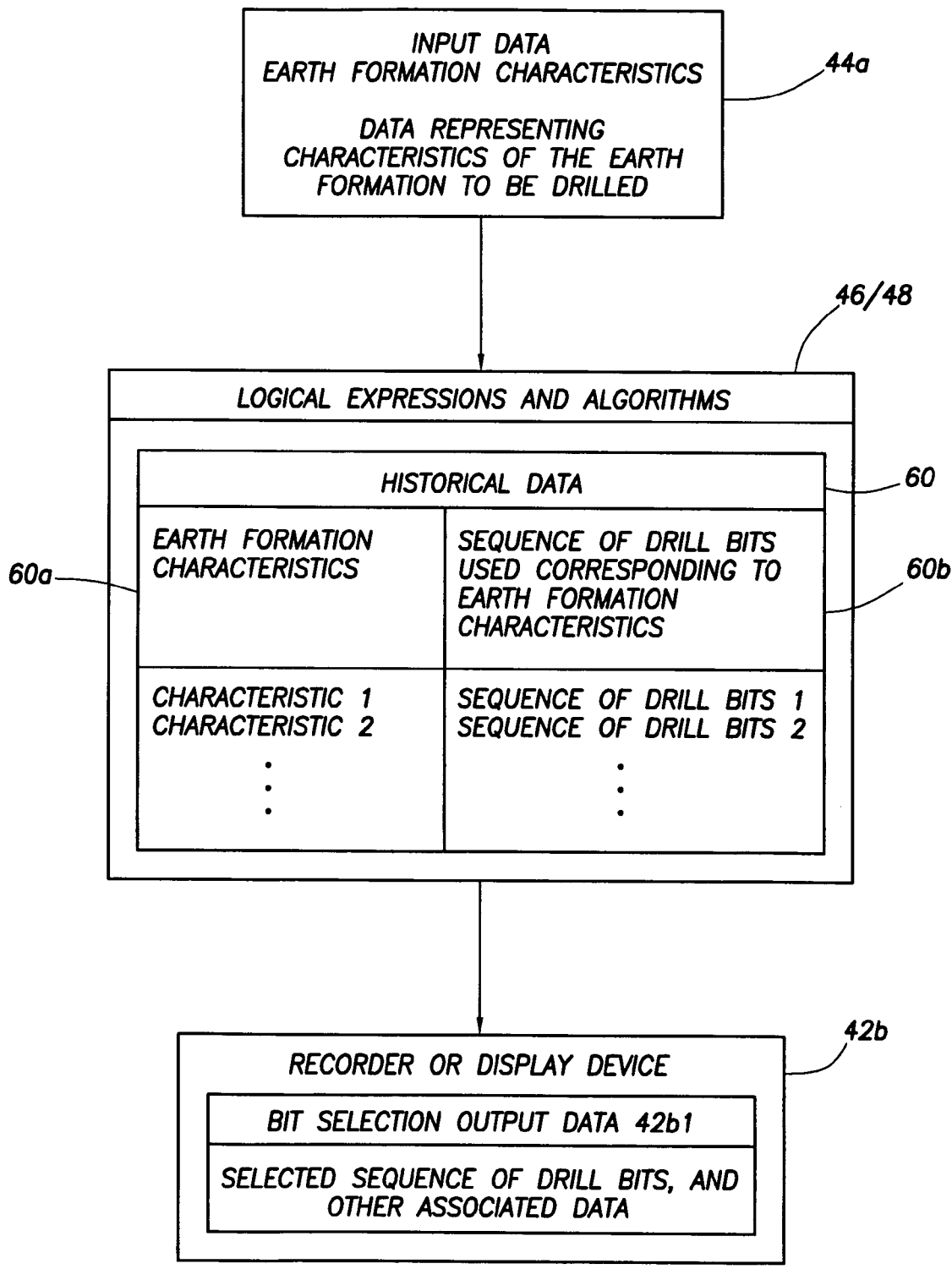
FIGS. 14A and 14B illustrate block diagrams representing a functional operation of the Automatic Well Planning Bit Selection software of FIG. 13.
Figure 15A:
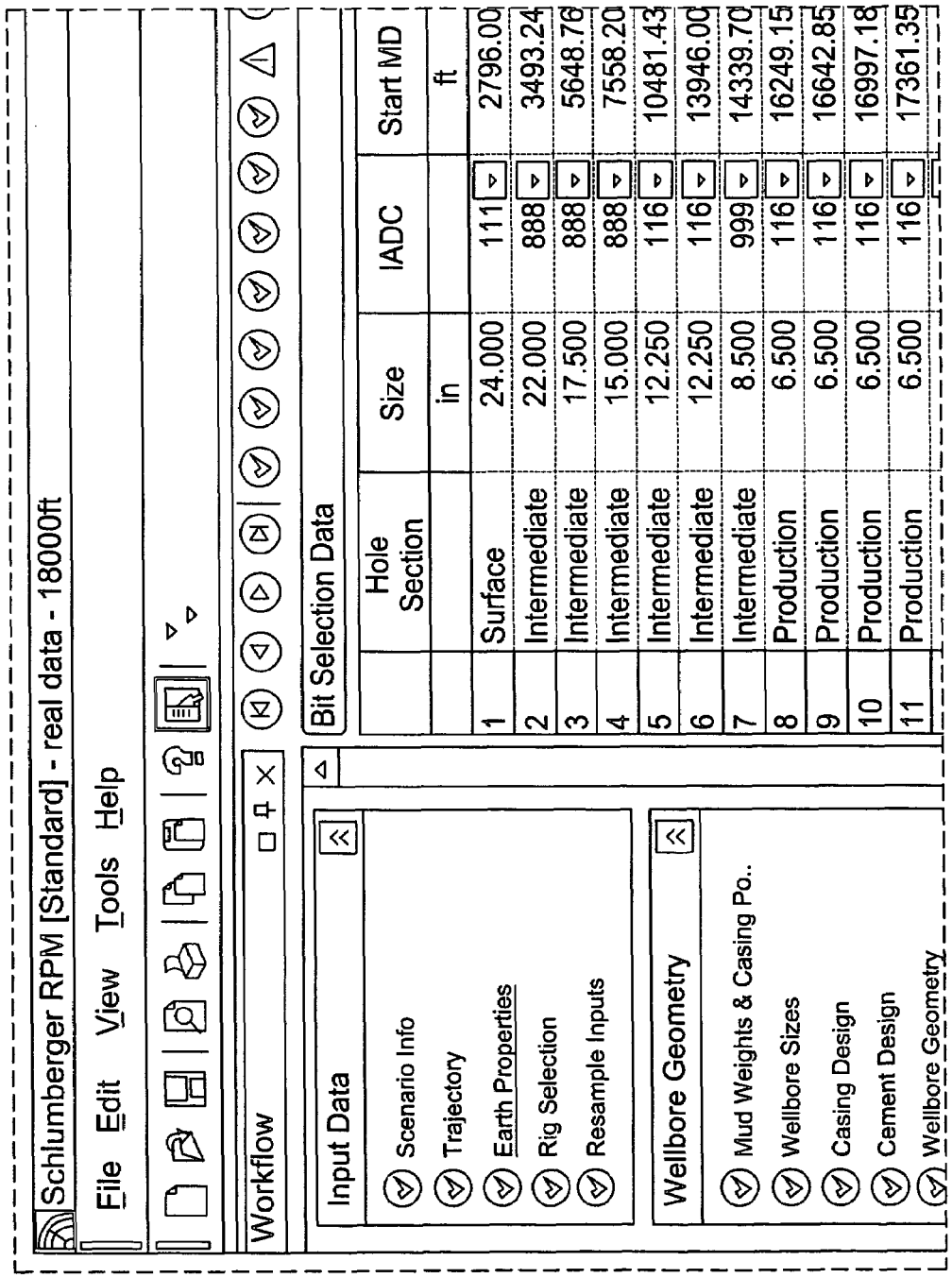
FIG. 15 illustrates a Bit Selection display which is generated by a Recorder or Display device associated with the Computer System of FIG. 12 which stores the Automatic Well Planning Bit Selection software.
Figure 15C:
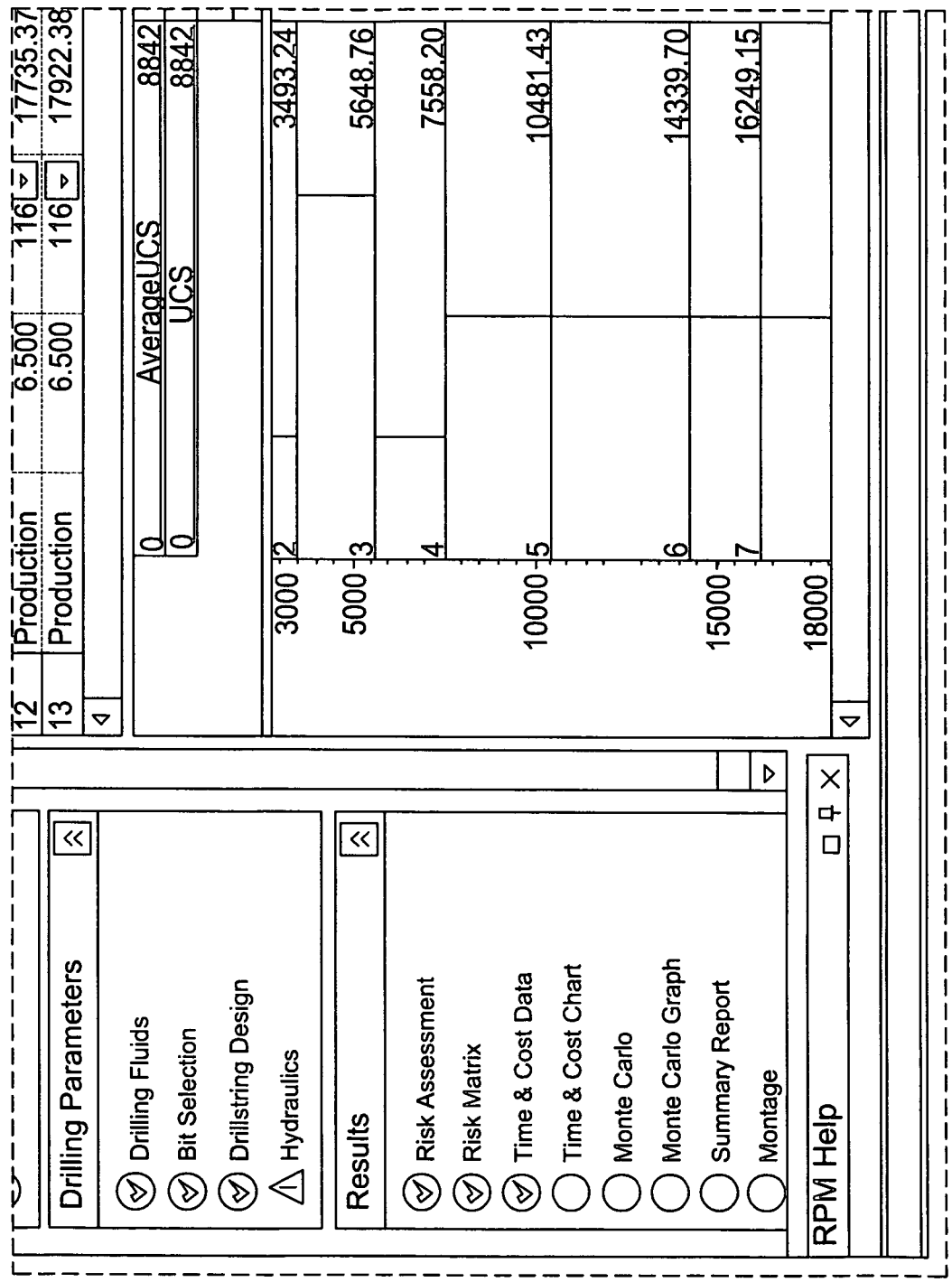
Figure 15D:
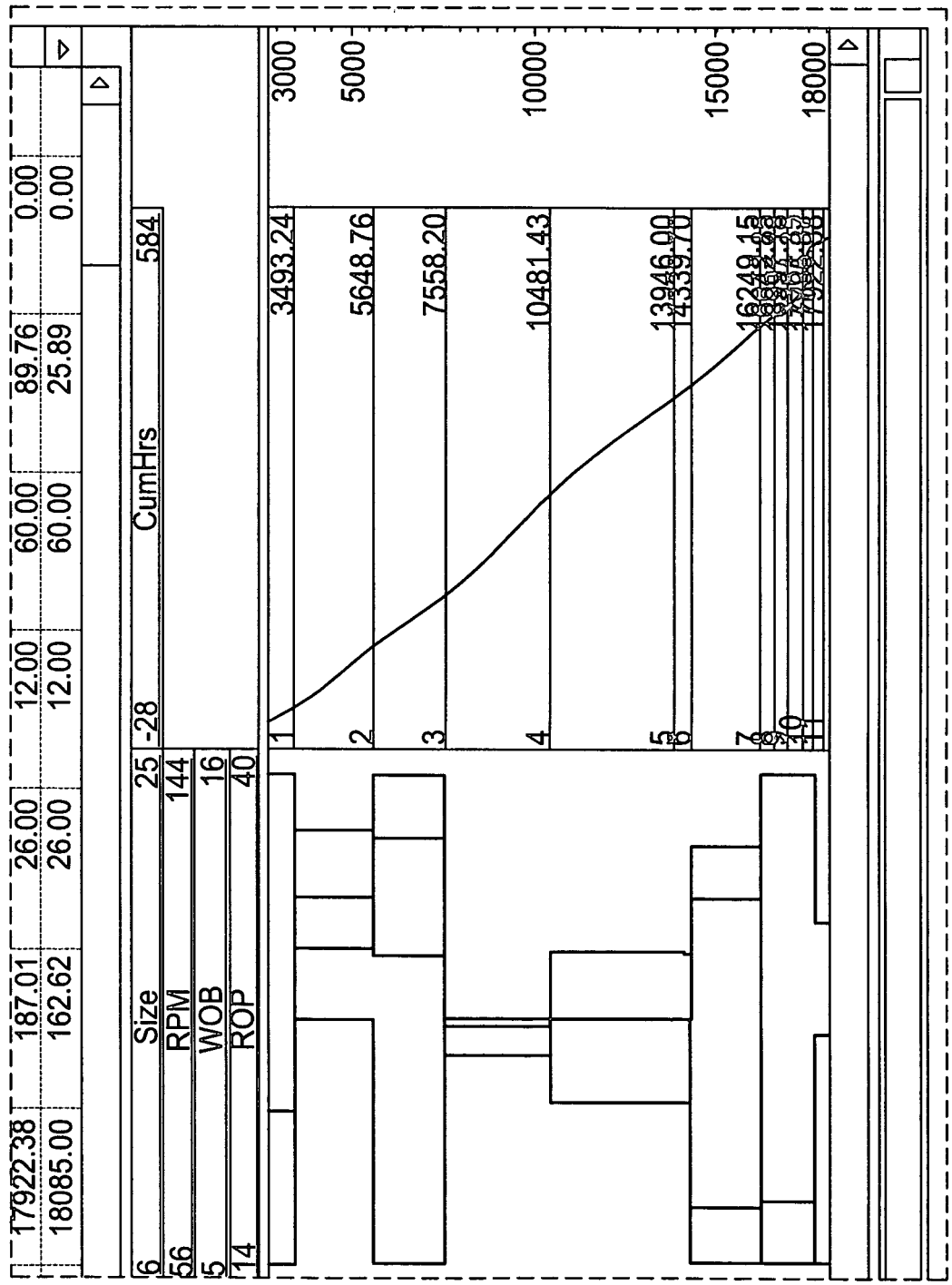

In FIG. 14A, the Input Data 44a represents a set of Earth formation characteristics, where the Earth formation characteristics are comprised of data representing characteristics of a particular Earth formation 'To Be Drilled'. The Logical Expressions and Algorithms 46/48 are comprised of Historical Data 60, where the Historical Data 60 can be viewed as a table consisting of two columns: a first column 60a including 'historical Earth formation characteristics', and a second column 60b including 'sequences of drill bits used corresponding to the historical Earth formation characteristics'. The Recorder or Display device 42b will record or display 'Bit Selection Output Data' 42b, where the 'Bit Selection Output Data' 42b is comprised of the 'Selected Sequence of Drill Bits, and other associated data'. In operation, referring to FIG. 14A, the Input Data 44a represents a set of Earth formation characteristics associated with an Earth formation 'To Be Drilled'. The 'Earth formation characteristics (associated with a section of Earth Formation 'to be drilled') corresponding to the Input Data 44a' is compared with each 'characteristic in column 60a associated with the Historical Data 60' of the Logical Expressions and Algorithms 46/48. When a match (or a substantial match) is found between the 'Earth formation characteristics (associated with a section of Earth Formation 'to be drilled') corresponding to the Input Data 44a' and a 'characteristic in column 60a associated with the Historical Data 60', a 'Sequence of Drill Bits' (called a 'selected sequence of drill bits') corresponding to that 'characteristic in column 60a associated with the Historical Data 60' is generated as an output from the Logical Expressions and Algorithms block 46/48 in FIG. 14A. The aforementioned 'selected sequence of drill bits along with other data associated with the selected sequence of drill bits' is generated as an 'output' by the Recorder or Display device 42b of the Computer System 42 in FIG. 12. See FIG. 15 for an example of that 'output'. The 'output' can be a 'display' (as illustrated in FIG. 15) that is displayed on a computer display screen, or it can be an 'output record' printed by the Recorder or Display device 42b.

The functions discussed above with reference to FIG. 14A, pertaining to the manner by which the 'Logical Expressions and Algorithms' 46/48 will generate the 'Bit Selection Output Data' 42b1 in response to the 'Input Data' 44a, will be discussed in greater detail below with reference to FIG. 14B.

Figure 14B:
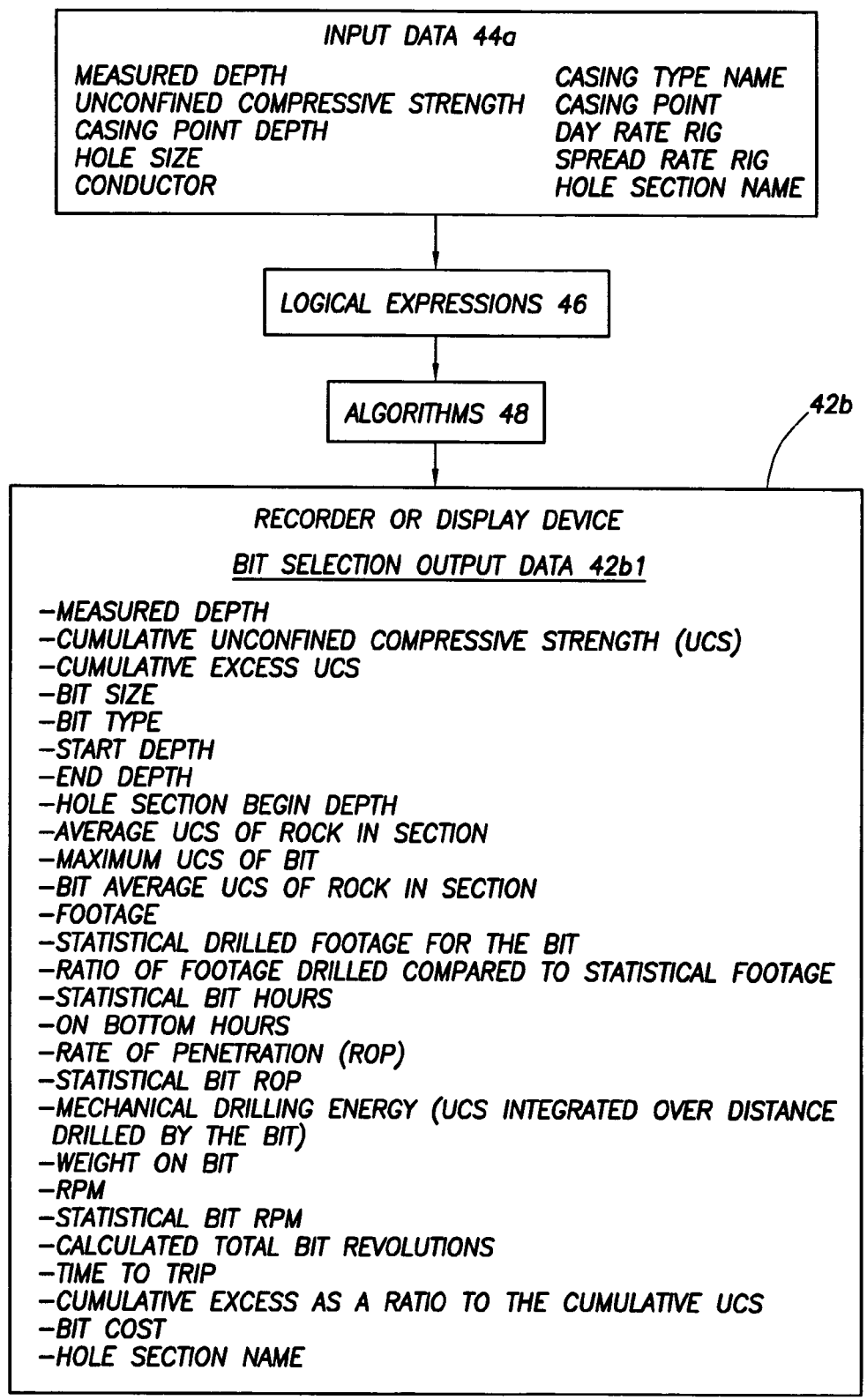

In FIG. 14B, recall that the Input Data 44a represents a set of 'Earth formation characteristics', where the 'Earth formation characteristics' are comprised of data representing characteristics of a particular Earth formation 'To Be Drilled'. As a result, the Input Data 44a is comprised of the following specific data: Measured Depth, Unconfined Compressive Strength, Casing Point Depth, Hole Size, Conductor, Casing Type Name, Casing Point, Day Rate Rig, Spread Rate Rig, and Hole Section Name.

In FIG. 14B, recall that the Logical Expressions 46 and Algorithms 48 will respond to the Input Data 44a by generating a set of 'Bit Selection Output Data' 42b1, where the 'Bit Selection Output Data' 42b1 represents the aforementioned 'selected drill bit along with other data associated with the selected drill bit'. As a result, the 'Bit Selection Output Data' 42b1 is comprised of the following specific data: Measured Depth, Cumulative Unconfined Compressive Strength (UCS), Cumulative Excess UCS, Bit Size, Bit Type, Start Depth, End Depth, Hole Section Begin Depth, Average UCS of rock in section, Maximum UCS of bit, Bit Average UCS of rock in section, Footage, Statistical Drilled Footage for the bit, Ratio of footage drilled compared to statistical footage, Statistical Bit Hours, On Bottom Hours, Rate of Penetration (ROP), Statistical Bit Rate of Penetration (ROP), Mechanical drilling energy (UCS integrated over distance drilled by the bit), Weight On Bit, Revolutions per Minute (RPM), Statistical Bit RPM, Calculated Total Bit Revolutions, Time to Trip, Cumulative Excess as a ration to the Cumulative UCS, Bit Cost, and Hole Section Name.

In order to generate the 'Bit Selection Output Data' 42b1 in response to the 'Input Data' 44a, the Logical Expressions 46 and the Algorithms 48 must perform the following functions, which are set forth in the following paragraphs.

The Bit Selection Logical Expressions 46 will perform the following functions. The Bit Selection Logical Expressions 46 will: (1) Verify the hole size and filter out the bit sizes that do not match the hole size, (2) Check if the bit is not drilling beyond the casing point, (3) Check the cumulative mechanical drilling energy for the bit run and compare it with the statistical mechanical drilling energy for that bit, and assign the proper risk to the bit run, (4) Check the cumulative bit revolutions and compare it with the statistical bit revolutions for that bit type and assign the proper risk to the bit run, (5)

Verify that the encountered rock strength is not outside the range of rock strengths that is optimum for the selected bit type, and (6) Extend footage by 25% in case the casing point could be reached by the last selected bit.

The Bit Selection Algorithms 48 will perform the following functions. The Bit Selection Algorithms 48 will: (1) Read variables and constants, (2) Read catalogs, (3) Build cumulative rock strength curve from casing point to casing point, using the following equation:

$$CumUCS = \int_{start}^{end} (UCS) d\,ft,$$

Determine the required hole size, (5) Find the bit candidates that match the closest unconfined compressive strength of the rock to drill, (6) Determine the end depth of the bit by comparing the historical drilling energy with the cumulative rock strength curve for all bit candidates, (7) Calculate the cost per foot for each bit candidate taking into accounts the rig rate, trip speed and drilling rate of penetration by using the following equation:

TOT Cost = (RIG RATE + SPREAD RATE)

$$\left(T\_TripIn + \frac{footage}{ROP} + T\_Trip\right) + Bit\ Cost$$

Evaluate which bit candidate is most economic, (9) Calculate the remaining cumulative rock strength to casing point, (10) Repeat step 5 to 9 until the end of the hole section, (11) Build cumulative UCS, (12) Select bits—display bit performance and operating parameters, (13) Remove sub-optimum bits, and (14) Find the most economic bit based on cost per foot.

The following discussion set forth in the following paragraphs will describe how the 'Automatic Well Planning Bit Selection software' will generate a 'Selected Sequence of Drill Bits' in response to 'Input Data'.

The 'Input Data' is loaded, the 'Input Data' including the 'trajectory' data and Earth formation property data. The main characteristic of the Earth formation property data, which was loaded as input data, is the rock strength. The 'Automatic Well Planning Bit Selection' software has calculated the casing points, and the number of 'hole sizes' is also known. The casing sizes are known and, therefore, the wellbore sizes are also known. The number of 'hole sections' are known, and the size of the 'hole sections' are also known. The drilling fluids are also known. The most important part of the 'input data' is the 'hole section length', the 'hole section size', and the 'rock hardness' (also known as the 'Unconfined Compressive Strength' or 'UCS') associated with the rock that exists in the hole sections. In addition, the 'input data' includes 'historical bit performance data'. The 'Bit Assessment Catalogs' include: bit sizes, bit-types, and the relative performance of the bit types. The 'historical bit performance data' includes the footage that the bit drills associated with each bit-type. The 'Automatic Well Planning Bit Selection software' starts by determining the average rock hardness that the bit-type can drill. The bit-types have been classified in the 'International Association for Drilling Contractors (IADC)' bit classification. Therefore, there exists a 'classification' for each 'bit-type'. We assign an 'average UCS' (that is, an 'average rock strength') to the bit-type. In addition, we assign a minimum and a maximum rock strength to each of the bit-types. Therefore, each 'bit type' has been assigned the following information: (1) the 'softest rock that each bit type can drill', (2) the 'hardest rock that each bit type can drill', and (3) the 'average or the optimum hardness that each bit type can drill'. All 'bit sizes' associated with the 'bit types' are examined for the wellbore 'hole section' that will be drilled (electronically) when the 'Automatic Well Planning Bit Selection software' is executed. Some 'particular bit types', from the Bit Selection Catalog, will filtered-out because those 'particular bit types' do not have the appropriate size for use in connection with the hole section that we are going to drill (electronically). As a result, a 'list of bit candidates' is generated. When the drilling of the rock (electronically—in the software) begins, for each foot of the rock, a 'rock strength' is defined, where the 'rock strength' has units of 'pressure' in 'psi'. For each foot of rock that we (electronically) drill, the 'Automatic Well Planning Bit Selection software' will perform a mathematical integration to determine the 'cumulative rock strength' by using the following equation:

$$CumUCS = \int_{start}^{end} (UCS) d\,ft$$

where:

'CumUCS' is the 'cumulative rock strength', and

'UCS' (Unconfined Compressive Strength') is the 'average rock strength' per 'bit candidate', and 'd' is the drilling distance using that 'bit candidate'.

Thus, if the 'average rock strength/foot' is 1000 psi/foot, and we drill 10 feet of rock, then, the 'cumulative rock strength' is (1000 psi/foot)(10 feet)=10000 psi 'cumulative rock strength'. If the next 10 feet of rock has an 'average rock strength/foot' of 2000 psi/foot, that next 10 feet will take (2000 psi/foot)(10 feet)=20000 psi 'cumulative rock strength'; then, when we add the 10000 psi 'cumulative rock strength' that we already drilled, the resultant 'cumulative rock strength' for the 20 feet equals 30000 psi. Drilling (electronically—in the software) continues. At this point, compare the 30000 psi 'cumulative rock strength' for the 20 feet of drilling with the 'statistical performance of the bit'. For example, if, for a 'particular bit', the 'statistical performance of the bit' indicates that, statistically, 'particular bit' can drill fifty (50) feet in a 'particular rock', where the 'particular rock' has 'rock strength' of 1000 psi/foot. In that case, the 'particular bit' has a 'statistical amount of energy that the particular bit is capable of drilling' which equals (50 feet) (1000 psi/foot)=50000 psi. Compare the previously calculated 'cumulative rock strength' of 30000 psi with the aforementioned 'statistical amount of energy that the particular bit is capable of drilling' of 50000 psi. Even though 'actual energy' (the 30000 psi) was used to drill the first 20 feet of the rock, there still exists a 'residual energy' in the 'particular bit' (the 'residual energy' being the difference between 50000 psi and 30000 psi). As a result, from 20 feet to 30 feet, we use the 'particular bit' to drill once again (electronically—in the software) an additional 10 feet. Assume the 'rock strength' is 2000 psi. Determine the 'cumulative rock strength' by multiplying (2000 psi/foot)(10 additional feet)=20000 psi. Therefore, the 'cumulative rock strength' for the additional 10 feet is 20000 psi. Add the 20000 psi 'cumulative rock strength' (for the additional 10 feet) to the previously calculated 30000 psi 'cumulative rock strength' (for the first 20 feet) that we already drilled. The result will yield a 'resultant cumulative rock strength' of 50000 psi' associated with 30 feet of drilling. Compare the aforementioned 'resultant cumulative rock strength' of 50000 psi with the 'statistical amount of energy that the particular bit is capable of drilling' of 50000 psi. As a result, there is only one conclusion: the bit life of the 'particular bit' ends and terminates at 50000 psi; and, in addition, the 'particular bit' can drill up to 30 feet. If the aforementioned 'particular bit' is 'bit candidate A', there is only one conclusion: 'bit candidate A' can drill 30 feet of rock. We now go to the next 'bit candidate' for the same size category and repeat the same process. We continue to drill (electronically—in the software) from point A to point B in the rock, and integrate the energy as previously described (as 'footage' in units of 'psi') until the life of the bit has terminated. The above mentioned process is repeated for each 'bit candidate' in the aforementioned 'list of bit candidates'. We now have the 'footage' computed (in units of psi) for each 'bit candidate' on the 'list of bit candidates'. The next step involves selecting which bit (among the 'list of bit candidates') is the 'optimum bit candidate'. One would think that the 'optimum bit candidate' would be the one with the maximum footage. However, how fast the bit drills (i.e., the Rate of Penetration or ROP) is also a factor. Therefore, a cost computation or economic analysis must be performed. In that economic analysis, when drilling, a rig is used, and, as a result, rig time is consumed which has a cost associated therewith, and a bit is also consumed which also has a certain cost associated therewith. If we (electronically) drill from point A to point B, it is necessary to first run into the hole where point A starts, and this consumes 'tripping time'. Then, drilling time is consumed. When (electronic) drilling is done, pull the bit out of the hole from point B to the surface, and additional rig time is also consumed. Thus, a 'total time in drilling' can be computed from point A to point B, that 'total time in drilling' being converted into 'dollars'. To those 'dollars', the bit cost is added. This calculation will yield: a 'total cost to drill that certain footage (from point A to B)'. The 'total cost to drill that certain footage (from point A to B)' is normalized by converting the 'total cost to drill that certain footage (from point A to B)' to a number which represents 'what it costs to drill one foot'. This operation is performed for each bit candidate. At this point, the following evaluation is performed: 'which bit candidate drills the cheapest per foot'. Of all the 'bit candidates' on the 'list of bit candidates', we select the 'most economic bit candidate'. Although we computed the cost to drill from point A to point B, it is now necessary to consider drilling to point C or point D in the hole. In that case, the Automatic Well Planning Bit Selection software will conduct the same steps as previously described by evaluating which bit candidate is the most suitable in terms of energy potential to drill that hole section; and, in addition, the software will perform an economic evaluation to determine which bit candidate is the cheapest. As a result, when (electronically) drilling from point A to point B to point C, the 'Automatic Well Planning Bit Selection software' will perform the following functions: (1) determine if 'one or two or more bits' are necessary to satisfy the requirements to drill each hole section, and, responsive thereto, (2) select the 'optimum bit candidates' associated with the 'one or two or more bits' for each hole section.

In connection with the Bit Selection Catalogs 52, the Catalogs 52 include a 'list of bit candidates'. The 'Automatic Well Planning Bit Selection software' will disregard certain bit candidates based on: the classification of each bit candidate and the minimum and maximum rock strength that the bit candidate can handle. In addition, the software will disregard the bit candidates which are not serving our purpose in terms of (electronically) drill from point A to point B. If rocks are encountered which have a UCS which exceeds the UCS rating for that 'particular bit candidate', that 'particular bit candidate' will not qualify. In addition, if the rock strength is considerably less than the minimum rock strength for that 'particular bit candidate', disregard that 'particular bit candidate'.

In connection with the Input Data 44*a*, the Input Data 44*a* includes the following data: which hole section to drill, where the hole starts and where it stops, the length of the entire hole, the size of the hole in order to determine the correct size of the bit, and the rock strength (UCS) for each foot of the hole section. In addition, for each foot of rock being drilled, the following data is known: the rock strength (UCS), the trip speed, the footage that a bit drills, the minimum and maximum UCS for which that the bit is designed, the Rate of Penetration (ROP), and the drilling performance. When selecting the bit candidates, the 'historical performance' of the 'bit candidate' in terms of Rate of Penetration (ROP) is known. The drilling parameters are known, such as the 'weight on bit' or WOB, and the Revolutions per Minute (RPM) to turn the bit is also known.

In connection with the Bit Selection Output Data 42*b*1, since each bit drills a hole section, the output data includes a start point and an end point in the hole section for each bit. The difference between the start point and the end point is the 'distance that the bit will drill'. Therefore, the output data further includes the 'distance that the drill bit will drill'. In addition, the output data includes: the 'performance of the bit in terms of Rate of Penetration (ROP)' and the 'bit cost'.

In summary, the Automatic Well Planning Bit Selection software 42*c*1 will: (1) suggest the right type of bit for the right formation, (2) determine longevity for each bit, (3) determine how far can that bit drill, and (3) determine and generate 'bit performance' data based on historical data for each bit.

Referring to FIG. 15, the 'Automatic Well Planning Bit Selection Software' 42*c*1 will generate the display illustrated in FIG. 15, the display of FIG. 15 illustrating 'Bit Selection Output Data 42*b*1' representing the selected sequence of drill bits which are selected by the 'Automatic Well Planning Bit Selection Software' 42*c*1.

Automatic Well Planning Software System—Drill String Design Sub-task 14*b*

In FIG. 8, the Drillstring Design sub-task 14*b* is illustrated.

Designing a drillstring is not terribly complex, but it is very tedious. The sheer number of components, methods, and calculations required to ensure the mechanical suitability of stacking one component on top of another component is quite cumbersome. Add to this fact that a different drillstring is created for every hole section and often every different bit run in the drilling of a well and the amount of work involved can be large and prone to human error.

The 'Automatic Well Planning Drillstring Design software' includes an algorithm for automatically generating the required drillstrings to support the weight requirements of each bit, the directional requirements of the trajectory, the mechanical requirements of the rig and drill pipe, and other general requirements for the well, i.e. formation evaluation. The resulting drillstrings are accurate enough representations to facilitate calculations of frictional pressure losses (hydraulics), mechanical friction (torque & drag), and cost (BHA components for directional drilling and formation evaluation).

Figure 16:
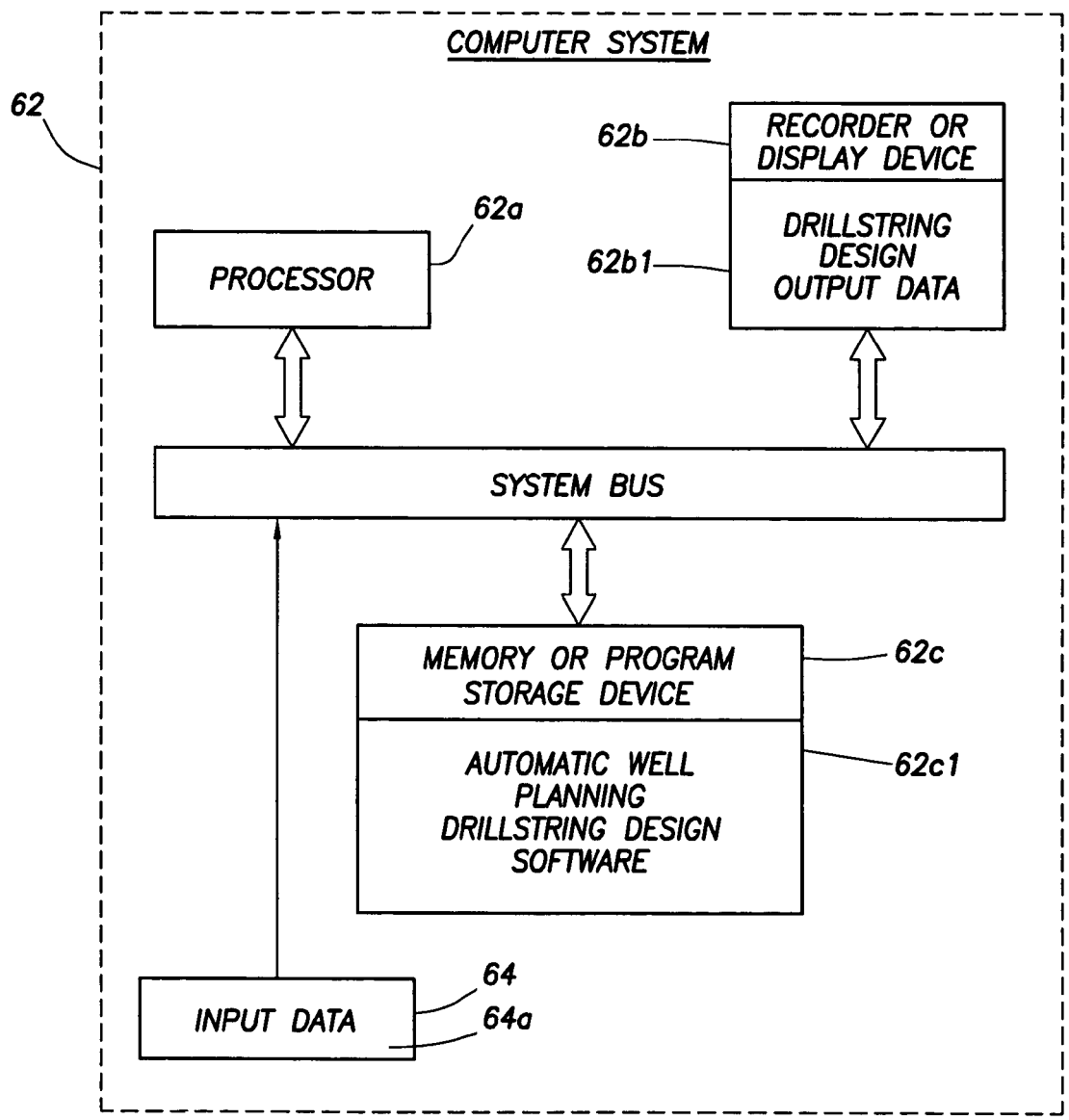
FIG. 16 illustrates a Computer System which stores an Automatic Well Planning Drillstring Design software.

Referring to FIG. 16, a Computer System 62 is illustrated. The Computer System 62 includes a Processor 62*a* connected to a system bus, a Recorder or Display Device 62*b* connected to the system bus, and a Memory or Program Storage Device 62c connected to the system bus. The Recorder or Display Device 62b is adapted to display 'Drillstring Design Output Data' 62b1. The Memory or Program Storage Device 62c is adapted to store an 'Automatic Well Planning Drillstring Design Software' 62c1. The 'Automatic Well Planning Drillstring Design Software' 62c1 is originally stored on another 'program storage device', such as a hard disk; however, the hard disk was inserted into the Computer System 62 and the 'Automatic Well Planning Drillstring Design Software' 62c1 was loaded from the hard disk into the Memory or Program Storage Device 62c of the Computer System 62 of FIG. 16. In addition, a Storage Medium 64 containing a plurality of 'Input Data' 64a is adapted to be connected to the system bus of the Computer System 62, the 'Input Data' 64a being accessible to the Processor 62a of the Computer System 62 when the Storage Medium 64 is connected to the system bus of the Computer System 62. In operation, the Processor 62a of the Computer System 62 will execute the Automatic Well Planning Drillstring Design Software 62c1 stored in the Memory or Program Storage Device 62c of the Computer System 62 while, simultaneously, using the 'Input Data' 64a stored in the Storage Medium 64 during that execution. When the Processor 62a completes the execution of the Automatic Well Planning Drillstring Design Software 62c1 stored in the Memory or Program Storage Device 62c (while using the 'Input Data' 64a), the Recorder or Display Device 62b will record or display the 'Drillstring Design Output Data' 62b1, as shown in FIG. 16. For example the 'Drillstring Design Output Data' 62b1 can be displayed on a display screen of the Computer System 62, or the 'Drillstring Design Output Data' 62b1 can be recorded on a printout which is generated by the Computer System 62. The 'Input Data' 64a and the 'Drillstring Design Output Data' 62b1 will be discussed and specifically identified in the following paragraphs of this specification. The 'Automatic Well Planning Drillstring Design software' 62c1 will also be discussed in the following paragraphs of this specification. The Computer System 62 of FIG. 16 may be a personal computer (PC). The Memory or Program Storage Device 62c is a computer readable medium or a program storage device which is readable by a machine, such as the processor 62a. The processor 62a may be, for example, a microprocessor, a microcontroller, or a mainframe or workstation processor. The Memory or Program Storage Device 62c, which stores the 'Automatic Well Planning Drillstring design Software' 62c1, may be, for example, a hard disk, ROM, CD-ROM, DRAM, or other RAM, flash memory, magnetic storage, optical storage, registers, or other volatile and/or non-volatile memory.

Figure 17:
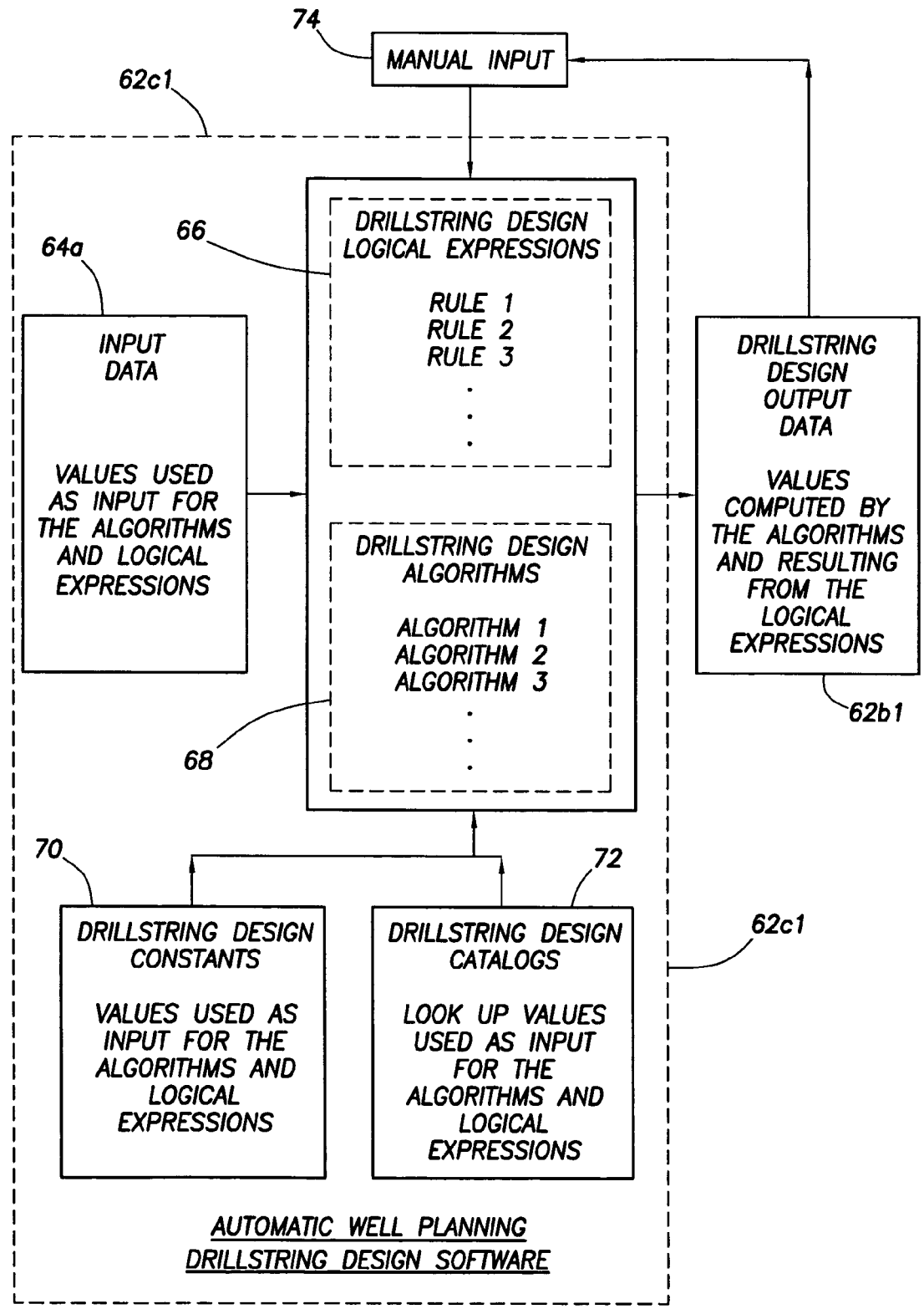
FIG. 17 illustrates a detailed construction of the Automatic Well Planning Drillstring Design Software stored in the Computer System of FIG. 16.

Referring to FIG. 17, a detailed construction of the 'Automatic Well Planning Drillstring Design Software' 62c1 of FIG. 16 is illustrated. In FIG. 17, the 'Automatic Well Planning Drillstring Design Software' 62c1 includes a first block which stores the Input Data 64a, a second block 66 which stores a plurality of Drillstring Design Logical Expressions 66; a third block 68 which stores a plurality of Drillstring Design Algorithms 68, a fourth block 70 which stores a plurality of Drillstring Design Constants 70, and a fifth block 72 which stores a plurality of Drillstring Design Catalogs 72. The Drillstring Design Constants 70 include values which are used as input for the Drillstring Design Algorithms 68 and the Drillstring Design Logical Expressions 66. The Drillstring Design Catalogs 72 include look-up values which are used as input by the Drillstring Design Algorithms 68 and the Drillstring Design Logical Expressions 66. The 'Input Data' 64a includes values which are used as input for the Drillstring Design Algorithms 68 and the Drillstring Design Logical Expressions 66. The 'Drillstring Design Output Data' 62b1 includes values which are computed by the Drillstring Design Algorithms 68 and which result from the Drillstring Design Logical Expressions 66. In operation, referring to FIGS. 16 and 17, the Processor 62a of the Computer System 62 of FIG. 16 executes the Automatic Well Planning Drillstring Design Software 62c1 by executing the Drillstring Design Logical Expressions 66 and the Drillstring Design Algorithms 68 of the Drillstring design Software 62c1 while, simultaneously, using the 'Input Data' 64a, the Drillstring Design Constants 70, and the values stored in the Drillstring Design Catalogs 72 as 'input data' for the Drillstring Design Logical Expressions 66 and the Drillstring Design Algorithms 68 during that execution. When that execution by the Processor 62a of the Drillstring Design Logical Expressions 66 and the Drillstring Design Algorithms 68 (while using the 'Input Data' 64a, Constants 70, and Catalogs 72) is completed, the 'Drillstring Design Output Data' 62b1 will be generated as a 'result'. The 'Drillstring Design Output Data' 62b1 is recorded or displayed on the Recorder or Display Device 62b of the Computer System 62 of FIG. 16. In addition, that 'Drillstring Design Output Data' 62b1 can be manually input, by an operator, to the Drillstring Design Logical Expressions block 66 and the Drillstring Design Algorithms block 68 via a 'Manual Input' block 74 shown in FIG. 17.

Input Data 64a

The following paragraphs will set forth the 'Input Data' 64a which is used by the 'Drillstring Design Logical Expressions' 66 and the 'Drillstring Design Algorithms' 68. Values of the Input Data 64a that are used as input for the Drillstring Design Algorithms 68 and the Drillstring Design Logical Expressions 66 include the following:

(1) Measured Depth
(2) True Vertical Depth
(3) Weight On Bit
(4) Mud Weight
(5) Mud Weight Measured Depth
(6) Inclination
(7) Casing Point Depth
(8) Hole Size
(9) Footage
(10) ROP
(11) Time to Trip
(12) Dog Leg Severity
(13) True Vertical Depth
(14) Pore Pressure without Safety Margin
(15) Bit Size
(16) Upper Wellbore Stability Limit
(17) Lower Wellbore Stability Limit
(18) Openhole Or Cased hole completion
(19) BOP Location
(20) Casing Type Name
(21) Hole Section Name
(22) Conductor
(23) Start Depth
(24) End Depth
(25) On Bottom Hours
(26) Statistical Drilled Footage for the bit
(27) Cumulative UCS
(28) Casing Point
(29) Casing Size
(30) Casing Burst Pressure
(31) Casing Collapse Pressure
(32) Casing Connector
(33) Casing Cost
(34) Casing Grade

(35) Casing Weight per foot
(36) Casing Outer Diameter
(37) Casing Internal Diameter
(38) Air Gap
(39) Casing Top Measure Depth
(40) Water Depth
(41) Top of Tail slurry
(42) Top Of Cement
(43) Mud Volume
(44) Offshore Well Drillstring Design Constants 70

The 'Drillstring Design Constants' 70 are used by the 'Drillstring Design Logical Expressions' 66 and the 'Drillstring Design Algorithms' 68. The values of the 'Drillstring Design Constants 70 that are used as input data for Drillstring Design Algorithms 68 and the Drillstring Design Logical Expressions 66 include the following:
(1) Design Factor
(2) Stand Length
(3) Safety Margin Kick Tolerance
(4) Minimum well inclination flag
(5) Minimum well dogleg severity flag
(6) Gravitation constant
(7) Mud surface volume Drillstring Design Catalogs 72

The 'Drillstring Design Catalogs' 72 are used by the 'Drillstring Design Logical Expressions' 66 and the 'Drillstring Design Algorithms' 68. The values of the Catalogs 72 that are used as input data for Drillstring Design Algorithms 68 and the Drillstring Design Logical Expressions 66 include the following:
(1) Drill Pipe Catalog
(2) Drill Collar Catalog File
(3) Heavy Weight Drill Pipe Catalog File
(4) Drill Pipe Catalog File
(5) BHA Catalog File
(6) Required overpull Drillstring Design Output Data 62b1

The 'Drillstring Design Output Data' 62b1 is generated by the 'Drillstring Design Algorithms' 68. The 'Drillstring Design Output Data' 62b1, that is generated by the 'Drillstring Design Algorithms' 68, includes the following types of output data:
(1) Hole Section Begin Depth
(2) Drill Collar 1 Length
(3) Drill Collar 1 Weight
(4) Drill Collar 1
(5) Drill Collar 1 OD
(6) Drill Collar 1 ID
(7) Drill Collar 2 Length
(8) Drill Collar 2 Weight
(9) Drill Collar 2
(10) Drill Collar 2 OD
(11) Drill Collar 2 ID
(12) Heavy Weight Length
(13) Heavy Weight Weight
(14) Heavy Weight
(15) Heavy Weight OD
(16) Heavy Weight ID
(17) Drill Pipe Length
(18) Drill Pipe Weight
(19) Pipe
(20) Pipe OD
(21) Pipe ID
(22) Drill Pipe Tensile Rating
(23) BHA tools
(24) Duration
(25) Kick Tolerance
(26) Drill Collar 1 Linear Weight
(27) Drill Collar 2 Linear Weight
(28) Heavy Weight Linear Weight
(29) Drill Pipe Linear Weight
(30) DC OD
(31) DC ID
(32) DC Linear Weight
(33) HW OD
(34) HW ID
(35) HW Linear Weight
(36) DP OD
(37) DP ID
(38) DP Linear Weight Drillstring Design Logical Expressions 66

The following paragraphs will set forth the 'Drillstring Design Logical Expressions' 66. The 'Drillstring Design Logical Expressions' 66 will: (1) receive the 'Input Data 64a', including a 'plurality of Input Data calculation results' that has been generated by the 'Input Data 64a'; and (2) evaluate the 'Input Data calculation results' during the processing of the 'Input Data' 64a. A better understanding of the following 'Drillstring Design Logical Expressions 66' will be obtained in the paragraphs to follow when a 'functional description of the operation of the present invention' is presented.

The Drillstring Design Logical Expressions 66, which evaluate the processing of the Input Data 64a, include the following:

Check that all drill string components will fit into the wellbore geometry, including after manual alteration of component size.

The first stand consists of a combination of a Positive Displacement Motor (PDM), a Measurement While Drilling (MWD) device, a Logging While Drilling (LWD) tool, and/or drill collars, and is named DC1. The actual configuration is based on the maximum inclination and dogleg severity in the hole section, using the following rules:
(1) A PDM is required when the inclination and dogleg exceed the threshold values.
(2) A MWD is required when the PDM is selected.
(3) A LWD is suggested in the last hole section Drillstring Design Algorithms 68

The following paragraphs will set forth the 'Drillstring Design Algorithms' 68. The 'Drillstring Design Algorithms' 68 will receive the output from the 'Drillstring Design Logical Expressions' 66 and process that 'output from the Drillstring Design Logical Expressions 66' in the following manner. DC is an acronym for 'Drill Collar', HW is an acronym for 'Heavy Weight', and DP is an acronym for 'Drill Pipe'. DC1 is 'Drill Coller 1', and DC2 is 'Drill Collar 2'. A better understanding of the following 'Drillstring Design Algorithms 68' will be obtained in the paragraphs to follow when a 'functional description of the operation of the present invention' is presented. In the following, DF is a 'design factor' and 'WFT' is a 'weight/foot'.

(1) Read variables and constants;
(2) Read catalogs;
(3) Determine Outer Diameter DC1, DC2, HW and DP:
   (a) DC1 Outer diameter is obtained from table by using the Hole Size,
   (b) DP,
      Use Stiffness Ratio to Determine the Outer Diameter.
      $DP_{OD}$=Obtained from table by using the Hole Size (Bit Diameter)
      $DP_{OD}$<=$DC1_{OD}$,
   (c) DC2,
      Use Stiffness Ratio to Determine the Outer Diameter.
      $SR=Z_{BIG}/Z_{SMALL}$
      $Z=(\Pi/32)((OD^4-ID^4)/OD)$
      SR<3.5
      $DC2_{OD}$<=$DC1_{OD}$ & $DC2_{OD}$>=$DP_{OD}$,
   (d) HW,
      Use Stiffness Ratio to Determine the Outer Diameter.
      $SR=Z_{BIG}/Z_{SMALL}$
      $Z=(\Pi/32)((OD^4-ID^4)/OD)$
      SR<3.5
      $HW_{OD}$<=$DC2_{OD}$ & $HW_{OD}$>=$DP_{OD}$,
   (e) $DP_{OD}$<=$HW_{OD}$;
(4) Determine the maximum weight on bit used in the hole section;
(5) Determine Weight of DC1, DC2 and HW, where 'θ' is used for the wellbore inclination, and 'DF' is the Design Factor:

$$HW_w = \frac{WOB(DF)}{K_b * \cos(\theta)} \left(\frac{5+\theta}{100}\right),$$

$$DC1_w + DC2_w = \frac{WOB(DF)}{K_b * \cos(\theta)} \left(\frac{95-\theta}{100}\right), \text{ or}$$

$$DC1_w + DC2_w = \frac{WOB(DF)}{K_b * \cos(\theta)} - HW_w,$$

$$DC1_w = DC1_L * DC1_{WFT},$$

$$DC2_w = (DC1+DC2) - DC1;$$

(6) Determine Length of DC1, DC2, HW, DP:
   (a) DC1–$DC1_L$=90 Feet=1 Stand=3 Joint,
   (b) DC2–$DC2_L$=$DC2_W$/$DC2_{WFT}$,
   (c) HW–$HW_L$=$HW_W$/$HW_{WFT}$,
   (d) DP–$DP_L$=(Bit Section Length)–($DC1_L$–$DC2_L$–$HW_L$);
(7) Determine the tensile Risk:
   (a) Take the rating of the top most Drill Pipe (Premium 80%),
   (b) Tensile Risk=(($\Sigma(W_{Components})*K_b$)+Min. Overpull)/(Pipe Tensile Rating*0.8);
(8) Calculate cost, based on the duration to drill the section; and
(9) Calculate the kick tolerance volume and assign risk based on the well type.

Figure 18:
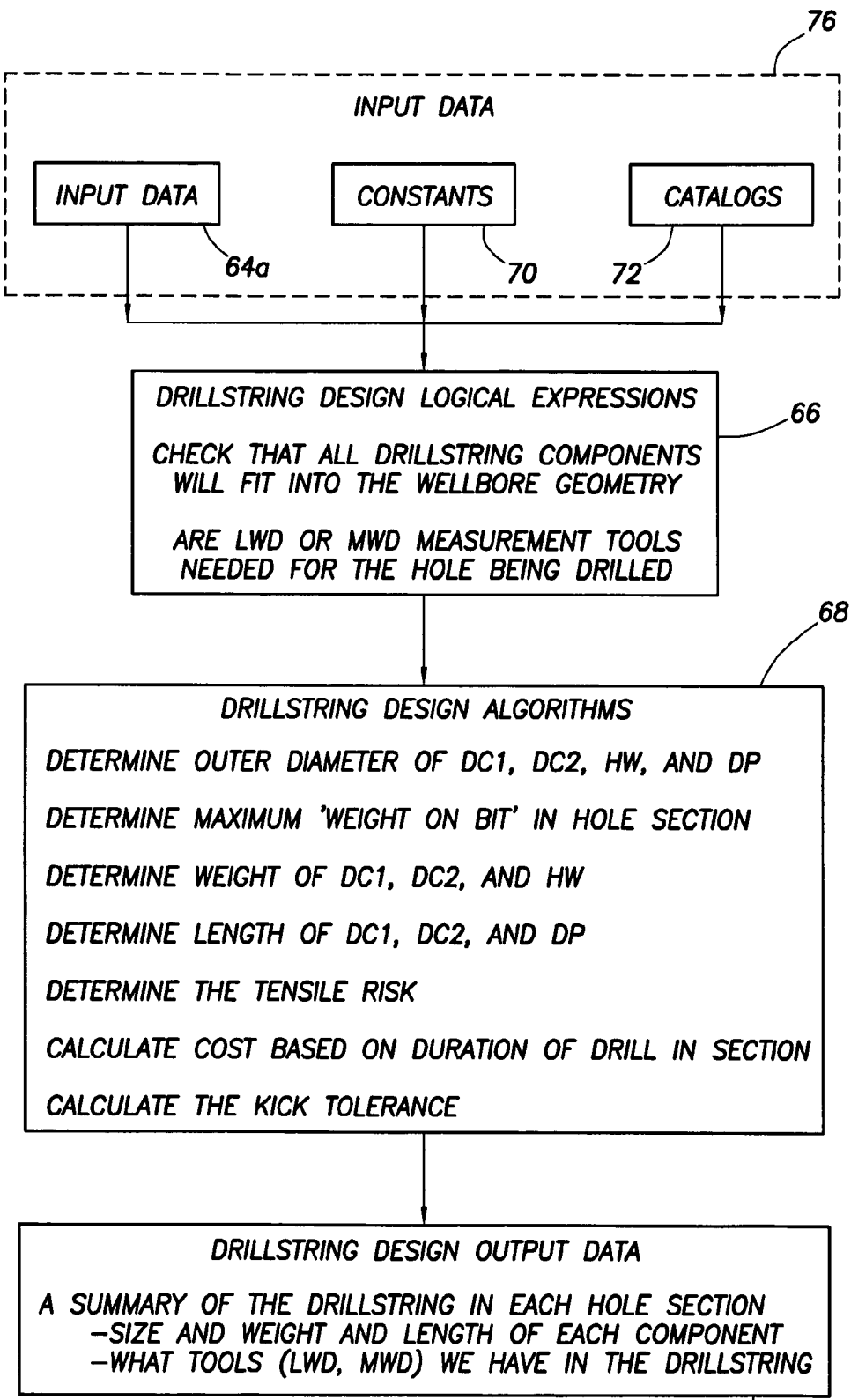
FIG. 18 illustrates a more detailed construction of the Automatic Well Planning Drillstring Design software system of FIGS. 16 and 17 including the Drillstring Design Algorithms and Logical Expressions.

Refer to FIG. 18 which will be used during the following functional description.

In FIG. 18, the Input Data 76 includes the 'Input Data' 64a, the Constants 70, and the Catalogs 72. The Input Data 76 will be provided as 'input data' to the Drillstring Design Logical Expressions 66. The Drillstring Design Logical Expressions 66 will: check that all drillstring components will fit into the wellbore geometry, and determine whether LWD or MWD measurement tools are needed for the hole being drilled. Then, the Drillstring Design Algorithms 68 will: determine the outer diameter for Drill Collar 1 (DC1), Drill Collar 2 (DC2), the Heavy Weights (HW), and the Drill Pipe (DP); determine the maximum 'Weight on Bit' in the hole section; determine the weight of DC1, DC2, and HW; determine the length of DC1, DC2, HW, and DP; determine the tensile risk; calculate the cost based on during of the drill in the section; and calculate the kick tolerance. Then, the Drillstring Design Output Data 62b1 will be generated and recorded or displayed on the 'recorder or display device' 62b in FIG. 16, the Drillstring Design Output Data 62b1 including: a summary of the drill string in each hole section, where that summary includes (1) size and weight and length of each components in the drill string, and (2) what tools (e.g., LWD, and MWD) exist in the drill string. A better understanding of the above referenced 'Drillstring Design Algorithms 68' will be obtained in connection with the 'functional description of the operation of the present invention' which is presented in the following paragraphs.

Figure 19:
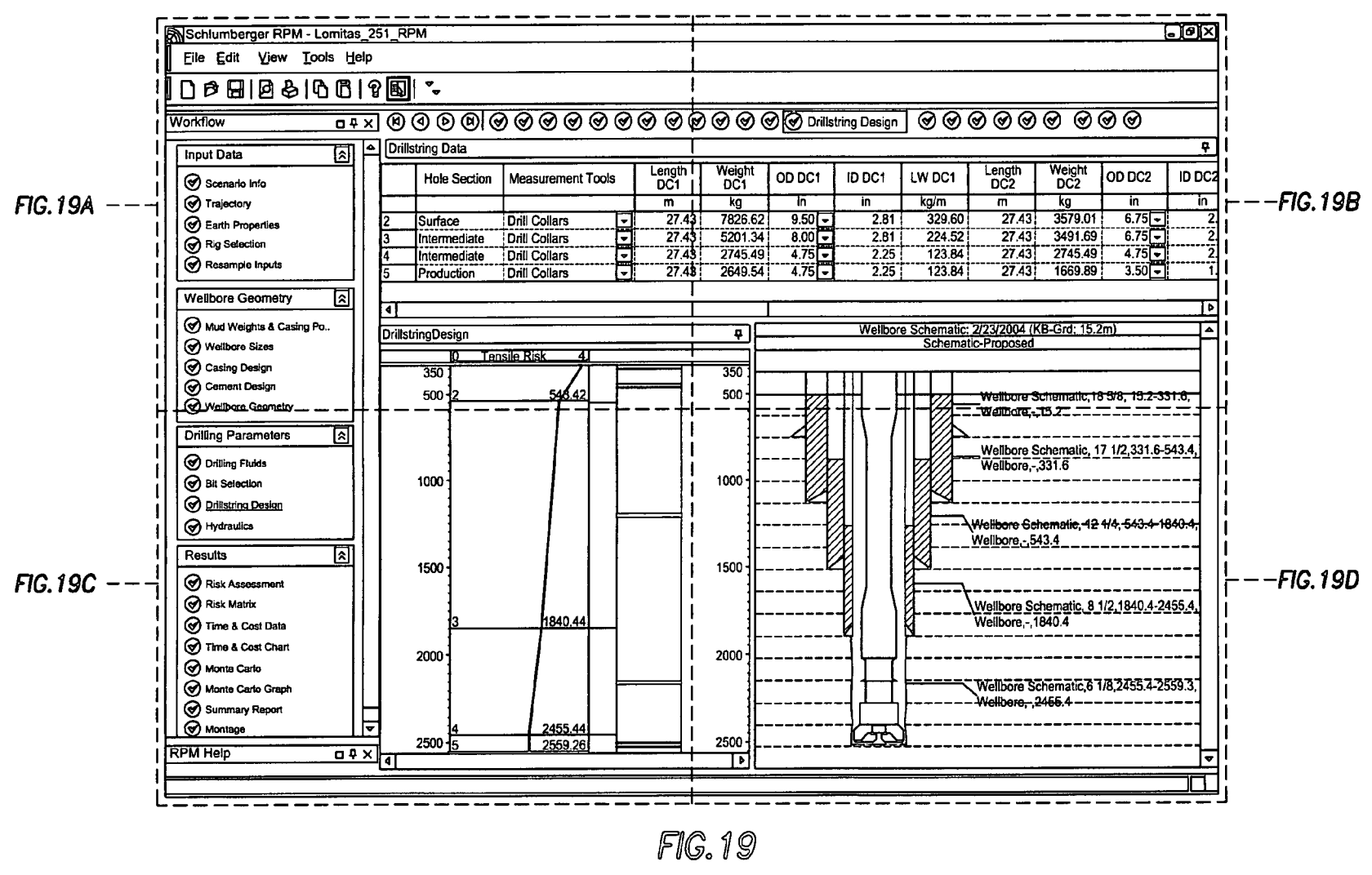
Figure 19A:
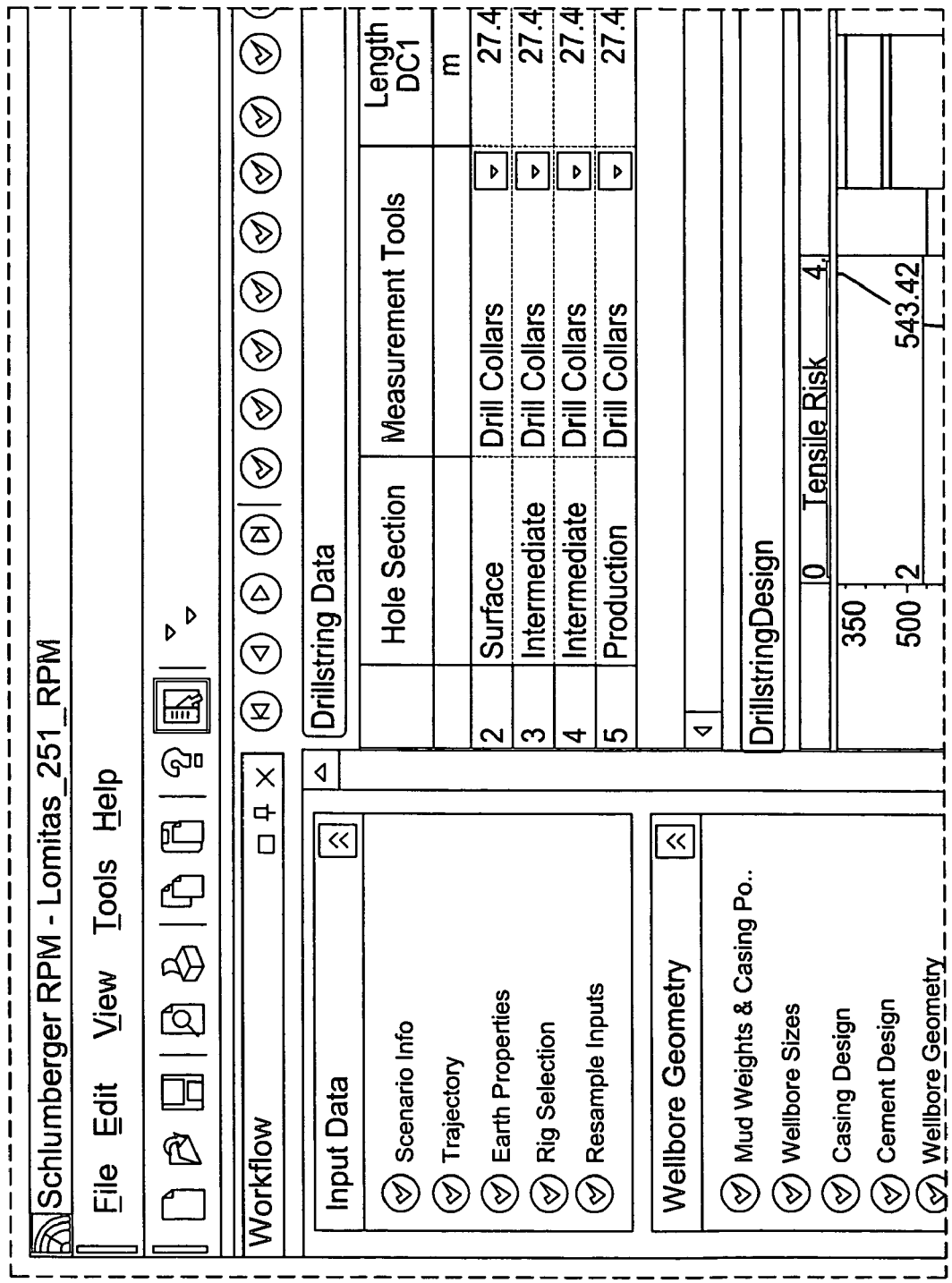
FIG. 19 illustrates a typical 'Drillstring Design output display' which can be recorded or displayed on the recorder or display device 62b in FIG. 16 and which displays the Drillstring Design Output Data 62b1 in FIG. 16.
Figure 19C:
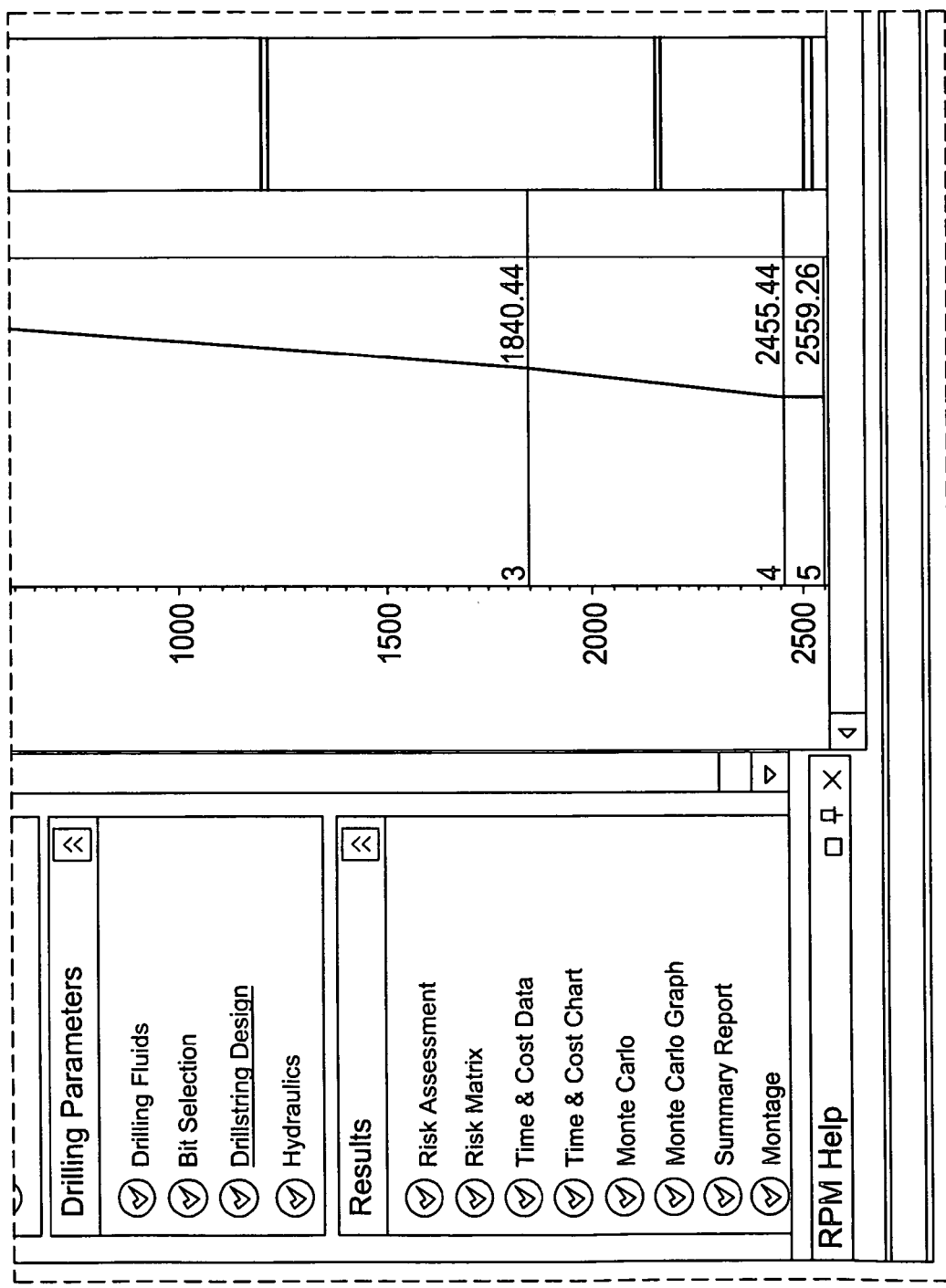
Figure 19D:
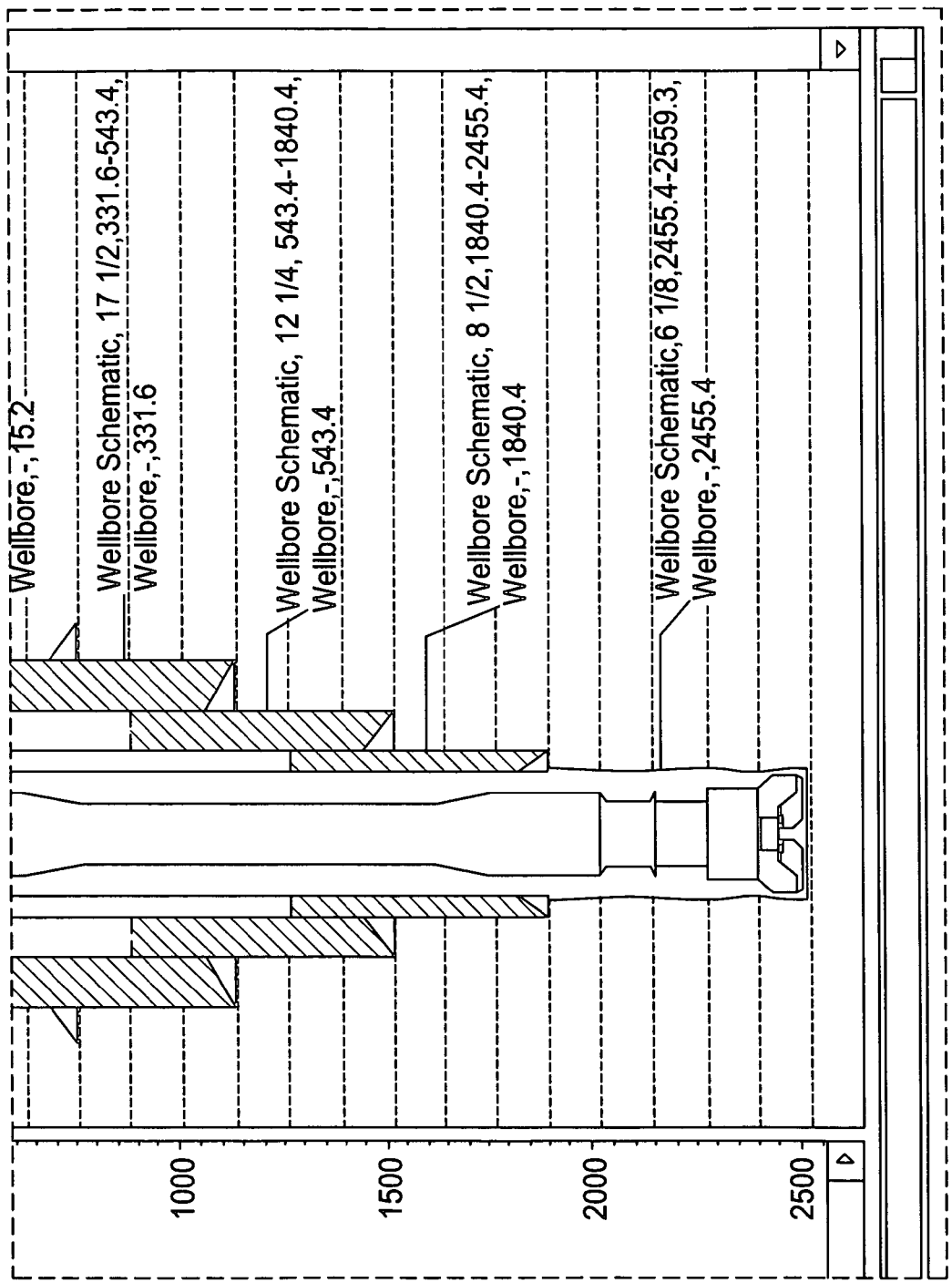

Referring to FIG. 19, a typical 'Drillstring Design output display' is illustrated which can be recorded or displayed on the recorder or display device 62b of FIG. 16 and which displays the Drillstring Design Output Data 62b1 in FIG. 16.

A functional description of the operation of the 'Automatic Well Planning Drillstring Design Software' 62c1 will be set forth in the following paragraphs with reference to FIGS. 1 through 19 of the drawings.

In the order of the workflow in FIG. 8, we know the wellbore 'hole size' and we know where the hole starts and where it finishes. The drill bits have been selected, and, from the drill bit, we know the drilling parameters, such as, how much 'weight on bit' is required to drill that bit, and how many revolutions per minute (RPM) are required to spin that bit. The last engineering task is the hydraulics task. This is the task where, based on the rate of penetration (ROP) for the particular drill bit, it is necessary to determine how much fluid do we need to pump in order to clean the hole free of cuttings. The hydraulics task reflects the 'pressure losses', and, in order to calculate the 'pressure losses', we need to know the structure of the drill string. As a result, drill string design takes place after bit selection and before hydraulics. From the bit selection, we know the sizes of the drill bits that are being used, we know how much 'weight on bit' is required for that particular bit, and we know, from the wellbore geometry, the casing size. All of the drill string components must be smaller than the drill bit size because all of the drill string components will be lowered into a newly drilled wellbore, and there needs to be sufficient room for the cuttings to be transported up to the surface between the wellbore and the Bottom Hole Assembly (BHA) components of the drillstring.

Recall the drillstring and compare the drillstring with an injection needle. Recalling the depths that are being drilled (e.g., 20,000 feet) using a five-inch Drill Pipe (DP), and comparing these dimensions, by analogy, with the injection needle, it would appear that the injection needle should be approximately 20 feet long. The drillstring is a very flexible hollow tube, since it is so much longer than the other dimensions of the drillstring pipe. The drillstring extends from a surface pipe to a bit pipe located downhole. The surface pipe is a common pipe, such as a five (5) inch pipe. If we are drilling a seventeen and one half (17½) inch wellbore, different components of the drillstring are needed to extend the drillstring from a 5 inch diameter surface pipe to a 17½ inch drill bit located downhole. Although most of the drillstring is in tension, we still need to have a 'weight on bit'. Therefore, we need to include 'components' in the drillstring which have a 'high-density' or a 'high-weight' that are located near to the drill bit, since those 'components' are in 'compression'.

Those drillstring 'components' that are located near to the drill bit need to be 'stiffer' and therefore the outer diameter of those 'components' must have an outer diameter (OD) which is larger than the OD of the surface pipe (that is, the OD of the surface pipe is smaller than the OD of the 'components' near the drill bit). As a result, the 'components' located near the drill bit have a 'high-weight' and therefore a 'high outer diameter' (certainly higher than the surface pipe).

However, at an interface between a big OD pipe located near the drill bit (hereinafter called a 'drill collar' or 'DC') and a much smaller OD drill pipe (DP) located near the surface, a great deal of tension will accumulate (called, the 'stress bending ratio'). Therefore, a 'transition' is required between the big-OD drill collar located near the drill bit and the 'smaller-OD' drill pipe located near the surface. In order provide for the aforementioned 'transition', two different sizes of 'big-OD' drill collers are used; that is, Drill Coller 1 (DC1) and Drill Collar 2 (DC2). Between the Drill Collar 2 (DC2) and the 'smaller OD' drill pipe located near the surface, one more 'additional transition' is needed, and that 'additional transition' is called a 'heavy-weight' drill pipe or 'HW' drill pipe'. The HW drill pipe is the same in size relative to the 'smaller OD' drill pipe; however, the HW drill pipe has a smaller inner diameter (ID). As a result, the HW drill pipe is heavier than the 'smaller OD' drill pipe. This helps in producing a smooth 'stress transition' between a big OD pipe at the bottom of the wellbore and a smaller OD pipe at the surface of the wellbore. The 'stress bending ratio' (which must be a certain number) can be calculated, and, if that 'stress bending ratio' number is within certain limits, the aforementioned 'stress transition' (between the big OD pipe at the bottom of the wellbore and the smaller OD pipe at the surface of the wellbore) is smooth.

The drill bits must have a 'weight on bit' and that is delivered by the weights of the drill collars. The drill collars must fit within the open-hole size, therefore, the maximum size of the drill collars can be calculated. When the maximum size of the drill collars are known, we would know the number of 'pounds per foot' or 'weight' of the (drill collar) pipes. When one knows the amount of weight that is required to drill, we can back-calculate the length of the drill collars. In addition, we can also calculate the length of the heavy-weight 'HW' drill pipe that must be run into the wellbore in order to provide the aforementioned 'weight on bit'. The drill pipe (DP) located near the surface is not delivering any 'weight on bit' for the drill bit, however, the drill pipe (DP) is needed to provide a flow-path for fluids produced from downhole.

All of these drill-collar components, which hang off the drill pipes in the wellbore, are heavy. As a result, there exists a 'tension factor' pulling on the last drill pipe at the surface of the wellbore. Since the drill pipe at the surface of the wellbore can only handle a certain tension, one can calculate the 'applied or actual tension' and compare that 'applied or actual tension' with the 'available tension' or the 'designed tension'. That comparison can be expressed as a 'ratio'. As long as the 'available tension' is higher than the 'applied or actual tension', the 'ratio' is larger than '1'. If the 'available tension' is not higher than the 'applied or actual tension', that is, if the 'tension applied' is actually larger than the 'tension which the drill pipe possesses as a material characteristic', the 'ratio' will be smaller than '1' and consequently the pipe will break.

In addition, if we drill other than vertically in an Earth formation, special tools are needed. While drilling, if we need to turn the drillstring a certain 'degree' in a horizontal plane (such as, turning the drillstring from a north direction to an east direction), the aforementioned 'degree' of 'turn' of the drill string downhole is called an 'inclination'. A motor (called a Positive Displacement Motor, or PDM) is needed to make the 'turn'. Therefore, when a change of 'inclination' is needed, a motor is needed to produce that change of 'inclination'. When the motor is being used to produce that change of 'inclination', at any point in time, we need to know the 'direction' in which the motor is drilling and that 'direction' must be compared with a 'desired direction'. In order to measure the 'direction' of the motor, and therefore, the 'direction' of the drill bit, a 'measurement device' is needed, and that 'measurement device' is called an 'MWD' or a 'Measurement While Drilling' measurement device. The 'Algorithm' 68 associated with the 'Automatic Well Planning Drillstring Design software' 62c1 knows that, if the drill bit is drilling 'directionally', a PDM motor is needed and an MWD measurement device is also needed.

Another logging tool is used, which is known as 'LWD' or 'Logging While Drilling'. In certain wellbore 'hole sections', it is advantageous to include an 'LWD' logging tool in the tool string. In connection with the 'Algorithm' 68, in the last hole section of a wellbore being drilled (known as the 'production hole section'), a maximum number of measurements is desired. When a maximum number of measurements is needed in the last hole section of the wellbore being drilled, the 'LWD' tool is utilized. Therefore, in connection with the logic of the 'Algorithm' 68, the 'trajectory' of the wellbore being drilled is measured, and the 'hole sections' of the wellbore being drilled are noted. Depending on the 'hole section' in the wellbore where the drill bit is drilling the wellbore, and depending on the 'trajectory' and the 'inclination' and an 'azimuth' change, certain 'drillstring components' are recommended for use, and those 'drillstring components' include the Measurement While Drilling (MWD) measurement device, the Logging While Drilling (LWD) tool, and the Positive Displacement Motor (PDM).

Therefore, we know: (1) the 'weight on bit' that the drill bit requires, (2) the size of the bit, (3) the wellbore geometry, (4) the size of the 'drillstring components', (5) the 'trajectory' of the 'hole section', (6) whether we need certain measurement tools (such as MWD and LWD), (7) the size of those measurement tools, and (8) the size of the drill pipe (since it has a rating characteristic). A Drillstring Design Algorithm 68 computes the size of the smaller drillstring components (located near the surface) in order to provide a smooth stress transition from the drill bit components (located downhole) to the smaller components (located near the surface).

In connection with the Drillstring Design Output Data 62b1 of FIG. 17 which is generated by the Drillstring Design Algorithm 68, since we use drill pipe, the Drillstring Design Output Data 62b1 includes: (1) the size of the drill pipe, (2) the length of the drill pipe (including the heavy weight drill pipe), (3) the size and the length of the drill collars, and (4) the identity and the size and the length of any PDM or MWD or LWD tools that are utilized. In connection with all of the aforementioned PDM and MWD and LWD 'components', we also know the weight of these 'components'. Therefore, we can compute the 'total tension' on the drill string, and we compare the computed 'total tension' with 'another tension' which represents a known tension rating that the drill string is capable of handling.

The 'Input Data' 64 of FIG. 17 includes: (1) the trajectory, (2) the wellbore geometry including the casing size and the hole size, (3) the inclination associated with the trajectory, and (4) the drilling parameters associated with the drill bit that was previously selected.

The Drillstring Design Catalogs 70 of FIG. 17 include: the sizes of all the Drillstring components, and the OD and the ID and the linear weight per foot, and the tension characteristics (the metal characteristics) associated with these Drillstring components.

The Constants 70 of FIG. 17 include: Gravitational constants and the length of one drilling stand.

The Logical Expressions 66 of FIG. 17 will indicate whether we need the measurement tools (LWD, MWD) in connection with a particular wellbore to be drilled. In addition, the rules in the Logical Expressions 66 are compared with the actual 'trajectory' of the drill bit in a hole section when drilling a deviated wellbore. In addition, the hole sections in the wellbore being drilled are compared with the requirements of those hole sections. For example, in a production hole section, an LWD tool is suggested for use. In hole sections associated with a directional well, a PDM motor and an LWD tool is suggested for use. In addition, the Logical Expressions 66 indicate that, if these PDM or LWD or MWD components are used, it is necessary to pay for such components. That is, the PDM and LWD and MWD components must be rented. Therefore, in the Logical Expressions 66, a cost/day is assigned, or, alternatively, a cost/foot.

In connection with the Drillstring Design Algorithms 68, a 'smooth transition' in size from the larger size pipe at the bottom near the bit to the smaller size pipe at the surface is provided; and, from the drill bit, we know, for each bit, how much 'weight on bit' that bit requires. That weight is delivered by the DC1, and the DC2 and the HW (heavy weights). Therefore, for each component, we must determine what length we need to have in order to provide that 'weight on bit'. If we are drilling a vertical well, all components are hanging. One factor associated with a vertical wellbore is that the entire weight of the drill string is hanging from all those components. However, if the well is deviated (such as 45 degrees), about 30% of the weight is lost. When drilling inside a certain inclination, longer drillstring components are required in order to provide the same weight. Therefore, the Algorithm 68 corrects for the inclination.

In connection with the 'tensile risk', if we know the total weight that is hanging on the drill pipe, we also need to know the 'tensile capacity' that the drill pipe has at the surface. As a result, we compare the 'total tension' with the 'maximum allowable (or potential) tension'. If the 'total tension' and the 'maximum allowable (or potential) tension' are expressed as a 'ratio', as the 'ratio' approaches '1', the greater the likelihood that the pipe will fail. Therefore, in connection with 'tensile risk', we compute the 'amount of tension applied', and compare that with the 'maximum allowable tension to be applied'.

In connection with cost, drill pipes and drill collars come with a rig, and we already paid for the rig on a per-day basis. If we need the specialized tools (e.g., PDM or MWD or LWD), we need to rent those tools, and the rental fee is paid on a daily basis. We need to compute how long we are going to use those tools for each drill section. If we know the time in days, we can calculate how much we need to pay. If we use a PDM motor, for example, a back up tool is needed for stand by. The stand by tool is paid at a lower rate.

In connection with the kick tolerance, the 'kick tolerance' is a volume of gas that can flow into the wellbore without any devastating effects. We can handle gas flowing into the well as long as the gas has a small volume. We can compute the 'volume' of gas that we can still safely handle and that volume is called the 'kick tolerance'. When computing the 'volume', during volumetric calculations, the 'volume' depends on: (a) hole size, and (b) the components in the drill string, such as the OD of the drill collars, the OD of the drill pipe, and the HW and the hole size. The 'kick tolerance' takes into account the pore pressure and the fracture pressure and the inclination and the geometric configuration of the drill string. The Drillstring Design Algorithm 68 receives the pore pressure and the fracture pressure and the inclination and the geometric configuration of the drill string, and computes the 'volume of gas' that we can safely handle. That 'volume of gas' is compared with the 'well type'. Exploration wells and development wells have different tolerances for the 'maximum volume' that such wells can handle.

Therefore, the 'Automatic Well Planning Drillstring Design software' 62*c*1 receives as 'input data': the trajectory and the wellbore geometry and the drilling parameters, the drilling parameters meaning the 'weight on bit'. When the software 62*c*1 is executed by the processor 62*a* of the computer system of FIG. 16, the 'Automatic Well Planning Drillstring Design software' 62*c*1 will generate as 'output data': information pertaining to the drill string 'components' that are needed, a description of those 'components', such as the Outer Diameter (OD), the Inner Diameter (ID), the linear weight, the total weight, and the length of those 'components', the kick tolerance and the tensile risk. In particular, the Drillstring Design Output Data 62*b*1 includes a 'summary of the drill string in each hole section'; that is, from top to bottom, the 'summary of the drill string in each hole section' includes: the size and the length of the drill pipe, the size and the weight of the heavy weight (HW) drill pipe, the size and the weight of the Drill Collar 2 (DC2), the size and the weight of the Drill Collar 1 (DC1), and the identity of other tools that are needed in the drill string (e.g., do we need to have: a PDM, or a LWD, or an MWD in the drill string). For each 'component' in the drillstring, the following information is reported: the inner diameter, the length/weight, the total weight for each 'component', the kick tolerance (that volume of gas that we can safely handle).

Automatic Well Planning Software System—Workflow Control System Software

The 'Automatic Well Planning Workflow Control System software' of the present invention represents a software system that is the first and only product to integrate the various tasks required to explicitly design an oil and gas well for the purposes of estimating the time and costs required along with the associated risks. The process dependencies allow the system to take advantage of the impact of each task's results on any task downstream in the workflow. The workflow can be modified to support the application of different technical solutions that could require a different sequence of tasks.

The 'Automatic Well Planning Workflow Control System software' of the present invention integrates the entire well planning process from the Geoscientists interpretation environment of mechanical earth properties through the technical well design and operational activity planning resulting in the delivery of time estimates, cost estimates, and assessment, categorization, and summary of risk.

Figure 21:
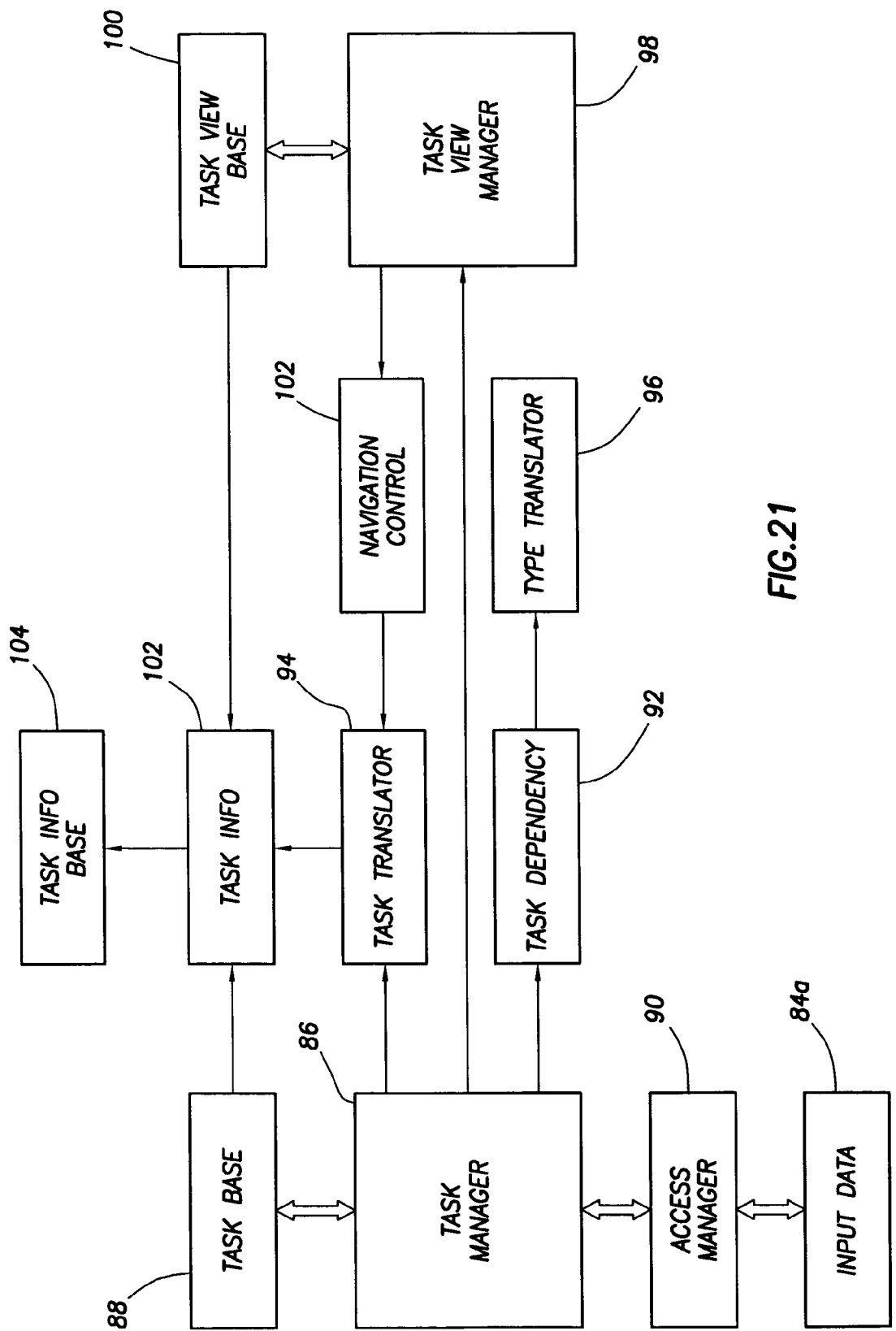
FIG. 21 illustrates a block diagram of the Automatic Well Planning Workflow Control System software of the present invention.
Figure 22:
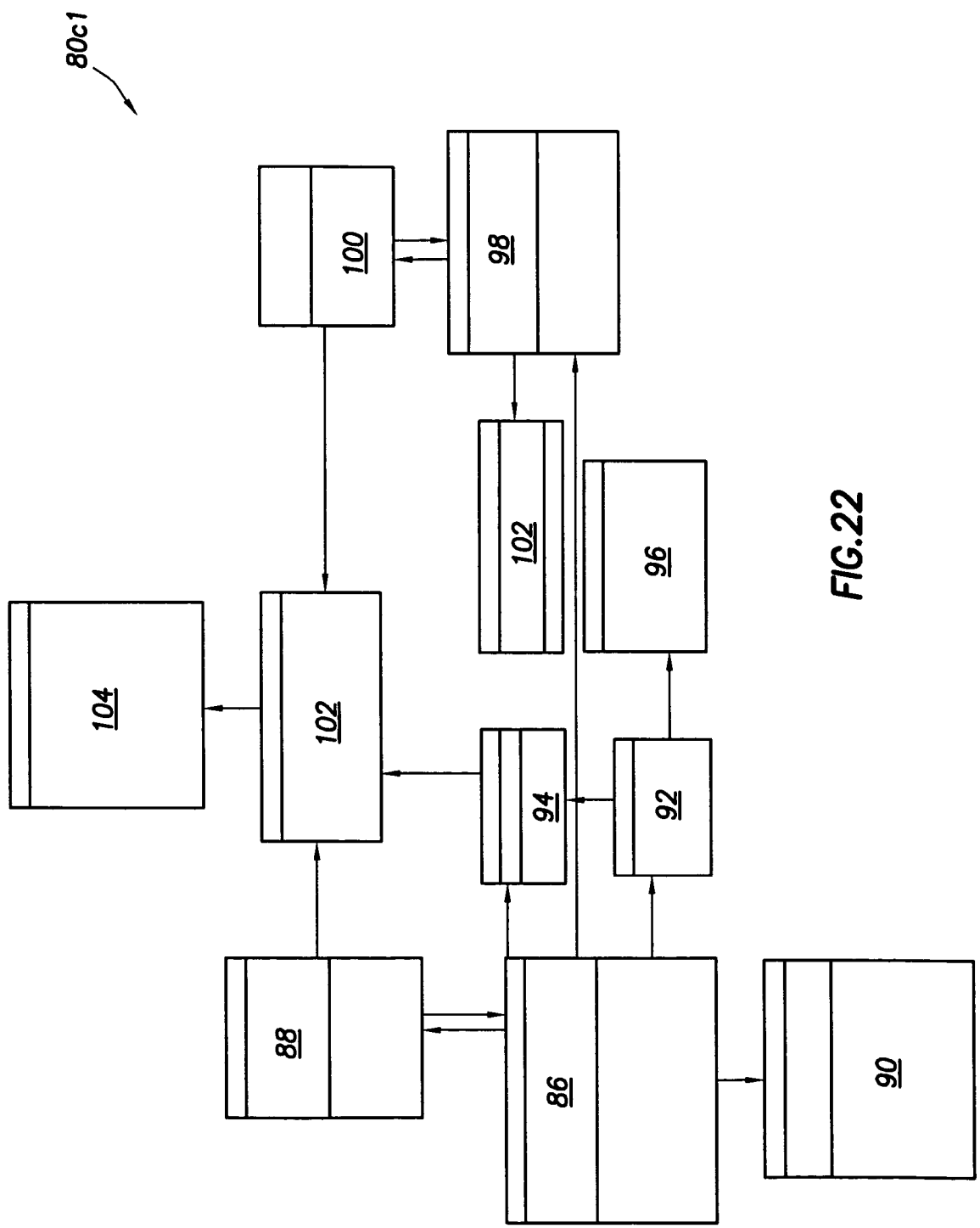
FIGS. 22A through 22F illustrate a more detailed construction of each of the blocks which comprise the Automatic Well Planning Workflow Control System software of FIG. 21 of the present invention.
Figure 22A:
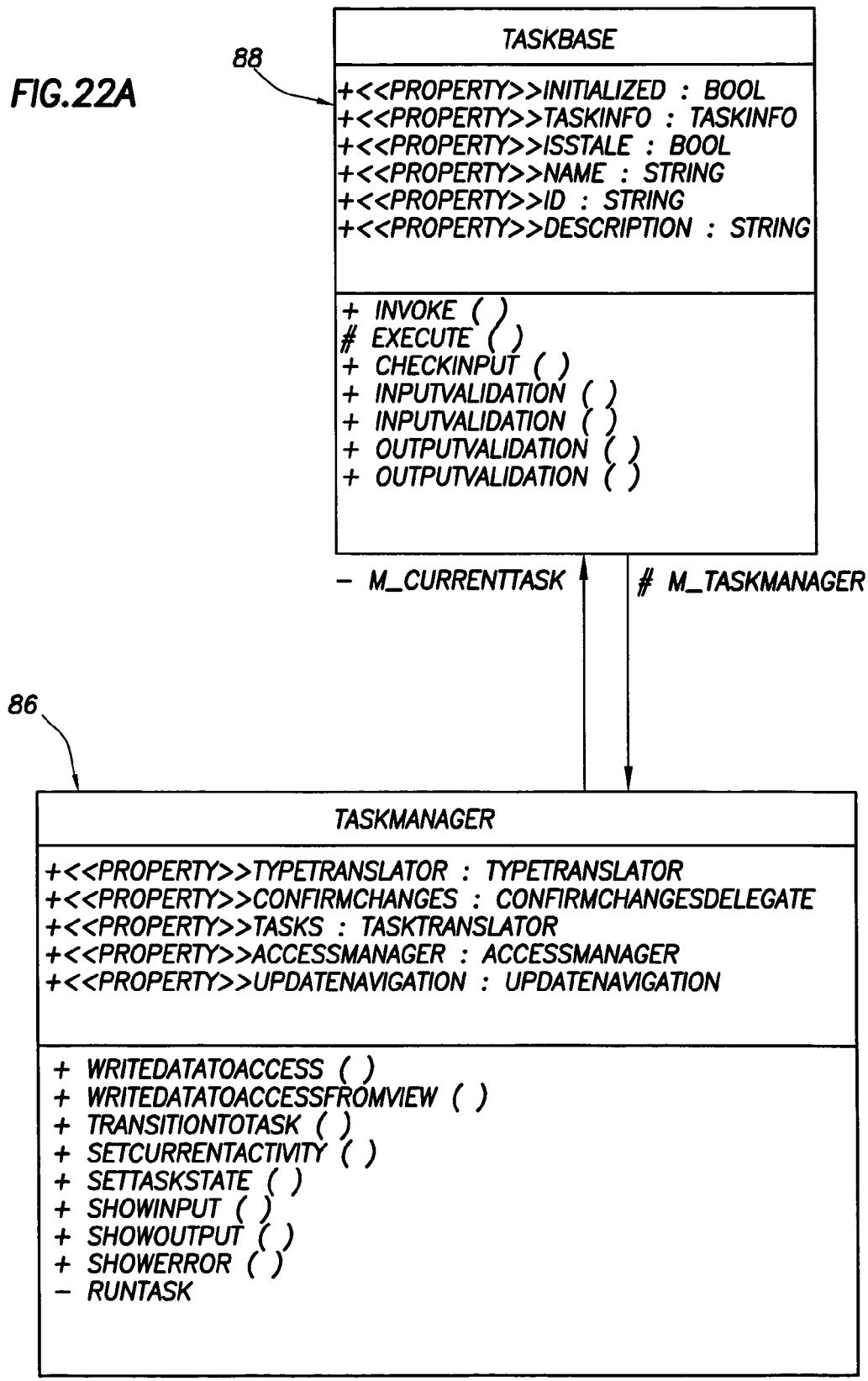
Figure 22D:
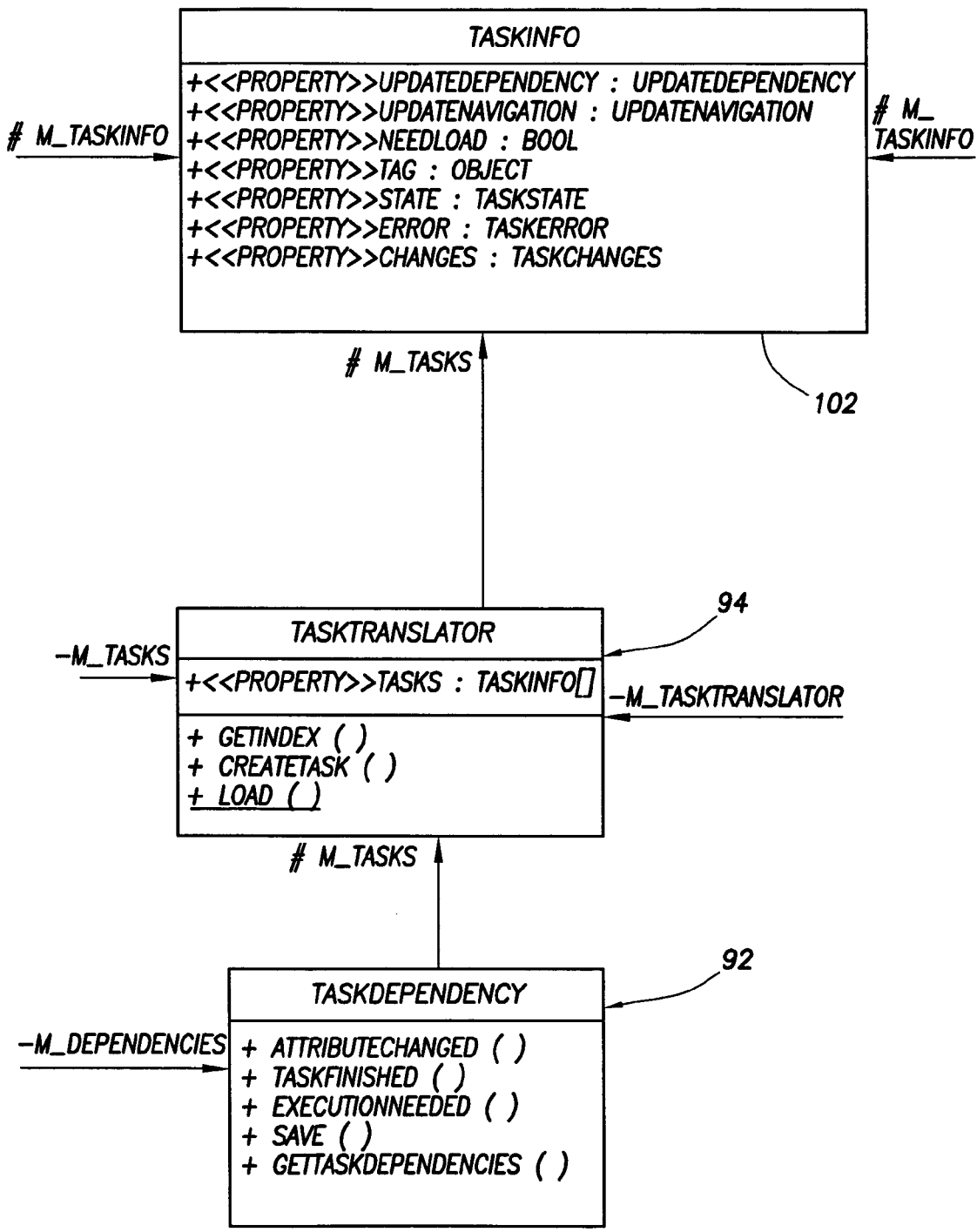

The solution that is provided by the 'Automatic Well Planning Workflow Control System software' of the present invention is achieved with a open and flexible workflow control system which is illustrated in FIGS. 21 and 22. FIGS. 21 and 22 will be discussed later in this specification.

The 'Automatic Well Planning Workflow Control System software' of the present invention, illustrated in FIGS. 21 and 22, includes the following entities:

(1) The workflow is defined in the tasks definition file. Each task has the following information: Name, Assembly, Type of Task, Help File Name, and Information if the associated task view should be shown

| | | | | |
|---|---|---|---|---|
| LoadScenario | Slb.RPM.Task.LoadScenario | TaskInfo_InputData | LoadScenario.xml | TRUE |
| Trajectory | Slb.RPM.Task.Trajectory | TaskInfo_InputData | Trajectory.Xml | TRUE |

This file is loaded into a task registry (TaskTranslator) which is ensuring that the specified order of tasks is consistent (all input attributes have to be defined as a task is loaded) and to ensure that all tasks can be loaded into the system. The flexibility of the registry enables to load any task which inherits the task api's.

(2) Parameters and Types are introduced into the system by loading them into a registry (TypeTranslator). The types declaration includes the Name, datatype (both native of derived types are possible), measurement type, display unit, storage unit CasingTop double[ ] Length m m MeasuredDepth As a result, it is very simple to introduce tasks which need additional parameters.

(3) Tasks define the data dependencies by defining which parameters are used as Input, Output or as constant attributes. Constant attributes are system wide defined attributes. To specify the attributes, the same names similar to that which is specified in the parameter definition are used.

(4) After loading a new workflow definition into the system, the task dependency map (TaskDependencies) is created. This map is a 2 dimensional array where the rows are defining the attributes while the columns define the tasks. This map enables a very performing check of task dependencies and it can ensure that all necessary input attributes are available as a task is loaded.

(5) Task follow a strict model/view/Control pattern, where the view part is a subclass of TaskViewBase, the Model part is a subclass of TaskInfo, and the Control is subclassed from TaskBase. The system is architectured in such a way that every task can run in batch and the TaskManager is the control for performing a workflow.

(6) During the workflow, each task execution includes several steps. Each step returns a 'state' to the system to keep the user informed. The states are:

```
public enum TaskState
{
    ///The Task has not run yet
        NotStarted,
        BeforeInput,
        InputFailed,
    ///Input finished
        InputSucceeded
    ///Input validation has failed
        InputCheckFailed,
    ///Input validation has succeeded
        InputCheckSucceeded,
    ///The Task is running
        Running,
    ///The Task is running
        Recompute,
    ///The Task execution was aborted
        ExecutionFailed,
    ///The Task has successfully completed execution
        ExecutionSucceeded,
    ///Output validation has failed
        OutputCheckFailed,
    ///Output validation has succeeded
        OutputCheckSucceeded,
    Finished
```

If the user decides to run 'n' steps at once, the system will run 'n−1' tasks in batch (no user interface) and will only show the results of the last task in its view. In the event that one of the 'n−1' tasks shows a sever problem, the system will load the view of the affected tasks and will resume at this stage until the user takes corrective measures.

Figure 20:
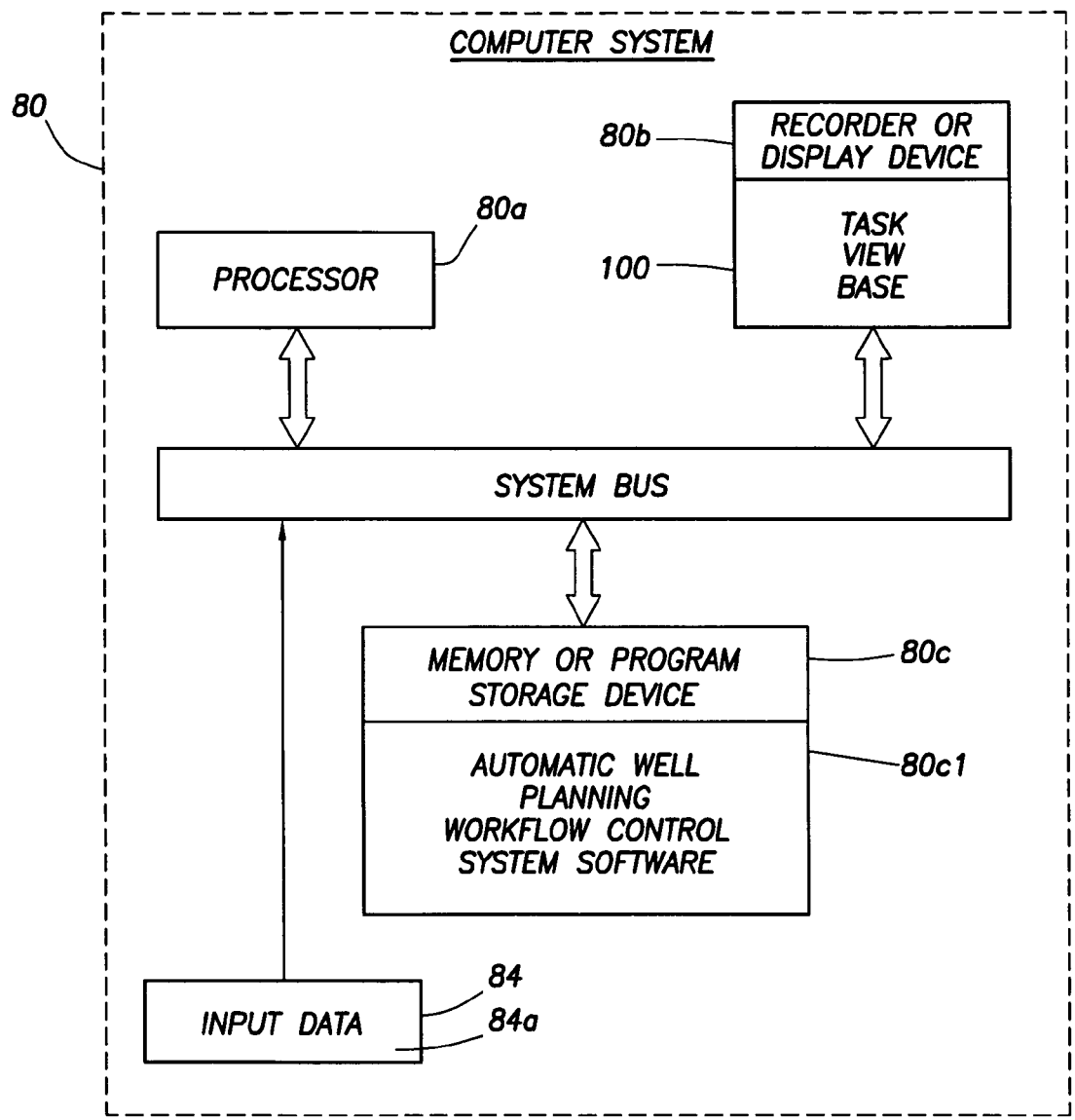
FIG. 20 illustrates a computer system of the types illustrated in FIGS. 9A, 12, and 16 which stores the Automatic Well Planning Workflow Control System software of the present invention.

Referring to FIG. 20, a computer system 80 is illustrated. The computer system 80 is similar to the computer systems 18, 42, and 62 illustrated in FIGS. 9A, 12, and 16, respectively. In FIG. 20, the computer system 80 includes a processor 80a, a recorder or display device 80b, and a memory or program storage device 80c. The computer system 80 is adapted to receive Input Data 84a from a memory or other storage device 84 which stores that Input Data 84a. The recorder or display device 80b is adapted to record or display a 'task view base' 100, the 'task view base' being discussed later in this specification. The memory or program storage device 80c is adapted to store an 'Automatic Well Planning Workflow Control System software' 80c1 in accordance with the present invention. The 'Automatic Well Planning Workflow Control System software' 80c was initially stored on 'another storage device', such as a 'hard disk' or CD-Rom, the 'Automatic Well Planning Workflow Control System software' 80c1 being loaded from that 'hard disk' (or other storage device) into the 'memory or program storage device' 80c in FIG. 20. The Input Data 84a can be the Input Data 20a of FIG. 9A, or it can be the Input Data 44a of FIG. 16, or it can be the Input Data 64a of FIG. 16. The Computer System 80 of FIG. 20 may be a personal computer (PC). The Memory or Program Storage Device 80c is a computer readable medium or a program storage device which is readable by a machine, such as the processor 80a. The processor 80a may be, for example, a microprocessor, a microcontroller, or a mainframe or workstation processor. The Memory or Program Storage Device 80c, which stores the 'Automatic Well Planning Workflow Control System Software' 80c1, may be, for example, a hard disk, ROM, CD-ROM, DRAM, or other RAM, flash memory, magnetic storage, optical storage, registers, or other volatile and/or non-volatile memory.

Figure 23:
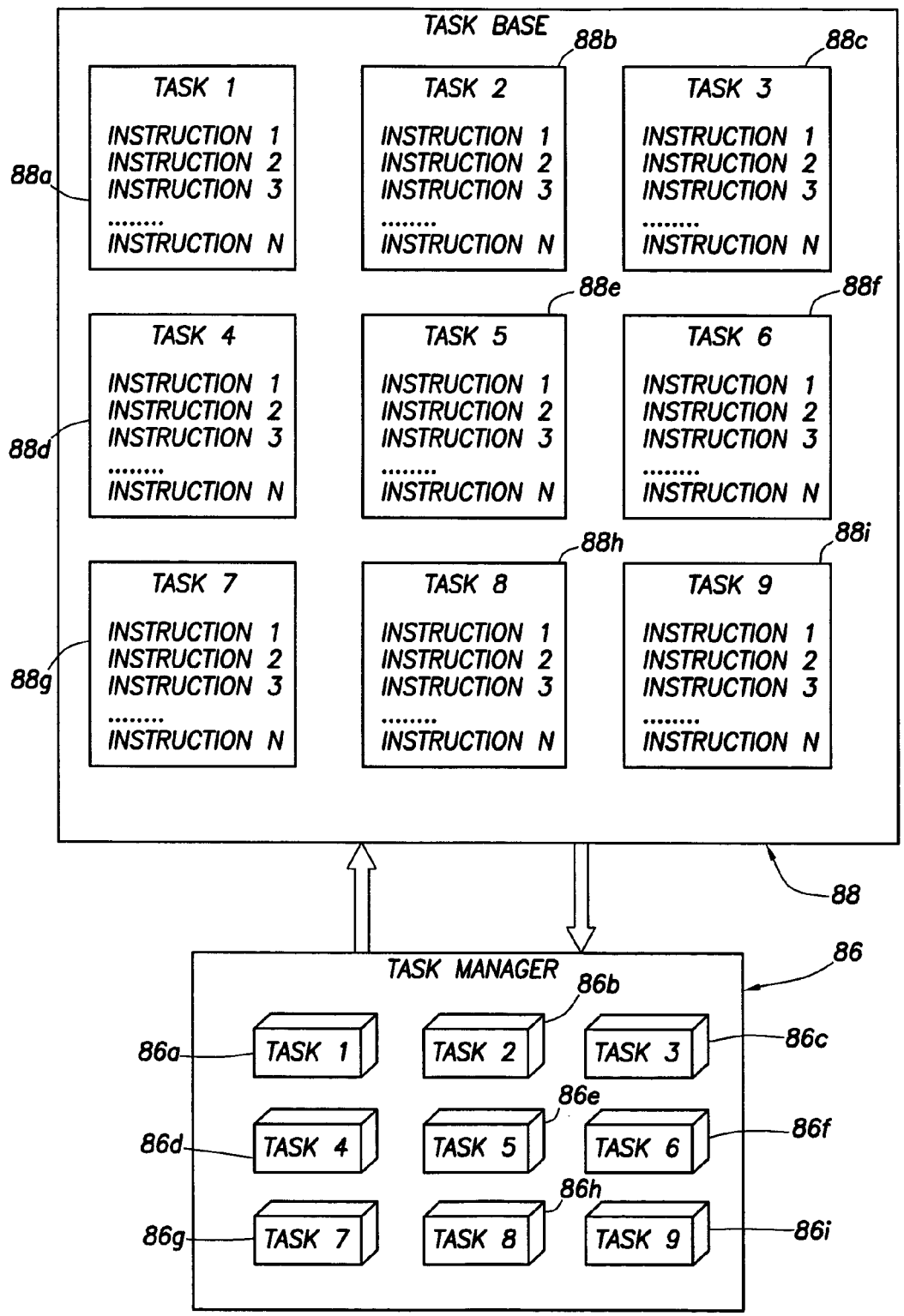
FIG. 23 illustrates a more detailed construction of the Task Base and the Task Manager associated with the Automatic Well Planning Workflow Control System software of the present invention of FIGS. 20-22.

Referring to FIG. 21, a detailed construction of the 'Automatic Well Planning Workflow Control System software' 80c1 of the present invention (hereinafter called 'Workflow Control System 80c1') is illustrated. In FIG. 21, the Workflow Control System 80c1 includes a 'Task Manager' 86, a 'Task base' 88, and an 'Access Manager' 90. The Task Manager 86 is the 'brain' of the Workflow Control System 80c1, the Task Manager 86 performing the function of a processor, similar to the processor 80a in FIG. 20. The Task Manager 86 stores a plurality of Tasks associated with the Workflow Control System 80c1; however, the Task Base 88 stores a plurality of 'instruction sets' associated, respectively, with the plurality of the Tasks in the Task Manager 86, one 'instruction set' in the Task Base 88 being reserved for each Task in the Task Manager 86. This concept is illustrated in FIG. 23, to be discussed later. The Access Manager 90 stores all of the data that is needed by each of the plurality of 'instruction sets' in the Task Base 88 associated with each of the Tasks in the Task Manager 86. Since the Task Manager 86 stores the plurality of Tasks, when a user selects a 'plurality of Tasks' via the Task Manager, the Task Manager 86 will receive and store the 'selected plurality of Tasks' which were selected by the user.

The Workflow Control System 80c1 also includes a 'Task Dependency' block 92, a 'Task Translator' block 94, and a 'Type Translator' block 96. As noted earlier, when the user selects a 'plurality of Tasks' via the Task Manager 86, the 'selected plurality of Tasks' will be stored in the Task Manager 86. The Task Manager 86 will then access the Task Base 88 to locate and execute the plurality of 'instruction sets' stored in the Task Base 88 which are associated with the 'selected plurality of Tasks'. However, the Task Dependency block 92 will ensure that the plurality of 'instruction sets' located in the Task Base 88 by the Task Manager 86 are located and executed in the 'proper order', where the term 'proper order' is defined by the 'order' of the 'plurality of Tasks' that were previously selected by the user. When the plurality of 'instruction sets' are located in the Task Base 88 by the Task Manager 86, and when the 'proper order' of the plurality of 'instruction sets' in the Task Base 88 is established by the Task Dependency block 92, the Task Translator block 94 and the Type Translator block 96 will ensure that each of the plurality of 'instruction sets' located in the Task Base 88, associated with the selected plurality of Tasks in the Task Manager 86 (as selected by the user), will receive its corresponding 'set of input data' from the Access Manager 90, and that corresponding 'set of input data' will be received by each of the 'instruction sets' in the Task Base 88 in the 'proper form'.

The Workflow Control System 80c1 also includes a 'Task View Manager' 98, a 'Task View Base' 100, and a 'Navigation Control' 102. Therefore, when the plurality of 'instruction sets' are located in the Task Base 88 and the 'proper order' of the 'instruction sets' are established by the Task Dependency block 92, the Task Manager 86 will execute the plurality of 'instruction sets' in the 'proper order' (as selected by the user), and, during the execution of the plurality of 'instruction sets' by the Task Manager 86, the Task Translator 94 and the Type Translator 96 will ensure that each of the plurality of 'instruction sets' will, during its execution, receive its 'set of input data' from the Access Manager 90 in the 'proper form'. During and after the execution, by the Task Manager 86, of the plurality of 'instruction sets' in the Task Base 88, a 'set of results' will be generated by the Task Manager 86, the 'set of results' being received by the Task View Manager 98. The Task View Manager 98 will convert a 'first unit of measure' associated with the 'set of results' generated by the Task Manager 86 into a 'second unit of measure' associated with the 'set of results'. The 'second unit of measure' associated with the 'set of results' is then transferred from the Task View Manager 98 to the Task View Base 100, where the Task View Base 100 will record or display the 'set of results' in the 'second unit of measure' on the recorder or display device 80b of the computer system 80 of FIG. 20. In the above description, the plurality of Tasks in the Task Base 88 were executed by the Task Manager 86 in the 'proper order', in accordance with the function of the Task Dependency block 92; and, during that execution, each of the plurality of Tasks received its 'set of input data' in the 'proper form' in accordance with the functions of the Task Translator 94 and the Type Translator 96. Assume that the user wants to change 'some of the sets of input data' associated with some of the plurality of Tasks (thereby creating 'changed sets of input data'), and then reexecute (by the Task Manager 86) the plurality of 'instruction sets' (stored in the Task Base 88) corresponding to the plurality of Tasks (in the Task Manager 86) while using the 'changed sets of input data' during the re-execution of the 'instruction sets' thereby creating a 'new set of results'. The Navigation Control 102 will allow the user to change 'some of the sets of input data' and then re-execute the plurality of 'instruction sets' to thereby create the 'new set of results'. In fact, the user can change any of the 'sets of input data' associated with any of the plurality of Tasks, and then re-execute the plurality of 'instruction sets' associated with the plurality of Tasks to create the 'new set of results'. This concept will be discussed later in this specification with reference to FIGS. 23-28.

The Workflow Control System 80c1 also includes a 'Task Info' block 102 and a 'Task Info Base' block 104. The Task Info Base block 104 is used only when setting-up the 'workflow' comprised of the plurality of Tasks selected by the user. When the 'workflow' is set-up, the Task Info Base block 104 is no longer used. The Task Info block 102 will generate a 'state', associated with 'each Task' of the plurality of Tasks, after 'each Task' has been executed by the Task Manager 86. A plurality of the 'states', associated with the execution of 'each Task' which are generated by the Task Info block 102, are set forth above and are duplicated below, as follows:

```
public enum TaskState
{
///The Task has not run yet
    NotStarted,
    BeforeInput,
    InputFailed,
///Input finished
    InputSucceeded
///Input validation has failed
    InputCheckFailed,
///Input validation has succeeded
    InputCheckSucceeded,
///The Task is running
    Running,
///The Task is running
    Recompute,
///The Task execution was aborted
    ExecutionFailed,
///The Task has successfully completed execution
    ExecutionSucceeded,
///Output validation has failed
    OutputCheckFailed,
///Output validation has succeeded
    OutputCheckSucceeded,
Finished
```

Referring to FIGS. 22A through 22F, a more detailed construction of each of the blocks which comprise the Automatic Well Planning Workflow Control System software 80c1 of FIG. 21 is illustrated.

Referring to FIG. 23, a more detailed construction of the Task Manager 86 and the Task Base 88 of FIGS. 21 and 22 is illustrated. In FIG. 23, a 'concept' was presented earlier, as follows: the Task Manager 86 stores a plurality of Tasks associated with the Workflow Control System 80c1; however, the Task Base 88 stores a plurality of 'instruction sets' associated, respectively, with the plurality of the Tasks in the Task Manager 86, one 'instruction set' in the Task Base 88 being reserved for each Task in the Task Manager 86. FIG. 23 illustrates that 'concept'. In FIG. 23, the Task Base 88 includes a plurality of 'instruction sets' including: a 'task 1 instruction set' 88a, a 'task 2 instruction set' 88b, a 'task 3 instruction set' 88c, a 'task 4 instruction set' 88d, a 'task 5 instruction set' 88e, a 'task 6 instruction set' 88f, a 'task 7 instruction set' 88g, a 'task 8 instruction set' 88h, and a 'task 9 instruction set' 88i. The Task Manager 86 includes: a 'task 1' 86a corresponding to the 'task 1 instruction set 88a', a 'task 2' 86b corresponding to the 'task 2 instruction set 88b', a 'task 3' 86c corresponding to the 'task 1 instruction set 88c', a 'task 4' 86d corresponding to the 'task 1 instruction set 88d', a 'task 5' 86e corresponding to the 'task 1 instruction set 88e', a 'task 6' 86f corresponding to the 'task 1 instruction set 88f', a 'task 7' 86g corresponding to the 'task 1 instruction set 88g', a 'task 8' 86h corresponding to the 'task 1 instruction set 88h', and a 'task 9' 86i corresponding to the 'task 1 instruction set 88i'. When the Task Manager 86 executes 'task 1' 86a in the Task Manager, the Task Manager 86 is really executing the 'task 1 instruction set 88a' in the Task Base 88; similarly, when the Task Manager 86 executes 'task 2' 86b in the Task Manager, the Task Manager 86 is really executing the 'task 2 instruction set 88b' in the Task Base 88; and when the Task Manager 86 executes 'task 3' 86c in the Task Manager, the Task Manager 86 is really executing the 'task 3 instruction set 88c' in the Task Base 88; and when the Task Manager 86 executes 'task 4' 86d in the Task Manager, the Task Manager 86 is really executing the 'task 4 instruction set 88d' in the Task Base 88; and when the Task Manager 86 executes 'task 5' 86e in the Task Manager, the Task Manager 86 is really executing the 'task 5 instruction set 88e' in the Task Base 88; and when the Task Manager 86 executes 'task 6' 86f in the Task Manager, the Task Manager 86 is really executing the 'task 6 instruction set 88f' in the Task Base 88; and when the Task Manager 86 executes 'task 7' 86g in the Task Manager, the Task Manager 86 is really executing the 'task 7 instruction set 88g' in the Task Base 88; and when the Task Manager 86 executes 'task 8' 86h in the Task Manager, the Task Manager 86 is really executing the 'task 8 instruction set 88h' in the Task Base 88, and when the Task Manager 86 executes 'task 9' 86i in the Task Manager, the Task Manager 86 is really executing the 'task 9 instruction set 88i' in the Task Base 88.

Figure 24:
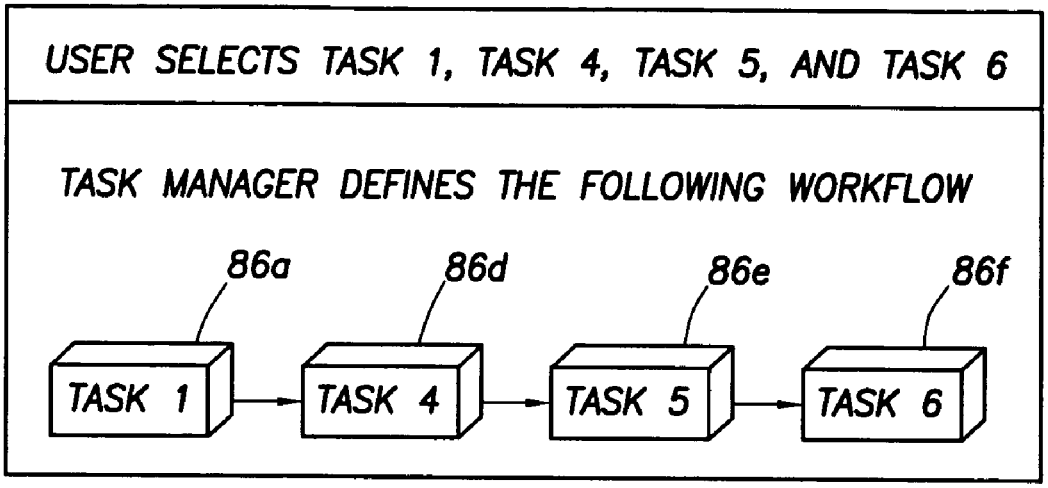
FIGS. 24 and 25 illustrate a function associated with the Task manager of the Automatic Well Planning Workflow Control System software of the present invention pertaining to the selection by a user of one or more tasks to be performed in sequence.
Figure 25:
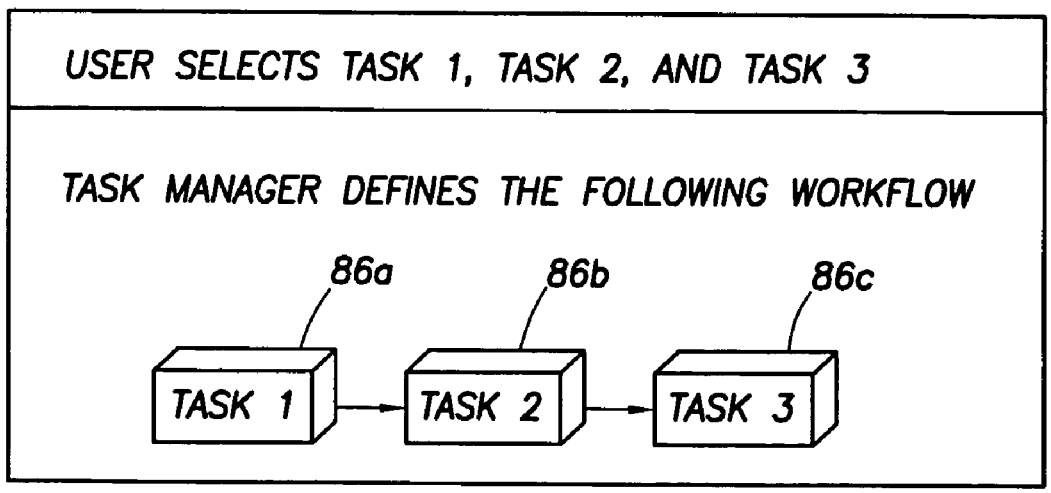

Referring to FIGS. 24 and 25, assume that the user selects task 1, task 4, task 5, and task 6 in the Task Manager 86 of FIG. 23; in that case, the Task Manager 86 defines the workflow shown in FIG. 24, as follows: 'task 1' followed by 'task 4' followed by 'task 5' followed 'task 6'. Similarly, assume that the user selects task 1, task 2, and task 3 in the Task Manager 86 of FIG. 23; in that case, the Task Manager 86 defines the workflow shown in FIG. 25, as follows: 'task 1' followed by 'task 2' followed by 'task 3'.

Figure 26:
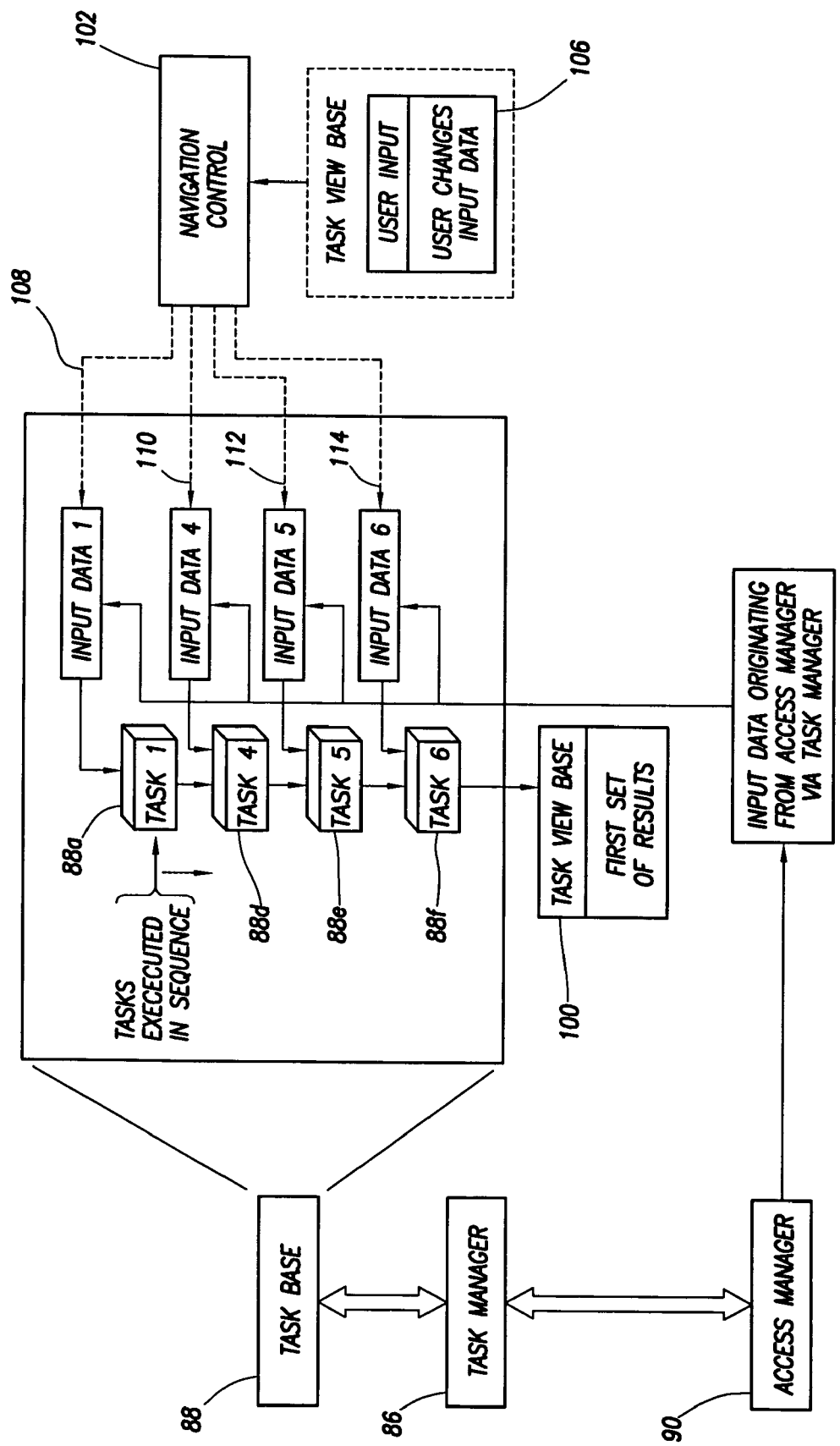
FIG. 26 illustrates a more detailed construction of the task base including its interface with a Navigation Control, an Access Manager, and a Task View Base.

Referring to FIG. 26, another construction of the 'Automatic Well Planning Workflow Control System software' 80c1 of FIGS. 21 and 22 (that is, the 'Workflow Control System 80c1') of the present invention is illustrated. In FIG. 26, assuming from FIG. 24 that the user selects: 'task 1', 'task 4', 'task 5', and 'task 6', the Task Manager 86 defines the workflow shown in FIG. 24: 'task 1' 86a followed by 'task 4' 86d followed by 'task 5' 86e followed by 'task 6' 86f. In that case, in FIG. 23, in accordance with the workflow shown in FIG. 24, the Task Manager 86 will execute the following 'instruction sets' which are stored in the Task Base 88 in the following order, as follows: 'task 1 instruction set 88a' followed by 'task 4 instruction set 88d' followed by 'task 5 instruction set 88e' followed by 'task 6 instruction set 88f'. In FIG. 26, the Task Manager 86 executes, in sequence, the 'task 1 instruction set' 88a, the 'task 4 instruction set' 88d, the 'task 5 instruction set' 88e, and the 'task 6 instruction set' 88f which are stored in the Task Base 88 as shown in FIG. 26. The Access Manager 90 (via the task translator 94 and the type translator 96 of FIG. 21) will provide the required input data to each of the tasks, as follows: 'Input Data 1' is provided to 'task 1 instruction set' 88a, 'Input Data 4' is provided to 'task 4 instruction set' 88d, 'Input Data 5' is provided to 'task 5 instruction set' 88e, and 'Input Data 6' is provided to 'task 6 instruction set' 88f. When the tasks ('task 1' 88a followed by 'task 4' 88d followed by 'task 5' 88e followed by 'task 6' 88f) are executed in sequence as shown in FIG. 26, the Task View Base 100 will record or display (on the recorder or display device 80b in FIG. 20) a 'First Set of Results' as shown in FIG. 26. However, the user can change any of the above sets of input data by interfacing with the Task View Base 100 to use the Navigation Control 102; in that case, the Task Manager 86 will re-execute 'only those tasks which were affected by the changed input data' (i.e., 'task 1' 88a followed by 'task 4' 88d followed by 'task 5' 88e followed by 'task 6' 88f in FIG. 27; and 'task 5' 88e followed by 'task 6' 88f in FIG. 28) and use the 'changed input data' during the re-execution of 'only those tasks which were affected by the changed input data'. In FIG. 26, for example, the user can interface with the Task View Base 100 to change the input data to each task (block 106 in FIG. 26) thereby producing 'changed input data'. That is, the user can change 'Input Data 1' for 'Task 1' 88a or 'Input Data 4' for 'Task 4' 88d or 'Input Data 5' for 'Task 5' 88e or 'Input Data 6' for 'Task 6' 88f. The Navigation Control 102 will receive that 'changed input data' from block 106. In FIG. 26, however, lines 108, 110, 112, and 114 which extend from the Navigation Control 102 to the 'Input Data' for each 'Task' are 'dotted lines' which indicate that the Navigation Control 102 has not yet changed any of the input data for any task.

Figure 27:
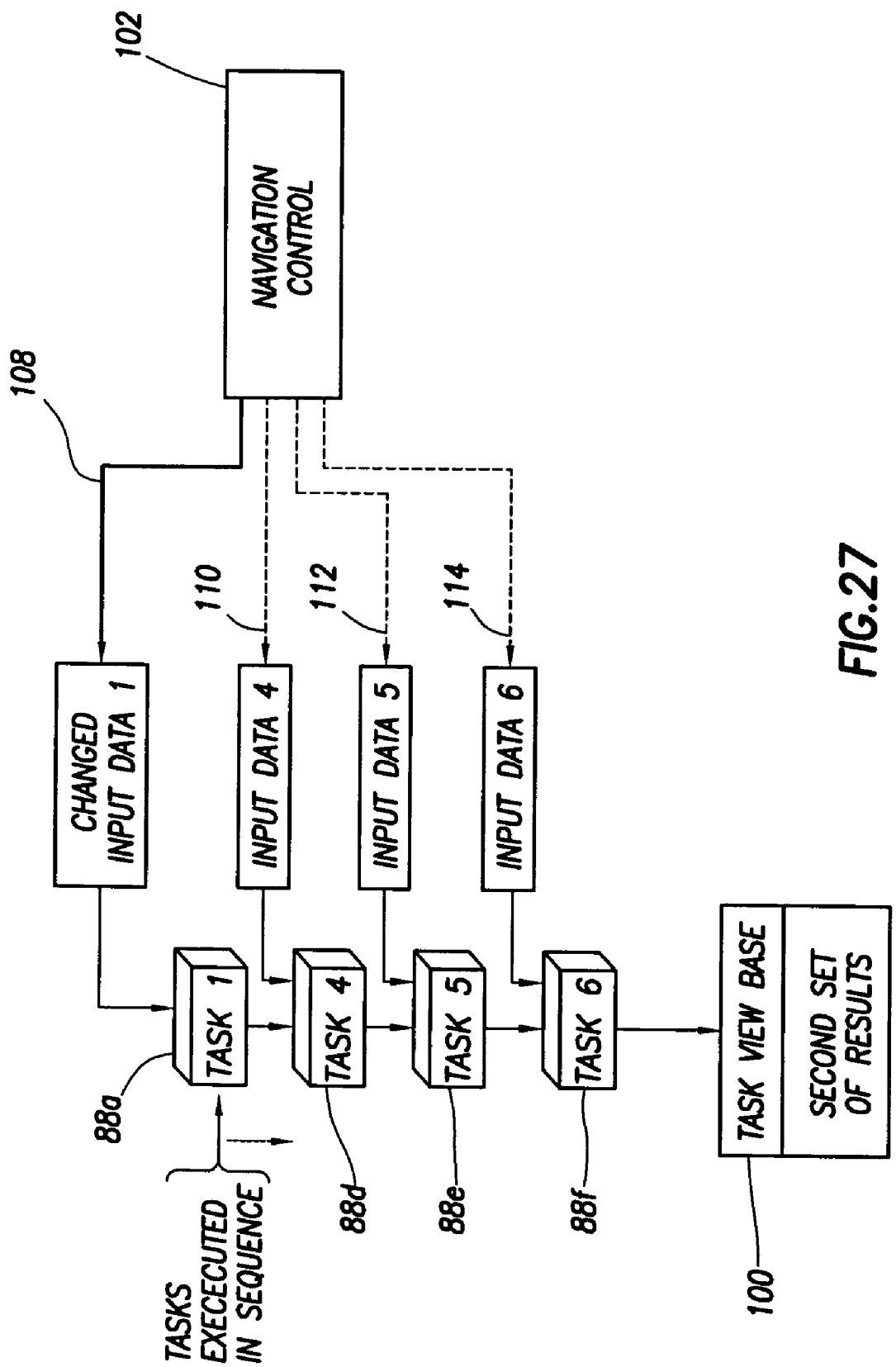
FIGS. 27 and 28 illustrate a function associated with the Navigation Control.

Referring to FIG. 27, recall that the user can interface with the Task View Base 100 to change the input data to each task (block 106 in FIG. 26) thereby producing 'changed input data'; that is, the user can change 'Input Data 1' for 'Task 1' 88a, or 'Input Data 4' for 'Task 4' 88d, or 'Input Data 5' for 'Task 5' 88e, or 'Input Data 6' for 'Task 6' 88f; and, responsive thereto, the Navigation Control 102 will receive that 'changed input data' from block 106. In FIG. 27, assume that the user (via block 106 in FIG. 26) wants to change 'Input Data' 1 for 'Task 1' 88a. In that case, the user will interface with the Task View Base 100 to change 'Input Data 1' for 'Task 1' 88a; and, responsive thereto, the Navigation Control 102 will energize line 108 and change the 'Input Data 1' for 'Task 1' 88a. In that case, in FIG. 27, a 'Changed Input Data 1' will represent the input data for the 'task 1 instruction set 88a' ('Task 1' 88a) in the Task Base 88. At this point, since tasks 1, 4, 5, and 6 are all affected by the changed input data, the Task Manager 86 will reexecute each of the designated tasks in the Task Base 88 in sequence [i.e., the Task Manager 86 will reexecute again, in sequence, the 'task 1 instruction set' 88a ('Task 1' 88a) followed by the 'task 4 instruction set' 88d ('Task 4' 88d) followed by the 'task 5 instruction set' 88e ('Task 5' 88e) followed by 'the task 6 instruction set' 88f ('Task 6' 88f)] while using a 'new set of input data' as follows: 'Changed Input Data 1' and 'Input Data 4' and 'Input Data 5' and 'Input Data 6'. When those tasks in the Task Base 88 (that have been affected by the changed input data) have been re-executed again, in sequence, in response to the 'new set of input data', the Task View Base 100 will record or display (on the recorder or display device 80b in FIG. 20) a 'Second Set of Results', as shown in FIG. 27.

Figure 28:
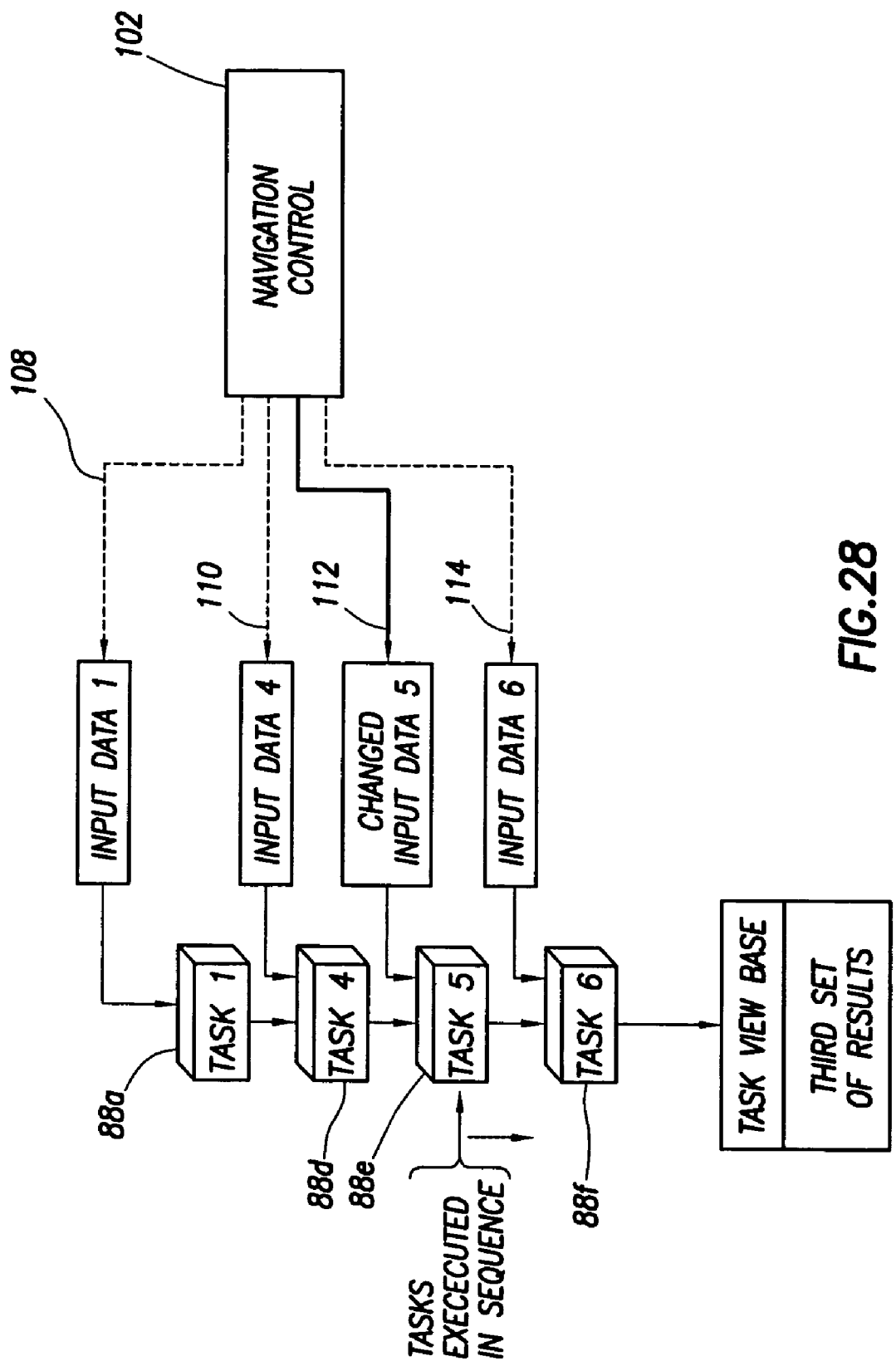

Referring to FIG. 28, assume that the user (via block 106 in FIG. 26) wants to interface with the Task View Base 100 to change 'Input Data' 5 for 'Task 5' 88e. In that case, the Navigation Control 102 will energize line 112 in FIG. 28 and change the 'Input Data 5' for 'Task 5' 88e to a 'Changed Input Data 5'. As a result, in FIG. 28, a 'Changed Input Data 5' will represent the input data for the 'task 5 instruction set 88e' ('Task 5' 88e) in the Task Base 88. At this point, the Task Manager 86 will reexecute 'only those tasks in the Task Base 88 which were affected by the changed input data'. Since 'Task 5' and 'Task 6' are the 'only tasks that are affected by the changed input data', in FIG. 28, the Task Manager 86 will re-execute again, in sequence, the 'task 5 instruction set' 88e ('Task 5' 88e) followed by 'the task 6 instruction set' 88f ('Task 6' 88f); in addition, the Task Manager 86 will use a 'new set of input data' during the re-execution of 'Task 5' 88e and 'Task 6' 88f, as follows: 'Changed Input Data 5' and 'Input Data 6'. When the designated tasks in the Task Base 88, which were affected by the changed input data, have been reexecuted again, in sequence, in response to the 'new set of input data' (which was changed by the Navigation Control 102), the Task View Base 100 will record or display (on the recorder or display device 80b in FIG. 20) a 'Third Set of Results', as shown in FIG. 28.

A functional description of the operation of the 'Automatic Well Planning Software System' of the present invention, including the 'Automatic Well Planning Workflow Control System software' 80c1 of the present invention, will be set forth in the following paragraphs with reference to FIGS. 1 through 28 of the drawings, with emphasis on FIGS. 20 through 28 of the drawings.

A user will begin by selecting one or more tasks via the Task Manager 86 of the Automatic Well Planning Workflow Control System of FIG. 21 which is stored in memory 80c of the computer system 80 shown in FIG. 20, such as (by way of example) 'Task 1' 86a in FIG. 23 or 'Task 2' 86b or 'Task 3' 86c or 'Task 4' 86d or 'Task 5' 86e or 'Task 6' 86f or 'Task 7' 86g or 'Task 8' 86h or 'Task 9' 86i. If the user selects (via the Task Manager 86) the 'Task 1' followed by 'Task 4' followed by 'Task 5' followed by 'Task 6' in FIG. 23, then, a workflow consisting of 'Task 1' followed by 'Task 4' followed by 'Task 5' followed by 'Task 6' will be executed by the Task Manager 86 of the processor 80a of the computer system 80 in FIG. 20 (see FIGS. 24 and 25 for an example of tasks selected by the user and workflows which could be executed by the Task Manager 86). If a workflow consisting of 'Task 1' followed by 'Task 4' followed by 'Task 5' followed by 'Task 6' is executed by the Task Manager 86, in FIG. 23, a 'task 1 instruction set' 88a stored in the Task Base 88 will first be executed by the Task Manager 86, then a 'task 4 instruction set' 88d stored in the Task Base 88 will then be executed by the Task Manager 86, then a 'task 5 instruction set' 88e stored in the Task Base 88 will then be executed by the Task Manager 86, then a 'task 6 instruction set' 88f stored in the Task Base 88 will then be executed by the Task Manager 86. In FIG. 21, the Task Dependency 92 (of the Automatic Well Planning Workflow Control System 80c1 stored in memory 80c of the computer system 80 in FIG. 20) will ensure that the tasks are executed by the Task Manager 86 in the 'proper order', that is, Task Dependency 92 will ensure that the 'Task 1 instruction set' 88a is executed first, then the 'Task 4 instruction set' 88d is executed second, and the 'Task 5 instruction set' 88e is executed third, and the the 'Task 6 instruction set' 88f is executed last by the Task Manager 86 of the processor 80a of the computer system 80 in FIG. 20. In FIG. 21, the Task Translator 94 and the Type Translator 96 will jointly ensure that each task receives its required 'input data' in the 'proper form'; that is, in FIG. 26, the Task Translator 94 and the Type Translator 96 will jointly ensure that 'Task 1' 88a receives its 'Input Data 1' from line 108 in 'proper form', and 'Task 4' 88d receives its 'Input Data 4' from line 110 in 'proper form', and 'Task 5' 88e receives its 'Input Data 5' from line 112 in 'proper form', and 'Task 6' 88f receives its 'Input Data 6' from line 114 in 'proper form'. In FIG. 26, when the Task Manager 86 and processor 80a executes 'Task 1' 88a, a 'first state' is generated by the 'Task Info' block 102 in FIG. 21; and when the Task Manager 86 and processor 80a executes 'Task 4' 88d, a 'second state' is generated by the 'Task Info' block 102 in FIG. 21; and when the Task Manager 86 and processor 80a executes 'Task 5' 88e, a 'third state' is generated by the 'Task Info' block 102 in FIG. 21; and when the Task Manager 86 and processor 80a executes 'Task 6' 88a, a 'fourth state' is generated by the 'Task Info' block 102 in FIG. 21. The 'first state' and the 'second state' and the 'third state' and the 'fourth state' can each include one of the following 'states', as follows:

```
///The Task has not run yet
        NotStarted,
        BeforeInput,
        InputFailed,
///Input finished
        InputSucceeded
///Input validation has failed
        InputCheckFailed,
///Input validation has succeeded
        InputCheckSucceeded,
///The Task is running
        Running,
///The Task is running
        Recompute,
///The Task execution was aborted
        ExecutionFailed,
///The Task has successfully completed execution
        ExecutionSucceeded,
///Output validation has failed
        OutputCheckFailed,
///Output validation has succeeded
        OutputCheckSucceeded,
```

In FIG. 21, it was noted earlier that the Task Dependency 92 (of the Automatic Well Planning Workflow Control System 80c1 stored in memory 80c of the computer system 80 in FIG. 20) will ensure that the 'task instruction sets' stored in the Task Base 88 (i.e., 'Task 1' 88a and 'Task 4' 88d and 'Task 5' 88e and 'Task 6' 88f in FIG. 26) are executed by the Task Manager 86 in the 'proper order'. When the execution of these 'task instruction sets' by the Task Manager 86 is completed, a 'first set of results' will be transmitted to the Task View Manager 98, the Task View Manager 98 ensuring that a 'first unit of measure' associated with the 'first set of results' is converted into a 'second unit of measure' prior to transmitting the 'first set of results' to the Task View Base 100. The 'first set of results' will then be recorded or displayed by the Task View Base 100 on the Recorder or Display device 80b of the computer system 80 in FIG. 20. If the user is not satisfied with one or more of the 'first set of results', in FIG. 26, the user can change one or more of the 'input data' being provided to one or more of the tasks, that is, in FIG. 26, the user can interface with the Task View Base 100 to use the Navigation Control 102 to change the 'Input Data 1' associated with 'Task 1' 88a, or the user can interface with the Task View Base 100 to use the Navigation Control 102 to change the 'Input Data 4' associated with 'Task 4' 88d, or the user can interface with the Task View Base 100 to use the Navigation Control 102 to change the 'Input Data 5' associated with 'Task 5' 88e, or the user can interface with the Task View Base 100 to use the Navigation Control 102 to change the 'Input Data 6' associated with 'Task 6' 88f. At that time, only those tasks that were affected by the changed input data (i.e., 'Task 1' followed by 'Task 4' followed by 'Task 5' followed by 'Task 6' in FIG. 27; or 'Task 5' followed by 'Task 6' in FIG. 28) will be re-executed in sequence by the Task Manager 86. For example, in FIG. 27, the user can interface with the Task View Base 100 to use the Navigation Control 102 to change 'Input Data 1' associated with 'Task 1' 88a, thereby providing 'Changed Input Data 1' to Task 1' 88a and producing a 'second set of results' on the Task View Base 100 of the recorder or display device 80b. When the 'Input Data 1' has been changed to 'Changed Input Data 1', since Tasks 1, 4, 5, and 6 are affected by the changed input data, the following tasks will be reexecuted in sequence: 'Task 1', 'Task 4', 'Task 5', and 'Task 6'. In FIG. 28, the user can interface with the Task View Base 100 to use the Navigation Control 102 to change 'Input Data 5' associated with 'Task 5' 88e, thereby providing 'Changed Input Data 5' to Task 5' 88e and producing a 'third set of results' on the Task View Base 100 of the recorder or display device 80b. When the 'Input Data 5' has been changed to 'Changed Input Data 5', since Tasks 5 and 6 are affected by the changed input data, the following tasks will be reexecuted in sequence: 'Task 5', and 'Task 6'.

In FIG. 23, the 'tasks' in the Task Manager 86 (i.e., 'Task 1' 86a through 'Task 9' 86i) can include the following: (1) the 'Risk Assessment' task of FIGS. 9A through 11, or the 'Bit Selection' task of FIGS. 12 through 15, or (3) the 'Drillstring Design' task of FIGS. 16 through 19.

In FIGS. 20 and 21, the Input Data 84a stored in memory 80c and accessed by the Access Manager 90 of the Automatic Well Planning Workflow Control System software 80c1 of FIGS. 20 and 21 of the present invention can include the following: (1) In FIG. 10, the Input Data 20a being provided to the Risk Assessment Logical Expressions 22 and the Risk Assessment Algorithms 24, (2) In FIG. 13, the Input Data 44a being provided to the Bit Selection Logical Expressions 46 and the Bit Selection Algorithms 48, and (3) In FIG. 17, the Input Data 64a being provided to the Drillstring Design Logical Expressions 66 and the Drillstring Design Algorithms 68.

In FIG. 23, the 'instruction sets' stored in the Task Base 88 (that is, the 'Task 1 instruction set' 88a through and including the 'Task 9 instruction set' 88i) can include the following: (1) In FIG. 10, the Risk Assessment Logical Expressions 22 and the Risk Assessment Algorithms 24, (2) In FIG. 13, the Bit Selection Logical Expressions 46 and the Bit Selection Algorithms 48, and (3) In FIG. 17, the Drillstring Design Logical Expressions 66 and the Drillstring Design Algorithms 68.

In FIGS. 20 and 21, the 'set of results' which are recorded or displayed by the Task View Base 100 on the Recorder or Display device 80b of the computer system 80 of FIG. 20, such as the 'first set of results' that is recorded or displayed by the Task View Base 100 in FIG. 26 or the 'second set of results' that is recorded or displayed by the Task View Base 100 in FIG. 27 or the 'third set of results' that is recorded or displayed by the Task View Base 100 in FIG. 28, can include the following: (1) In FIG. 10, the Risk Assessment Output Data 18b1, (2) In FIG. 13, the Bit Selection Output Data 42b1, and (3) In FIG. 17, the Drillstring Design Output Data 62b1.

In FIGS. 26, 27, and 28, if a user wanted to interface with the Task View Base 100 to use the Navigation Control 102 to change any of the 'input data' being provided to the 'tasks' (such as 'Input Data 1' for 'Task 1' 88a or 'Input Data 4' for 'Task 4' 88d, or 'Input Data 5' for 'Task 5' 88e, or 'Input Data 6' for 'Task 6' 88f), the user can do one of the following: (1) In FIG. 10, the user could use the Navigation Control 102 to change one or more of the 'Input Data' 20a being input to the Risk Assessment Logical Expressions 22 and the Risk Assessment Algorithms 24, (2) In FIG. 13, the user could use the Navigation Control 102 to change one or more of the 'Input Data' 44a being input to the Bit Selection Logical Expressions 46 and the Bit Selection Algorithms 48, and (3) In FIG. 17, the user could use the Navigation Control 102 to change one or more of the 'Input Data' 64a being input to the Drillstring Design Logical Expressions 66 and the Drillstring Design Algorithms 68.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of well planning in an automatic well planning system, comprising the steps of:
   selecting one or more tasks in a task manager executing on a processor, said one or more tasks comprising a drill-string design task;
   verifying, by a task dependency, a proper order of said one or more tasks, said task dependency describing input attributes and results attributes required for each of said one or more tasks;
   retrieving, by said task manager executing on said processor, from a task base one or more sets of instructions associated with said one or more tasks selected in the task manager and verified by said task dependency,
   retrieving, by said task manager executing on said processor, from an access manager one or more sets of input data associated with said one or more sets of instructions retrieved by said task manager from said task base, said one or more sets of input data comprising pore pressure, fracture gradient, and unconfined compressive strength;
   verifying that each set of input data of said one or more sets of input data retrieved by said task manager from said access manager is received by a corresponding one of said one or more sets of instructions retrieved by said task manager executing on said processor from said task base;
   executing, by said task manager executing on said processor, said one or more sets of instructions and using, by said task manager executing on said processor, said one or more sets of input data to generate a set of results comprising a summary of a drillstring in each hole section of a wellbore;
   displaying, by a task view base, said set of results on a display device;
   changing, by a navigation control in response to a user input, one of said sets of input data retrieved by said task manager, executing on said processor, from said access manager, thereby generating changed input data;
   identifying a portion of said one or more sets of instructions affected by said changed input data based on said task dependency;
   re-executing, by said task manager executing on said processor, said portion of said one or more sets of instructions and using, by said task manager executing on said processor, said changed input data to generate a second set of results; and
   displaying, by said task view base, said second set of results on said display device, said second set of results comprising drillstring design output data.

2. The method of claim 1, wherein said one or more tasks selected in said task manager is selected from a group consisting of: risk assessment and bit selection.

3. The method of claim 2, wherein said one or more sets of instructions retrieved by said task manager from said task base is selected from a group consisting of: risk assessment logical expressions and risk assessment algorithms, bit selection logical expressions and bit selection algorithms, and drillstring design logical expressions and drillstring design algorithms.

4. The method of claim 3, wherein said one or more sets of input data retrieving by said task manager from said access manager is selected from a group consisting of: input data provided to the risk assessment logical expressions and the risk assessment algorithms, input data provided to the bit selection logical expressions and the bit selection algorithms, and input data provided to the drillstring design logical expressions and the drillstring design algorithms.

5. The method of claim 4, wherein said set of results is selected from a group consisting of: risk assessment output data, bit selection output data, and drillstring design output data.

6. The method of claim 1, wherein said one or more tasks selected in said task manager is selected from a group consisting of: risk assessment and bit selection.

7. The method of claim 6, wherein said at least a portion of said one or more sets of instructions retrieved by said task manager from said task base is selected from a group consisting of: risk assessment logical expressions and risk assessment algorithms, bit selection logical expressions and bit selection algorithms, and drillstring design logical expressions and drillstring design algorithms.

8. The method of claim 7, wherein said one or more sets of input data retrieving by said task manager from said access manager is selected from a group consisting of: input data provided to the risk assessment logical expressions and the risk assessment algorithms, input data provided to the bit selection logical expressions and the bit selection algorithms, and input data provided to the drillstring design logical expressions and the drillstring design algorithms.

9. The method of claim 8, wherein said second set of results further comprises one selected from a group consisting of: risk assessment output data and bit selection output data.

10. The method of claim 1, wherein said one or more tasks selected in said task manager comprises a risk assessment task adapted for generating risk information in response to said one or more sets of input data.

11. The method of claim 10, wherein said set of results for said risk assessment task that is displayed by said task view base on said display device comprises said risk information, said risk information including individual risks, subcategory risks, and risk categories.

12. The method of claim 11, wherein said individual risks are selected from a group consisting of: H2S and CO2, Hydrates, Well water depth, Tortuosity, Dogleg severity, Directional Drilling Index, Inclination, Horizontal displacement, Casing Wear, High pore pressure, Low pore pressure, Hard rock, Soft Rock, High temperature, Water-depth to rig rating, Well depth to rig rating, mud weight to kick, mud weight to losses, mud weight to fracture, mud weight window, Wellbore stability window, wellbore stability, Hole section length, Casing design factor, Hole to casing clearance, casing to casing clearance, casing to bit clearance, casing linear weight, Casing maximum overpull, Low top of cement, Cement to kick, cement to losses, cement to fracture, Bit excess work, Bit work, Bit footage, bit hours, Bit revolutions, Bit Rate of Penetration, Drillstring maximum overputt, Bit compressive strength, Kick tolerance, Critical flow rate, Maximum flow rate, Small nozzle area, Standpipe pressure, ECD to fracture, ECD to losses, Gains, Gains Average, Losses, Losses average, Stuck, Stuck average, Mechanical, Mechanical average, Risk Average, Subsea BOP, Large Hole, Small Hole, Number of casing strings, Drillstring parting, and Cuttings.

13. The method of claim 11, wherein said subcategory risks of said risk categories are selected from a group consisting of: gains risks, losses risks, stuck pipe risks, and mechanical risks.

14. The method of claim 11, wherein said risk categories are selected from a group consisting of: an average individual risk, an average subcategory risk, a total risk, an average total risk, a potential risk for each design task, and an actual risk for each design task.

15. The method of claim 11, wherein said one or more sets of input data for said risk assessment task is selected from a group consisting of: Casing Point Depth, Measured Depth, True Vertical Depth, Mud Weight, Measured Depth, ROP, Pore Pressure, Static Temperature, Pump Rate, Dog Leg Severity, ECD, Inclination, Hole Size, Casing Size, Easting-westing, Northing-Southing, Water Depth, Maximum Water Depth, Maximum well Depth, Kick Tolerance, Drill Collar 1 Weight, Drill Collar 2 Weight, Drill Pipe Weight, Heavy Weight Weight, Drill Pipe Tensile Rating, Upper Wellbore Stability Limit, Lower Wellbore Stability Limit, Unconfined Compressive Strength, Bit Size, Mechanical drilling energy (UCS integrated over distance drilled by the bit), Ratio of footage drilled compared to statistical footage, Cumulative UCS, Cumulative Excess UCS, Cumulative UCS Ratio, Average UCS of rock in section, Bit Average UCS of rock in section, Statistical Bit Hours, Statistical Drilled Footage for the bit, RPM, On Bottom Hours, Calculated Total Bit Revolutions, Time to Trip, Critical Flow Rate, Maximum Flow Rate in hole section, Minimum Flow Rate in hole section, Flow Rate, Total Nozzle Flow Area of bit, Top Of Cement, Top of Tail slurry, Length of Lead slurry, Length of Tail slurry, Cement Density Of Lead, Cement Density Of Tail slurry, Casing Weight per foot, Casing Burst Pressure, Casing Collapse Pressure, Casing Type Name, Hydrostatic Pressure of Cement column, Start Depth, End Depth, Conductor, Hole Section Begin Depth, Openhole Or Cased hole completion, Casing Internal Diameter, Casing Outer Diameter, Mud Type, Pore Pressure without Safety Margin, Tubular Burst Design Factor, Casing Collapse Pressure Design Factor, Tubular Tension Design Factor, Derrick Load Rating, Drawworks Rating, Motion Compensator Rating, Tubular Tension rating, Statistical Bit ROP, Statistical Bit RPM, Well Type, Maximum Pressure, Maximum Liner Pressure Rating, Circulating Pressure, Maximum UCS of bit, Air Gap, Casing Point Depth, Presence of H2S, Presence of CO2, Offshore Well, and Flow Rate Maximum Limit.

16. The method of claim 1, wherein said one or more tasks selected in said task manager comprises a bit selection task adapted for generating a sequence of drill bits and other associated data in response to said one or more sets of input data.

17. The method of claim 16, wherein said set of results for said bit selection task that are displayed by said task view base on said display device comprise said sequence of drill bits and other associated data.

18. The method of claim 17, wherein said set of results for said bit selection task that are displayed by said task view base on said display device is selected from a group consisting of: Measured Depth, Cumulative Unconfined Compressive Strength (UCS), Cumulative Excess UCS, Bit Size, Bit Type, Start Depth, End Depth, Hole Section Begin Depth, Average UCS of rock in section, Maximum UCS of bit, Bit Average UCS of rock in section, Footage, Statistical Drilled Footage for the bit, Ratio of footage drilled compared to statistical footage, Statistical Bit Hours, On Bottom Hours, Rate of Penetration (ROP), Statistical Bit Rate of Penetration (ROP), Mechanical drilling energy (UCS integrated over distance drilled by the bit),Weight On Bit, Revolutions per Minute (RPM), Statistical Bit RPM, Calculated Total Bit Revolutions, Time to Trip, Cumulative Excess as a ration to the Cumulative UCS, Bit Cost, and Hole Section Name.

19. The method of claim 17, wherein said one or more sets of input data for said bit selection task is selected from a group consisting of: Measured Depth, Unconfined Compressive Strength, Casing Point Depth, Hole Size, Conductor, Casing Type Name, Casing Point, Day Rate Rig, Spread Rate Rig, and Hole Section Name.

20. The method of claim 1, wherein said summary of said drillstring in each hole section of said wellbore is generated in response to said one or more sets of input data.

21. The method of claim 20, wherein said set of results for said drillstring design task that are displayed by said task view base on said display device comprise said summary of said drillstring in each hole section of said wellbore.

22. The method of claim 21, wherein said set of results for said drillstring design task that are displayed by said task view base on said display device representing said summary of said drillstring in each hole section of said wellbore is selected from a group consisting of: Hole Section Begin Depth, Drill Collar 1 Length, Drill Collar 1 Weight, Drill Collar 1, Drill Collar 1 OD, Drill Collar 1 ID, Drill Collar 2 Length, Drill Collar 2 Weight, Drill Collar 2, Drill Collar 2 OD, Drill Collar 2 ID, Heavy Weight Length, Heavy Weight Weight, Heavy Weight, Heavy Weight OD, Heavy Weight ID, Drill Pipe Length, Drill Pipe Weight, Pipe, Pipe OD, Pipe ID, Drill Pipe Tensile Rating, BHA tools, Duration, Kick Tolerance, Drill Collar 1 Linear Weight, Drill Collar 2 Linear Weight, Heavy Weight Linear Weight, Drill Pipe Linear Weight, DC OD, Drill Collar ID, Drill Collar Linear Weight, HW OD, HW ID, HW Linear Weight, Drill Pipe OD, Drill Pipe ID, and Drill Pipe Linear Weight.

23. The method of claim 21, wherein said one or more sets of input data for said drillstring design task is selected from a group consisting of: Measured Depth, True Vertical Depth, Weight On Bit, Mud Weight, Mud Weight Measured Depth, Inclination, Casing Point Depth, Hole Size, Footage, Rate of Penetration, Time to Trip, Dog Leg Severity, True Vertical Depth, Pore Pressure without Safety Margin, Bit Size, Upper Wellbore Stability Limit, Lower Wellbore Stability Limit, Openhole Or Cased hole completion, BOP Location, Casing Type Name, Hole Section Name, Conductor, Start Depth, End Depth, On Bottom Hours, Statistical Drilled Footage for the bit, Cumulative UCS, Casing Point, Casing Size, Casing Burst Pressure, Casing Collapse Pressure, Casing Connector, Casing Cost, Casing Grade, Casing Weight per foot, Casing Outer Diameter, Casing Internal Diameter, Air Gap, Casing Top Measure Depth, Water Depth, Top of Tail slurry, Top Of Cement, Mud Volume, and Offshore Well.

24. A program storage device readable by a machine tangibly embodying a program of instructions executable by the machine to perform method steps adapted for well planning in an automatic well planning system, said method steps comprising:

selecting one or more tasks in a task manager, said one or more tasks comprising a drillstring design task;

verifying by a task dependency a proper order of said one or more tasks, said task dependency describing input attributes and results attributes required for each of said one or more tasks;

retrieving by said task manager from a task base one or more sets of instructions associated with said one or more tasks selected in the task manager and verified by said task dependency;

retrieving by said task manager from an access manager one or more sets of input data associated with said one or more sets of instructions retrieved by said task manager from said task base, said one or more sets of input data comprising pore pressure, fracture gradient, and unconfined compressive strength;

verifying that each set of input data of said one or more sets of input data retrieved by said task manager from said access manager is received by a corresponding one of said one or more sets of instructions retrieved by said task manager from said task base;

executing, by said task manager, said one or more sets of instructions and using, by said task manager, said one or more sets of input data to generate a set of results comprising a summary of a drillstring in each hole section of a wellbore;

displaying, by a task view base, said set of results on a display device;

changing, by a navigation control in response to a user input, one of said sets of input data retrieved by said task manager from said access manager thereby generating changed input data;

identifying a portion of said one or more sets of instructions affected by said changed input data based on said task dependency;

re-executing, by said task manager, said portion of said one or more sets of instructions and using, by said task manager, said changed input data to generate a second set of results; and displaying, by said task view base, said second set of results on said display device, said second set of results comprising drillstring design output data.

25. The program storage device of claim 24, wherein said one or more tasks selected in said task manager is selected from a group consisting of: risk assessment and bit selection.

26. The program storage device of claim 25, wherein said one or more sets of instructions retrieved by said task manager from said task base is selected from a group consisting of: risk assessment logical expressions and risk assessment algorithms, bit selection logical expressions and bit selection algorithms, and drillstring design logical expressions and drillstring design algorithms.

27. The program storage device of claim 26, wherein said one or more sets of input data retrieving by said task manager from said access manager is selected from a group consisting of: input data provided to the risk assessment logical expressions and the risk assessment algorithms, input Data provided to the bit selection logical expressions and the bit selection algorithms, and input data provided to the drillstring design logical expressions and the drillstring design algorithms.

28. The program storage device of claim 27, wherein said set of results is selected from a group consisting of: risk assessment output data, bit selection output data, and drillstring design output data.

29. The program storage device of claim 24, wherein said one or more tasks selected in said task manager is selected from a group consisting of: risk assessment and bit selection.

30. The program storage device of claim 29, wherein said at least a portion of said one or more sets of instructions retrieved by said task manager from said task base is selected from a group consisting of: risk assessment logical expressions and risk assessment algorithms, bit selection logical expressions and bit selection algorithms, and drillstring design logical expressions and drillstring design algorithms.

31. The program storage device of claim 30, wherein said one or more sets of input data retrieving by said task manager from said access manager is selected from a group consisting of: input data provided to the risk assessment logical expressions and the risk assessment algorithms, input Data provided to the bit selection logical expressions and the bit selection algorithms, and input data provided to the drillstring design logical expressions and the drillstring design algorithms.

32. The program storage device of claim 31, wherein said second set of results further comprises one selected from a group consisting of: risk assessment output data and bit selection output data.

33. The program storage device of claim 24, wherein said one or more tasks selected in said task manager comprises a risk assessment task adapted for generating risk information in response to said one or more sets of input data.

34. The program storage device of claim 33, wherein said set of results for said risk assessment task that is displayed by said task view base on said display device comprises said risk information, said risk information including individual risks, subcategory risks, and risk categories.

35. The program storage device of claim 34, wherein said individual risks are selected from a group consisting of: H2S and CO2, Hydrates, Well water depth, Tortuosity, Dogleg severity, Directional Drilling Index, Inclination, Horizontal displacement, Casing Wear, High pore pressure, Low pore pressure, Hard rock, Soft Rock, High temperature, Waterdepth to rig rating, Well depth to rig rating, mud weight to kick, mud weight to losses, mud weight to fracture, mud weight window, Wellbore stability window, wellbore stability, Hole section length, Casing design factor, Hole to casing clearance, casing to casing clearance, casing to bit clearance, casing linear weight, Casing maximum overpull, Low top of cement, Cement to kick, cement to losses, cement to fracture, Bit excess work, Bit work, Bit footage, bit hours, Bit revolutions, Bit Rate of Penetration, Drillstring maximum overputt, Bit compressive strength, Kick tolerance, Critical flow rate, Maximum flow rate, Small nozzle area, Standpipe pressure, ECD to fracture, ECD to losses, Gains, Gains Average, Losses, Losses average, Stuck, Stuck average, Mechanical, Mechanical average, Risk Average, Subsea BOP, Large Hole, Small Hole, Number of casing strings, Drillstring parting, and Cuttings.

36. The program storage device of claim 34, wherein said subcategory risks of said risk categories are selected from a group consisting of: gains risks, losses risks, stuck pipe risks, and mechanical risks.

37. The program storage device of claim 34, wherein said risk categories are selected from a group consisting of: an average individual risk, an average subcategory risk, a total risk, an average total risk, a potential risk for each design task, and an actual risk for each design task.

38. The program storage device of claim 34, wherein said one or more sets of input data for said risk assessment task is selected from a group consisting of: Casing Point Depth, Measured Depth, True Vertical Depth, Mud Weight, Measured Depth, ROP, Pore Pressure, Static Temperature, Pump Rate, Dog Leg Severity, ECD, Inclination, Hole Size, Casing Size, Easting-westing, Northing-Southing, Water Depth, Maximum Water Depth, Maximum well Depth, Kick Tolerance, Drill Collar 1 Weight, Drill Collar 2 Weight, Drill Pipe Weight, Heavy Weight Weight, Drill Pipe Tensile Rating, Upper Wellbore Stability Limit, Lower Wellbore Stability Limit, Unconfined Compressive Strength, Bit Size, Mechanical drilling energy (UCS integrated over distance drilled by the bit), Ratio of footage drilled compared to statistical footage, Cumulative UCS, Cumulative Excess UCS, Cumulative UCS Ratio, Average UCS of rock in section, Bit Average UCS of rock in section, Statistical Bit Hours, Statistical Drilled Footage for the bit, RPM, On Bottom Hours, Calculated Total Bit Revolutions, Time to Trip, Critical Flow Rate, Maximum Flow Rate in hole section, Minimum Flow Rate in hole section, Flow Rate, Total Nozzle Flow Area of bit, Top Of Cement, Top of Tail slurry, Length of Lead slurry, Length of Tail slurry, Cement Density Of Lead, Cement Density Of Tail slurry, Casing Weight per foot, Casing Burst Pressure, Casing Collapse Pressure, Casing Type Name, Hydrostatic Pressure of Cement column, Start Depth, End Depth, Conductor, Hole Section Begin Depth, Openhole Or Cased hole completion, Casing Internal Diameter, Casing Outer Diameter, Mud Type, Pore Pressure without Safety Margin, Tubular Burst Design Factor, Casing Collapse Pressure Design Factor, Tubular Tension Design Factor, Derrick Load Rating, Drawworks Rating, Motion Compensator Rating, Tubular Tension rating, Statistical Bit ROP, Statistical Bit RPM, Well Type, Maximum Pressure, Maximum Liner Pressure Rating, Circulating Pressure, Maximum UCS of bit, Air Gap, Casing Point Depth, Presence of H2S, Presence of CO2, Offshore Well, and Flow Rate Maximum Limit.

39. The program storage device of claim 24, wherein said one or more tasks selected in said task manager comprises a bit selection task adapted for generating a sequence of drill bits and other associated data in response to said one or more sets of input data.

40. The program storage device of claim 39, wherein said set of results for said bit selection task that are displayed by said task view base on said display device comprise said sequence of drill bits and other associated data.

41. The program storage device of claim 40, wherein said set of results for said bit selection task that are displayed by said task view base on said display device is selected from a group consisting of: Measured Depth, Cumulative Unconfined Compressive Strength (UCS), Cumulative Excess UCS, Bit Size, Bit Type, Start Depth, End Depth, Hole Section Begin Depth, Average UCS of rock in section, Maximum UCS of bit, Bit Average UCS of rock in section, Footage, Statistical Drilled Footage for the bit, Ratio of footage drilled compared to statistical footage, Statistical Bit Hours, On Bottom Hours, Rate of Penetration (ROP), Statistical Bit Rate of Penetration (ROP), Mechanical drilling energy (UCS integrated over distance drilled by the bit), Weight On Bit, Revolutions per Minute (RPM), Statistical Bit RPM, Calculated Total Bit Revolutions, Time to Trip, Cumulative Excess as a ration to the Cumulative UCS, Bit Cost, and Hole Section Name.

42. The program storage device of claim 40, wherein said one or more sets of input data for said bit selection task is selected from a group consisting of: Measured Depth, Unconfined Compressive Strength, Casing Point Depth, Hole Size, Conductor, Casing Type Name, Casing Point, Day Rate Rig, Spread Rate Rig, and Hole Section Name.

43. The program storage device of claim 11, wherein summary of said drillstring in each hole section of said wellbore is generated in response to said one or more sets of input data.

44. The program storage device of claim 43, wherein said set of results for said drillstring design task that are displayed by said task view base on said display device comprise said summary of said drillstring in each hole section of said wellbore.

45. The program storage device of claim 44, wherein said set of results for said drillstring design task that are displayed by said task view base on said display device representing said summary of said drillstring in each hole section of said wellbore is selected from a group consisting of: Hole Section Begin Depth, Drill Collar 1 Length, Drill Collar 1 Weight, Drill Collar 1, Drill Collar 1 OD, Drill Collar 1 ID, Drill Collar 2 Length, Drill Collar 2 Weight, Drill Collar 2, Drill Collar 2 OD, Drill Collar 2 ID, Heavy Weight Length, Heavy Weight Weight, Heavy Weight, Heavy Weight OD, Heavy Weight ID, Drill Pipe Length, Drill Pipe Weight, Pipe, Pipe OD, Pipe ID, Drill Pipe Tensile Rating, BHA tools, Duration, Kick Tolerance, Drill Collar 1 Linear Weight, Drill Collar 2

Linear Weight, Heavy Weight Linear Weight, Drill Pipe Linear Weight, DC OD, Drill Collar ID, Drill Collar Linear Weight, HW OD, HW ID, HW Linear Weight, Drill Pipe OD, Drill Pipe ID, and Drill Pipe Linear Weight.

46. The program storage device of claim 44, wherein said one or more sets of input data for said drillstring design task is selected from a group consisting of: Measured Depth, True Vertical Depth, Weight On Bit, Mud Weight, Mud Weight Measured Depth, Inclination, Casing Point Depth, Hole Size, Footage, Rate of Penetration, Time to Trip, Dog Leg Severity, True Vertical Depth, Pore Pressure without Safety Margin, Bit Size, Upper Wellbore Stability Limit, Lower Wellbore Stability Limit, Openhole Or Cased hole completion, BOP Location, Casing Type Name, Hole Section Name, Conductor, Start Depth, End Depth, On Bottom Hours, Statistical Drilled Footage for the bit, Cumulative UCS, Casing Point, Casing Size, Casing Burst Pressure, Casing Collapse Pressure, Casing Connector, Casing Cost, Casing Grade, Casing Weight per foot, Casing Outer Diameter, Casing Internal Diameter, Air Gap, Casing Top Measure Depth, Water Depth, Top of Tail slurry, Top Of Cement, Mud Volume, and Offshore Well.

47. An automatic well planning system, comprising:
- task manager apparatus adapted for receiving one or more tasks selected by a user, said one or more tasks comprising a drillstring design task;
- task dependency apparatus adapted for verifying a proper order of said one or more tasks, wherein said task dependency apparatus describes input data attributes and results attributes required for each of said one or more tasks,
- said task manager apparatus retrieving from a task base one or more sets of instructions associated with said one or more tasks received in said task manager apparatus and verified by said task dependency apparatus,
- said task manager apparatus retrieving from an access manager one or more sets of input data associated with said one or more sets of instructions retrieved by said task manager from said task base, said one or more sets of input data comprising pore pressure, fracture gradient, and unconfined compressive strength;
- translator apparatus adapted for verifying that each set of input data of said one or more sets of input data retrieved by said task manager apparatus from said access manager is received by a corresponding one of said one or more sets of instructions retrieved by said task manager apparatus from said task base,
- said task manager executing said one or more sets of instructions and using said one or more sets of input data to generate a set of results comprising a summary of a drillstring in each hole section of a wellbore;
- task view base apparatus adapted for displaying said set of results on a display device;
- navigation control apparatus, responsive to a user input, adapted for changing said one or more sets of input data retrieved by said task manager apparatus from said access manager thereby generating one or more sets of changed input data,
- said task manager apparatus identifying a portion of said one or more sets of instructions affected by said changed input data based on said task dependency;
- said task manager apparatus re-executing said portion of said one or more sets of instructions and using said one or more sets of changed input data to generate a second set of results,
- said task view base apparatus displaying said second set of results on said display device, said second set of results comprising drillstring design output data.

48. The system of claim 47, wherein said one or more tasks selected in said task manager by said user is selected from a group consisting of: risk assessment and bit selection.

49. The system of claim 48, wherein said one or more sets of instructions retrieved by said task manager apparatus from said task base is selected from a group consisting of: risk assessment logical expressions and risk assessment algorithms, bit selection logical expressions and bit selection algorithms, and drillstring design logical expressions and drillstring design algorithms.

50. The system of claim 49, wherein said one or more sets of input data retrieving by said task manager apparatus from said access manager is selected from a group consisting of: input data provided to the risk assessment logical expressions and the risk assessment algorithms, input Data provided to the bit selection logical expressions and the bit selection algorithms, and input data provided to the drillstring design logical expressions and the drillstring design algorithms.

51. The system of claim 50, wherein said set of results is selected from a group consisting of: risk assessment output data, bit selection output data, and drillstring design output data.

52. The system of claim 47, wherein said one or more tasks selected in said task manager by said user is selected from a group consisting of: risk assessment and bit selection.

53. The system of claim 52, wherein said at least a portion of said one or more sets of instructions retrieved by said task manager apparatus from said task base is selected from a group consisting of: risk assessment logical expressions and risk assessment algorithms, bit selection logical expressions and bit selection algorithms, and drillstring design logical expressions and drillstring design algorithms.

54. The system of claim 53, wherein said one or more sets of input data retrieving by said task manager apparatus from said access manager is selected from a group consisting of: input data provided to the risk assessment logical expressions and the risk assessment algorithms, input Data provided to the bit selection logical expressions and the bit selection algorithms, and input data provided to the drillstring design logical expressions and the drillstring design algorithms.

55. The system of claim 54, wherein said second set of results is selected from a group consisting of: risk assessment output data, bit selection output data, and drillstring design output data.

* * * * *